(12) United States Patent
Reigan et al.

(10) Patent No.: US 12,435,059 B2
(45) Date of Patent: Oct. 7, 2025

(54) AMP-ACTIVATED PROTEIN KINASE INHIBITORS AND METHODS OF MAKING AND USING THE SAME

(71) Applicant: The Regents of the University of Colorado, Denver, CO (US)

(72) Inventors: Philip Reigan, Denver, CO (US); Christopher J. Matheson, Newcastle upon Tyne (GB); Craig Jordan, Aurora, CO (US)

(73) Assignee: The Regents of the University of Colorado, A Body Corporate, Denver, CO (US)

( * ) Notice: Subject to any disclaimer, the term of this patent is extended or adjusted under 35 U.S.C. 154(b) by 924 days.

(21) Appl. No.: 17/620,317

(22) PCT Filed: Jul. 2, 2020

(86) PCT No.: PCT/US2020/040611
§ 371 (c)(1),
(2) Date: Dec. 17, 2021

(87) PCT Pub. No.: WO2021/003339
PCT Pub. Date: Jan. 7, 2021

(65) Prior Publication Data
US 2022/0289707 A1 Sep. 15, 2022

Related U.S. Application Data

(60) Provisional application No. 62/870,672, filed on Jul. 3, 2019.

(51) Int. Cl.
*C07D 401/06* (2006.01)
*A61P 35/02* (2006.01)

(52) U.S. Cl.
CPC ............ *C07D 401/06* (2013.01); *A61P 35/02* (2018.01)

(58) Field of Classification Search
CPC ........ A61P 35/00; A61P 35/02; C07D 401/06; C07D 403/06
See application file for complete search history.

(56) References Cited

U.S. PATENT DOCUMENTS

| | | | |
|---|---|---|---|
| 2014/0275076 | A1 | 9/2014 | Tsuboi et al. |
| 2016/0031888 | A1* | 2/2016 | Li .................. C07D 471/04 540/521 |
| 2016/0368870 | A1* | 12/2016 | Madanahalli Ranganath Rao ...... A61K 31/427 |

FOREIGN PATENT DOCUMENTS

| | | |
|---|---|---|
| WO | WO-2008033562 A2 | 3/2008 |
| WO | WO-2008033743 A1 | 3/2008 |
| WO | WO-2010104406 A1 | 9/2010 |

OTHER PUBLICATIONS

Yang et al., Pyrrole indolin-2-One Based Kinase Inhibitor as Anti-Cancer Agents, Journal of Cancer Treatment and Diagnosis, vol. 2, No. 5, 24-29, 2018 (Year: 2018).*

(Continued)

*Primary Examiner* — Sarah Pihonak
*Assistant Examiner* — Padmaja S Rao
(74) *Attorney, Agent, or Firm* — Snell & Wilmer, L.L.P.

(57) ABSTRACT

The present disclosure relates to compounds of Formula (I):

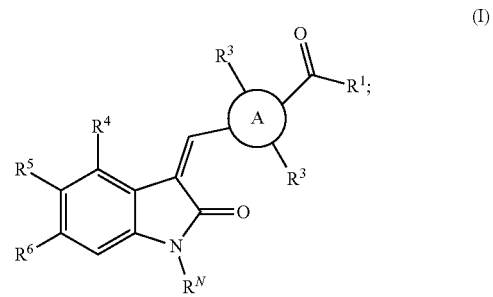

stereoisomers thereof, prodrugs thereof, and pharmaceutically acceptable salts thereof. The present disclosure also relates to uses of the compounds, e.g., to inhibit AMP-Activated protein kinase (AMPK) and treat cancer in a subject.

19 Claims, 13 Drawing Sheets

(56) References Cited

OTHER PUBLICATIONS

Berge, S. M., et al., "Pharmaceutical Salts," Journal of Pharmaceutical Sciences, Jan. 1977, vol. 66, No. 1, pp. 1-19.
Prakash et al. "Indolinones as Promising Scaffold as Kinase Inhibitors: A Review", Mini-Reviews in Medicinal Chemistry, 2012, vol. 12, No. 2, pp. 98-119.

* cited by examiner

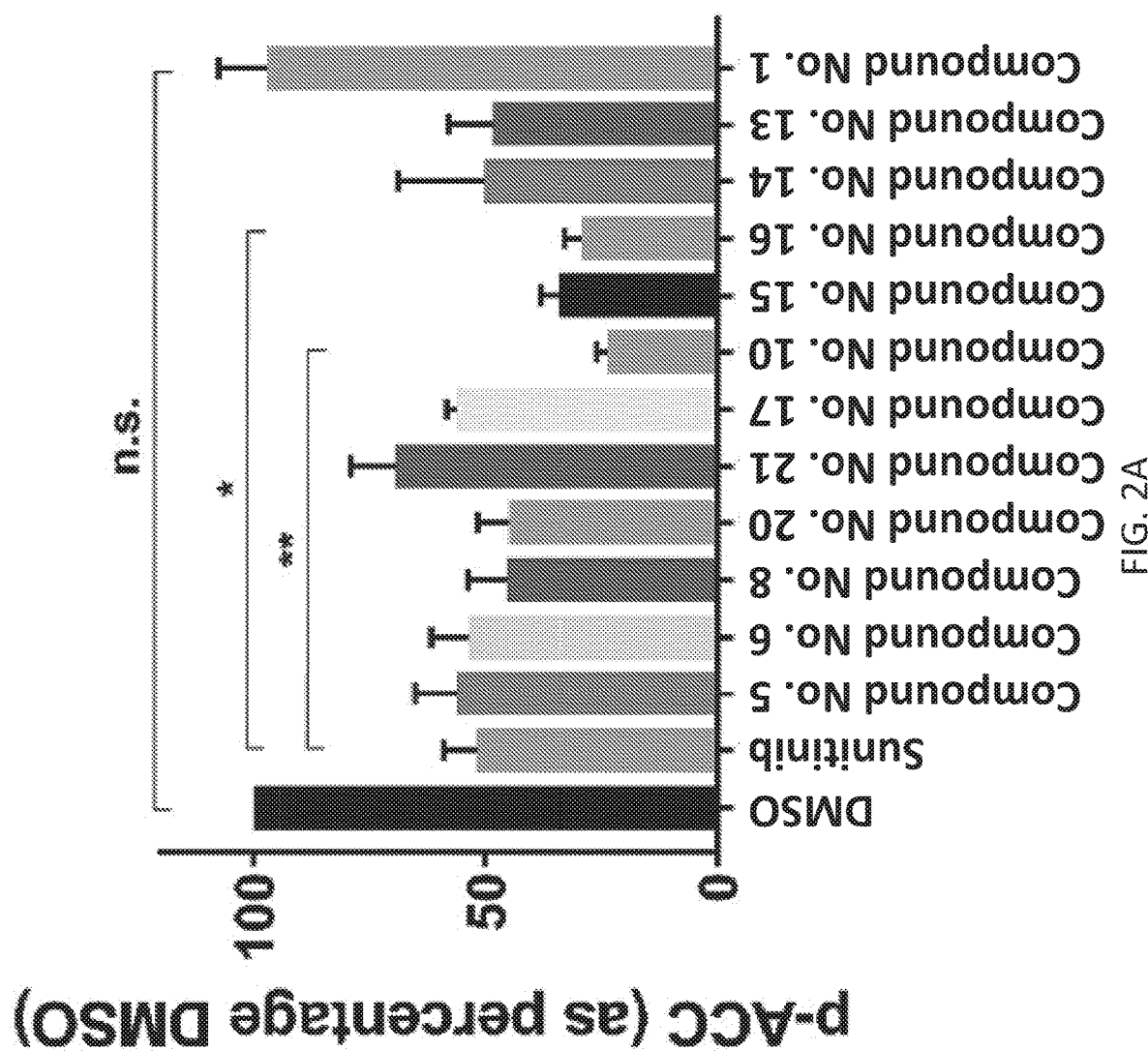

AMP-ACTIVATED PROTEIN KINASE INHIBITORS AND METHODS OF MAKING AND USING THE SAME

RELATED APPLICATIONS

This application is a U.S. National Phase application, filed under 35 U.S.C. § 371, of International Application No. PCT/US2020/040611, filed Jul. 2, 2020, which claims priority to U.S. Provisional Application No. 62/870,672, filed Jul. 3, 2019, the entire contents of each of which are incorporated herein by reference.

GOVERNMENT INTEREST

This invention was made with government support under grant number R01CA200707 awarded by the National Institutes of Health (NIH). The government has certain rights in this invention.

TECHNICAL FIELD

The invention relates to improvements in drug design and disease therapy.

BACKGROUND

AMP-Activated protein kinase (AMPK) is a heterotrimeric complex consisting of a catalytic α subunit, a scaffolding β subunit, and a regulatory γ subunit that acts as a central metabolic sensor at the interface of metabolic and signaling networks. The γ subunit contains three adenosine phosphate binding sites. ATP, ADP, and AMP compete for two of these binding sites and one of the sites is constitutively occupied by AMP, independent of changes in the cellular AMP:ATP ratio. The activation of AMPK under conditions of energetic stress is modulated in part by an allosteric mechanism, whereby the depletion of ATP promotes AMP binding to the γ subunit and phosphorylation of Thr172 within the activation loop by liver kinase B1 (LKB1) or $Ca^{2+}$/calmodulin dependent protein kinase (CaMMK) results in a conformational change and increased activity at the catalytic a subunit. Activated AMPK promotes multiple catabolic processes to generate ATP, such as glucose uptake, glycolysis, fatty acid uptake and oxidation, and mitochondrial biogenesis. In addition, AMPK activation suppresses the cell cycle, and anabolic processes such as the mammalian Target of Rapamycin Complex 1 (mTORC1)-dependent protein synthesis, and fatty acid biosynthesis via inactivating phosphorylation of cytosolic acetyl-CoA carboxylase 1 (ACC1) and mitochondrial ACC2. AMPK activity can be affected by Thr172 dephosphorylation, but the main mechanism of negative regulation is through increased cellular ATP levels, where ATP binding to the γ subunit induces a conformational change in the autoinhibitory domain that interacts with the kinase domain to maintain AMPK in an inactive state.

Due to the integral role of AMPK in regulating glucose and lipid homeostasis to promote cell survival under conditions of energetic stress, it has become a therapeutic target for obesity, insulin resistance, type-II diabetes, non-alcoholic fatty liver disease, cardiovascular disease, and cancer.

SUMMARY

In some aspects, the present disclosure provides a compound of Formula (I):

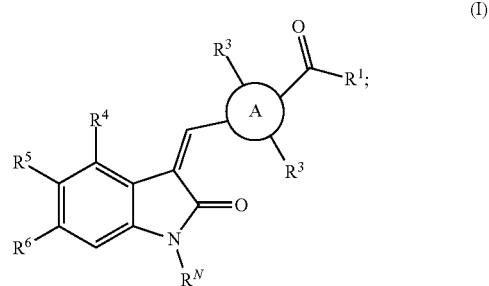

a stereoisomer thereof, a prodrug thereof, or a pharmaceutically acceptable salt thereof, wherein:
A is $C_6$ aryl or 5- to 6-membered heteroaryl containing 1 to 3 heteroatoms selected from N, O, and S;
$R^N$ is H or $C_{1-6}$ alkyl;
$R^1$ is H, $C_{1-6}$ alkyl, $C_{1-6}$ alkoxy, $OR^7$, $NR^8R^9$, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{1S}$;
each $R^{1S}$ is independently $C_{1-6}$ alkyl, $OR^7$, $CO_2R^7$, $NR^8R^9$, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{1SS}$;
each $R^{1SS}$ is independently $C_{1-6}$ alkyl, $OR^7$, $CO_2R^7$, $NR^8R^9$;
$R^2$ is H, $C_{1-6}$ alkyl, $OR^7$, $CO_2R^7$, or $NR^8R^9$; wherein the $C_{1-6}$ alkyl is optionally substituted with one or more $C_{1-6}$ alkyl, $OR^7$, $CO_2R^7$, or $NR^8R^9$;
$R^3$ is H, $C_{1-6}$ alkyl, $OR^7$, $CO_2R^7$, or $NR^8R^9$; wherein the $C_{1-6}$ alkyl is optionally substituted with one or more $C_{1-6}$ alkyl, $OR^7$, $CO_2R^7$, or $NR^8R^9$;
$R^4$ is H, $C_{1-6}$ alkyl, $OR^7$, $CO_2R^7$, or $NR^8R^9$, wherein the $C_{1-6}$ alkyl is optional substituted with one or more $C_{1-6}$ alkyl, $OR^7$, $CO_2R^7$, or $NR^8R^9$,
$R^5$ is H, halogen, cyano, $C_{1-6}$ alkyl, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{5S}$;
each $R^{5S}$ is independently $C_{1-6}$ alkyl, $OR^7$, $CO_2R^7$, $OC(=O)R^7$, $NHC(=O)R^7$, $NR^8R^9$,

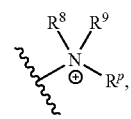

$NHC(=O)NR^8R^9$, $C(=O)NR^8R^9$, CN, azido, $C_6$ aryl, or 5- to 6-membered heteroaryl containing 1 to 3 heteroatoms selected from N, O, and S; wherein the wherein the $C_{1-6}$ alkyl, $C_6$ aryl, or 5- to 6-membered heteroaryl is optionally substituted with one or more $R^{5SS}$;

each $R^{5SS}$ is independently $C_{1-6}$ alkyl, $OR^7$, $CO_2R^7$, or $NR^8R^9$; wherein the $C_{1-6}$ alkyl is optionally substituted with one or more $C_{1-6}$ alkyl, $OR^7$, $CO_2R^7$, or $NR^8R^9$;

$R^6$ is H, $C_{1-6}$ alkyl, $C_{2-4}$ alkenyl, $C_{1-4}$ alkoxy, halogen, $C_6$ aryl, or 5- to 6-membered heteroaryl containing 1 to 3 heteroatoms selected from N, O, and S; wherein the $C_{1-6}$ alkyl is optionally substituted with one or more $C_{1-6}$ alkyl, $OR^7$, $NR^8R^9$;

each $R^7$ is independently H, $C_{1-6}$ alkyl, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $C_{1-6}$ alkyl;

$R^8$ and $R^9$ each are independently H, $C_{1-6}$ alkyl, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $C_{1-6}$ alkyl, $OR^7$, $CO_2R^7$, $OC(=O)R^7$, $NR^{10}R^{11}$ in which the $C_{1-6}$ alkyl is optionally substituted with one or more $C_{1-6}$ alkyl, $OR^7$, $CO_2R^7$, $NR^{10}R^{11}$;

$R^{10}$ and $R^{11}$ each are independently H or $C_{1-6}$ alkyl; and each $R^P$ is independently H or $C_{1-6}$ alkyl optionally substituted with one or more 5- to 6-membered heteroaryl containing 1 to 3 heteroatoms selected from N, O, and S; wherein the 5- to 6-membered heteroaryl is optionally substituted with one or more $C_{1-6}$ alkyl or $NO_2$.

In some aspects, the present disclosure provides a compound being an isotopic derivative (e.g., isotopically labeled compound) of any one of the compounds of the Formulae disclosed herein.

In some aspects, the present disclosure provides a method of preparing a compound disclosed herein.

In some aspects, the present disclosure provides a pharmaceutical composition comprising at least one compound of each of the formulae described herein, or a pharmaceutically acceptable salt or solvate thereof, and one or more pharmaceutically acceptable carriers or excipients.

In some aspects, the present disclosure provides a method of treating a cancer in a subject, the method comprising administering to the subject at least one therapeutically effective amount of at least one compound of the present disclosure. The present disclosure provides at least one compound of the present disclosure for use in the treatment of a cancer in a subject, wherein the at least one compound of the present disclosure is for administration to the subject in at least one therapeutically effective amount. The present disclosure provides at least one compound of the present disclosure for the manufacture of a medicament for the treatment of cancer in a subject, wherein the at least one compound is for administration to the subject in at least one therapeutically effective amount.

In some aspects, the present disclosure provides a method of modulating AMPK activity in a subject, the method comprising administering to the subject at least one therapeutically effective amount of at least one compound of the present disclosure. The present disclosure provides at least one compound of the present disclosure for use in a method of modulating AMPK, wherein the at least one compound of the present disclosure is for administration to the subject in at least one therapeutically effective amount. The present disclosure provides at least one compound of the present disclosure for the manufacture of a medicament for the modulation of AMPK activity in a subject, wherein the at least one compound of the present disclosure is for administration to the subject in at least one therapeutically effective amount.

In some aspects, the present disclosure provides a method of reducing the amount of cancer stem cells in a subject, the method comprising administering to the subject, at least one therapeutically effective amount of at least one compound of the present disclosure. The present disclosure provides at least one compound of the present disclosure for use in a method of reducing the amount of cancer stem cells in a subject, wherein the at least one compound is for administration to the subject in at least one therapeutically effective amount. The present disclosure provides at least one compound of the present disclosure for the manufacture of a medicament for use in a method of reducing the amount of cancer stem cells in a subject, wherein the at least one compound is for administration to the subject in at least one therapeutically effective amount.

In some aspects, the present disclosure provides a method of treating a cancer in a subject, the method comprising administering to the subject at least one therapeutically effective amount of at least one compound of the present disclosure in combination with at least on therapeutically effective amount of at least one additional therapeutic agent. The present disclosure provides at least one compound of the present disclosure for use in the treatment of a cancer in a subject, wherein the at least one compound of the present disclosure is for administration to the subject in at least one therapeutically effective amount, and wherein the treatment further comprises administering to the subject at least one therapeutically effective amount of at least one additional therapeutic agent. The present disclosure provides at least one compound of the present disclosure for the manufacture of a medicament for the treatment of a cancer in a subject, wherein the at least one compound is for administration to the subject in at least one therapeutically effective amount and wherein the treatment further comprises administering to the subject at least one therapeutically effective amount of at least one additional therapeutic agent.

This Summary is neither intended nor should it be construed as being representative of the full extent and scope of the invention. Moreover, references made herein to "the present disclosure," or aspects thereof, should be understood to mean certain embodiments of the present disclosure and should not necessarily be construed as limiting all embodiments to a particular description. The present disclosure is set forth in various levels of detail in this Summary as well as in the attached drawings and the Detailed Description and no limitation as to the scope of the present disclosure is intended by either the inclusion or non-inclusion of elements, components, etc. in this Summary. Additional aspects of the present disclosure will become readily apparent from the Detailed Description, particularly when taken together with the figures.

Although methods and materials similar or equivalent to those described herein can be used in the practice or testing of the present disclosure, suitable methods and materials are described below. All publications, patent applications, patents, and other references mentioned herein are incorporated by reference in their entirety. The references cited herein are not admitted to be prior art to the claimed invention. In the case of conflict, the present Specification, including definitions, will control. In addition, the materials, methods, and examples are illustrative only and are not intended to be limiting. Other features and advantages of the disclosure will be apparent from the following detailed description and claim.

BRIEF DESCRIPTION OF FIGURES

The above and further features will be more clearly appreciated from the following detailed description when taken in conjunction with the accompanying figures.

In FIG. 1A, the reagents and conditions for the steps in the synthesis include: i) chloroacetyl chloride, DIPEA, DCM, RT, 4 h; ii) $AlCl_3$, 170° C., 4 h; iii) pyrrolidine, EtOH, reflux, 3 h; iv) $SOCl_2$, DMF, toluene, reflux, 3 h; v) R'—NH2, dry THF, 50° C., 1 h; vi) TFA, DCM, RT, 18 h. In FIG. 1B, the reagents and conditions for the steps in the synthesis include: i) $AlCl_3$, chloroacetyl chloride, dry DCM, 0° C. to 45° C., 16 h; ii) $Et_3SiH$, TFA, 0° C. to RT, 16 h; iii) appropriate nucleophile, Δ; iv) UHP, NaOH, EtOH, $H_2O$, RT, 2 h; v) $PPh_3$, $H_2O$, 60° C., 1 h; vi) $Ac_2O$, $NEt_3$, dry DCM, 0° C. to RT, 2 h. In FIG. 1C, the reagents and conditions for the steps in the synthesis include: i) Isopropenyl boronic acid MIDA ester, $Pd(OAc)_2$, SPhos, $K_3PO_4$, dioxane, $H_2O$, 100° C., 16 h; ii) diethyl malonate, $K_2CO_3$, dry DMF, 60° C., 16 h; iii) a) LiCl, DMSO, $H_2O$, 100° C., 3 h, b) Fe, AcOH, 100° C., 2 h; iv) $H_2$, Pd/C, MeOH, TFA, RT, 16 h; v) KOCN, $H_2O$, RT, 16 h; vi) $H_2$, Pd/C, MeOH, RT, 16 h. In FIG. 1D, the reagents and conditions for the steps in the synthesis include: i) tributyl (vinyptin, $Pd(PPh_3)_2Cl_2$, LiCl, BHT, MeCN, 80° C., 16 h; ii) $H_2$, Pd/C, MeOH, TT, 16 h; iii) N,N-Diethylethylenediamine, HOBt, EDC, DMF, RT, 16 h; iv) pyrrolidine, EtOH, reflux, 2 h; v) NaOH, MeOH, dioxane, RT, 6 h; vi) Resin supported $PPh_3$, THF, $H_2O$, 60° C., 3 h.

FIGS. 2A and 2B are a series of graphs showing the effects of compounds of the present disclosure on cellular levels of p-ACC(Ser79) in K562 cells. FIG. 2A Quantitative ELISA determination of p-ACC(Ser79) levels in K562 lysates (1.0 mg mL$^{-1}$ total protein) following growth in glucose-free media for 24 h, 2-DG (12 mM) treatment for 1 h followed by treatment with inhibitor compounds at 5.0 μM for 2 h. Relative p-ACC levels are reported as a percentage of levels resultant from DMSO control treatment. Statistically significant reductions in p-ACC levels with respect to sunitinib were observed upon treatment with Compound No. 10 (23.7% of control, p=0.022) and Compound No. 16 (29.2% of control, p=0.003) (n=3, error bars: ±S.D., compared with DMSO, *p<0.033, **p<0.0021, compared with sunitinib, n.s.=no significance). FIG. 2B shows p-ACC (Ser79) ELISA dose response for K562 cell lysates (1.0 mg mL$^{-1}$ total protein) grown in glucose-free media for 24 h followed by treatment with 2-DG (12 mM) for 1 h and a concentration range of sunitinib, Compound No. 10 and Compound No. 16 for 2 h. Compound 67 showed significant improvements in p-ACC level reduction with respect to sunitinib at both 3.125 mM and 12.5 mM. Compound 65 exhibited improvements in cellular AMPK inhibition over sunitinib at all concentrations apart from 50 μM (n=3, error bars: ±S.D., compared with DMSO, *p<0.033, p<0.0021, *p<0.0002, compared with sunitinib).

FIG. 3A shows the dose response for K562 cells treated with a concentration range of compounds of the present disclosure for 72 hours in a MTS assay. Compound No. 21 (65% inhibition at 1.56 μM), Compound No. 20 ($EC_{50}$=2.85±0.22 μM) and Compound No. 13 ($EC_{50}$=3.83±0.05 μM) showed increased cellular potency than sunitinib ($EC_{50}$=7.23±0.14 μM). FIG. 3B shows the dose response for K562 cells treated with a concentration range of compounds of the present disclosure for 24 hours in a CellTiter-Glo assay. Compound No. 21 ($EC_{50}$=3.83±0.46 μM) and Compound No. 13 ($EC_{50}$=4.86±0.16 μM) were more potent inhibitors of cell viability than sunitinib ($EC_{50}$=12.50±4.60 μM). FIG. 3C and FIG. 3B show the dose response for K562 cells treated with a concentration range of compounds of the present disclosure for 24 hours (FIG. 3C) and 48 hours (FIG. 3D) in a CellTox green assay. Compound No. 21 ($EC_{50}$; 24 h=5.24±0.22 μM; 48 h=4.18±0.41 μM) and Compound No. 13 (24 h=90% inhibition at 50 μM; 48 h $EC_{50}$=4.81±0.08 μM) were more potent inducers of cell toxicity than sunitinib (24 h=61% inhibition at 50 μM; 48 h $EC_{50}$=7.03±0.23 μM) at both incubation time points (n=3, error bars: ±S.D.).

DETAILED DESCRIPTION

Figure 1A:
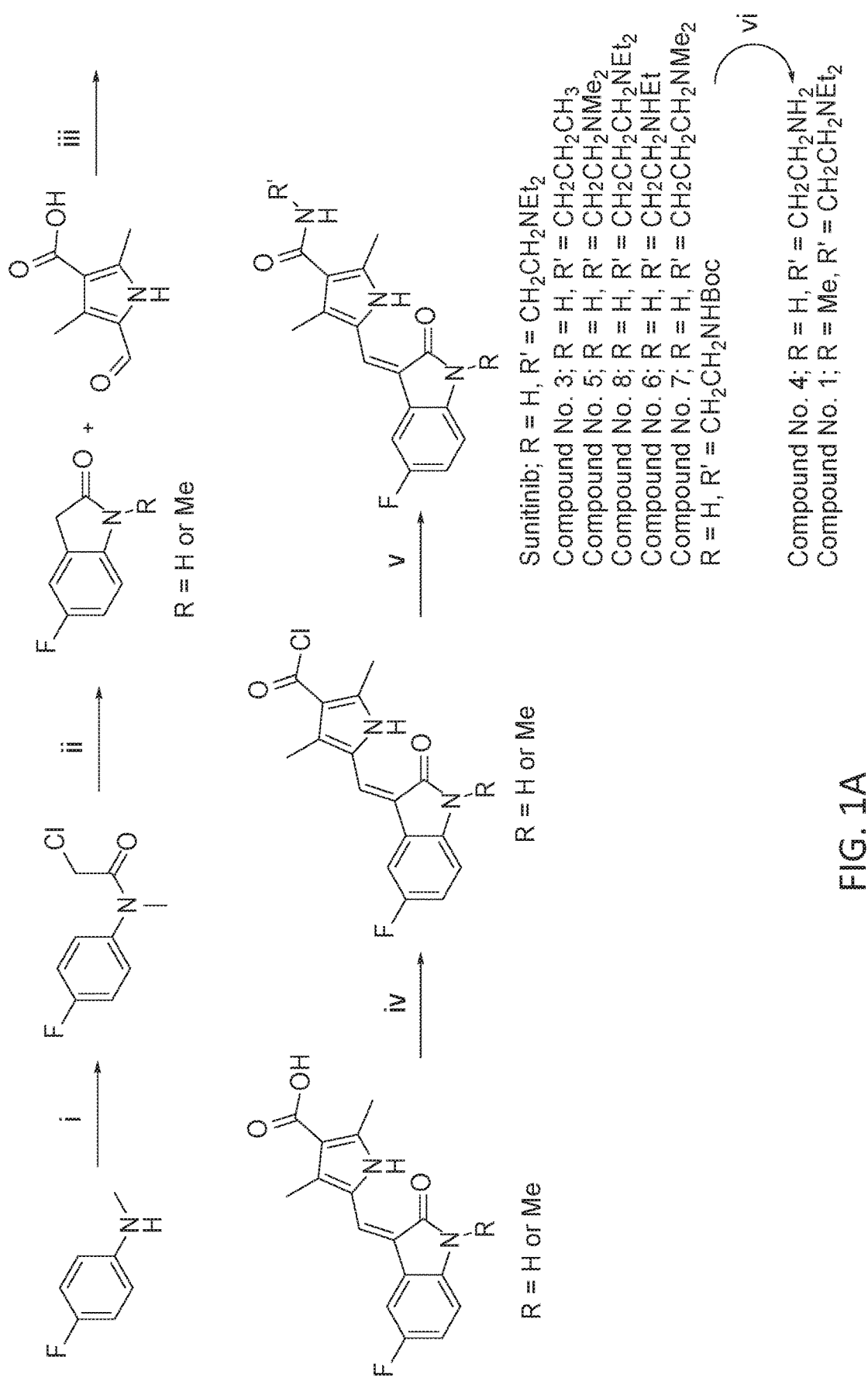
FIGS. 1A-1D are a series of schemes describing suitable synthetic routes for preparing exemplary compounds of the present disclosure.
Figure 1B:
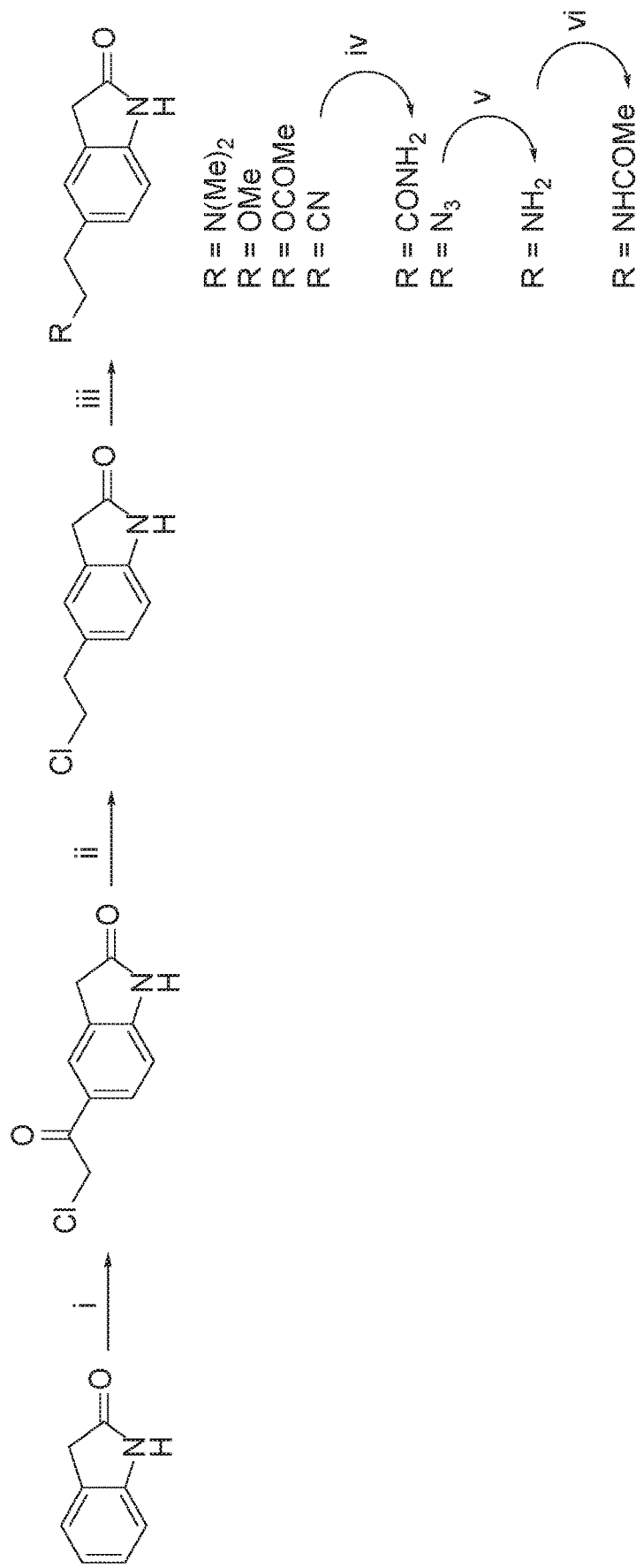
Figure 1C:
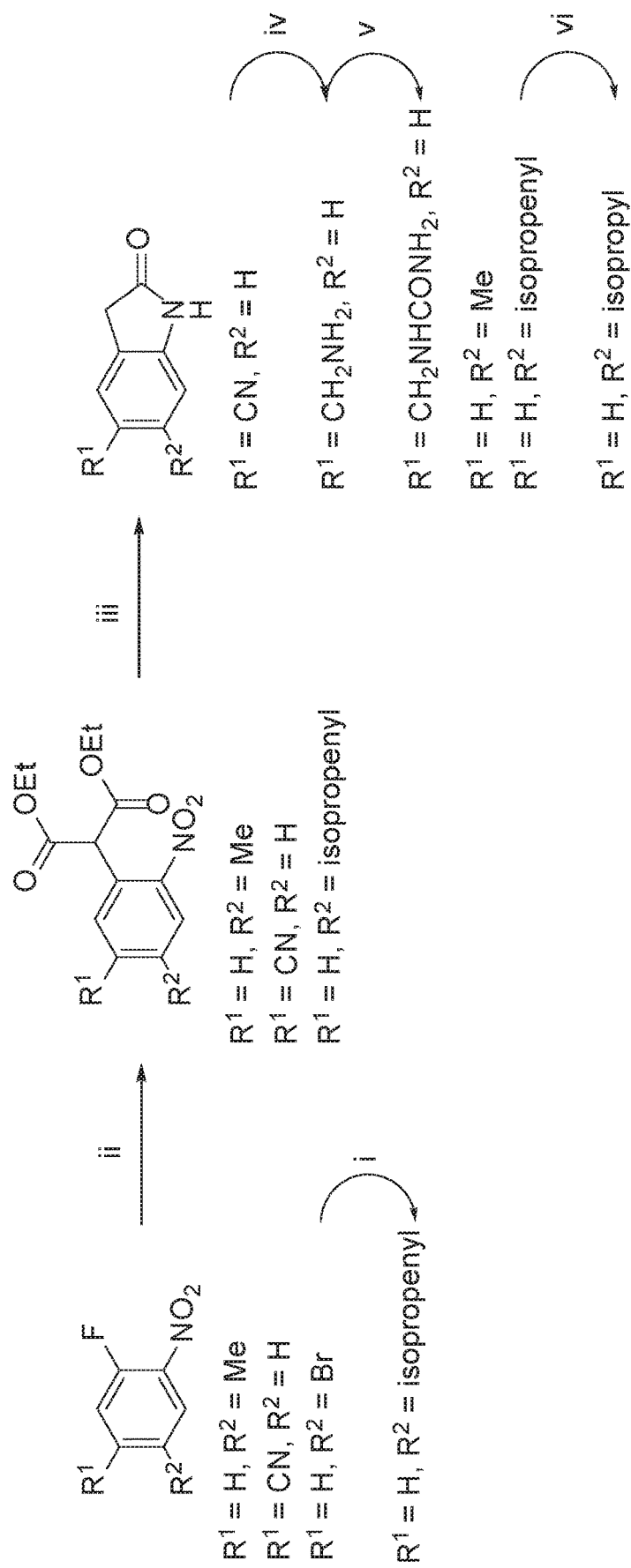
Figure 1D:
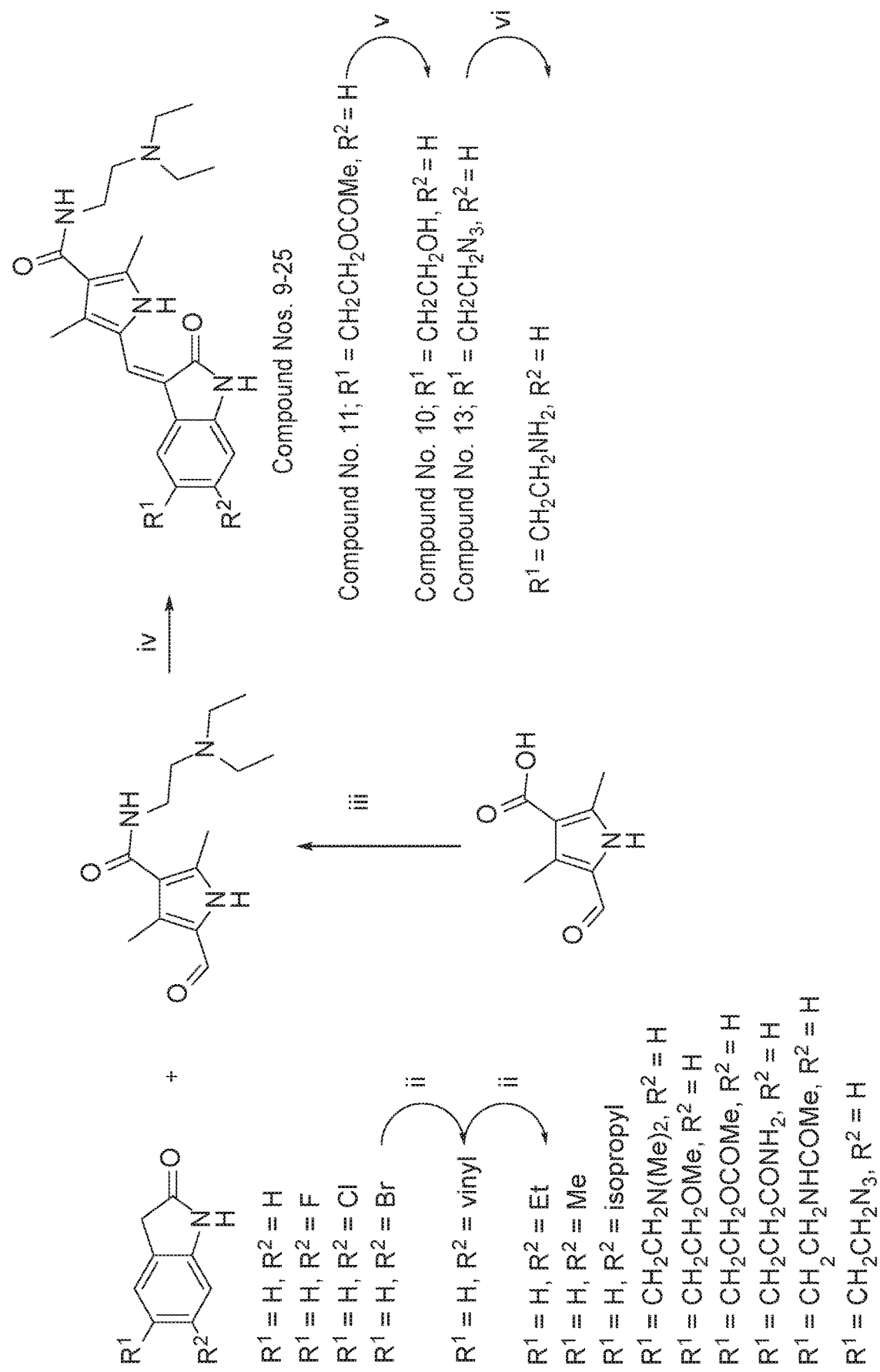

AMPK has been reported to act as both a tumor suppressor and promoter. AMPK was initially considered a tumor suppressor as it is a component of the LKB1-mediated tumor suppressor pathway and may inhibit tumor growth independently of LKB1 by targeting multiple signaling pathways. Activated AMPK can inhibit lipogenesis by directly inactivating ACC; negatively regulate mTORC1 and hypoxia-inducible factor (HIF)-1α thereby impacting cell proliferation and survival; phosphorylate p53 and the transcriptional activation of p53 target genes to inhibit the cell cycle and induce apoptosis; and activate FOXO3 transcription factor preventing epithelial-to-mesenchymal transition (EMT). Therefore, studies have focused on AMPK activators in various cancer types and although metformin, AICAR, and A-769662 have been shown to suppress tumorigenesis in animal models, this may have been via AMPK-dependent and/or AMPK-independent mechanisms. Conversely, more recent studies have revealed that under certain cellular contexts or stages of tumorigenesis AMPK activation may support cancer cell survival under metabolic stresses, such as hypoxia, glucose deprivation, and matrix detachment. High levels of AMPK expression have been reported in cancers that are resistant to glucose starvation, and in hypoxic tumor microenvironments. In response to glucose depravation, AMPK directly inactivates ACC to shift fatty acid metabolism from biosynthesis to oxidation, generating ATP and increasing cellular NADPH levels to provide protection from reactive oxygen species (ROS) production and promote cancer cell survival. Although AMPK suppresses HIF-1α expression through downregulation of mTORC1, it has also been reported that AMPK activation under hypoxic conditions can support HIF-1α transcriptional activity and function as an adaptive response to hypoxia or glucose starvation. Activated AMPK has also been implicated in drug resistance, induction of autophagy, and the enrichment of cancer stem cells. Preclinical studies have initially supported the use of AMPK activators to treat hematological cancers and a report demonstrated that co-activation of AMPK and mTORC1 induced cytotoxicity in acute myeloid leukemia (AML); however, a more recent study showed that AMPK protects leukemic stem cells from metabolic stress. In chronic myelogenous leukemia (CML) K562 cells, AMPK activation caused cell-cycle arrest, but in another report AMPK inhibition sensitized K562 to non-toxic concentrations of doxorubicin. AMPK activation has been shown to maintain cancer cell proliferation in astrocytic tumors and recently has been shown to promote glioblastoma (GBM) growth and viability of GBM stem-like cells. In addition, AMPK has been reported to support the growth of a number of other cancers including breast, colorectal, lung, ovarian, and prostate cancers. Therefore, there is now the view that inhibiting rather than activating AMPK may provide a more beneficial therapeutic approach to overcome drug resistance and eradicate residual disease in a context where eliminating surviving and drug resistant cancer cells is desirable. In the case of cancer, AMPK activators may be effective in treating the bulk cancer population, but AMPK inhibitors could be introduced after successful standard of care therapy to eliminate or sensitize drug resistant cancer cells.

The current availability of potent and selective small molecule AMPK inhibitors as chemical tools for use in biological systems or for therapeutic evaluation is extremely limited. Three inhibitor compounds are available:

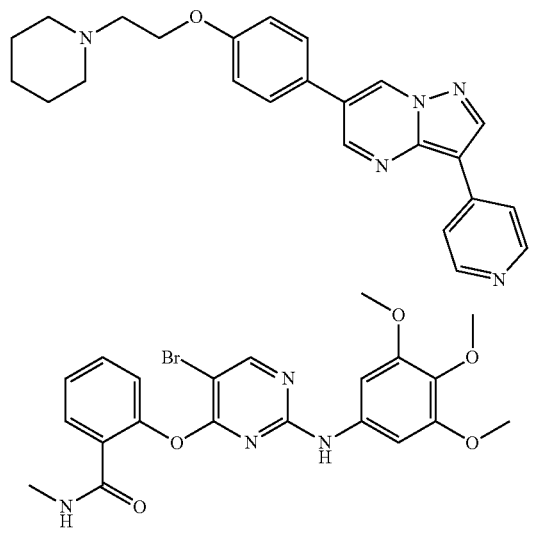

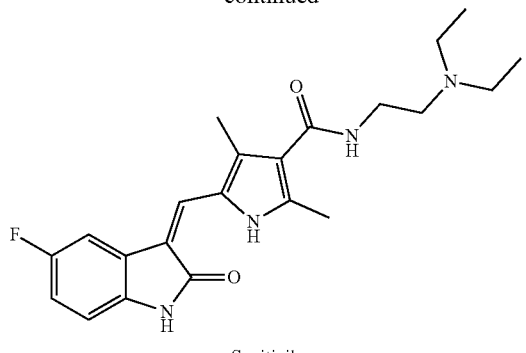

Sunitinib

Compound C (dorsomorphin) has been widely used in biochemical, cell-based, and in vivo assays as an AMPK inhibitor, but it also inhibits a number of other kinases with lower $IC_{50}$ values than for AMPK and has broad-spectrum activity within the kinome. Furthermore, several studies have reported that compound C disrupts various biological events independently of AMPK inhibition, and that its anticancer effects may also be AMPK independent. Amongst these other biological targets, compound C has been reported to inhibit the adenosine transporter, and to inhibit the hypoxic activation of HIF-1 by suppressing mitochondrial generated ROS. Therefore, compound C has limited use or scope for development as a selective AMPK inhibitor.

Recently, the 2-aminopyrimidine (SBI-0206965) has been reported as an AMPK inhibitor, and while this compound demonstrated increased inhibitory potency against purified AMPK protein compared with compound C in a $^{32}P$ radio-activity assay (AMPKα1 $IC_{50}$ 0.40 μM versus 15.89 μM), high micromolar concentrations were required to inhibit AMPK in cells and this may be due to interaction with other cellular targets or extensive metabolism.

The multi-kinase inhibitor sunitinib has demonstrated potent AMPK inhibition compared to compound C in a TR-FRET assay (AMPKα1 $IC_{50}$ of 0.045 μM versus $IC_{50}$ of 2.38 μM), but has broad-spectrum activity across the kinome with receptors for platelet-derived growth factor (PDGFR) and vascular endothelial growth factor (VEGFR) being its main targets.

Thus, there is a desire for a specific AMPK inhibitor with limited or no inhibitory effects on other kinases, and nanomolar potency for AMPK inhibition to further studies and understanding of AMPK in cancer and other disease states, as well as for therapeutic uses in preventing and treating disease.

The present disclosure is drawn to potent AMPK inhibitors with significantly improved specificity for AMPK inhibition.

Moreover, there is an urgent need to improve the disease cure rate for AML, as despite advances in the biological characterization and treatment of AML, only 20-30% of patients achieve long-term disease-free survival (DFS) and effective treatment options for relapsed AML are extremely limited. Over the last 20-25 years studies have clearly demonstrated that AML populations are highly heterogeneous and that the disease is propagated by a subpopulation of leukemia stem cells (LSCs). Clinical and laboratory studies have demonstrated that functionally defined LSCs are substantially more resistant to standard chemotherapy than bulk leukemia populations. The recurrence of AML has also been attributed to surviving LSCs that have evaded chemotherapy, and therefore efforts are now focused on targeting this drug resistant population of cells in order to cure AML. Thus, elucidating the specific molecular and cellular properties that mediate LSC survival is an extremely important step toward the goal of creating improved therapeutic regimens for leukemia.

Recent studies have proposed that AMPK, a regulator of cellular energy pathways, is critical for the maintenance of LSCs, and that AMPK inhibition may sensitize LSCs to chemotherapy. In our studies characterizing LSCs, we examined energy metabolism in primary human AML specimens using reactive oxygen species (ROS) as a measure of metabolic activity, and discovered that: 1) the majority of LSCs reside in a ROS-low state, 2) ROS-low cells are reliant on oxidative phosphorylation for survival, 3) AMPK is preferentially activated in ROS-low cells, and 4) AMPK inhibition results in increased ROS levels and concomitant loss of LSCs. Without wishing to be bound by theory, AMPK inhibition by the compounds of the present disclosure can leverage LSCs out of the ROS-low state, decreasing their viability which may be sufficient for complete LSC elimination or may sensitize them to conventional therapy.

Definitions

To facilitate an understanding of the embodiments presented, the following definitions are provided.

The singular terms "a," "an," and "the" include plural referents unless context clearly indicates otherwise. Similarly, the word "or" is intended to include "and" unless the context clearly indicates otherwise. The term "comprises" means "includes." Also, "comprising A or B" means including A or B, or A and B, unless the context clearly indicates otherwise. It is to be further understood that all molecular weight or molecular mass values given for compounds are approximate and are provided for description. Although methods and materials similar or equivalent to those described herein can be used in the practice or testing of this disclosure, suitable methods and materials are described below. In addition, the materials, methods, and examples are illustrative only and not intended to be limiting.

Unless otherwise defined, all technical and scientific terms used herein have the same meaning as commonly understood by one of ordinary skill in the art to which this disclosure belongs. In the Specification, the singular forms also include the plural unless the context clearly dictates otherwise; as examples, the terms "a," "an," and "the" are understood to be singular or plural and the term "or" is understood to be inclusive. By way of example. "an element" means one or more element. Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. About can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

"Administration of" and "administering a" compound or agent should be understood to mean providing a compound or agent, a prodrug of a compound or agent, or a pharmaceutical composition as described herein. The compound, agent or composition can be administered by another person to the subject (e.g., intravenously) or it can be self-administered by the subject (e.g., tablets or capsules).

The term "subject" refers to mammals (for example, humans and veterinary animals such as dogs, cats, pigs, horses, sheep, and cattle).

An "R-group" or "substituent" refers to a single atom (for example, a halogen atom) or a group of two or more atoms that are covalently bonded to each other, which are covalently bonded to an atom or atoms in a molecule to satisfy the valency requirements of the atom or atoms of the molecule, typically in place of a hydrogen atom. Examples of R-groups/substituents include alkyl groups, hydroxyl groups, alkoxy groups, acyloxy groups, mercapto groups, and aryl groups.

"Substituted" or "substitution" refer to replacement of a hydrogen atom of a molecule or an R-group with one or more additional R-groups such as halogen, alkyl, alkoxy, alkylthio, trifluoromethyl, acyloxy, hydroxy, mercapto, carboxy, aryloxy, aryl, atylalkyl, heteroaryl, amino, alkylamino, dialkylamino, morpholino, piperidino, pyrrolidin-1-yl, piperazin-1-yl, nitro, sulfato, or other R-groups.

"Acyl" refers to a group having the structure RCO—, where R may be alkyl, or substituted alkyl. "Lower acyl" groups are those that contain one to six carbon atoms.

"Acyloxy refers to a group having the structure RCOO—, where R may be alkyl or substituted alkyl, "Lower acyloxy" groups contain one to six carbon atoms.

"Alkenyl" refers to a cyclic, branched or straight chain group containing only carbon and hydrogen, and unless otherwise mentioned typically contains one to twelve carbon atoms, and contains one or more double bonds that may or may not be conjugated. Alkenyl groups may be unsubstituted or substituted. "tower alkenyl" groups contain one to six carbon atoms.

The term "alkoxy" refers to a straight, branched or cyclic hydrocarbon configuration and combinations thereof, including from 1 to 20 carbon atoms, preferably from 1 to 8 carbon atoms (referred to as a "lower alkoxy"), more preferably from 1 to 4 carbon atoms, that include an oxygen atom at the point of attachment. An example of an "alkoxy group" is represented by the formula —OR, where R can be an alkyl group, optionally substituted with an alkenyl, alkenyl, aryl, aralkyl, cycloalkyl, halogenated alkyl, alkoxy or heterocycloalkyl group. Suitable alkoxy groups include methoxy, ethoxy, n-propoxy, i-propoxy, n-butoxy, i-butoxy, sec-butoxy, tert-butoxy cyclopropoxy, cyclohexyloxy, and the like.

The term "alkyl" refers to a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is a saturated branched or unbranched hydrocarbon having from 1 to 6 carbon atoms. Preferred alkyl groups have 1 to 4 carbon atoms. Alkyl groups may be "substituted alkyls" wherein one or more hydrogen atoms are substituted with a substituent such as halogen, cycloalkyl, alkoxy, amino, hydroxyl, aryl, alkenyl, or carboxyl. For example, a lower alkyl or ($C_1$-$C_6$)alkyl can be methyl, ethyl, propyl, isopropyl, butyl, iso-butyl, sec-butyl, pentyl, 3-pentyl, or hexyl; ($C_3$-$C_6$)cycloalkyl can be cyclopropyl, cyclobutyl, cyclopentyl, or cyclohexyl; ($C_3$-$C_6$)cycloalkyl($C_1$-$C_6$)alkyl can be cyclopropylmethyl, cyclobutylmethyl, cyclopentylmethyl, cyclohexylmethyl, 2-cyclopropylethyl, 2-cyclobutylethyl, 2-cyclopentylethyl, or 2-cyclohexylethyl; ($C_1$-$C_6$)alkoxy can be methoxy, ethoxy, propoxy, isopropoxy, butoxy, iso-butoxy, sec-butoxy, pentoxy, 3-pentoxy, or hexyloxy; ($C_2$-$C_6$)alkenyl can be vinyl, allyl, 1-propenyl, 2-propenyl, 1-butenyl, 2-butenyl, 3-butenyl, L-pentenyl, 2-pentenyl, 3-pentenyl, 4-pentenyl, 1-hexenyl, 2-hexenyl, 3-hexenyl, 4-hexenyl, or 5-hexenyl; $(C_2-C_6)$alkynyl can be ethynyl, 1-propynyl, 2-propynyl, 1-butyryl, 2-butyryl, 3-butyryl, 1-pentynyl, 2-pentynyl, 3-pentynyl, 4-pentynyl, 1-hexynyl, 2-hexynyl, 3-hexynyl, 4-hexynyl, or 5-hexynyl; $(C_1-C_6)$ alkanoyl can be acetyl, propanoyl or butanoyl; halo$(C_1-C_6)$ alkyl can be iodomethyl, bromomethyl, chloromethyl, fluoromethyl, trifluoromethyl, 2-chloroethyl, 2-fluoroethyl, 2,2, 2-trifluoroethyl, or pentafluoroethyl; hydroxy$(C_1-C_6)$alkyl can be hydroxymethyl, 1-hydroxyethyl, 2-hydroxyethyl, 1-hydroxypropyl, 2-hydroxypropyl, 3-hydroxypropyl, 1-hydroxybutyl, 4-hydroxybutyl, 1-hydroxypentyl, 5-hydroxypentyl, 1-hydroxyhexyl, or 6-hydroxyhexyl; $(C_1-C_6)$alkoxycarbonyl can be methoxycarbonyl, ethoxycarbonyl, propoxycarbonyl, isopropoxycarbonyl, butoxycarbonyl, pentoxycarbonyl, or hexyloxycarbonyl; $(C_1-C_6)$alkylthio can be methylthio, ethylthio, propylthio, isopropylthio, butylthio, isobutylthio, pentylthio, or hexylthio; $(C_2-C_6)$ alkanoyloxy can be acetoxy, propanoyloxy, butanoyloxy, isobutanoyloxy, pentanoyloxy, or hexanoyloxy.

"Alkynyl" refers to a cyclic, branched or straight chain group containing only carbon and hydrogen, and unless otherwise mentioned typically contains one to twelve carbon atoms and contains one or more triple bonds. Alkynyl groups may be unsubstituted or substituted. "Lower alkynyl" groups are those that contain one to six carbon atoms.

The term "halogen" refers to fluoro, bromo, chloro, and iodo substituents.

"Aryl" refers to a monovalent unsaturated aromatic carbocyclic group having a single ring (e.g., phenyl) or multiple condensed rings (e.g., naphthyl or anthryl), which can optionally be unsubstituted or substituted.

The term "heteroaryl" is intended to include a stable 5-, 6-, or 7-membered monocyclic or 7-, 8-, 9-, 10-, 11- or 12-membered bicyclic aromatic heterocyclic ring which consists of carbon atoms and one or more heteroatoms, e.g., 1 or 1-2 or 1-3 or 1-4 or 1-5 or 1-6 heteroatoms, or e.g., 1, 2, 3, 4, 5, or 6 heteroatoms, independently selected from the group consisting of nitrogen, oxygen and sulphur. The nitrogen atom may be substituted or unsubstituted (i.e., N or NR wherein R is H or other substituents, as defined). The nitrogen and sulphur heteroatoms may optionally be oxidised (i.e., N→O and $S(O)_p$, where p=1 or 2). It is to be noted that total number of S and O atoms in the aromatic heterocycle is not more than 1, Examples of heteroaryl groups include pyrrole, furan, thiophene, thiazole, isothiazole, imidazole, triazole, tetrazole, pyrazole, oxazole, isoxazole, pyridine, pyrazine, pyridazine, pyrimidine, and the like. Heteroaryl groups can also be fused or bridged with alicyclic or heterocyclic rings, which are not aromatic so as to form a multicyclic system.

The term "amino" refers to an R-group having the structure —$NH_2$, which can be optionally substituted with, for example, lower alkyl groups, to yield an amino group having the general structure —NHR or —$NR_2$.

"Nitro" refers to an R-group having the structure —$NO_2$.

The term "aromatic" as applied to cyclic groups refers to ring structures which contain double bonds that are conjugated around the entire ring structure, possibly through a heteroatom such as an oxygen atom or a nitrogen atom. Aryl groups, pyridyl groups and furan groups are examples of aromatic groups. The conjugated system of an aromatic group contains a characteristic number of electrons, for example, 6 or 10 electrons that occupy the electronic orbitals making up the conjugated system, which are typically un-hybridized p-orbitals.

"Pharmaceutical compositions" are compositions that include an amount (for example, a unit dosage) of one or more of the disclosed compounds together with one or more non-toxic pharmaceutically acceptable additives, including carriers, diluents, and/or adjuvants, and optionally other biologically active ingredients. Such pharmaceutical compositions can be prepared by standard pharmaceutical formulation techniques such as those disclosed in Remington's *Pharmaceutical Sciences*, Mack Publishing Co., Easton, Pa. (19th Edition).

The terms "pharmaceutically acceptable salt or ester" refers to salts or esters prepared by conventional means that include salts, e.g., of inorganic and organic acids, including but not limited to hydrochloric acid, hydrobromic acid, sulfuric acid, phosphoric acid, methanesulfonic acid, ethanesulfonic acid, malic acid, acetic acid, oxalic acid, tartaric acid, citric acid, lactic acid, fumaric acid, succinic acid, maleic acid, salicylic acid, benzoic acid, phenylacetic acid, mandelic acid, and the like.

For therapeutic use, salts of the compounds are those wherein the counter-ion is pharmaceutically acceptable. However, salts of acids and bases which are non-pharmaceutically acceptable may also find use, for example, in the preparation or purification of a pharmaceutically acceptable compound.

The pharmaceutically acceptable acid and base addition salts as mentioned above are meant to comprise the therapeutically active non-toxic acid and base addition salt forms which the compounds can form. The pharmaceutically acceptable acid addition salts can conveniently be obtained by treating the base form with such appropriate acid. Appropriate acids comprise, for example, inorganic acids such as hydrohalic acids, e.g. hydrochloric or hydrobromic acid, sulfuric, nitric, phosphoric and the like acids; or organic acids such as, for example, acetic, propanoic, hydroxyacetic, lactic, pyruvic, oxalic (i.e. ethanedioic), malonic, succinic (i.e. butanedioic acid), maleic, fumaric, malic (i.e. hydroxybutanedioic acid), tartaric, citric, methanesulfonic, ethanesulfonic, benzenesulfonic, p-toluenesulfonic, cyclamic, salicylic, p-aminosalicylic, pamoic, and like acids. Conversely, these salt forms can be converted into the free base form by treatment with an appropriate base.

The compounds containing an acidic proton may also be converted into their non-toxic metal or amine addition salt formed by treatment with appropriate organic and inorganic bases. Appropriate base salt forms comprise, for example, the ammonium salts, the alkali and earth alkaline metal salts, e.g. the lithium, sodium, potassium, magnesium, calcium salts and the like, salts with organic bases, e.g. the benzathine, N-methyl-D-glucamine, hydrabamine salts, and salts with amino acids such as, for example, arginine, lysine, and the like.

Some of the AMPK inhibitor compounds described herein may also exist in their tautomeric form.

A "therapeutically effective amount" of the disclosed compounds is a dosage of the compound that is sufficient to achieve a desired therapeutic effect, such as an anti-tumor or anti-metastatic effect. In some examples, a therapeutically effective amount is an amount sufficient to achieve tissue concentrations at the site of action that are similar to those that are shown to modulate tumor growth in tissue culture, in vitro, or in vivo. For example, a therapeutically effective amount of a compound may be such that the subject receives a dosage of about 0.1 µg/kg body weight/day to about 1000 mg/kg body weight/day, for example, a dosage of about 1 µg/kg body weight/day to about 1000 µg/kg body weight/day, such as a dosage of about 5 µg/kg body weight/day to about 500 μg/kg body weight/day. In some aspects, the compounds of the present disclosure can be adminstered in an amount of about 20 mg/kg body weight/day. In some aspects, the compounds of the present disclosure can be administered in an amount of about 10 mg/kg body weight/ day to about 30 mg/kg body weight/day. In some aspects, venetoclax can be administered in an amount of about 100 mg/kg body weight/day. In some aspects, cytarabine can be administered in an amount of about 50 mg/kg body weight/ day.

The term "stereoisomer" refers to a molecule that is an enantiomer, diastereomer, or geometric isomer of a molecule. Stereoisomers, unlike structural isomers, do not differ with respect to the number and types of atoms in the molecule's structure but with respect to the spatial arrangement of the molecule's atoms. Examples of stereoisomers include the (+) and (−) forms of optically active molecules.

The term "modulate" refers to the ability of an AMPK inhibitor compound to alter the amount, degree, or rate of a biological function, the progression of a disease, or amelioration of a condition. For example, modulating can refer to the ability of a compound to elicit an increase or decrease in tumor growth, tumor metastasis, or tumorigenesis.

"Treatment" refers to a therapeutic intervention that ameliorates a sign or symptom of a disease or pathological condition after it has begun to develop. As used herein, the term "ameliorating," with reference to a disease or pathological condition, refers to any observable beneficial effect of the treatment. The beneficial effect can be evidenced, for example, by a delayed onset of clinical symptoms of the disease in a susceptible subject, a reduction in severity of some or all clinical symptoms of the disease, a slower progression of the disease, an improvement in the overall health or well-being of the subject, or by other parameters well known in the art that are specific to the particular disease. The phrase "treating a disease" is inclusive of inhibiting the full development of a disease or condition, for example, in a subject who is at risk for a disease, or who has a disease, such as cancer or a disease associated with a compromised immune system. "Preventing" a disease or condition refers to prophylactically administering a composition to a subject who does not exhibit signs of a disease or exhibits only early signs of the disease, for the purpose of decreasing the risk of developing a pathology or condition, or diminishing the severity of a pathology or condition.

As used herein, a "prodrug" is an active or inactive compound that is modified chemically through in vivo physiological action, such as hydrolysis, metabolism and the like, into an active compound following administration of the prodrug to a subject. The term "prodrug" as used throughout this text means the pharmacologically acceptable derivatives such as esters, amides and phosphates, such that the resulting in vivo biotransformation product of the derivative is the active drug as defined in the AMPK inhibitor compounds described herein. Prodrugs preferably have excellent aqueous solubility, increased bioavailability, and are readily metabolized into the active AMPK inhibitors in vivo. Prodrugs of compounds described herein may be prepared by modifying functional groups present in the compound in such a way that the modifications are cleaved, either by routine manipulation or in vivo, to the parent compound. The suitability and techniques involved in making and using prodrugs are well known by those skilled in the art. For a general discussion of prodrugs involving esters see Svensson and Tunek, *Drug Metabolism Reviews* 165 (1988) and Bundgaard, *Design of Prodrugs*, Elsevier (1985).

The term "prodrug" includes any covalently bonded carriers that release an active AMPK inhibitor compound of this disclosure in vivo when the prodrug is administered to a subject. Because prodrugs often have enhanced properties relative to the active AMPK inhibitor, such as solubility and bioavailability, the AMPK inhibitor compounds disclosed herein can be delivered in prodrug form. Thus, also contemplated are prodrugs of the presently disclosed AMPK inhibitor compounds, methods of delivering prodrugs, and compositions containing such prodrugs. Prodrugs of the disclosed compounds typically are prepared by modifying one or more functional groups present in the compound in such a way that the modifications are cleaved, either in routine manipulation or in vivo, to yield the parent compound. Prodrugs may include compounds having a hydroxyl or amino group functionalized with any group that is cleaved in vivo to yield the corresponding hydroxyl or amino group, respectively, Examples of prodrugs include, without limitation, compounds having an acylated amino group and/or a phosphate ester or phosphonate amide group. For example, a prodrug of the AMPK inhibitor compounds of this disclosure may include a lower alkyl phosphate such as an isopropyl phosphate.

Exemplary prodrug moieties that thrill active prodrug compounds in combination with the AMPK inhibitor compounds of this disclosure are nitroimidazoles that rely on bioreduction by a nitroreductase or oxidoreductase, in a hypoxic environment, for prodrug activation and release of the active AMPK kinase inhibitor. These prodrugs provide additional tumor-selectivity in the prodrugs of this disclosure and reduce systemic side effects, such as cardiotoxicity and neurotoxicity often observed with many kinase inhibitors. Additional useful prodrugs include any prodrug compound described in US Patent Application Publication No. 2012/0077811, Which is incorporated herein by this reference, in its entirety, for this purpose.

Thus, exemplary nitroimidazole prodrug moieties of this disclosure include compounds having the structure:

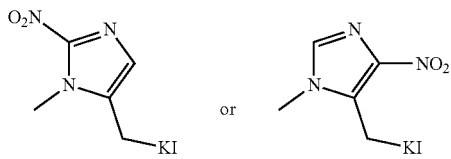

wherein 'KI' is an AMPK kinase inhibitor of this disclosure. These nitroimidazole prodrug moieties are linked to the AMPK kinase inhibitor through a tertiary nitrogen atom present in the kinase inhibitor chemical structure. Thus, examples of the prodrug AMPK kinase inhibitor chemical structures of this disclosure include:

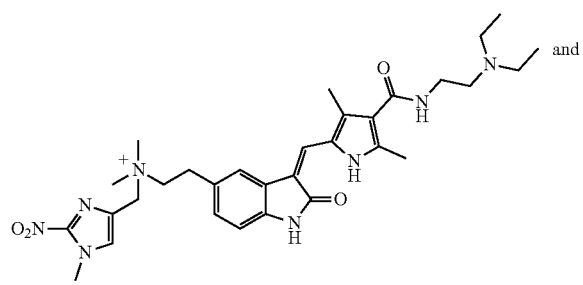 and 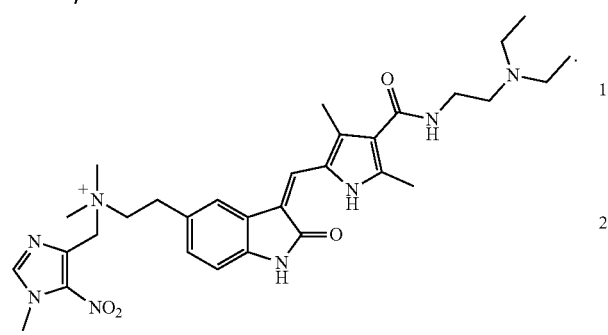

Without wishing to be bound by theory, it is understood that a compound of the presend disclosure in which at least one $R^{5S}$ is

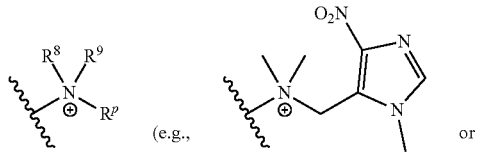 (e.g., 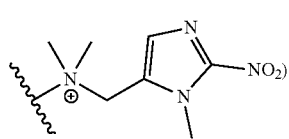 or

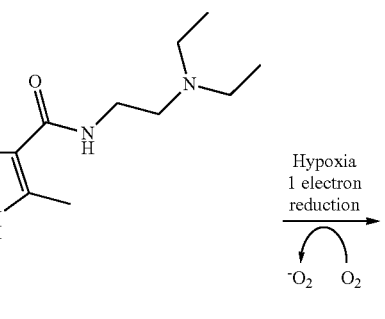)

may be a suitable prodrug for the corresponding compound in which the $R^{5S}$ is $NR^8R^9$. For example, as shown below, the moiety of $R^P$ may disrupt the anchoring interactions of the alkylamino side chain with the Asp105 and Glu102 residues of AMPK. Bioactivation of the prodrug under hypoxic conditions could release the active compound.

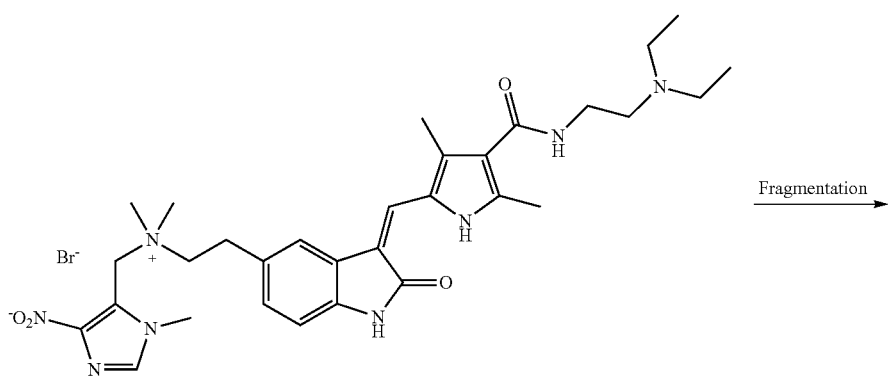

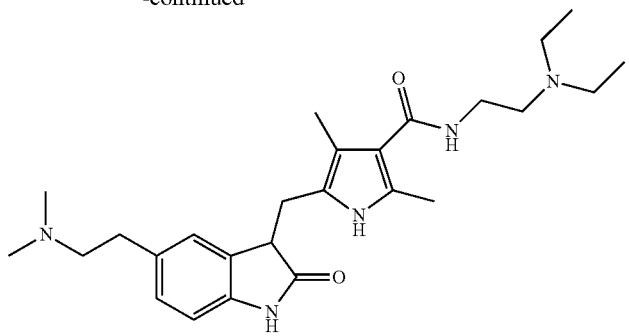

Compound No. 12

Protected derivatives of the disclosed compounds also are contemplated. A variety of suitable protecting groups for use with the disclosed compounds are disclosed in Greene and Wuts, *Protective Groups in Organic Synthesis;* 3rd. Ed.; John Wiley & Sons, New York, 1999. In general, protecting groups are removed under conditions which will not affect the remaining portion of the molecule. These methods are well known in the art and include acid hydrolysis, hydrogenolysis, and the like. One preferred method involves the removal of an ester, such as cleavage of a phosphonate ester using Lewis acidic conditions, such as in TMS-Br mediated ester cleavage to yield the free phosphonate. A second preferred method involves removal of a protecting group, such as removal of a benzyl group by hydrogenolysis utilizing palladium on carbon in a suitable solvent system such as an alcohol, acetic acid, and the like or mixtures thereof. A t-butoxy-based group, including t-butoxy carbonyl protecting groups can be removed utilizing an inorganic or organic acid, such as HCl or trifluoroacetic acid, in a suitable solvent system, such as water, dioxane and/or methylene chloride. Another exemplary protecting group, suitable for protecting amino and hydroxy functions amino is trityl. Other conventional protecting groups are known and suitable protecting groups can be selected by those of skill in the art in consultation with Greene and Wuts, *Protective Groups in Organic Synthesis;* 3rd Ed.; John Wiley & Sons, New York, 1999. When an amine is deprotected, the resulting salt can readily be neutralized to yield the free amine. Similarly, when an acid moiety, such as a phosphonic acid moiety is unveiled, the compound may be isolated as the acid compound or as a salt thereof.

Particular examples of the presently disclosed compounds include one or more asymmetric centers. Thus, these compounds can exist in different stereoisomeric forms. Accordingly, compounds and compositions may be provided as individual pure enantiomers or as stereoisomeric mixtures, including racemic mixtures. The compounds disclosed herein may be synthesized in, or are purified to be in, substantially enantiopure form, such as in a 90% enantiomeric excess, a 95% enantiomeric excess, a 97% enantiomeric excess or even in greater than a 99% enantiomeric excess, such as in enantiopure form.

Groups which are substituted (e.g. substituted alkyl), may in some embodiments be substituted with a group which is itself substituted (e.g. substituted amyl). In some embodiments, the number of substituted groups linked together is limited to two (e.g. substituted alkyl is substituted with substituted aryl, wherein the substituent present on the aryl is not further substituted). In exemplary embodiments, a substituted group is not substituted with another substituted group (e.g. substituted alkyl is substituted with unsubstituted aryl).

It is to be understood that a compound of the present disclosure may be depicted in a neutral form, a cationic form (e.g., carrying one or more positive charges), an anionic form (e.g., carrying one or more negative charges), or a zwitterion form (e.g., carrying one or more positive charges and one or more negative charges), all of which are intended to be included in the scope of the present disclosure. For example, when a compound of the present disclosure is depicted in a neutral form, it should be understood that such depiction also refers to the various neutral forms, cationic forms, anionic forms, and zwitterion forms of the compound. When the compound is depicted in a cationic or anionic form, the compound could be associated with a suitable counter ion. For example, when the compound is depicted in a cationic form, the compound could be associated with a suitable anion.

Compounds of the Present Disclosure

Without wishing to be bound by theory, compounds of the present disclosure may inhibit kinase enzymes with significantly improved specificity for AMPK kinase and can therefore be used to treat a wide variety of advanced solid tumors and blood cancers. Pharmaceutically acceptable salts, prodrugs, stereoisomers, and metabolites of all the AMPK inhibitor compounds of this disclosure also are contemplated.

In some aspects, the present disclosure provides a compound of Formula (I):

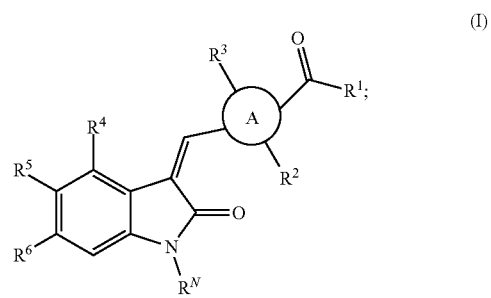

(I)

a stereoisomer thereof, a prodrug thereof, or a pharmaceutically acceptable salt thereof, wherein:

A is $C_6$ aryl or 5- to 6-membered heteroaryl containing 1 to 3 heteroatoms selected from N, O, and S;

$R^N$ is H or $C_{1-6}$ alkyl;

$R^1$ is H, $C_{1-6}$ alkyl, $C_{1-6}$ alkoxy, $OR^7$, $NR^8R^9$, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{1S}$;

each $R^{1S}$ is independently $C_{1-6}$ alkyl, $OR^7$, $CO_2R^7$, $NR^8R^9$, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{1SS}$;

each $R^{1SS}$ is independently $C_{1-6}$ alkyl, $OR^7$, $CO_2R^7$, $NR^8R^9$;

$R^2$ is H, $C_{1-6}$ alkyl, $OR^7$, $CO_2R^7$, or $NR^8R^9$; wherein the $C_{1-6}$ alkyl is optionally substituted with one or more $C_{1-6}$ alkyl, $OR^7$, $CO_2R^7$, or $NR^8R^9$;

$R^3$ is H, $C_{1-6}$ alkyl, $OR^7$, $CO_2R^7$, or $NR^8R^9$; wherein the $C_{1-6}$ alkyl is optional substituted with one or more $C_{1-6}$ alkyl, $OR^7$, $CO_2R^7$, or $NR^8R^9$;

$R^4$ is H, $C_{1-6}$ alkyl, $OR^7$, $CO_2R^7$, or $NR^8R^9$; wherein the $C_{1-6}$ alkyl is optionally substituted with one or more $C_{1-6}$ alkyl, $OR^7$, $CO_2R^7$, or $NR^8R^9$;

$R^5$ is H, halogen, cyano, $C_{1-6}$ alkyl, $C_6$ aryl, or 5- to 6-membered heteroaryl containing 1 to 3 heteroatoms selected from N, O, and S, wherein the $C_{1-6}$ alkyl, $C_6$ aryl, or 5- to 6-membered heteroaryl is optionally substituted with one or more $R^{5S}$;

each $R^{5S}$ is independently $C_{1-6}$ alkyl, $OR^7$, $CO_2R^7$, $NHC(=O)R^7$, $NR^8R^9$,

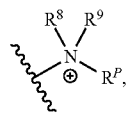

$NHC(=O)NR^8R^9$, $C(=O)NR^8R^9$, CN, azido, $C_6$ aryl, or 5- to 6-membered heteroaryl containing 1 to 3 heteroatoms selected from N, O, and S; wherein the wherein the $C_{1-6}$ alkyl, $C_6$ aryl, or 5- to 6-membered heteroaryl is optionally substituted with one or more $R^{5SS}$;

each $R^{5SS}$ is independently $C_{1-6}$ alkyl, $OR^7$, $CO_2R^7$, or $NR^8R^9$; wherein the $C_{1-6}$ alkyl is optionally substituted with one or more $C_{1-6}$ alkyl, $OR^7$, $CO_2R^7$, or $NR^8R^9$;

$R^6$ is H, $C_{1-6}$ alkyl, $C_{2-4}$ alkenyl, $C_{1-4}$ alkoxy, halogen, $C_6$ aryl, or 5- to 6-membered heteroaryl containing 1 to 3 heteroatoms selected from N, O, and S; wherein the $C_{1-6}$ alkyl is optionally substituted with one or more $C_{1-6}$ alkyl, $OR^7$, $NR^8R^9$;

each $R^7$ is independently H, $C_{1-6}$ alkyl, $C_6$ aryl, or 5- to 6-membered heteroaryl containing; 1 to 3 heteroatoms selected from N, O, and S; wherein the $C_{1-6}$ alkyl, $C_6$ aryl, or 5- to 6-membered heteroaryl is optionally substituted with one or more $C_{1-6}$ alkyl;

$R^8$ and $R^9$ each are independently H, $C_{1-6}$ alkyl, $C_6$ aryl, or 5- to 6-membered heteroaryl containing 1 to 3 heteroatoms selected from N, O, and S, wherein the $C_{1-6}$ alkyl, $C_6$ aryl, or 5- to 6-membered heteroaryl is optionally substituted with one or more $C_{1-6}$ alkyl, $OR^7$, $CO_2R^7$, $OC(=O)R^7$, $NR^{10}R^{11}$ in which the $C_{1-6}$ alkyl is optionally substituted with one or more $C_{1-6}$ alkyl, $OR^7$, $CO_2R^7$, $NR^{10}R^{11}$;

$R^{10}$ and $R^{11}$ each are independently H or $C_{1-6}$ alkyl; and each $R^P$ is independently H or $C_{1-6}$ alkyl optionally substituted with one or more 5- to 6-membered heteroaryl containing 1 to 3 heteroatoms selected from N, O, and S; wherein the 5- to 6-membered heteroaryl is optionally substituted with one or more $C_{1-6}$ alkyl or $NO_2$.

In some embodiments, the compound is of Formula (Ia):

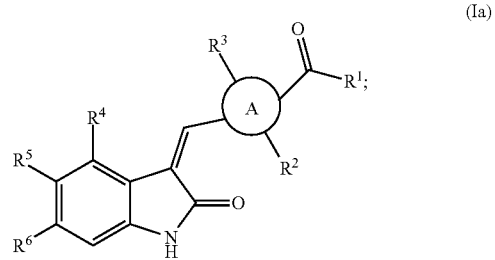

(Ia)

a stereoisomer thereof, a prodrug thereof, or a pharmaceutically acceptable salt thereof, wherein:

A is a 6-membered aryl ring or a 5- or 6-membered heteroaryl ring containing 1 to 3 heteroatoms selected from N, O, and S;

$R^1$ is H, $C_{1-6}$ alkyl, $C_{1-6}$ alkoxy, $OR^7$, $NR^8R^9$; or $C_{1-6}$ alkyl optionally substituted with $C_{1-6}$ alkyl, $OR^7$, $CO_2R^7$, $NR^8R^9$, a 6-membered aryl ring or a 5- or 6-membered heteroaryl ring containing 1 to 3 heteroatoms selected from N, O, and S, optionally substituted with $OR^7$, $CO_2R^7$, $NR^8R^9$, $C_{1-6}$ alkyl optionally substituted with $C_{1-6}$ alkyl, $OR^7$, $CO_2R^7$, $NR^8R^9$ or any combination thereof; or a 6-membered acyl ring or a 5- or 6-membered heteroaryl ring containing 1 to 3 heteroatoms selected from N, O, and S, and optionally substituted with $C_{1-6}$ alkyl, $OR^7$, $CO_2R^7$, $NR^8R^9$, $C_{1-6}$ alkyl optionally substituted with $C_{1-6}$ alkyl, $OR^7$, $CO_2R^7$, $NR^8R^9$, or any combination thereof;

$R^2$ is H, $C_{1-6}$ alkyl, $OR^7$, $CO_2R^7$, $NR^8R^9$, $C_{1-6}$ alkyl optionally substituted with $C_{1-6}$ alkyl, $OR^7$, $CO_2R^7$, or $NR^8R^9$;

$R^3$ is H, $C_{1-6}$ alkyl, $OR^7$, $CO_2R^7$, $NR^8R^9$, $C_{1-6}$ alkyl optionally substituted with $C_{1-6}$ alkyl, $OR^7$, $CO_2R^7$, or $NR^8R^9$;

$R^4$ is H, $C_{1-6}$ alkyl, $OR^7$, $CO_2R^7$, $NR^8R^9$, or $C_{1-6}$ alkyl optionally substituted with $C_{1-6}$ alkyl, $OR^7$, $CO_2R^7$, or $NR^8R^9$;

$R^5$ is $C_{1-6}$ alkyl optionally substituted with $C_{1-6}$ alkyl, $OR^7$, $CO_2R^7$, $OC(=O)R^7$, $NR^8R^9$, CN, azido, is a 6-membered aryl ring or a 5- or 6-membered heteroaryl ring containing 1 to 3 heteroatoms selected from N, O, and S, and optionally substituted with $C_{1-6}$ alkyl, $OR^7$, $CO_2R^7$, $NR^8R^9$, $C_{1-6}$ alkyl optionally substituted with $C_{1-6}$ alkyl, $OR^7$, $CO_2R^7$, $NR^8R^9$, or any combination thereof;

$R^6$ is H, $C_{2-4}$ alkenyl, $C_{1-4}$ alkoxy, halogen; or $C_{1-6}$ alkyl optionally substituted with $C_{1-6}$ alkyl, $OR^7$, $NR^8R^9$, or any combination thereof; each $R^7$ is independently H, $C_{1-6}$ alkyl optionally substituted with $C_{1-6}$ alkyl; or a 6-membered aryl ring or a 5- or 6-membered heteroaryl ring containing 1 to 3 heteroatoms selected from N, O, and S;

$R^8$ and $R^9$ each are independently H, or $C_{1-6}$ alkyl optionally substituted with $C_{1-6}$ alkyl, $OR^7$, $CO_2R^7$, $OC(=O)R^7$, $NR^{10}R^{11}$, a 6-membered aryl ring or a 5- or 6-membered heteroaryl ring containing 1 to 3 heteroatoms selected from N, O, and S, and optionally substituted with $C_{1-6}$ alkyl, $OR^7$, $CO_2R^7$, $NR^{10}R^{11}$, or $C_{1-6}$ alkyl optionally substituted with $C_{1-6}$ alkyl, $OR^7$, $CO_2R^7$, $NR^{10}R^{11}$, or any combination thereof; and $R^{10}$ and $R^{11}$ each are independently ti or $C_{1-6}$ alkyl.

It is understood that, for a compound of the present disclosure, variables A, $R^N$, $R^1$, $R^{1S}$, $R^{1SS}$, $R^2$, $R^3$, $R^4$, $R^5$, $R^{5S}$, $R^{5SS}$, $R^6$, $R^7$, $R^8$, $R^9$, $R^{10}$, $R^{11}$, and $R^P$ can each be, where applicable, selected from the groups described herein, and any group described herein for any of variables A, $R^N$, $R^1$, $R^{1S}$, $R^{1SS}$, $R^2$, $R^3$, $R^4$, $R^5$, $R^{5S}$, $R^{5SS}$, $R^6$, $R^7$, $R^8$, $R^9$, $R^{10}$, $R^{11}$, and $R^P$ can be combined, where applicable, with any group described herein for one or more of the remainder of variables A, $R^N$, $R^1$, $R^{1S}$, $R^{1SS}$, $R^2$, $R^3$, $R^4$, $R^5$, $R^{5S}$, $R^{5SS}$, $R^6$, $R^7$, $R^8$, $R^9$, $R^{10}$, $R^{11}$, and $R^P$.

Exemplary Embodiments of Variables

In some embodiments, A is $C_6$ aryl.

In some embodiments, A is 5- to 6-membered heteroaryl containing 1 to 3 heteroatoms selected from N, O, and S.

In some embodiments, A is 5-membered heteroaryl containing 1 to 3 heteroatoms selected from N, O, and S.

In some embodiments, A is 5-membered heteroaryl containing N.

In some embodiments, A is pyrrolyl.

In some embodiments, $R^N$ is H.

In some embodiments, $R^N$ is $C_{1-6}$ alkyl (e.g., methyl).

In some embodiments, $R^N$ is methyl.

In some embodiments, $R^1$ is $C_{1-6}$ alkyl, $C_{1-6}$ alkoxy, $OR^7$, $NR^8R^9$, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{1S}$.

In some embodiments, $R^1$ is $OR^7$ or $NR^8R^9$.

In some embodiments, $R^1$ is $OR^7$.

In some embodiments, $R^1$ is OH.

In some embodiments, $R^1$ is $NR^8R^9$.

In some embodiments, $R^1$ is NH—($C_{1-6}$ alkyl).

In some embodiments, $R^1$ is NH—($C_{1-6}$ alkyl)-$NR^{10}R^{11}$.

In some embodiments, $R^1$ is NH—($CH_2CH_2$)—$NR^{10}R^{11}$.

In some embodiments, $R^2$ is $C_{1-6}$ alkyl, $OR^7$, $CO_2R^7$, or $NR^8R^9$; wherein the $C_{1-6}$ alkyl is optionally substituted with one or more $C_{1-6}$ alkyl, $OR^7$, $CO_2R^7$, or $NR^8R^9$.

In some embodiments, $R^2$ is $C_{1-6}$ alkyl.

In some embodiments, $R^2$ is methyl.

In some embodiments, $R^3$ is $C_{1-6}$ alkyl, $OR^7$, $CO_2R^7$, or $NR^8R^9$; wherein the $C_{1-6}$ alkyl is optionally substituted with one or more $C_{1-6}$ alkyl, $OR^7$, $CO_2R^7$, or $NR^8R^9$.

In some embodiments, $R^3$ is $C_{1-6}$ alkyl.

In some embodiments, $R^3$ is methyl.

In some embodiments. $R^4$ is H.

In some embodiments, $R^4$ is $C_{1-6}$ alkyl, $OR^7$, $CO_2R^7$, or $NR^8R^9$; wherein the $C_{1-6}$ alkyl is optionally substituted with one or more $C_{1-6}$ alkyl, $OR^7$, $CO_2R^7$, or $NR^8R^9$, In some embodiments, $R^5$ is halogen, cyano, $C_{1-6}$ alkyl, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{5S}$.

In some embodiments, $R^5$ is halogen (e.g., F, Cl, or Br).

In some embodiments. $R^5$ is F.

In some embodiments, $R^5$ is Cl, Br, $C_{1-6}$ alkyl, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{5S}$.

In some embodiments, $R^5$ is $C_{1-6}$ alkyl, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{5S}$.

In some embodiments, $R^5$ is $C_{1-6}$ alkyl optionally substituted with one or more $R^{5S}$.

In some embodiments, $R^5$ is $C_{1-6}$ alkyl optionally substituted with one or more $OR^7$, $CO_2R^7$, $OC(=O)R^7$, $NHC(=O)R^7$, $NR^8R^9$,

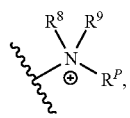

$NHC(=O)NR^8R^9$, $C(=O)NR^8R^9$, CN, or azido.

In some embodiments, $R^5$ is $C_{1-6}$ alkyl optionally substituted with one or more $OR^7$, $CO_2R^7$, $OC(=O)R^7$, $NHC(=O)R^7$, $NR^8R^9$, $NHC(=O)NR^8R^9$, $C(=O)NR^8R^9$, CN, or azido.

In some embodiments, $R^5$ is $C_{1-6}$ alkyl optionally substituted with one or more

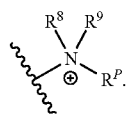

In some embodiments, $R^5$ is $C_{1-6}$ alkyl optionally substituted with one or more

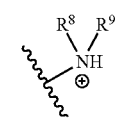

wherein $R^8$ and $R^9$ each are independently $C_{1-6}$ alley.

In some embodiments, $R^5$ is $C_{1-6}$ alkyl optionally substituted with one or more

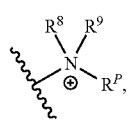

wherein $R^8$ and $R^9$ each are independently $C_{1-6}$ alkyl, and $R^P$ is H or $C_{1-6}$ alkyl optionally substituted with one or more 5- to 6-membered heteroaryl containing 1 to 3 heteroatoms selected from N, O, and S; wherein the 5- to 6-membered heteroaryl is optionally substituted with one or more $C_{1-6}$ alkyl or $NO_2$.

In some embodiments, $R^5$ is $C_{1-6}$ alkyl optionally substituted with one or more

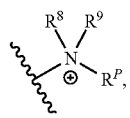

wherein $R^8$ and $R^9$ each are independently $C_{1-6}$ alkyl, and $R^P$ is H or $C_{1-6}$ alkyl substituted with imidazoyl; wherein the imidazoyl is substituted with $C_{1-6}$ alkyl and $NO_2$.

In some embodiments. $R^5$ is $C_{1-6}$ alkyl optionally substituted with one or more

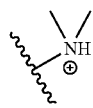

In some embodiments, $R^5$ is $C_{1-6}$ alkyl optionally substituted with one or more

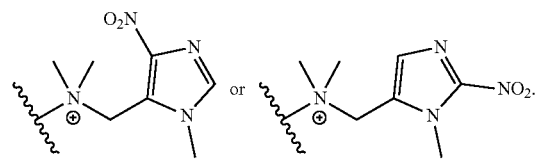 [SMILES: *[N+](C)(C)Cc1c([N+](=O)[O-])ncn1C ; *[N+](C)(C)Cc1cnc([N+](=O)[O-])n1C]

In some embodiments, $R^5$ is $C_{1-6}$ alkyl optionally substituted with one or more

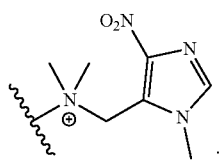 [SMILES: *[N+](C)(C)Cc1c([N+](=O)[O-])ncn1C]

In some embodiments, $R^5$ is $C_{1-6}$ alkyl optionally substituted with one or more

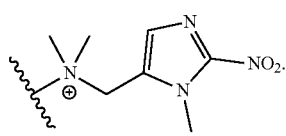 [SMILES: *[N+](C)(C)Cc1cnc([N+](=O)[O-])n1C]

In some embodiments, $R^5$ is

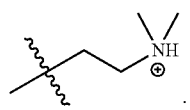

In some embodiments, $R^5$ is

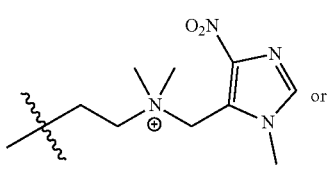

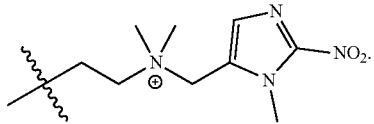

In some embodiments, $R^5$ is

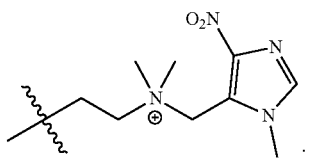 [SMILES: *CC[N+](C)(C)Cc1c([N+](=O)[O-])ncn1C]

In some embodiments, $R^5$ is

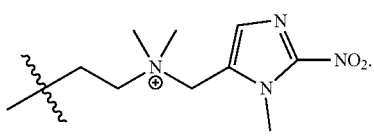 [SMILES: *CC[N+](C)(C)Cc1cnc([N+](=O)[O-])n1C]

In some embodiments, at least one $R^{5S}$ is $OR^7$, $CO_2R^7$, $OC(=O)R^7$, $NHC(=O)R^7$, $NR^8R^9$,

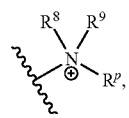

$NHC(=O)NR^8R^9$, $C(=O)NR^8R^9$, CN, or azido.

In some embodiments, at least one $R^{5S}$ is $OR^7$, $CO_2R^7$, $OC(=O)R^7$, $NHC(=O)R^7$, $NR^8R^9$, $NHC(=O)NR^8R^9$, $C(=O)NR^8R^9$, CN, or azido.

In some embodiments, at least one $R^{5S}$ is

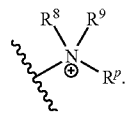

In some embodiments, a least one $R^{5S}$ is

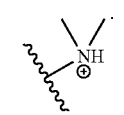

In some embodiments, at least one $R^{5S}$ is

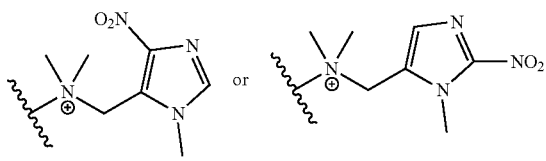 [SMILES: *[N+](C)(C)Cc1c([N+](=O)[O-])ncn1C ; *[N+](C)(C)Cc1cnc([N+](=O)[O-])n1C]

In some embodiments, a least one $R^{5S}$ is

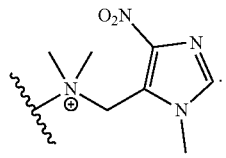 [SMILES: *[N+](C)(C)Cc1c([N+](=O)[O-])ncn1C]

In some embodiments, at least one $R^{5S}$ is

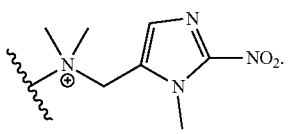 [SMILES: *[N+](C)(C)Cc1cnc([N+](=O)[O-])n1C]

In some embodiments, $R^6$ is H.

In some embodiments, $R^6$ is $C_{1-6}$ alkyl (e.g., methyl, ethyl, or propyl).

In some embodiments, $R^6$ is halogen (e.g., F or Cl)

In some embodiments, at least one $R^7$ is H

In some embodiments, at least one $R^7$ is $C_{1-6}$ alkyl (e.g., methyl).

In some embodiments, at least one $R^8$ is H.

In some embodiments, at least one $R^8$ is $C_{1-6}$ alkyl optionally substituted with one or more $C_{1-6}$ alkyl, $OR^7$, $CO_2R^7$, $OC(=O)R^7$, $NR^{10}R^{11}$ in which the $C_{1-6}$ alkyl is optionally substituted with one or more $C_{1-6}$ alkyl, OR, $CO_2R^7$, $NR^{10}R^{11}$.

In some embodiments, at least one $R^8$ is $C_{1-6}$ alkyl (e.g., methyl, ethyl, or propyl).

In some embodiments, at least one $R^8$ is $C_{1-6}$ alkyl (e.g., methyl, ethyl, or propyl) substituted with one or more $NR^{10}R^{11}$.

In some embodiments, at least one $R^9$ is H.

In some embodiments, at least one $R^9$ is $C_{1-6}$ alkyl optionally substituted with one or more $C_{1-6}$ alkyl, $OR^7$, $CO_2R^7$, $OC(=O)R^7$, $NR^{10}R^{11}$ in which the $C_{1-6}$ alkyl is optionally substituted with one or more $C_{1-6}$ alkyl, $OR^7$, $CO_2R^7$, $NR^{10}R^{11}$.

In some embodiments, at least one $R^9$ is $C_{1-6}$ alkyl (e.g., methyl, ethyl, or propyl).

In some embodiments, at least one $R^9$ is $C_{1-6}$ alkyl (e.g., methyl, ethyl, or propyl) substituted with one or more $NR^{10}R^{11}$.

In some embodiments, one of $R^8$ and $R^9$ is H, and the other one of $R^8$ and $R^9$ is $C_{1-6}$ alkyl optionally substituted with one or more $C_{1-6}$ alkyl, $OR^7$, $CO_2R^7$, $OC(=O)R^7$, $NR^{10}R^{11}$ in which the $C_{1-6}$ alkyl is optionally substituted with one or more $C_{1-6}$ alkyl, $OR^7$, $CO_2R^7$, $NR^{10}R^{11}$.

In some embodiments, one of $R^8$ and $R^9$ is H, and the other one of $R^8$ and $R^9$ is $C_{1-6}$ alkyl (e.g., methyl, ethyl, or propyl) substituted with one or more $NR^{10}R^{11}$.

In some embodiments, both of $R^8$ and $R^9$ are is $C_{1-6}$ alkyl (e.g., methyl, ethyl, or propyl).

In some embodiments, $R^{10}$ is H.

In some embodiments, $R^{10}$ is $C_{1-6}$ alkyl (e.g., methyl, ethyl, or propyl).

In some embodiments, $R^{11}$ is H.

In some embodiments, $R^{11}$ is $C_{1-6}$ alkyl (e.g., methyl, ethyl, or propyl).

In some embodiments, $R^{11}$ is H.

In some embodiments, $R^{11}$ is $C_{1-6}$ alkyl (e.g., methyl, ethyl, or propyl).

In some embodiments, one of $R^{10}$ and $R^{11}$ is H, and the other one of $R^{10}$ and $R^{11}$ is $C_{1-6}$ alkyl (e.g., methyl, ethyl, or propyl).

In some embodiments, both of $R^{10}$ and $R^{11}$ are $C_{1-6}$ alkyl (e.g., methyl, ethyl, or propyl).

In some embodiments, when both of $R^4$ and $R^6$ are H, then $R^5$ is Cl, Br, $C_{1-6}$ alkyl, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{5S}$.

In some embodiments, when both of $R^4$ and $R^6$ are H, then $R^5$ is $C_{1-6}$ alkyl, $C_6$ aryl, or 5- to 6-membered heteroaryl containing 1 to 3 heteroatoms selected from N, O, and S; wherein the $C_{1-6}$ alkyl, $C_6$ aryl, or 5- to 6-membered heteroaryl is optionally substituted with one or more $R^{5S}$.

In some embodiments, both of $R^4$ and $R^6$ are H.

In some embodiments, two or less of $R^4$, $R^5$, and $R^6$ are H.

In some embodiments, two of $R^4$, $R^5$, and $R^6$ are H.

In some embodiments, one of $R^4$, $R^5$, and $R^6$ is H.

In some embodiments, A is 2,4-dimethyl-1H-pyrrole; $R^1$ is —$NHCH_2CH_2N(CH_2CH_3)_2$; $R^4$ is hydrogen; $R^5$ is —$CH_2CH_2OH$, —$CH_2CH_2CONH_2$, or $CH_2CH_2CN$, and $R^6$ is hydrogen. The compound of claim 1, wherein:

$R^1$ is —$NHCH_2CH_2N(CH_2CH_3)_2$;

$R^5$ is —$CH_2CH_2OH$ or —$CH_2CH_2CONH_2$; and $R^6$ is hydrogen.

In some embodiments, the compound is not any of Compound. Nos. 1-2, 4-6, 17, and 19.

In some embodiments, the compound is not any of Compound Nos. 1-2, 4-6, 17, and 19, and pharmaceutically acceptable salts thereof.

In some embodiments, the compound is not any of Compound Nos. 1-2, 4-6, 17, and 19, prodrugs thereof, and pharmaceutically acceptable salts thereof.

In some embodiments, the compound is not any of Compound Nos. 1-2, 4-6, 17, and 19, stereoisomers thereof, prodrugs thereof, and pharmaceutically acceptable salts thereof.

In some embodiments, the compound is of Formula (II) or (II-a):

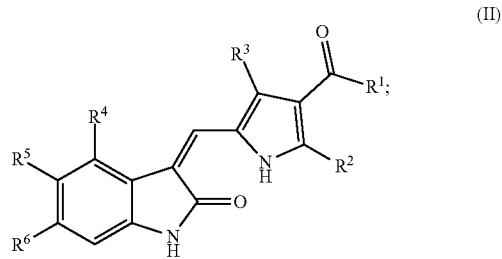

-continued

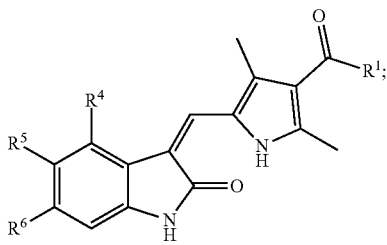
(II-a)

a stereoisomer thereof, a prodrug thereof, or a pharmaceutically acceptable salt thereof.

In some embodiments, the compound is of Formula (III) or (III-a):

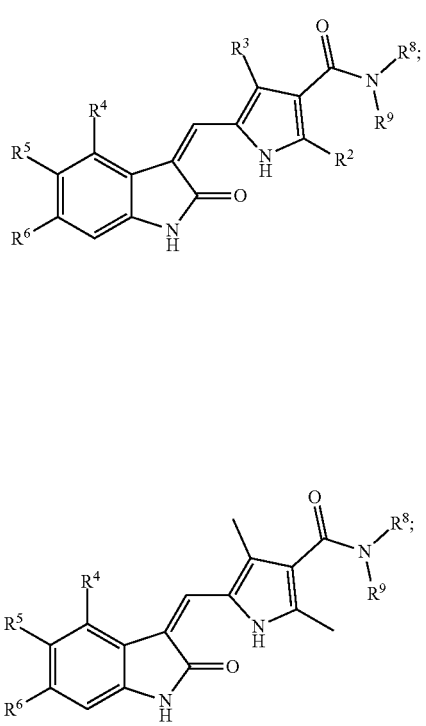
(III)

(III-a)

a stereoisomer thereof, a prodrug thereof, or a pharmaceutically acceptable salt thereof.

In some embodiments, the compound is of Formula (IV) or (IV-a):

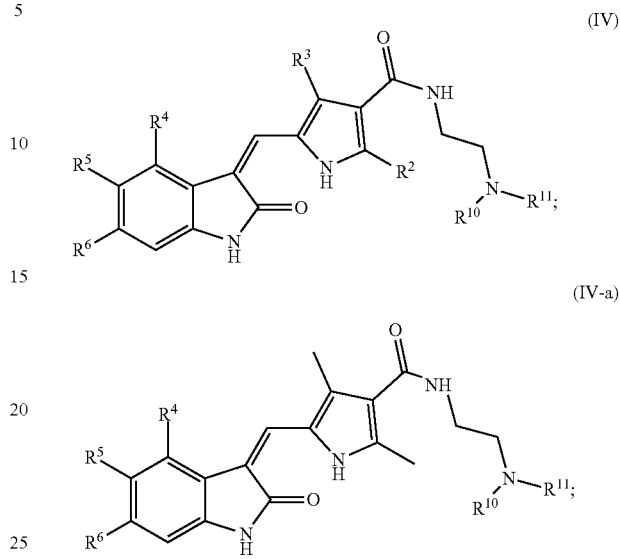
(IV)

(IV-a)

a stereoisomer thereof, a prodrug thereof, or a pharmaceutically acceptable salt thereof.

In some embodiments, the compound is selected from the compounds described in Table A, stereoisomers thereof, prodrugs thereof, and pharmaceutically acceptable salts thereof.

In some embodiments, the compound is selected from the compounds described in Table A, prodrugs thereof, and pharmaceutically acceptable salts thereof.

In some embodiments, the compound is selected from the compounds described in Table A and pharmaceutically acceptable salts thereof.

In some embodiments, the compound is selected from Compound Nos. 3, 7-16, 18, and 20-25, stereoisomers thereof, prodrugs thereof, and pharmaceutically acceptable salts thereof.

In some embodiments, the compound is selected from Compound Nos. 3, 7-16, 18, and 20-25, prodrugs thereof, and pharmaceutically acceptable salts thereof.

In some embodiments, the compound is selected from Compound Nos. 3, 7-16, 18, and 20-25, and pharmaceutically acceptable salts thereof.

In some embodiments, the compound is selected from Compound Nos. 3, 7-16, 18, and 20-25.

In some embodiments, the compound is selected from Compound Nos, 10 and 15-16, stereoisomers thereof, prodrugs thereof, and pharmaceutically acceptable salts thereof.

In some embodiments, the compound is selected from Compound Nos. 10 and 15-16, prodrugs thereof, and pharmaceutically acceptable salts thereof.

In some embodiments, the compound is selected from Compound Nos. 10 and 15-16, and pharmaceutically acceptable salts thereof.

In some embodiments, the compound is selected from Compound Nos. 10 and 15-16.

TABLE A

| Compound No. | Structure |
|---|---|
| 1 | |
| 2 | |
| 3 | |
| 4 | |
| 5 | |

TABLE A-continued

| Compound No. | Structure |
| --- | --- |
| 6 | |
| 7 | |
| 8 | |
| 9 | |
| 10 | |

TABLE A-continued

| Compound No. | Structure |
| --- | --- |
| 11 | |
| 12 | |
| 13 | |
| 14 | |
| 15 | |

TABLE A-continued

| Compound No. | Structure |
|---|---|
| 16 | |
| 17 | |
| 18 | |
| 19 | |
| 20 | |

TABLE A-continued

| Compound No. | Structure |
|---|---|
| 21 | 6-chloro indolinone linked via methylidene to N-(2-(diethylamino)ethyl)-2,4-dimethyl-1H-pyrrole-3-carboxamide |
| 22 | 6-bromo indolinone linked via methylidene to N-(2-(diethylamino)ethyl)-2,4-dimethyl-1H-pyrrole-3-carboxamide |
| 23 | 6-methyl indolinone linked via methylidene to N-(2-(diethylamino)ethyl)-2,4-dimethyl-1H-pyrrole-3-carboxamide |
| 24 | 6-ethyl indolinone linked via methylidene to N-(2-(diethylamino)ethyl)-2,4-dimethyl-1H-pyrrole-3-carboxamide |
| 25 | 6-isopropyl indolinone linked via methylidene to N-(2-(diethylamino)ethyl)-2,4-dimethyl-1H-pyrrole-3-carboxamide |

In some embodiments, the compound is selected from the compounds described in Table B, stereoisomers thereof, and pharmaceutically acceptable salts thereof.

In some embodiments, the compound is selected from the compounds described in Table B and pharmaceutically acceptable salts thereof.

In some embodiments, the compound is selected from the compounds described in Table B.

It is understood that the isotopic derivative can be prepared using any of a variety of art-recognised techniques. For example, the isotopic derivative can generally be prepared by carrying out the procedures disclosed in the Schemes and/or in the Examples described herein, by substituting an isotopically labeled reagent for a non-isotopically labeled reagent.

TABLE B

| Compound No. | Structure |
| --- | --- |
| 1B | 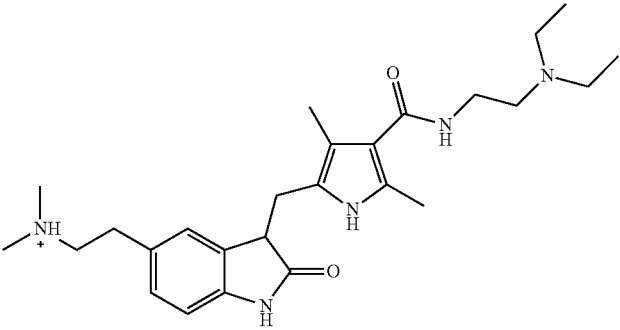 [SMILES: CCN(CC)CCNC(=O)c1c(C)[nH]c(CC2C(=O)Nc3ccc(CC[NH+](C)C)cc32)c1C] |
| 2B | 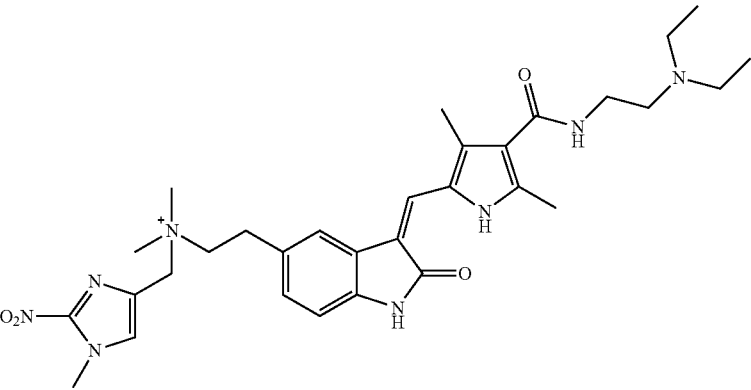 [SMILES: CCN(CC)CCNC(=O)c1c(C)[nH]c(/C=C2\C(=O)Nc3ccc(CC[N+](C)(C)Cc4cn(C)c([N+](=O)[O-])n4)cc32)c1C] |
| 3B | 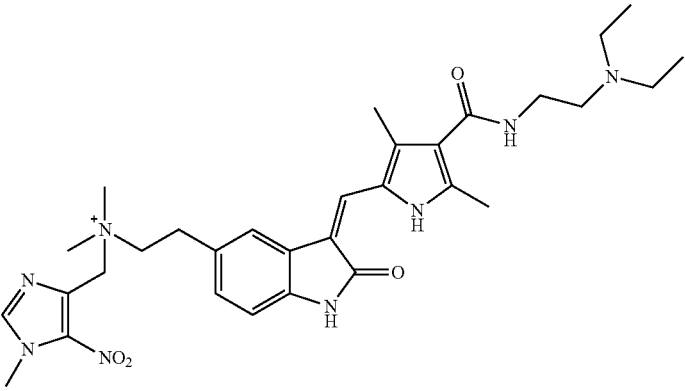 [SMILES: CCN(CC)CCNC(=O)c1c(C)[nH]c(/C=C2\C(=O)Nc3ccc(CC[N+](C)(C)Cc4ncn(C)c4[N+](=O)[O-])cc32)c1C] |

In some aspects, the present disclosure provides a compound being an isotopic derivative (e.g., isotopically labeled compound) of any one of the compounds of the Formulae disclosed herein.

In some embodiments, the compound is an isotopic derivative of any one of the compounds described in Tables A and B, stereoisomers thereof, prodrugs thereof, and pharmaceutically acceptable salts thereof.

In some embodiments, the isotopic derivative is a deuterium labeled compound.

In some embodiments, the isotopic derivative is a deuterium labeled compound of any one of the compounds of the Formulae disclosed herein.

In some embodiments, the compound is a deuterium labeled compound of any one of the compounds described in Tables A and B, stereoisomers thereof, prodrugs thereof, and pharmaceutically acceptable salts thereof.

It is understood that the deuterium labeled compound comprises a deuterium atom having an abundance of deuterium that is substantially greater than the natural abundance of deuterium, which is 0.015%.

In some embodiments, the deuterium labeled compound has a deuterium enrichment factor for each deuterium atom of at least 3500 (52.5% deuterium incorporation at each deuterium atom), at least 4000 (60% deuterium incorporation), at least 4500 (67.5% deuterium incorporation), at least 5000 (75% deuterium), at least 5500 (82.5% deuterium incorporation), at least 6000 (90% deuterium incorporation), at least 6333.3 (95% deuterium incorporation), at least 6466.7 (97% deuterium incorporation), at least 6600 (99% deuterium incorporation), or at least 6633.3 (99.5% deuterium incorporation). As used herein, the term "deuterium enrichment factor" means the ratio between the deuterium abundance and the natural abundance of a deuterium.

It is understood that the deuterium labeled compound can be prepared using any of a variety of art-recognized techniques. For example, the deuterium labeled compound can generally be prepared by carrying out the procedures disclosed in the Schemes and/or in the Examples described herein, by substituting a deuterium labeled reagent for a non-deuterium labeled reagent.

Synthesis of the Compounds

In some aspects, the present disclosure provides a method of preparing a compound of the present disclosure.

In some aspects, the present disclosure provides a method of a compound, comprising one or more steps as described herein.

In some aspects, the present disclosure provides a compound obtainable by, or obtained by, or directly obtained by a method for preparing a compound as described herein.

In some aspects, the present disclosure provides an intermediate as described herein, being suitable for use in a method for preparing a compound as described herein.

The compounds of the present disclosure can be prepared by any suitable technique known in the art. Particular processes for the preparation of these compounds are described further in the accompanying examples.

In the description of the synthetic methods described herein and in any referenced synthetic methods that are used to prepare the starting materials, it is to be understood that all proposed reaction conditions, including choice of solvent, reaction atmosphere, reaction temperature, duration of the experiment and workup procedures, can be selected by a person skilled in the art.

It is understood by one skilled in the art of organic synthesis that the functionality present on various portions of the molecule must be compatible with the reagents and reaction conditions utilised.

It will be appreciated that during the synthesis of the compounds of the disclosure in the processes defined herein, or during the synthesis of certain starting materials, it may be desirable to protect certain substituent groups to prevent their undesired reaction. The skilled chemist will appreciate when such protection is required, and how such protecting groups may be put in place, and later removed. For examples of protecting groups see one of the many general texts on the subject, for example, 'Protective Groups in Organic Synthesis' by Theodora Green (publisher: John Wiley & Sons). Protecting groups may be removed by any convenient method described in the literature or known to the skilled chemist as appropriate for the removal of the protecting group in question, such methods being chosen so as to effect removal of the protecting group with the minimum disturbance of groups elsewhere in the molecule. Thus, if reactants include, for example, groups such as amino, carboxy or hydroxy it may be desirable to protect the group in some of the reactions mentioned herein.

By way of example, a suitable protecting group for an amino or alkylamino group is, for example, an acyl group, for example an alkanoyl group such as acetyl, an alkoxycarbonyl group, for example a methoxycarbonyl, ethoxycarbonyl or t-butoxycarbonyl group, an arylmethoxycarbonyl group, for example benzyloxycarbonyl, or an aroyl group, for example benzoyl. The deprotection conditions for the above protecting groups necessarily vary with the choice of protecting group. Thus, for example, an acyl group such as an alkanoyl or alkoxycarbonyl group or an aroyl group may be removed by, for example, hydrolysis with a suitable base such as an alkali metal hydroxide, for example lithium or sodium hydroxide. Alternatively an acyl group such as a tert-butoxycarbonyl group may be removed, for example, by treatment with a suitable acid as hydrochloric, sulphuric or phosphoric acid or trifluoroacetic acid and an arylmethoxycarbonyl group such as a benzyloxycarbonyl group may be removed, for example, by hydrogenation over a catalyst such as palladium on carbon, or by treatment with a Lewis acid for example boron tris(trifluoroacetate). A suitable alternative protecting group for a primary amino group is, for example, a phthaloyl group which may be removed by treatment with an alkylamine, for example dimethylaminopropylamine, or with hydrazine.

A suitable protecting group for a hydroxy group is, for example, an acyl group, for example an alkanoyl group such as acetyl, an aroyl group, for example benzoyl, or an arylmethyl group, for example benzyl. The deprotection conditions for the above protecting groups will necessarily vary with the choice of protecting group. Thus, for example, an acyl group such as an alkanoyl or an aroyl group may be removed, for example, by hydrolysis with a suitable base such as an alkali metal hydroxide, for example lithium, sodium hydroxide or ammonia. Alternatively an arylmethyl group such as a benzyl group may be removed, for example, by hydrogenation over a catalyst such as palladium on carbon.

A suitable protecting group for a carboxy group is, for example, an esterifying group, for example a methyl or an ethyl group which may be removed, for example, by hydrolysis with a base such as sodium hydroxide, or for example a tert-butyl group which may be removed, for example, by treatment with an acid, for example an organic acid such as trifluoroacetic acid, or for example a benzyl group which may be removed, for example, by hydrogenation over a catalyst such as palladium on carbon.

The resultant compounds can be isolated and purified using techniques well known in the art.

Conveniently, the reaction of the compounds is carried out in the presence of a suitable solvent, which is preferably inert under the respective reaction conditions. Examples of suitable solvents comprise but are not limited to hydrocarbons, such as hexane, petroleum ether, benzene, toluene or xylene; chlorinated hydrocarbons, such as trichlorethylene, 1,2-dichloroethane, tetrachloromethane, chloroform or dichloromethane; alcohols, such as methanol, ethanol, isopropanol, n-propanol, n-butanol or tert-butanol; ethers, such as diethyl ether, diisopropyl ether, tetrahydrofuran (THF), 2-methyltetrahydrofuran, cyclopentylmethyl ether (CPME), methyl Cert-butyl ether (MTBE) or dioxane; glycol ethers, such as ethylene glycol monomethyl or monoethyl ether or ethylene glycol dimethyl ether (diglyme); ketones, such as acetone, methylisobutylketone (MIBK) or butanone; amides, such as acetamide, dimethylaceramide, dimethylformamide (DMF) or N-methylpyrrolidinone (NMP); nitrites, such as acetonitrile; sulphoxides, such as dimethyl sulphoxide (DMSO); nitro compounds, such as nitromethane or nitrobenzene; esters, such as ethyl acetate or methyl acetate, or mixtures of the said solvents or mixtures with water.

The reaction temperature is suitably between about −100° C. and 300° C., depending on the reaction step and the conditions used.

Reaction times are generally in the range between a fraction of a minute and several days, depending on the reactivity of the respective compounds and the respective reaction conditions. Suitable reaction times are readily determinable by methods known in the art, for example reaction monitoring. Based on the reaction temperatures given above, suitable reaction times generally lie in the range between 10 minutes and 48 hours.

Moreover, by using the procedures described herein, in conjunction with ordinary skills in the art, additional compounds of the present disclosure can be readily prepared. Those skilled in the art will readily understand that known variations of the conditions and processes of the following preparative procedures can be used to prepare these compounds.

As will be understood by the person skilled in the art of organic synthesis, compounds of the present disclosure are readily accessible by various synthetic routes, some of which are exemplified in the accompanying examples. The skilled person will easily recognize which kind of reagents and reactions conditions are to be used and how they are to be applied and adapted in any particular instance—wherever necessary or useful—in order to obtain the compounds of the present disclosure. Furthermore, some of the compounds of the present disclosure can readily be synthesized by reacting other compounds of the present disclosure under suitable conditions, for instance, by converting one particular functional group being present in a compound of the present disclosure, or a suitable precursor molecule thereof, into another one by applying standard synthetic methods, like reduction, oxidation, addition or substitution reactions; those methods are well known to the skilled person. Likewise, the skilled person will apply—whenever necessary or useful—synthetic protecting (or protective) groups; suitable protecting groups as well as methods for introducing and removing them are well-known to the person skilled in the art of chemical synthesis and are described, in more detail, in, e.g., P. G. M. Wuts, T. W. Greene, "Greene's Protective Groups in Organic Synthesis", 4th edition (2006) (John Wiley & Sons).

General routes for the synthesis of the compound of the present disclosure are described in FIGS. 1A-1D.

Biological Assays

Compounds designed, selected and/or optimised by methods described above, once produced, can be characterised using a variety of assays known to those skilled in the art to determine whether the compounds have biological activity. For example, the molecules can be characterised by conventional assays, including but not limited to those assays described below, to determine whether they have a predicted activity, binding activity and/or binding specificity.

Furthermore, high-throughput screening can be used to speed up analysis using such assays. As a result, it can be possible to rapidly screen the molecules described herein for activity, using techniques known in the art. General methodologies for performing high-throughput screening are described, for example, in Devlin (1998) *High Throughput Screening*, Marcel Dekker; and U.S. Pat. No. 5,763,263. High-throughput assays can use one or more different assay techniques including, but not limited to, those described below.

Uses of the Compounds

Another aspect of this disclosure provides pharmaceutical compositions comprising at least one AMPK inhibitor compound of this disclosure and at least one pharmaceutically acceptable additive.

Another aspect of this disclosure provides pharmaceutical kits containing a pharmaceutical composition of this disclosure, prescribing information for the composition, and a container.

Another aspect of this disclosure provides methods for inhibiting AMPK kinase activity in a subject, including administering to the subject a therapeutically effective amount of an AMPK inhibitor compound of this disclosure, or a pharmaceutically acceptable salt thereof.

This disclosure also provides methods of preventing, treating, or ameliorating cancer, or preventing metastasis of a cancer in a subject, including administering a therapeutically effective amount of an AMPK inhibitor compound of this disclosure to a subject in need thereof.

In these methods, the cancer may be a blood cancer (including, for example, acute myeloid leukemia or chronic myeloid leukemia), a tumor of the CNS (including, for example, glioblastoma or medulloblastoma), breast cancer, a carcinoma, cervical cancer, colorectal cancer, lung cancer, ovarian cancer, pancreatic cancer, or prostate cancer.

In these methods, the AMPK inhibitor compound may be administered to the subject within a pharmaceutical composition. The pharmaceutical composition may be a monophasic pharmaceutical composition suitable for parenteral or oral administration consisting essentially of a therapeutically effective amount of the AMPK inhibitor compound, and a pharmaceutically acceptable additive.

In these methods, the pharmaceutical composition may be administered in combination with one or more DNA-targeted agents (including, for example, DNA alkylating agents such as carboplatin or cyclophosphamide), topoisomerase inhibitors including, for example, cisplatin), capecitabine, cytarabine, daunoribicin, docetaxel, doxorubicin, 5-fluorouracil, gemcitabine, methotrexate, paclitaxel, premetrexed, irinotecan temozolomide, topotecan, or combinations thereof.

Alternatively or additionally, in these methods, the pharmaceutical composition may be administered in combination with one or more angiogenic agents including axitinib, bevacizumab, cabozantinib, everolimus, lenalidomide, lenvatinib mesylate, pazopanib, ramucirumab, regorafenib, sorafenib, sunitinib, thalidomide, vandetanib, ziv-aflibercept, or combinations thereof.

Alternatively or additionally, in these methods, the pharmaceutical composition may be administered in combination with radiation therapy.

In related aspects, this disclosure also provides the use of an AMPK inhibitor compound of this disclosure, or a pharmaceutically acceptable salt thereof, in the manufacture of a medicament for the treatment of cancer, such as AML. Similarly, this disclosure provides an AMPK inhibitor compound of this disclosure, or a pharmaceutically acceptable salt thereof, for use in the treatment of cancer, such as AML.

The AMPK inhibitor compounds, and prodrugs thereof, disclosed herein may be used to prevent, treat, or ameliorate cancer, or prevent metastasis of cancer, in a subject by administering a therapeutically effective amount of a compound of this disclosure that inhibits AMPK. For example, the disclosed compounds may be used to treat a hematological cancer such as acute myeloid leukemia or chronic myeloid leukemia, an advanced hypoxic solid tumor, a tumor of the central nervous system such as glioblastoma and medulloblastoma, or a breast cancer, a carcinoma, a cervical cancer, a colorectal cancer, a lung cancer, an ovarian cancer, a pancreatic cancer, or a prostate cancer. These compounds may be particularly useful in treating hypoxic cancers or cancers with a cancer stem cell component.

Therapeutically effective amounts of the disclosed compounds can be administered to a subject with a tumor to achieve an anti-tumor effect, such as inhibition of tumorigenesis or tumor metastasis. The disclosed compounds are also useful in the treatment of both primary and metastatic solid tumors. The disclosed compounds are also useful in treating hematological malignancies such as leukemias as well as the treatment of hypoxic solid tumors. In addition, these compounds may be useful in the prevention of metastases from the tumors described above either when used alone or in combination with radiotherapy and/or other chemotherapeutic agents.

Further, a method for inhibiting the activity of the AMPK in a subject using the disclosed compounds is provided. The method includes administering a therapeutically effective amount of a disclosed compound to a subject to achieve an AMPK inhibitory effect. The compounds of this disclosure having AMPK-inhibitory effects are useful for treating many malignant diseases. These include, but are not limited to, cancer, tumor growth, and undesirable angiogenesis.

The recurrence of cancer has been attributed to cancer stem cells and efforts are now focused on targeting this drug resistant population of cells. Increased levels of activated AMPK, a regulator of metabolic pathways, has been measured in the cancer stem cells that have low ROS levels, and knockdown of AMPK has resulted in concomitant loss of cancer stem cells. Therefore, without intending to be bound by theory, we propose that the inhibition of AMPK will decrease cancer stem cell viability and sensitize these stem cells to conventional therapy. Thus, further methods for inhibiting the activity of the AMPK in cancer stem cells using the disclosed AMPK inhibitor compounds is provided. These methods may be particularly effective in preventing or limiting the recurrence of cancer, and/or achieving long-term disease-free survival (DFS) and treating relapsed cancers.

The disclosed compounds can be used in combination with other compositions and procedures for the treatment of diseases. For example, a cancer may be treated conventionally with surgery, radiation or chemotherapy in combination with one or more of the AMPK inhibitor compounds disclosed herein. Additionally, a cancer may be treated conventionally with a chemotherapeutic and one or more of the AMPK inhibitor compounds disclosed herein may be administered to reduce chemotherapeutic drug resistance of the cancer cells to the conventional chemotherapeutic or enhance the sensitivity of the cancer cells to the conventional chemotherapeutic.

The disclosed compounds exhibiting AMPK-inhibitory activity may be combined with other kinase inhibitory agents. The compounds exhibiting AMPK-inhibitory activity of this disclosure may be combined with other conventional anticancer therapies, for example, steroids such as dexamethasone and prednisolone.

Examples of other chemotherapeutic agents that can be used in combination with the compounds of this disclosure include DNA-targeted agents, including DNA alkylating agents and topoisomerase inhibitors, including cisplatin, capecitabine, carboplatin, cyclophosphamide, cytarabine, dauoribicin, docetaxel, doxorubicin, 5-fluorouracil, gemcitabine, methotrexate, paclitaxel, premetrexed, irinotecan temozolomide, topotecan, or combinations thereof.

The disclosed compounds also may be combined with radiotherapy employing radioisotopes (such as $^{32}P$, $^{90}Y$, $^{125}I$, $^{131}I$, and $^{177}Lu$), particle beams (such as proton, neutron and electron beams) and electromagnetic radiation (such as gamma rays, x-rays and photodynamic therapy using photosensitizers and visible or ultraviolet rays). The present disclosure provides a method of treating a cancer in a subject, the method comprising administering to the subject at least one therapeutically effective amount of at least one compound of the present disclosure. The present disclosure provides at least one compound of the present disclosure for use in the treatment of a cancer in a subject, wherein the at least one compound of the present disclosure is for administration to the subject in at least one therapeutically effective amount. The present disclosure provides at least one compound of the present disclosure for the manufacture of a medicament for the treatment of cancer in a subject, wherein the at least one compound is for administration to the subject in at least one therapeutically effective amount.

In some aspects, a cancer can be, but is not limited to, a carcinoma, a lymphoma, a blastoma, a sarcoma, a leukemia, a brain cancer, a breast cancer, a blood cancer, a bone cancer, a lung cancer, a skin cancer, a liver cancer, an ovarian cancer, a bladder cancer, a renal cancer, a gastric cancer, a thyroid cancer, a pancreatic cancer, an esophageal cancer, a prostate cancer, a cervical cancer or a colorectal cancer. Cancer can also include, but is not limited to, carcinoma, lymphoma, blastoma, sarcoma, leukemia and germ cell tumors. More particular examples of such cancers include adrenocortical carcinoma, bladder urothelial carcinoma, breast invasive carcinoma, cervical squamous cell carcinoma, endocervical adenocarcinoma, cholangiocarcinoma, colon adenocarcinoma, lymphoid neoplasm diffuse large B-cell lymphoma, esophageal carcinoma, glioblastoma, multiforme, head and neck squamous cell carcinoma, kidney chromophobe, kidney renal clear cell carcinoma, kidney renal papillary cell carcinoma, acute myeloid leukemia, brain lower grade glioma, liver hepatocellular carcinoma, lung adenocarcinoma, lung squamous cell carcinoma, mesothelioma, ovarian serous cystadenocarcinoma, pancreatic adenocarcinoma, pheochromocytoma, paraganglioma, prostate adenocarcinoma, rectum adenocarcinoma, sarcoma, skin cutaneous melanoma, stomach adenocarcinoma, testicular germ cell tumors, thyroid carcinoma, thymoma, uterine carcinosarcoma, uveal melanoma. Other examples include breast cancer, lung cancer, lymphoma, melanoma, liver cancer, colorectal cancer, ovarian cancer, bladder cancer, renal cancer or gastric cancer. Further examples of cancer include neuroendocrine cancer, non-small cell lung cancer (NSCLC), small cell lung cancer, thyroid cancer, endometrial cancer, biliary cancer, esophageal cancer, anal cancer, salivary, cancer, vulvar cancer, cervical cancer, Acute lymphoblastic leukemia (ALL), Acute myeloid leukemia (AML), Adrenal gland tumors, Anal cancer, Bile duct cancer, Bladder cancer, Bone cancer, Bowel cancer, Brain tumors, Breast cancer, Cancer of unknown primary (CUP), Cancer spread to bone, Cancer spread to brain, Cancer spread to liver, Cancer spread to lung, Carcinoid, Cervical cancer, Children's cancers, Chronic lymphocytic leukemia (CLL), Chrome myeloid leukemia (CML), Colorectal cancer, Ear cancer, Endometrial cancer, Eye cancer, Follicular dendritic cell sarcoma, Gallbladder cancer, Gastric cancer, Gastro esophageal junction cancers, Germ cell tumors, Gestational trophoblastic disease (GIT)), Hairy cell leukemia, Head and neck cancer, Hodgkin lymphoma, Kaposi's sarcoma, Kidney cancer, Laryngeal cancer, Leukemia, Gastric linitis plastica, Liver cancer, Lung cancer, Lymphoma, Malignant schwannoma, Mediastinal germ cell tumors, Melanoma skin cancer, Men's cancer, Merkel cell skin cancer, Mesothelioma, Molar pregnancy, Mouth and oropharyngeal cancer, Myeloma, Nasal and paranasal sinus cancer, Nasopharyngeal cancer, Neuroblastoma, Neuroendocrine tumors, Non Hodgkin lymphoma (NHL), Esophageal cancer, Ovarian cancer, Pancreatic cancer, Penile cancer, Persistent trophoblastic disease and choriocarcinoma, Pheochromocytoma, Prostate cancer, Pseudomyxoma peritonei, Rectal cancer. Retinoblastoma, Salivary gland cancer, Secondary' cancer, Signet cell cancer, Skin cancer, Small bowel cancer, Soft tissue sarcoma, Stomach cancer, T cell childhood non Hodgkin lymphoma (NHL), Testicular cancer, Thymus gland cancer, Thyroid cancer, Tongue cancer, Tonsil cancer, Tumors of the adrenal gland, Uterine cancer. Vaginal cancer, Vulval cancer, Wilms' tumor, Womb cancer and Gynaecological cancer. Examples of cancer also include, but are not limited to, Hematologic malignancies, Lymphoma, Cutaneous T-cell lymphoma, Peripheral T-cell lymphoma, Hodgkin's lymphoma, Non-Hodgkin's lymphoma, Multiple myeloma, Chrome lymphocytic leukemia, chronic myeloid leukemia, acute myeloid leukemia, Myelodysplastic syndromes, Myelofibrosis, Biliary tract cancer, Hepatocellular cancer, Colorectal cancer, Breast cancer, Lung cancer, Non-small cell lung cancer, Ovarian cancer, Thyroid Carcinoma, Renal Cell Carcinoma, Pancreatic cancer, Bladder cancer, skin cancer, malignant melanoma, merkel cell carcinoma, Uveal Melanoma or Glioblastoma multiforme.

The present disclosure provides a method of modulating AMPK activity in a subject, the method comprising administering to the subject at least one therapeutically effective amount of at least one compound of the present disclosure. The present disclosure provides at least one compound of the present disclosure for use in a method of modulating AMPK activity, wherein the at least one compound of the present disclosure is for administration to the subject in at least one therapeutically effective amount. The present disclosure provides at least one compound of the present disclosure for the manufacture of a medicament for the modulation of AMPK activity in a subject, wherein the at least one compound of the present disclosure is for administration to the subject in at least one therapeutically effective amount.

In some aspects, modulating AMPK activity comprises inhibiting AMPK activity. In some aspects, modulating AMPK activity comprises inhibiting AMPK activity in a specific target cell, e.g. a tumor cell or a cancer cell. In some aspects, modulating AMPK activity comprises inhibiting AMPK activity by at least about 10%, or at least about 20%, or at least about 30%, or at least about 40%, or at least about 50%, or at least about 60%, or at least about 70%, or at least about 80%, or at least about 90%, or at least about 99%.

The present disclosure provides a method of modulating 90 kDa ribosomal S6 kinase (RSK) activity in a subject, the method comprising administering to the subject at least one therapeutically effective amount of at least one compound of the present disclosure. The present disclosure provides at least one compound of the present disclosure for use in a method of modulating RSK activity, wherein the at least one compound of the present disclosure is for administration to the subject in at least one therapeutically effective amount. The present disclosure provides at least one compound of the present disclosure for the manufacture of a medicament for the modulation of RSK activity in a subject, wherein the at least one compound of the present disclosure is for administration to the subject in at least one therapeutically effective amount.

In some aspects, RSK can be RSK1, RSK2, RKS3 or RSK4.

In some aspects, modulating RSK activity comprises inhibiting RSK activity. In some aspects, modulating RSK activity comprises inhibiting RSK activity in a specific target cell, e.g. a tumor cell or a cancer cell. In some aspects, modulating RSK activity comprises inhibiting AMPK activity by at least about 10%, or at least about 20%, or at least about 30%, or at least about 40%, or at least about 50%, or at least about 60%, or at least about 70%, or at least about 80%, or at least about 90%, or at least about 99%.

The present disclosure provides a method of reducing the amount of cancer stein cells in a subject, the method comprising administering to the subject, at least one therapeutically effective amount of at least one compound of the present disclosure. The present disclosure provides at least one compound of the present disclosure for use in a method of reducing the amount of cancer stein cells in a subject, wherein the at least one compound is for administration to the subject in at least one therapeutically effective amount. The present disclosure provides at leas tone compound of the present disclosure for the manufacture of a medicament for use in a method of reducing the amount of cancer stem cells in a subject, wherein the at least one compound is for administration to the subject in at least one therapeutically effective amount.

In some aspects, a cancer stem cell can be a leukemia stem cell (LSC). In some aspects, a cancer stem cell can be a glioblastoma stem-like cells. In some aspects, reducing the amount of cancer stem cells in a subject comprises reducing the amount of cancer stem cells in a subject by at least about 10%, or at least about 20%, or at least about 30%, or at least about 40%, or at least about 50%, or at least about 60%, or at least about 70%, or at least about 80%, or at least about 90%, or at least about 99%.

The present disclosure provides a method of increase ROS levels in at least one cell in a subject, the method comprising administering to the subject at least one therapeutically effective amount of at least one compound of the present disclosure. The present disclosure provides at least one compound of the present disclosure for use in a method of increasing ROS levels in at least one cell in a subject, wherein the at least one compound of the present disclosure is for administration to the subject in at least one therapeutically effective amount. The present disclosure provides at least one compound of the present disclosure for the manufacture of a medicament for use in a method of increasing ROS levels in at least one cell in a subject, wherein the at least one compound is for administration to the subject in at least one therapeutically effective amount.

In some aspects, an increase in ROS levels can be at least about a 10%, or at least about a 20%, or at least about a 30%, or at least about a 40%, or at least about a 50%, or at least about a 60%, or at least about a 70%, or at least about an 80%, or at least about a 90%, or at least about a 100% increase in ROS levels.

The present disclosure provides a method of sensitizing at least one cancer stem cell in a subject to treatment, the method comprising administering to the subject at least one therapeutically effective amount of at least one compound of the present disclosure. The present disclosure provides at least one compound of the present disclosure for use in a method of sensitizing at least one cancer stein cell in a subject to treatment, wherein the at least one compound of the present disclosure is for administration to the subject in at least one therapeutically effective amount. The present disclosure provides at least one compound of the present disclosure for the manufacture of a medicament for use in a method of sensitizing at least one cancer stem cell in a subject to treatment, wherein the at least one compound is for administration to the subject in at least one therapeutically effective amount.

In some aspects, the at least one cell can be a cancer stem cell. In some aspects, a cancer stem cell can be a leukemia stem cell (LSC) or a glioblastoma stein-like cells.

The present disclosure provides a method of treating a cancer in a subject, the method comprising administering to the subject at least one therapeutically effective amount of at least one compound of the present disclosure in combination with at least on therapeutically effective amount of at least one additional therapeutic agent. The present disclosure provides at least one compound of the present disclosure for use in the treatment of a cancer in a subject, wherein the at least one compound of the present disclosure is for administration to the subject in at least one therapeutically effective amount, and wherein the treatment further comprises administering to the subject at least one therapeutically effective amount of at least one additional therapeutic agent. The present disclosure provides at least one compound of the present disclosure for the manufacture of a medicament for the treatment of a cancer in a subject, wherein the at least one compound is for administration to the subject in at least one therapeutically effective amount and wherein the treatment further comprises administering to the subject at least one therapeutically effective amount of at least one additional therapeutic agent.

The present disclosure a combination comprising at least one compound of the present disclosure and at least one additional therapeutic agent for use in the treatment of a cancer in a subject, wherein the combination is for the administration to the subject in at least one therapeutically effective amount. The present disclosure provides a combination comprising at least one compound of the present disclosure and at least one additional therapeutic agent for the manufacture of a medicament for the treatment of a cancer in a subject, wherein the combination is for administration to the subject in at least one therapeutically effective amount.

Additional therapeutic agents can include, but are not limited to, chemotherapeutic agents, anti-cancer agents, DNA alkylating agents, DNA damage response (DDR) inhibitors, cell-cycle checkpoint inhibitors, PARP inhibitors, HDAC inhibitors, kinase inhibitors, Bcl-2 inhibitors, Mcl-1 inhibitors, PD-L1 targeted agents, immunotherapy agents and bioenergetics modulators. Additional therapeutic agents can include, but are not limited to cisplatin, cytarabine, doxorubicin, paclitaxel, temozolomide, dasatinib, nilotinib, fluvestrant, venetoclax, metformin, or combinations thereof.

In some aspects, anti-cancer agents can include, but are not limited to, 13-cis-Retinoic Acid, 2-CdA, 2-Chlorodeoxyadenosine, 5-Azacitidine, 5-Fluorouracil, 5-FU, 6-Mercaptopurine, 6-MP, 6-TG, 6-Thioguanine, Abemaciclib, Abiraterone acetate, Abraxane, Accutane, Actinomycin-D, Adcetris, Ado-Trastuzumab Emtansine, Adriamycin, Adrucil, Afatinib, Afinitor, Agrylin, Ala-Cort, Aldesleukin, Alemtuzumab, Alecensa, Alectinib, Alimta, Alitretinoin, Alkaban-AQ, Alkeran, All-transretinoic Acid, Alpha Interferon, Altretamine, Alunbrig, Amethopterin, Amitbstine, Aminoglutethimide, Anagrelide, Anandron, Anastrozole, Apalutamide, Arabinosylcytosine, Ara-C, Aranesp, Aredia, Arimidex, Ammasin, ArranonArsenic Trioxide, Arzerra, Asparaginase, Atezolizumab, Atra, Avastin, Avelumab, Axicabtagene Ciloleucel, Axitinib, Azacitidine, Bavencio, Bcg, Beleodaq, Belinostat, Bendamustine, Bendeka, Besponsa, Bevacizumab, Bexarotene, Bexxar, Bicalutamide, Bicnu, Blenoxane, Bleomycin, Blinatumomab, Blincyto, Bortezomib, Bosulif, Bosutinib, Brentuximab Vedotin, Brigatinib, Busulfan, Busulfex, C225, Cabazitaxel, Cabozantinib, Calcium Leucovorin, Campath, Camptosar, Camptothecin-11, Capecitabine, Caprelsa, Carac, Carboplatin, Carfilzomib, Carmustine, Carmustine Wafer, Casodex, CCI-779, Ccnu, Cddp, Ceenu, Ceritinib, Cerubidine, Cetuxirnab, Chlorambucil, Cisplatin, Citrovorum Factor, Cladribine, Clofarabine, Clolar, Cobimetinib, Cometriq, Cortisone, Cosmegen, Cotellic, Cpt-11, Crizotinib, Cyclophosphamide, Cyrarnza, Cytadren, Cytarabine, Cytarabine Liposomal, Cytosar-U, Cytoxan, Dabrafenib, Dacarbazine, Dacogen, Dactinomycin, Daratumumab, Darbepoetin Alfa, Darzalex, Dasatinib, Daunomycin, Daunorubicin, Daunorubicin Cytarabine (Liposomal), daunorubicin-hydrochloride, Daunorubicin Liposomal, DaunoXome, Decadron, Decitabine, Degarelix, Delta-Cortef, Deltasone, Denileukin Diftitox, Denosumab, DepoCyt, Dexamethasone, Dexamethasone Acetate, Dexamethasone Sodium Phosphate, Dexasone, Dexrazoxane, Dhad, Dic, Diodex, Docetaxel, Doxil, Doxorubicin, Doxorubicin Liposomal, Droxia, DTIC, Dtic-Dome, Duralone, Durvalumab, Eculizumab, Efudex, Ellence, Elotuzumab, Eloxatin, Elspar, Eltrombopag, Emcyt, Empliciti, Enasidenib, Enzalutamide, Epirubicin, Epoetin Alfa, Erbitux, Eribulin, Erivedge, Erleada, Erlotinib, Erwinia L-asparaginase, Estramustine, Ethyol, Etopophos, Etoposide, Etoposide Phosphate, Eulexin, Everolimus, Evista, Exemestane, Fareston, Fatydak, Faslodex, Ferrara, Filgrastim, Firmagon, Floxuridine, Fludara, Fludarabine, Fluoroplex, Fluorouracil, Fluorouracil (cream), Fluoxymesterone, Flutamide, Folinic Acid, Folotyn, Fudr, Fulvestrant, G-Csf, Gazyva, Gefitinib, Gemcitabine, Gemtuzumab ozogamicin, Gemzar, Gilotrif, Gleevec, Gleostine, Gliadel Wafer, Gin-Csf, Goserelin, Granix, Granulocyte-Colony Stimulating Factor, Granulocyte Macrophage Colony Stimulating Factor, Halaven, Halotestin, Herceptin, Hexadrol, Hexalen, Hexamethylmelamine, Hmm, Hycamtin, Hydrea, Hydrocort Acetate, Hydrocortisone, Hydrocortisone Sodium Phosphate, Hydrocortisone Sodium Succinate, Hydrocortone Phosphate, Hydroxyurea, Ibrance, Ibritumomab, Ibritumomab Tiuxetan, Ibrutinib, Iclusig, Idamycin, Idarubicin, Idelalisib, Idhifa, Ifex, IFN-alpha, Ifosfamide, IL-11, IL-2, Imbruvica, Imatinib Mesylate, Imfinzi, Imidazole Carboxamide, Imlygic, Inlyta, Inotuzumab Ozogamicin, Interferon-Alfa, Interferon Alfa-2b (PEG Conjugate), Interleukin-2, Interleukin-11, Intron A (interferon alfa-2b), Ipilitnumab Iressa, Irinotecan, Irinotecan (Liposomal), Isotretinoin, Istodax, Ixabepilone, Ixazomib, Ixempra, Jakafi, Jevtana, Kadcyla, Keytruda, Kidrolase, Kisqali, Kymriah, Kyprolis, Lannon, Lanreotide, Lapatinib, Lartruvo, L-Asparaginase, Lbrance, Lcr, Lenalidomide, Lenvatinib, Lenvima, Letrozole, Leucovorin, Leukeran, Leukine, Leuprolide, Leurocristine, Leustatin, Liposomal Ara-C, Liquid Pred, Lomustine, Lonsurf, L-PAM, L-Sarcolysin, Lupron, Lupron Depot, Lynparza, Marqibo, Matulane, Maxidex, Mechlorethamine, Mechlorethamine Hydrochloride, Medralone, Medrol, Megace, Megestrol, Megestrol Acetate, Mekinist, Mercaptopurine, Mesna, Mesnex, Methotrexate, Methotrexate Sodium, Methylprednisolone, Meticorten, Midostaurin, Mitomycin, Mitomycin-C, Mitoxantrone, M-Prednisol, MTC, MTX, Mustargen, Mustine, Mutamycin, Myleran, Mylocel, Mylotarg, Navelbine, Necitumumab, Nelarabine, Neosar, Neratinib, Nerlynx, Neulasta, Neumega, Neupogen, Nexavar, Nilandron, Nilotinib, Nilutamide, Ninlaro, Nipent, Niraparib, Nitrogen Mustard, Nivolumab, Nolvadex, Novantrone, Nplate, Obinutuzumab, Octreotide, Octreotide Acetate, Odomzo, Ofatumumab, Olaparib, Olaratumab, Ornacetaxine, Oncospar, Oncovin, Onivyde, Ontak, Onxal, Opdivo, Oprelvekin, Orapred, Orasone, Osimertinib, Otrexup, Oxaliplatin, Paclitaxel, Paclitaxel Protein-bound, Palbociclib, Pamidronate, Panitumumab, Panobinostat, Panretin, Paraplatin, Pazopanib, Pediapred, Peg Interferon, Pegaspargase, Pegfilgrastim, Peg-Introit, PEG-L-asparaginase, Pembrolizumab, Pemetrexed, Pentostatin, Perjeta, Pertuzumab, Phenylalanine Mustard, Platinol, Platinol-AQ, Pomalidomide, Pomalyst, Ponatinib, Portrazza, Pralatrexate, Prednisolone, Prednisone, Prelone, Procarbazine, Procrit, Proleukin, Prolia, Prolifeprospan 20 with Carmustine Implant, Promacta, Provenge, Purinethol, Radium 223 Dichloride, Raloxifene, Ramucirumab, Rasuvo, Regorafenib, Revlimid, Rheumatrex, Ribociclib, Rituxan, Rituxan Hycela, Rituximab, Rituximab Hyalurodinase, Roferon-A (Interferon Alfa-2a), Romidepsin, Romiplostim, Rubex, Rubidomycin Hydrochloride, Rubraca, Rucaparib, Ruxolitinib, Rydapt, Sandostatin, Sandostatin LAR, Sargramostim, Siltuximab, Sipuleucel-T, Soliris, Solu-Cortef, Solu-Medrol, Somatuline, Sonidegib, Sorafenib, Sprycel, Sti-571, Stivarga, Streptozocin, SU11248, Sunitinib, Sutent, Sylvant, Synribo, Tafinlar, Tagrisso, Talimogene Laheiparepvec, Tamoxifen, Tarceva, Targretin, Tasigna, Taxol, Taxotere, Tecentriq, Temodar, Temozolomide, Temsirolimus, Teniposide, Tespa, Thalidomide, Thalomid, TheraCys, Thioguanine, Thioguanine Tabloid, Thiophosphoamide, Thioplex, Thiotepa, Tice, Tisagenlecleucel, Toposar, Topotecan, Toremifene, Torisel, Tositumomab, Trabectedin, Trametinib, Trastuzumab, Treanda, Trelstar, Tretinoin, Trexall, Trifluridine/Tipiricil, Triptorelin pamoate, Trisenox. Tspa, T-VEC, Tykerb, Valstar, Vandetanib, VCR, Vectibix, Velban, Veicade, Vemurafenib, Venclexta, Venetoclax, VePesid, Verzenio, Vesanoid, Viadur, Vidaza, Vinblastine, Vinblastine Sulfate, Vincasar Pfs, Vincristine, Vincristine Liposomal, Vinorelbine, Vinorelbine Tartrate, Vismodegib, Vlb, VM-26, Vorinostat, Votrient, VP-16, Vumon, Vyxeos, Xalkori Capsules, Xeloda, Xgeva, Xofigo, Xtandi, Yervoy, Yescarta, Yondelis, Zaltrap, Zanosar, Zarxio, Zejula, Zelboraf, Zevalin, Zinecard, Ziv-aflibercept, Zoladex, Zoledronic Acid, Zolinza, Zometa, Zydelig, Zykadia, Zytiga, or any combination thereof.

Immunotherapy can comprise administering checkpoint inhibitors. Checkpoint inhibitors can comprise antibodies. Checkpoint inhibitors include, but are not limited to, anti-CTLA4 antibodies, anti-PD-1 antibodies, anti-PD-L1 antibodies, anti-AZAR antibodies, anti-B7-H3 antibodies, anti-B7-H4 antibodies, anti-BTLA antibodies, anti-IDO antibodies, anti-KIR antibodies, anti-LAG3 antibodies, anti-TIM3 antibodies and anti-VISTA (V-domain Ig suppressor of T cell activation) antibodies.

Anti-CTLA4 antibodies can include, but are not limited to, ipilimumab, tremelimumab and AGEN-1884. Anti-PD-1 antibodies include, but are not limited to, pembrolizumab, nivolumab pidilizumab, cemiplimab, REGN2810, AMP-224, MEDI0680, PDR001 and CT-001. Anti-PD-L1 antibodies include, but are not limited to atezolizumab, avelumab and durvalumab. Anti-CD137 antibodies include, but are not limited to, urelumab. Anti-B7-H3 antibodies include, but are not limited to, MGA271. Anti-KIR antibodies include, but are not limited to, lirilumab. Anti-LAG3 antibodies include, but are not limited to, BMS-986016.

The term "immunotherapy" can refer to activating immunotherapy or suppressing immunotherapy. As will be appreciated by those in the art, activating immunotherapy refers to the use of a therapeutic agent that induces, enhances, or promotes an immune response, including, e.g., a T cell response while suppressing immunotherapy refers to the use of a therapeutic agent that interferes with, suppresses, or inhibits an immune response, including, e.g., a T cell response. Activating immunotherapy may comprise the use of checkpoint inhibitors. Activating immunotherapy may comprise administering to a subject a therapeutic agent that activates a stimulatory checkpoint molecule. Stimulatory checkpoint molecules include, but are not limited to, CD27, CD28, CD40, CD122, CD137, OX40, GITR and ICOS. Therapeutic agents that activate a stimulatory checkpoint molecule include, but are not limited to, MEDI0562, TGN1412, CDX-1127, lipocalin.

The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity. An antibody that binds to a target refers to an antibody that is capable of binding the target with sufficient affinity such that the antibody is useful as a diagnostic and/or therapeutic agent in targeting the target. In one embodiment, the extent of binding of an anti-target antibody to an unrelated, non-target protein is less than about 10% of the binding of the antibody to target as measured, e.g., by a radioimmunoassay (RIA) or biacore assay. In certain embodiments, an antibody that binds to a target has a dissociation constant (Kd) of <1 µM, <100 nM, <10 nM, <1 nM, <0.1 nM, <0.01 nM, or <0.001 nM (e.g. $10^8$ M or less, e.g. from $10^8$ M to $10^{13}$ M, e.g., from $10^9$ M to $10^{13}$ M). In certain embodiments, an anti-target antibody binds to an epitope of a target that is conserved among different species.

A "blocking antibody" or an "antagonist antibody" is one that partially or fully blocks, inhibits, interferes, or neutralizes a normal biological activity of the antigen it binds. For example, an antagonist antibody may block signaling through an immune cell receptor (e.g., a T cell receptor) so as to restore a functional response by T cells (e.g., proliferation, cytokine production, target cell killing) from a dysfunctional state to antigen stimulation.

An "agonist antibody" or "activating antibody" is one that mimics, promotes, stimulates, or enhances a normal biological activity of the antigen it binds. Agonist antibodies can also enhance or initiate signaling by the antigen to which it binds. In some embodiments, agonist antibodies cause or activate signaling without the presence of the natural ligand. For example, an agonist antibody may increase memory T cell proliferation, increase cytokine production by memory T cells, inhibit regulatory T cell function, and/or inhibit regulatory T cell suppression of effector T cell function, such as effector T cell proliferation and/or cytokine production.

An "antibody fragment" refers to a molecule other than an intact antibody that comprises a portion of an intact antibody that binds the antigen to which the intact antibody binds. Examples of antibody fragments include but are not limited to Fv, Fab, Fab', Fab'-SH, F(ab')2; diabodies; linear antibodies; single-chain antibody molecules (e.g. scFv); and multispecific antibodies formed from antibody fragments.

As used herein, the term additional therapeutic agents can also comprise the administration of radiation therapy, surgery or any combination thereof.

The present disclosure provides a method of treating AML in a subject, the method comprising administering to the subject at least one therapeutically effective amount of at least one compound of the present disclosure in combination with at least on therapeutically effective amount of at least one BCL-2 inhibitor. The present disclosure provides at least one compound of the present disclosure for use in the treatment of AML in a subject, wherein the at least one compound of the present disclosure is for administration to the subject in at least one therapeutically effective amount, and wherein the treatment further comprises administering to the subject at least one therapeutically effective amount of at least one BCL-2 inhibitor. The present disclosure provides at least one compound of the present disclosure for the manufacture of a medicament for the treatment of AML in a subject, wherein the at least one compound is for administration to the subject in at least one therapeutically effective amount and wherein the treatment further comprises administering to the subject at least one therapeutically effective amount of at least one BCL-2 inhibitor.

The present disclosure a combination comprising at least one compound of the present disclosure and at least one BCL-2 inhibitor for use in the treatment of AML in a subject, wherein the combination is for the administration to the subject in at least one therapeutically effective amount. The present disclosure provides a combination comprising at least one compound of the present disclosure and at least one BCL-2 inhibitor for the manufacture of a medicament for the treatment of AML in a subject, wherein the combination is for administration to the subject in at least one therapeutically effective amount.

BCL-2 inhibitors can include, but are not limited to, venetoclax, navitociax, and any other BCL-2 inhibitor known in the art.

The present disclosure provides a method of treating AML in a subject, the method comprising administering to the subject at least one therapeutically effective amount of at least one compound of the present disclosure in combination with at least on therapeutically effective amount of venetoclax. The present disclosure provides at least one compound of the present disclosure for use in the treatment of AML in a subject, wherein the at least one compound of the present disclosure is for administration to the subject in at least one therapeutically effective amount, and wherein the treatment further comprises administering to the subject at least one therapeutically effective amount of venetoclax. The present disclosure provides at least one compound of the present disclosure for the manufacture of a medicament for the treatment of AML in a subject, wherein the at least one compound is for administration to the subject in at least one therapeutically effective amount and wherein the treatment further comprises administering to the subject at least one therapeutically effective amount of venetoclax.

The present disclosure a combination comprising at least one compound of the present disclosure and venetoclax for use in the treatment of AML in a subject, wherein the combination is for the administration to the subject in at least one therapeutically effective amount. The present disclosure provides a combination comprising at least one compound of the present disclosure and venetoclax for the manufacture of a medicament for the treatment of AML in a subject, wherein the combination is for administration to the subject in at least one therapeutically effective amount.

The present disclosure provides a method of treating AML in a subject, the method comprising administering to the subject at least one therapeutically effective amount of at least one compound of the present disclosure in combination with at least on therapeutically effective amount of at least one hypomethylating agent. The present disclosure provides at least one compound of the present disclosure for use in the treatment of AML in a subject, wherein the at least one compound of the present disclosure is for administration to the subject in at least one therapeutically effective amount, and wherein the treatment further comprises administering to the subject at least one therapeutically effective amount of at least one hypomethylating agent. The present disclosure provides at least one compound of the present disclosure for the manufacture of a medicament for the treatment of AML in a subject, wherein the at least one compound is for administration to the subject in at least one therapeutically effective amount and wherein the treatment further comprises administering to the subject at least one therapeutically effective amount of at least one hypomethylating agent.

The present disclosure provides a combination comprising at least one compound of the present disclosure and at least one hypomethylating agent for use in the treatment of AML in a subject, wherein the combination is for the administration to the subject in at least one therapeutically effective amount. The present disclosure provides a combination comprising at least one compound of the present disclosure and at least one hypomethylating agent for the manufacture of a medicament for the treatment of AML in a subject, wherein the combination is for administration to the subject in at least one therapeutically effective amount.

Hypomethylating agents can include, but are not limited to, azacitidine, decitabine and any other hypomethlyating agent known in the art.

The present disclosure provides a method of treating AML in a subject, the method comprising administering to the subject at least one therapeutically effective amount of at least one compound of the present disclosure in combination with at least on therapeutically effective amount of cytarabine. The present disclosure provides at least one compound of the present disclosure for use in the treatment of AML in a subject, wherein the at least one compound of the present disclosure is for administration to the subject in at least one therapeutically effective amount, and wherein the treatment further comprises administering to the subject at least one therapeutically effective amount of cytarabine. The present disclosure provides at least one compound of the present disclosure for the manufacture of a medicament for the treatment of AML in a subject, wherein the at least one compound is for administration to the subject in at least one therapeutically effective amount and wherein the treatment further comprises administering to the subject at least one therapeutically effective amount of cytarabine.

The present disclosure a combination comprising at least one compound of the present disclosure and cytarabine for use in the treatment of AML in a subject, wherein the combination is for the administration to the subject in at least one therapeutically effective amount. The present disclosure provides a combination comprising at least one compound of the present disclosure and cytarabine for the manufacture of a medicament for the treatment of AML in a subject, wherein the combination is for administration to the subject in at least one therapeutically effective amount.

Pharmaceutical Compositions

In some aspects, the present disclosure provides a pharmaceutical composition comprising a compound of the present disclosure as an active ingredient.

In some embodiments, the present disclosure provides a pharmaceutical composition comprising at least one compound of each of the formulae described herein, or a pharmaceutically acceptable salt or solvate thereof, and one or more pharmaceutically acceptable carriers or excipients. In some embodiments, the present disclosure provides a pharmaceutical composition comprising at least one compound selected from Tables A and B.

The disclosed AMPK inhibitor compounds may be combined with pharmaceutically acceptable excipients, and optionally sustained-release matrices, such as biodegradable polymers, to form therapeutic compositions. Therefore, also disclosed are pharmaceutical compositions including one or more of any of the compounds disclosed above and a pharmaceutically acceptable carrier. The composition may comprise a unit dosage form of the composition, and may further comprise instructions for administering the composition to a subject to inhibit cancer progression or metastasis, for example, instructions for administering the composition to achieve an anti-tumor effects or to inhibit a pathological cellular proliferation. Such pharmaceutical compositions may be used in methods for treating or preventing cancer growth in a subject by administering to the subject a therapeutically effective amount of the composition.

These pharmaceutical compositions can be in the form of tablets, capsules, powders, granules, lozenges, liquid or gel preparations, such as oral, topical, or sterile parenteral solutions or suspensions (e.g., eye or ear drops, throat or nasal sprays, etc.), transdermal patches, and forms known in the art.

Pharmaceutical compositions can be administered systemically or locally in any manner appropriate to the treatment of a given condition, including orally, parenterally, intrathecally, rectally, nasally, buccally, vaginally, topically, optically, by inhalation spray, or via an implanted reservoir. The term "parenterally" as used herein includes, but is not limited to subcutaneous, intravenous, intramuscular, intrasternal, intrasynovial, intrathecal, intrahepatic, intralesional, and intracranial administration, for example, by injection or infusion. For treatment of the central nervous system, the pharmaceutical compositions may readily penetrate the blood-brain barrier when peripherally or intraventricularly administered.

Pharmaceutically acceptable carriers include, but are not limited to, ion exchangers, alumina, aluminum stearate, lecithin, serum proteins (such as human serum albumin), buffers (such as phosphates), glycine, sorbic acid, potassium sorbate, partial glyceride mixtures of saturated vegetable fatty acids, water, salts or electrolytes such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol, and wool fat.

Tablets and capsules for oral administration can be in a form suitable for unit dose presentation and can contain conventional pharmaceutically acceptable excipients. Examples of these include binding agents such as syrup, acacia, gelatin, sorbitol, tragacanth, and polyvinylpyrrolidone; fillers such as lactose, sugar, corn starch, calcium phosphate, sorbitol, or glycine; tableting lubricants, such as magnesium stearate, talc, polyethylene glycol, or silica; disintegrants, such as potato starch; and dispersing or wetting agents, such as sodium lauryl sulfate. Oral liquid preparations can be in the form of, for example, aqueous or oily suspensions, solutions, emulsions, syrups or elixirs, or can be presented as a dry product for reconstitution with water or other suitable vehicle before use.

The pharmaceutical compositions can also be administered parenterally in a sterile aqueous or oleaginous medium. The composition can be dissolved or suspended in a non-toxic, parenterally acceptable diluent or solvent, e.g., as a solution in 1,3-butanediol. Commonly used vehicles and solvents include water, physiological saline, Hank's solution, Ringer's solution, and sterile, fixed oils, including synthetic mono- or di-glycerides, etc. For topical application, the drug may be made up into a solution, suspension, cream, lotion, or ointment in a suitable aqueous or non-aqueous vehicle. Additives may also be included, for example buffers such as sodium metabisulphite or disodium edeate; preservatives such as bactericidal and fungicidal agents, including phenyl mercuric acetate or nitrate, benzalkonium chloride or chlorhexidine, and thickening agents, such as hypromellose.

The dosage unit involved depends, for example, on the condition treated, nature of the formulation, nature of the condition, embodiment of the claimed pharmaceutical compositions, mode of administration, and condition and weight of the patient. Dosage levels are typically sufficient to achieve a tissue concentration at the site of action that is at least the same as a concentration that has been shown to be active in vitro, in vivo, or in tissue culture. For example, a dosage of about 0.1 µg/kg body weight/day to about 1000 mg/kg body weight/day, for example, a dosage of about 1 µg/kg body weight/day to about 1000 µg/kg body weight/day, such as a dosage of about 5 µg/kg body weight/day to about 500 µg/kg body weight/day can be useful for treatment of a particular condition.

The compounds can be used in the form of pharmaceutically acceptable salts derived from inorganic or organic acids and bases, including, but not limited to: acetate, adipate, alginate, aspartate, benzoate, benzenesulfonate, bisulfate, butyrate, citrate, camphorate, camphorsulfonate, cyclopentanepropionate, digluconate, dodecylsulfate, ethanesulfonate, fumarate, glucoheptanoate, glycerophosphate, hemisulfate, heptanoate, hexanoate, hydrochloride, hydrobromide, hydroiodide, 2-hydroxyethanesulfonate, lactate, maleate, methanesulfonate, 2-naphthalenesulfonate, nicotinate, oxalate, pamoate, pectinate, persulfate, 3-phenylpropionate, picrate, pivalate, propionate, succinate, tartrate, thiocyanate, tosylate, and undecanoate. Base salts include, but are not limited to, ammonium salts, alkali metal salts (such as sodium and potassium salts), alkaline earth metal salts (such as calcium and magnesium salts), salts with organic bases (such as dicyclohexylamine salts), N-methyl-D-glutamine, and salts with amino acids (such as arginine, lysine, etc.). Basic nitrogen-containing groups can be quaternized, for example, with such agents as $C_{1-8}$ alkyl halides (such as methyl, ethyl, propyl, and butyl chlorides, bromides, and iodides), dialkyl sulfates (such as dimethyl, diethyl, dibutyl, ai diamyl sulfates), long-chain halides (such as decyl, lauryl, myristyl, and steatyl chlorides, bromides, and iodides), aralkyl halides (such as benzyl and phenethyl bromides), etc. Water or oil-soluble or dispersible products are produced thereby.

Pharmaceutically acceptable salts of the presently disclosed AMPK inhibitor compounds also include those formed from cations such as sodium, potassium, aluminum, calcium, lithium, magnesium, zinc, and from bases such as ammonia, ethylenediamine, N-methyl-glutamine, lysine, arginine, ornithine, choline, N,N'-dibenzylethylenediamine, chloroprocaine, diethanolamine, procaine, N-benzylphenethylatnine, diethylamine, piperazine, tris(hydroxymethyl) aminomethane, and tetramethylammonium hydroxide. These salts may be prepared by standard procedures, for example by reacting the free acid with a suitable organic or inorganic base. Any chemical compound recited in this specification may alternatively be administered as a pharmaceutically acceptable salt thereof. "Pharmaceutically acceptable salts" are also inclusive of the free acid, base, and zwitterionic forms. Descriptions of suitable pharmaceutically acceptable salts can be found in *Handbook of Pharmaceutical Salts, Properties, Selection and Use*, Wiley VCH (2002). When compounds disclosed herein include an acidic function, such as a carboxy group, then suitable pharmaceutically acceptable cation pairs for the carboxy group are well known to those skilled in the art and include alkaline, alkaline earth, ammonium, quaternary ammonium cations and the like. Such salts are known to those of skill in the art. For additional examples of "pharmacologically acceptable salts," see Berge et al., *J. Pharm. Sci.* 66:1 (1977).

Each publication or patent cited herein is incorporated herein by reference in its entirety. The disclosure now being generally described will be more readily understood by reference to the following examples, which are included merely for the purposes of illustration of certain aspects of the embodiments of the present disclosure. The examples are not intended to limit the disclosure, as one of skill in the art would recognize from the above teachings and the following examples that other techniques and methods can satisfy the claims and can be employed without departing from the scope of the claimed disclosure.

EXAMPLES

The following methods and materials were used to conduct the studies described in Examples 1-7, below:

Structure-based Design of Oxindoles as AMPK Inhibitors: Sunitinib was docked into the ATP-binding site of the α-subunit of the α1β2γ1 (PDB: 4REW) and α2β1γ1 (PDB: 4CFE) human AMPK crystal structures using the Glide module within Schrödinger (Release 2018-1, Schrödinger LLC, New York, NY). Prior to docking, the water molecules were removed, and the proteins were prepared by assigning bond orders, adding hydrogens, and repairing any side chains or missing amino acid sequences. To complete protein preparation a restrained minimization of the protein structure was performed using the default constraint of 0.30 Å RMSD and the OPLS_2005 force field. The prepared proteins were subjected to SiteMap analysis, that identified the ATP-binding site in the α-subunit of each crystal structure and docking grids were generated using Receptor Grid Generation. Sunitinib was prepared using LigPrep by generating possible states at the target pH 7.0 using Epik and minimized by applying the OPLS_2005 force field. Molecular docking simulations were performed using the Glide ligand docking module in XP (extra precision) mode and included post-docking minimization. The docked structures of sunitinib in the ATP-binding sites of the α-subunit of the α1β2γ1 and α2β1γ1 human AMPK crystal structures were used as the basis for the design of candidate AMPK inhibitors, with the aim of introducing substitutions to optimize interactions with residues in the respective ATP-binding sites. The synthesized candidate AMPK inhibitors were prepared and docked in the AMPK crystal structures in order to identify the critical interactions that resulted in AMPK inhibition.

Recombinant kinase activity assays: LANCE® Eu time-resolved fluorescence resonance energy transfer (TR-FRET) kinase assays (PerkinElmer) were performed in 384-well OptiPlates (Corning) using recombinant AMPK(α1) and AMPK(α2) kinase subunits (Carna), ULight™-CREBtide substrate (PerkinElmer) and ATP (Sigma) according to supplier protocols. All reagents were prepared in kinase buffer (2 mM DTT, 50 mM HEPES, 1 mM EGTA, 10 mM $MgCl_2$, 0.01% Tween20, pH 7.5) and inhibitor solutions were prepared such that the final DMSO concentration did not exceed 0.5%, which was shown to have no effect on kinase activity. AMPK(α1) and AMPK(α2) were used at a final concentration of 4 nM, ULight™-CREBtide substrate was used at a final concentration of 50 nM and ATP was used at final concentration of 8 μM and 20 μM for AMPK(α1) and AMPK(α2), respectively. Assays were performed at 25° C. in a reaction mixture consisting of 2.5 μL serially diluted inhibitor solution, 2.5 μL kinase, 2.5 μL ATP and 2.5 μL substrate. Reagents were incubated for 1 hr before the reaction was halted through the addition of EDTA (10 mM) after which Eu anti-phospho-CREB (Ser133) antibody (PerkinElmer) was added at a final concentration of 2 nM for 1 hr. The plate was read using a BioTek Synergy H1 Hybrid plate reader enabled for TR-FRET (Excitation=340 nm; Substrate emission=665 nm; Antibody emission=615 nm; Delay=100 μs; Integration=200 μs). Emission ratios (665 nm/615 nm) were calculated for each well and half-maximal inhibitory concentration ($IC_{50}$) values were determined for each inhibitor through non-linear regression analysis of the log dose-response curve. LanthaScreen™ Eu TR-FRET assay (Invitrogen) was performed in 384-well low volume plates (Corning) using recombinant KDR kinase (Carna), Kinase Tracer 236 (Invitrogen) and LanthaScreen™ Eu-anti-GST antibody (Invitrogen). KDR was used at a final concentration of 5 nM, Kinase Tracer 236 was used at a final concentration of 150 nM and LanthaScreen™ Eu-anti-GST antibody was used at a final concentration of 2 nM. All reagents were diluted in 1× kinase buffer A (Invitrogen) and assays were performed at 25° C. in a reaction mixture consisting of 5 μL serially diluted inhibitor solution, 5 μL Kinase Tracer 236 solution, and 5 μL kinase/antibody solution. The reagents were incubated together for 1 hr and the plate was read using a PerkinElmer Envision 2104 Multi-label reader enabled for TR-FRET (Excitation=340 nm: Substrate emission=665 nm; Antibody emission=615 nm; Delay=100 μs; Integration=200 μs). Emission ratios (665 nm/615 nm) were calculated for each well and half-maximal inhibitory concentration ($IC_{50}$) values were determined for each inhibitor through non-linear regression analysis of the log dose-response curve.

Cell lines and cell culture. Molm-13 and K562 cells were passaged for <6 months following resuscitation. Cells were cultured in RPMI-1640 (Gibco) supplemented with 10% FBS (Sigma Aldrich) and 1× penicillin/streptomycin solution (Corning) at 37° C. in an incubator humidifier with 95% air and 5% $CO_2$. In all treatment conditions, the final DMSO concentration did not exceed 0.5%.

Determination of p-ACC concentration through ELISA assay: K562 cells were plated in sterile 6-well plates at 750,000 cells/mL in 4 mL glucose free RPM-1640 (Gibco) supplemented with 10% FBS (Sigma Aldrich) and 1× penicillin/streptomycin solution (Corning) ($3.0×10^6$ cells/well) and incubated for 16 hours. 2-Deoxy-D-glucose was added to a concentration of 12 mM and cells were incubated for 1 hour, after which AMPK inhibitors diluted in glucose free RPMI-1640 were added at relevant concentrations and cells were incubated for a further 3 hours. Cells were collected, washed with PBS and lysed on ice in lysis buffer containing 1% Triton X (Cell Signaling). Lysates were someated (1×5 seconds) and centrifuged for 10 minutes at 10,000 rpm and 4° C., and the protein concentration in supernatants was determined by Lowry assay. Lysates were diluted with ELISA PathScan® sample diluent to a final volume of 100 μL and protein concentration of 1.0 mg/ml prior to use. The concentration of p-ACC (Ser79) was determined using an enzyme-linked immunosorbent assay according to recommended protocol (Cell Signaling, ELISA PathScan® phospho-Acetyl-CoA Carboxylase (Ser79)) and expressed as a relative percentage of the DMSO control.

Cell viability analysis: For the MTS assay K562 cells were plated in sterile 96-well plates at 300,000 cells/mL in 100 µL (30×10$^3$ cells/well) RPMI-1640 (Gibco). Test compounds were diluted from DMSO stock solutions into RPMI-1640 and added to the cells at relevant concentrations in 50 µL media. The cells were incubated with inhibitors for 72 hours, after which 30 µL CellTiter AQueous One solution (Promega) was added and the cells were incubated for a further 1 hour. The plates were read using a PerkinElmer Envision 2104 Multilabel reader (Absorption=490 nm) and optical density (O.D.) values plotted against the inhibitor log-dose and evaluated by a non-linear regression to determine half-maximal effect concentration ($EC_{50}$) values, where possible. For the CellTiter-Glo assay (Promega) K562 cells were plated in sterile black-walled 96-well plates at 300,000 cells/mL in 50 µL (15×10$^3$ cells/well) glucose free RPMI-1640 (Gibco). Test compounds were diluted from DMSO stock solutions into glucose free RPMI-1640 and added to the cells at relevant concentrations in 50 µL media. The cells were incubated with inhibitors for 24 hours, before the plates were equilibrated to room temperature and 100 µL CellTiter-Glo reagent was added. The plates were mixed on an orbital shaker for 2 minutes to lyse the cells before being incubated in the dark for 10 minutes and cellular ATP concentration determined by reading the plates using a PerkinElmer Envision 2104 Multilabel reader measuring total luminescence. Luminescent signal was plotted against the inhibitor log-dose and evaluated by a non-linear regression to determine half-maximal effect concentration ($EC_{50}$) values, where possible.

Cell toxicity analysis: K562 cells were adjusted to 300, 000 cells/mL in glucose free RPMI-1640 and CellTox green reagent (Promega) was added (500:1) and the mixture homogenized through gentle inversion. The cells were plated in sterile black-walled 96-well plates in 50 µL (15×10$^3$ cells/well) before test compounds were diluted from DMSO stocks in glucose free RPMI-1640 and added to the cells at relevant concentrations in 50 µL media. The cells were incubated and the plates were read for fluorescence using a PerkinElmer Envision 2104 Multilabel reader (Excitation=485 nm; Emission=520 nm) at 0, 24 and 48 hours. Fluorescence was plotted against inhibitor log-dose and evaluated by a non-linear regression to determine half-maximal effect concentration ($EC_{50}$) values, where possible.

Analytical techniques. All melting points were determined using a Stuart Scientific SMP40 melting point apparatus and are uncorrected. $^1$H and $^{13}$C nuclear magnetic resonance (NMR) spectra were obtained as solutions in deuterated solvents DMSO-d$_6$, CDCl$_3$ or MeOD using a Bruker Avance III 400 spectrometer recording at 400 MHz. Chemical shifts (δ) are reported in parts per million (ppm) and the spin-multiplicity abbreviated as: s (singlet), d (doublet), t (triplet), q (quartet), quin (quintet), sept (septet), m (multiplet), or hr (broad), with coupling constants (J) given in Hertz (Hz). Mass Spectrometry (MS) was carried out on an API 4000. Fourier Transform Infrared (FTIR) spectra were obtained using a Bruker Alpha Platinum-ATR as a neat sample. High-resolution mass spectrometry was acquired using an Agilent 6520 tandem quadrupole-time of flight (Q-TOF) mass spectrometer coupled to an electrospray ionization source. Spray was induced with a capillary voltage of 4000V and the fragmentor voltage was 200V. Data was acquired over a range of m/z 50-1700

Example 1. Computational-Based Design of Oxindoles as AMPK Inhibitors

The catalytic α1 and α2 subunit isoforms of AMPK have approximately 90% homology in their N-terminal catalytic domains and approximately 60% homology in their C-terminal domains, suggesting that they may have overlapping and alternative substrates. In order to develop a computational model to support inhibitor development, the structure of sunitinib was docked into the ATP-binding site of the α1 and α2 subunit of the human AMPK, α1β2γ1 (PDB: 4REW) and α2β1γ1 (PDB: 4CFE) crystal structures, to determine the potential for α1/α2 isoform-selective targeting. Overall, no differences were observed in the conformation or interactions of sunitinib docked into the α1β2γ1 and α2β1γ1 AMPK isoforms. The computational-based docking revealed that sunitinib binds in close proximity to the hinge and gatekeeper regulatory domains, with a donor-acceptor-donor motif of hydrogen bond interactions between the oxindole and pyrrole heterocyclic nitrogens of sunitinib and the hinge backbone residues Glu96 and Val98. The indole amino group makes a key interaction with Val98 and this interaction appears to be critical for sunitinib binding as substitution at this position has been proposed to abolish AMPK inhibitory activity. To confirm the relevance of the Val98 interaction, Compound. No. 1 (also known as SUDE) was included for synthesis and biochemical testing. The protonated pyrrole carboxamide trialkylamino side chain of sunitinib forms hydrogen bonds with Glu102 and Asp105 and these interactions serve to anchor the oxindole in the ATP-binding site.

Analysis of the computational models revealed regions of sunitinib that could be modified to improve binding to AMPK. Firstly, the interaction between the trialkylamino side chain and residues Glu102 and Asp105 appeared to be strained, resulting in an unusual conformation of the alkyl chain linking the basic group to the pyrrole of sunitinib. The inventors proposed that varying the chain length between the pyrrole and the amine, and the alkyl substituents adorning the amine, may allow optimizing the conformation of the amine for binding to AMPK. To this end, a series of alkyl amines were proposed, and to confirm the requirement of a basic group in this region, the propylamide. The 5-fluoro group of sunitinib is directed towards the DFG motif of AMPK and structural substitutions at the 5-position that interact with the DFG Asp159 and/or the adjacent Lys47 may increase both the selectivity and inhibitory potency. The inventors proposed the synthesis of compounds incorporating numerous moieties capable of interacting with these residues. At the oxindole 6-position there were no residues suitable for specific hydrogen bonding interactions, but a large hydrophobic pocket exists, formed around the residues Leu70, Met95, and Phe160. A series of compounds incorporating either halogens or increasing sizes of alkyl substituents at the oxindole 6-position were proposed, to attempt to gain an entropic benefit to binding through expansion into this hydrophobic region.

Example 2. Synthesis of Exemplary Compounds

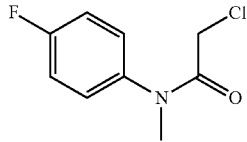

2-Chloro-N-(4-fluorophenyl)-N-methylacetamide.
DIPEA (1.45 mL, 8.31 mmol) and chloroacetyl chloride (660 μL, 8.31 mmol) were slowly added to a vigorously stirred solution of 4-fluoro-N-methylaniline (500 μL, 4.16 mmol) in dry DCM (20 mL) at 0° C. The reaction mixture was allowed to warm to RT and stirred for 4 h, before being quenched with 1M HCl (15 mL) and the omanic extract washed with water (10 mL) and brine (10 mL), dried (MgSO$_4$) and concentrated in vacuo. The resultant residue was purified by chromatography on silica (7:3 Hexaries:EtOAc) to afford the target compound as a pale brown oil (0.824 g, 4.09 mmol, 98%). Rf 0.38 (7:3 Hexanes:EtOAc); IR (cm$^{-1}$) 1504, 1665, 1742, 2951, 3069; $^1$H NMR (400 MHz, CDCl$_3$) 3.31 (3H, s, N—CH$_3$), 3.84 (2H, s, CH$_2$Cl), 7.16 (2H, dd, J=8.6, 8.2 Hz, H-3/5), 7.24-7.30 (2H, m, H-2/6); $^{13}$C NMR (100 MHz, CDCl$_3$) 38.2 (N—CH$_3$), 41.3 (CH$_2$Cl), 117.1 (d, J$_{CF}$=23.2 Hz, Ar—C), 129.0 (d, J$_{CF}$=8.4 Hz, Ar—C), 138.6 (d, J$_{CF}$=3.6 Hz, Ar—C), 162.2 (d, J$_{CF}$=249.9 Hz, Ar—C), 166.5 (C=O); HRMS calcd. for C$_9$H$_{10}$ClFNO (ES+) m/z 202.043495 [M+H]+, found 202.042798.

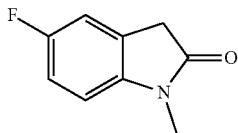

5-Fluoro-1-methylindolin-2-one. 2-Chloro-N-(4-fluorophenyl)-N-methylacetamide (0.288 g, 1.43 mmol) and anhydrous AlCl$_3$ (0.475 g, 3.57 mmol) were heated together in a solvent free system at 170° C. for 4 h, before being slowly dripped into ice water (approx. 20 mL). The aqueous mixture was extracted with EtOAc (2×20 mL), and the combined organic extracts were washed with brine (15 mL) before being dried (MgSO$_4$). The solvent was removed in vacuo to afford the target compound as a beige solid (0.221 mg, 1.34 mmol, 94%). Rf 0.41 (1:1 Hexanes:EtOAc); M.p. 105-108° C.; IR (cm$^{-1}$) 1534, 1578, 1626, 1673, 2796, 2921, 2964, 3314; $^1$H NMR (400 MHz, DMSO-d$_6$) 3.11 (3H, s, N—CH$_3$), 3.57 (2H, s, oxindole-CH$_2$), 6.96 (1H, dd, J=8.5, 4.5 Hz, H-7), 7.11 (1H, ddd, J=9.6, 8.5, 2.6 Hz, H-6), 7.16-7.20 (1H, m, H-4); $^{13}$C NMR (100 MHz, DMSO-d$_6$) 26.5 (N—CH$_3$), 35.9 (oxindole-CH$_2$), 109.3 (d, J$_{CF}$=8.3 Hz, Ar—C), 112.6 (d, J$_{CF}$=25.0 Hz, Ar—C), 114.0 (d, J$_{CF}$=23.3 Hz, Ar—C), 127.1 (d, J$_{CF}$=8.9 Hz, Ar—C), 141.8 (d, J$_{CF}$=1.5 Hz, Ar—C), 158.7 (d, J$_{CF}$=236.3 Hz, Ar—C), 174.5 (C=O); HRMS calcd. for C$_9$H$_7$FNO (ES−) m/z 164.051167 [M−H]−, found 164.051768.

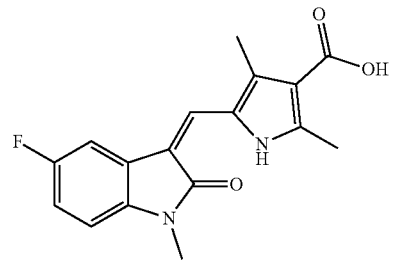 [SMILES: Cc1[nH]c(/C=C2\C(=O)N(C)c3ccc(F)cc32)c(C)c1C(=O)O]

(Z)-5-((5-Fluoro-1-methyl-2-oxoindolin-3-ylidene)methyl)-2,4-dimethyl-1H-pyrrole-3-carboxylic acid. 5-Fluoro-1-methylindolin-2-one (67 mg, 0.41 mmol), 5-formyl-2,4-dimethyl-1H-pyrrole-3-carboxylic acid (71 mg, 0.43 mmol) and pyrrolidine (66 μL, 0.81 mmol) were refluxed in EtOH (8 mL) for 3 h. The reaction mixture was cooled to RT before 2M HCl (1.5 mL) was added. The resultant precipitate was collected by filtration and washed with cold EtOH and hexanes, followed by air drying, to give the target compound as an orange solid (107 mg, 0.34 mmol, 84%). Rf 0.32 (3:2 Hexanes:EtOAc); M.p. 297-299° C.; IR (cm$^{-1}$) 1570, 1658, 2627, 2877; $^1$H NMR (400 MHz, CD$_3$OD) 2.53 (3H, s, pyrrole-CH$_3$), 2.61 (3H, s, pyrrole-CH$_3$), 3.34 (3H, s, oxindole-N—CH$_3$), 6.82 (1H, dd, J=8.5, 4.3 Hz, H-7), 6.91 (1H, ddd, J=8.9, 8.5, 2.4 Hz, H-6), 7.25 (1H, dd, J=8.9, 2.4 Hz, H-4), 7.42 (1H, br, pyrrole-NH), 7.48 (1H, s, alkene-CH), 13.61 (1H, br, COOH); $^{13}$C NMR, (100 MHz, DMSO-d$_6$) 11.9 (pyrrole-CH$_3$), 14.9 (pyrrole-CH$_3$), 26.7 (N—CH$_3$), 106.4 (d, J$_{CF}$=26.1 Hz, Ar—C), 109.5 (d, J$_{CF}$=8.7 Hz, Ar—C), 112.9 (d, J$_{CF}$=24.4 Hz, Ar—C), 114.5 (d, J$_{CF}$=2.9 Hz, Ar—C), 115.8 (Ar—C), 125.2 (Ar—C), 126.4 (Ar—C), 126.5 (Ar—C), 134.3 (Ar—C), 136.4 (Ar—C), 141.5, 159.2 (d, J$_{CF}$=235.0 Hz, Ar—C), 166.7 (C=O), 168.0 (C=O); HRMS calcd. for C$_{17}$H$_{16}$FN$_2$O$_3$ (ES+) m/z 315.114496 [M+H]+, found 315.116765.

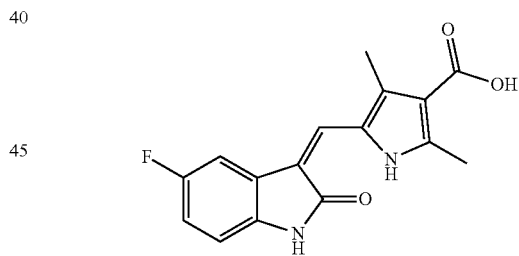

(Z)-5-((5-Fluoro-2-oxoindolin-3-ylidene)methyl)-2,4-dimethyl-1H-pyrrole-3-carboxylic acid (Compound No. 2). 5-Fluoro-2-oxindole (100 mg, 0.66 mmol), 5-formyl-2,4-dimethyl-1H-pyrrole-3-carboxylic acid (116 mg, 0.69 mmol) and pyrrolidine (110 μL, 1.32 mmol) in ethanol (10 ml) were heated at reflux for 3 h. The reaction mixture was cooled to RT and 2M HCl (1.5 ml) was added, resulting in a precipitate that was collected by filtration. Washing with cold EtOH and hexanes, followed by air drying, gave the target compound as an orange solid (180 mg, 0.60 mmol, 91%). M.p. 311-314° C.; IR (cm$^{-1}$) 1567, 1673, 2006, 2153, 2850, 2962; $^1$H NMR (400 MHz, DMSO-d$_6$) 2.52 (3H, s, pyrrole-CH$_3$), 2.54 (3H, s, pyrrole-CH$_3$), 6.86 (1H, dd, J=8.2, 4.3 Hz, H-7), 6.92-6.98 (1H, m, H-6), 7.75-7.82 (2H, m, H-4 & alkene-CH), 10.95 (1H, s, oxindole-NH), 12.16 (1H, br, pyrrole-NH), 13.99 (1H, s, COOH); $^{13}$C NMR (100 MHz, DMSO-d$_6$) 11.9 (pyrrole-CH$_3$), 15.1 (pyrrole-CH$_3$), 106.7 (d, $J_{CF}$=25.7 Hz, Ar—C), 110.6 (d, $J_{CF}$=8.8 Hz, Ar—C), 113.2 (d, $J_{CF}$=24.2 Hz, Ar—C), 114.8 (Ar—C), 116.2 (d, $J_{CF}$=3.0 Hz, Ar—C), 125.3 (Ar—C), 126.5 (Ar—C), 127.5 (d, $J_{CF}$=9.5 Hz, Ar—C), 133.9 (Ar—C), 135.2 (Ar—C), 141.4 (Ar—C), 158.7 (d, $J_{CF}$=234.8 Hz, Ar—C), 166.4 (C=O), 170.1 (C=O); HRMS calcd. for $C_{16}H_{14}FN_2O_3$ (ES+) m/z 301.098846 [M+H]+, found 301.099991.

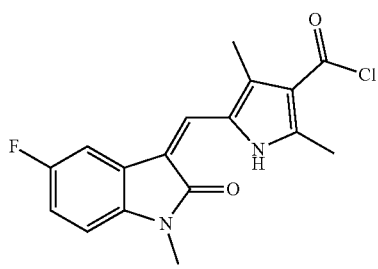 [SMILES: Cc1[nH]c(/C=C2\C(=O)N(C)c3ccc(F)cc32)c(C)c1C(=O)Cl]

(Z)-5-((5-Fluoro-1-methyl-2-oxoindolin-3-ylidene) methyl)-2,4-dimethyl-1H-pyrrole-3-carbonyl chloride. Thionyl chloride (40 µL, 0.56 mmol) and DMF (1 drop) were added to a suspension of (Z)-5-((5-Fluoro-1-methyl-2-oxoindolin-3-ylidene)methyl)-2,4-dimethyl-1H-pyrrole-3-carboxylic acid (159 mg, 0.51 mmol) in dry toluene (5 mL) and the mixture was heated at reflux for 4 h. Following cooling to RT the resultant precipitate was filtered and washed with hexanes and dried under vacuum to give the target compound as a pale brown solid (125 mg, 0.38 mmol, 75%) which was used directly with no further purification.

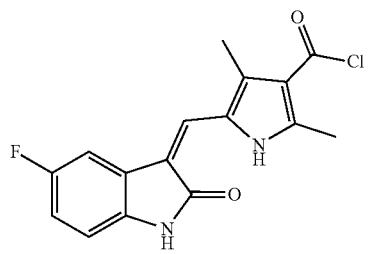 [SMILES: Cc1[nH]c(/C=C2\C(=O)Nc3ccc(F)cc32)c(C)c1C(=O)Cl]

(Z)-5-((5-Fluoro-2-oxoindolin-3-ylidene)methyl)-2,4-dimethyl-1H-pyrrole-3-carbonyl chloride. Thionyl chloride (30 µL, 0.40 mmol) and DMF (1 drop) were added to a solution of Compound No. 2 (107 mg, 0.36 mmol) in toluene (3 ml). The resultant mixture was heated at reflux for 4 h, before being cooled and the precipitate filtered. The filtrand was washed with toluene and dried under air followed by vacuum drying. The desired product was obtained as an orange/red solid (114 mg, 0.36 mmol, 100%) and used directly with no further purification.

General procedure for the synthesis of Sunitinib and analogs via reaction of amines with acid chlorides: The relevant acid chloride (Z)-5-((5-Fluoro-1-methyl-2-oxoindolin-3-ylidene methyl)-2,4-dimethyl-1H-pyrrole-3-carbonyl chloride or (Z)-5-((5-Fluoro-2-oxoindolin-3-ylidene)methyl)-2,4-dimethyl-1H-pyrrole-3-carbonyl chloride (1.0 equiv.) in dry THF (2.5 mL/mmol) was added to a solution of the relevant amine (2.5-4.0 equiv.) in dry THF (3-4 mL/mmol) at RT. The reaction mixture was heated to 50° C. for 1 h before being cooled to RT and having water added (10 mL/mmol). The THF was removed in vacuo and the resultant precipitate was removed by filtration and washed with water and hexanes. Further purification was performed if required.

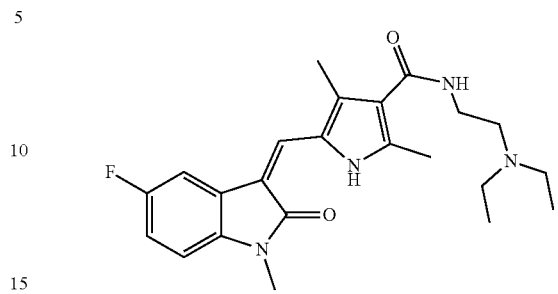

(Z)—N-(2-(Diethylamino)ethyl)-5-((5-fluoro-1-methyl-2-oxoindolin-3-ylidene)methyl)-2,4-dimethyl-1H-pyrrole-3-carboxamide (Compound No. 1), (Z)-5-((5-Fluoro-1-methyl-2-oxoindolin-3-ylidene)methyl)-2,4-dimethyl-1H-pyrrole-3-carbonyl chloride (101 mg, 0.30 mmol), N,N-diethylethylenediamine (107 µL, 0.76 mmol) and THF (1 mL) were reacted according to the described general procedure. Following purification by silica gel chromatography (1:1 DCM:MeOH) the target compound was obtained as a yellow solid (79 mg, 0.19 mmol, 64%). Rf 0.20 (1:1 DCM:MeOH); M.p. 133-136° C.; IR (cm$^{-1}$) 1533, 1578, 1626, 1673, 2796, 2877, 2921, 2964, 3314; $^1$H NMR (400 MHz, DMSO-$d_6$) 0.98 (6H, t, J=7.2 Hz, N(CH2CH3)2), 2.42 (3H, s, pyrrole-CH3), 2.45 (3H, s, pyrrole-CH3), 2.49-2.57 (9H, m, CH2CH2N(CH2CH3)2), 3.25-3.31 (2H, m, NHCH2CH2), 3.30 (3H, s, oxindole-N—CH3), 7.00-7.05 (2H, m, H-6/7), 7.44 (1H, t, J=7.4 Hz, NHCH2CH2), 7.75 (1H, s, alkene-CH), 7.80-7.84 (1H, m, H-4), 13.64 (1H, s, pyrrole-NH); $^{13}$C NMR (100 MHz, DMSO-$d_6$) 11.1 (pyrrole-CH$_3$), 12.4 (N(CH$_2$CH$_3$)$_2$), 13.8 (pyrrole-CH$_3$), 26.7 (oxindole-N—CH$_3$), 37.5 (NHCH$_2$CH$_2$), 47.0 (N(CH$_2$CH$_3$)$_2$), 52.1 (NHCH$_2$CH$_2$), 106.3 (d, $J_{CF}$=26.0 Hz, Ar—C), 109.6 (d, $J_{CF}$=8.9 Hz, Ar—C), 112.7 (d, $J_{CF}$=24.2 Hz, Ar—C), 113.8 (Ar—C), 121.3 (Ar—C), 125.4 (Ar—C), 126.2 (Ar—C), 126.5 (d, $J_{CF}$=9.4 Hz, Ar—C), 131-0 (Ar—C). 136.2 (Ar—C), 137.3 (Ar—C), 159.2 (d, $J_{CF}$=235.1 Hz, Ar—C), 164.9 (C=O), 168.0 (C=O); HRMS calcd. for $C_{23}H_{30}FN_4O_2$ (ES+) m/z 413.235279 [M+H]+, found 413.232986.

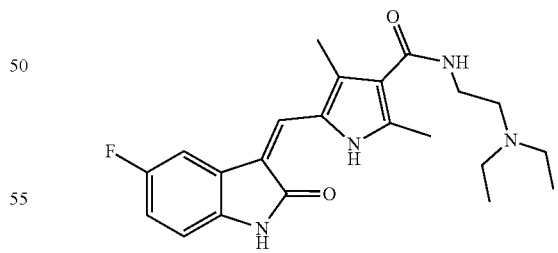

(Z)—N-(2-(Diethylamino)ethyl)-5-((5-fluoro-2-oxoindolin-3-ylidene)methyl)-2,4-dimethyl-1H-pyrrole-3-carboxamide. (Z)-5-((5-Fluoro-2-oxoindolin-3-ylidene)methyl)-2,4-dimethyl-1H-pyrrole-3-carbonyl chloride (114 mg, 0.36 mmol), N,N-diethylethylenediamine (125 µL, 0.90 mmol) and THF (1 mL) were reacted according to the described general procedure. The target compound was obtained as a yellow solid (85 mg, 0.21 mmol, 59%). Rf 0.26 (1:1 DCM:MeOH); M.p. 218-221° C.; IR (cm$^{-1}$) 1550, 1620, 1667, 2793, 2873, 2926, 2965, 3037, 3154, 3282; $^1$H NMR (400 MHz, CDCl$_3$) 1.06 (6H, t, J=7.4 Hz, N(CH$_2$CH$_3$)$_2$), 2.49 (3H, s, pyrrole-CH$_3$), 2.57-2.64 (7H, m, N(CH$_2$CH$_3$)$_2$ and pyrrole-CH$_3$), 2.69 (2H, t, J=5.5 Hz, NHCH$_2$CH$_2$NEt$_2$), 3.52 (2H, dt, J=5.5, 4.7 Hz, NHCH$_2$CH$_2$NEt$_2$), 6.53 (1H, br, NHCH$_2$CH$_2$), 6.81-6.90 (2H, m, H-6/7), 7.20 (1H, dd, J=8.8, 1.9 Hz, H-4), 7.36 (1H, s, alkene-CH), 7.82 (1H, br, oxindole-NH), 13.44 (1H, s, pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 37.5 (NFCH$_2$CH$_2$), 47.0 (N(CH$_2$CH$_3$)$_2$), 52.1 (NHCH$_2$CH$_2$), 106.4 (d, J$_{CF}$=25.9 Hz, Ar—C), 110.5 (d, J$_{CF}$=8.2 Hz, Ar—C), 112.8 (d, J$_{CF}$=24.3 Hz, Ar—C), 115.1 (d, J$_{CF}$=3.0 Hz, Ar—C), 121.2 (Ar—C), 125.3 (Ar—C), 126.3 (Ar—C), 127.6 (d, J$_{CF}$=9.5 Hz, Ar—C), 130.6 (Ar—C), 135.0 (Ar—C), 137.0 (Ar—C), 158.7 (d, J$_{CF}$=235.0 Hz, Ar—C), 165.0 (C=O), 170.0 (C=O); HRMS calcd. for C$_{22}$H$_{28}$FN$_4$O$_2$ (ES+) m/z 399.219629 [M+H]+, found 399.216616.

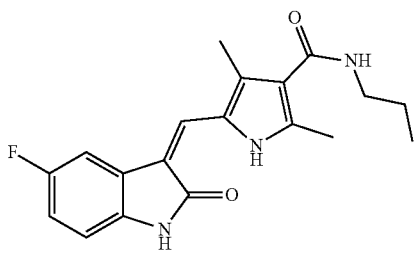 [SMILES: CCCNC(=O)c1c(C)[nH]c(/C=C2\C(=O)Nc3ccc(F)cc32)c1C]

(Z)-5-((5-Fluoro-2-oxoindolin-3-ylidene)methyl)-2,4-dimethyl-N-propyl-1H-pyrrole-3-carboxamide (Compound No. 3). (Z)-5-((5-Fluoro-2-oxoindolin-3-ylidene)methyl)-2,4-dimethyl-1H-pyrrole-3-carbonyl chloride (80 mg, 0.25 mmol), n-propylamine (51 µL, 0.63 mmol) and THF (1 mL) were reacted according to the described general procedure. Purification by chromatography on silica (19:1 DCM:MeOH) afforded the target compound as an orange solid (72 mg, 0.21 mmol, 84%). Rf 0.35 (19:1 DCM:MeOH); M.p. 320-323° C.; IR (cm$^{-1}$) 1537, 1624, 1670, 2859, 2920, 2959, 3038, 3158, 3275; $^1$H NMR (400 MHz, DMSO-d$_6$) 0.92 (3H, t, J=7.5 Hz, NHCH$_2$CH$_2$CH$_3$), 1.53 (2H, tq, J=7.5, 7.1 Hz, NHCH$_2$CH$_2$CH$_3$), 2.41 (3H, s, pyrrole-CH$_3$), 2.43 (3H, s, pyrrole-CH$_3$), 3.19 (2H, dt, J=7.1, 6.5 Hz, NHCH$_2$CH$_2$CH$_3$), 6.85 (1H, dd, J=8.0, 4.3 Hz, H-7), 6.93 (1H, ddd, J=9.4, 8.0, 1.8 Hz, H-6), 7.64 (1H, t, J=6.5 Hz, NHCH$_2$CH$_2$CH$_3$), 7.71 (1H, s, alkene-CH), 7.76 (1H, dd, J=9.2, 1.8 Hz, H-4), 10.88 (1H, s, oxindole-NH), 13.67 (1H, s, pyrrole-NH); $^{13}$C NMR (100 MHz, DMSO-d$_6$) 10.9 (pyrrole-CH$_3$), 12.0 (NHCH$_2$CH$_2$CH$_3$), 13.7 (pyrrole-CH$_3$), 23.1 (NHCH$_2$CH$_2$CH$_3$), 41.0 (NHCH$_2$CH$_2$CH$_3$), 106.3 (d, J$_{CF}$=25.7 Hz, Ar—C), 110.4 (d, J$_{CF}$=8.7 Hz, Ar—C), 112.8 (d, J$_{CF}$=25.0 Hz, Ar—C), 114.9 (Ar—C), 121.7 (Ar—C), 125.3 (Ar—C), 126.2 (Ar—C), 127.7 (d, J$_{CF}$=9.4 Hz, Ar—C), 130.7 (Ar—C), 134.9 (Ar—C), 136.7 (Ar—C), 158.7 (d, J$_{CF}$=233.8 Hz, Ar—C), 165.1 (C=O), 170.0 (C=O); HRMS calcd. for C$_{19}$H$_{21}$FN$_3$O$_2$ (ES+) m/z 342.161780 [M+H]+, found 342.166125.

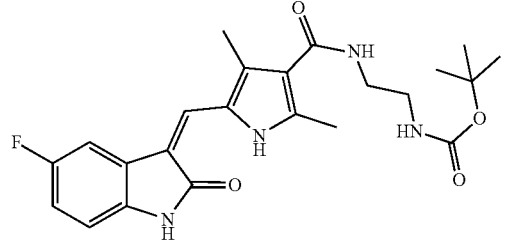 [SMILES: Cc1[nH]c(/C=C2\C(=O)Nc3ccc(F)cc32)c(C)c1C(=O)NCCNC(=O)OC(C)(C)C]

tert-Butyl (Z)-(2-(5-((5-Fluoro-2-oxoindolin-3-ylidene)methyl)-2,4-dimethyl-1H-pyrrole-3-carboxamido)ethyl)carbamate. (Z)-5-((5-Fluoro-2-oxoindolin-3-ylidene)methyl)-2,4-dimethyl-1H-pyrrole-3-carbonyl chloride (100 mg, 0.31 mmol), N-Boc-ethylenediamine (124 µL, 0.78 mmol) and THF (1 mL) were reacted according to the described general procedure. The target compound was obtained as an orange solid (134 mg, 0.31 mmol, quant.). Rf 0.29 (19:1 DCM:MeOH); M.p. 247-249° C.; IR (cm$^{-1}$) 1537, 1624, 1680, 1967, 2876, 2924, 2979, 3306, 3340; $^1$H NMR (400 MHz, DMSO-d$_6$) 1.39 (9H, s, C(CH$_3$)$_3$), 2.42 (3H, s, pyrrole-CH$_3$), 2.43 (3H, s, pyrrole-CH$_3$), 3.07-3.14 (2H, m, NHCH$_2$CH$_2$NHBoc), 3.23-3.30 (2H, m, NHCH$_2$CH$_2$NHBoc), 6.82-6.88 (2H, m, NHCH$_2$CH$_2$NHBoc and H-7), 6.93 (1H, ddd, J=9.2, 8.1, 2.3 Hz, H-6), 7.58 (1H, t, J=5.5 Hz, NHCH$_2$CH$_2$NHBoc), 7.72 (1H, s, alkene-CH), 7.77 (1H, dd, J=9.2, 2.3 Hz, H-4), 10.88 (1H, s, oxindole-NH), 13.69 (1H, s, pyrrole-NH); $^{13}$C NMR (100 MHz, DMSO-d$_6$) 11.0 (pyrrole-CH$_3$), 13.8 (pyrrole-CH$_3$), 28.7 (C(CH$_3$)$_3$), 78.1 (C(CH$_3$)$_3$), 106.4 (d, J$_{CF}$=26.0 Hz, Ar—C), 110.5 (d, J$_{CF}$=8.2 Hz, Ar—C), 112.8 (d, J$_{CF}$=23.8 Hz, Ar—C), 115.1 (Ar—C), 121.2 (Ar—C), 123.1 (Ar—C), 125.4 (Ar—C), 126.2 (Ar—C), 127.6 (d, J$_{CF}$=9.5 Hz, Ar—C), 130.8 (Ar—C), 135.0 (Ar—C), 137.1 (Ar—C), 156.2 (Boc-C=O), 158.8 (d, J$_{CF}$=234.4 Hz, Ar—C), 165.3 (C=O), 170.1 (C=O); HRMS calcd. for C$_{23}$H$_{28}$FN$_4$O$_4$ (ES+) m/z 443.209459 [M+H]+, found 443.212295.

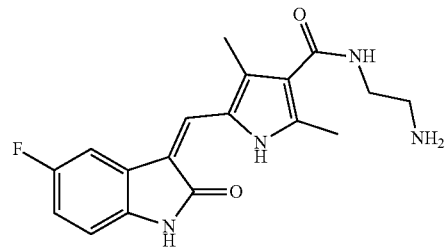 [SMILES: Cc1[nH]c(/C=C2\C(=O)Nc3ccc(F)cc32)c(C)c1C(=O)NCCN]

(Z)—N-(2-Aminoethyl)-5-((5-fluoro-2-oxoindolin-3-ylidene)methyl)-2,4-dimethyl-1H-pyrrole-3-carboxamide (Compound No. 4). TFA (255 µL, 3.32 mmol) was added to a suspension of tert-Butyl (Z)-(2-(5-((5-fluoro-2-oxoindolin-3-ylidene)methyl)-2,4-dimethyl-1H-pyrrole-3-carboxamido)ethyl)carbamate (147 mg, 0.33 mmol) in DCM (5 mL). The resultant solution was stirred at RT for 18 h, before being evaporated to dryness. The residue was suspended in sat. NaHCO$_3$ (10 mL) and stirred for 1 h, before being filtered and washed with water (4 mL). The resultant solid was purified by reverse phase chromatography (7:3 MeOH:H$_2$O+0.1% Formic acid) to afford the target compound as a yellow solid (68 mg, 0.20 mmol, 60%). Rf 0.43 (7:3 MeOH:H$_2$O+0.1% Formic acid, C18); M.p. 210-230° C. (decomposed); IR (cm$^{-1}$) 1539, 1569, 1628, 1673, 2873, 2925, 3041, 3160; $^1$H NMR (400 MHz, DMSO-d$_6$) 2.42 (3H, s, pyrrole-CH$_3$), 2.44 (3H, s, pyrrole-CH$_3$), 2.69 (2H, t, J=6.3 Hz, NHCH$_2$CH$_2$NH$_2$), 3.24 (2H, dt, J=6.3, 6.0 Hz, NHCH$_2$CH$_2$NH$_2$), 6.84 (1H, dd, J=8.2, 4.5 Hz, H-7), 6.92 (1H, ddd, J=9.3, 8.2, 2.1 Hz, H-6), 7.59 (1H, t, J=6.0 Hz, NHCH$_2$CH$_2$NH$_2$), 7.71 (1H, s, alkene-CH), 7.76 (1H, dd, J=9.3, 2.1 Hz, H-4), 13.68 (1H, s, pyrrole-NH); $^{13}$C NMR (100 MHz, DMSO-d$_6$) 11.0 (pyrrole-CH$_3$), 13.9 (pyrrole-CH$_3$), 37.9 (NHCH$_2$CH$_2$NH$_2$), 68.7 (NHCH$_2$CH$_2$NH$_2$), 106.4 (d, $J_{CF}$=24.9 Hz, Ar—C), 110.5 (d, $J_{CF}$=8.4 Hz, Ar—C), 112.9 (d, $J_{CF}$=24.9 Hz, Ar—C), 115.3 (Ar—C), 121.0 (Ar—C), 125.3 (Ar—C), 126.3 (Ar—C), 127.6 (d, $J_{CF}$=9.7 Hz, Ar—C), 130.9 (Ar—C), 137.4 (Ar—C), 158.7 (d, $J_{CF}$=233.6 Hz, Ar—C), 165.6 (Ar—C), 170.1 (Ar—C); HRMS calcd. for C$_{18}$H$_{20}$FN$_4$O$_2$ (ES+) m/z 343.157028 [M+H]+, found 343.159437.

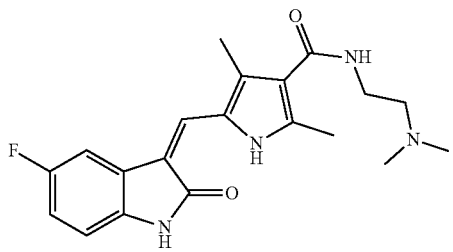 [SMILES: Cc1[nH]c(/C=C2\C(=O)Nc3ccc(F)cc32)c(C)c1C(=O)NCCN(C)C]

(Z)—N-(2-(Dimethylamino)ethyl)-5-((5-fluoro-2-oxoindolin-3-ylidene)methyl)-2,4-dimethyl-1H-pyrrole-3-carboxamide (Compound No. 5). (Z)-5-((5-Fluoro-2-oxoindolin-3-ylidene)methyl)-2,4-dimethyl-1H-pyrrole-3-carbonyl chloride (80 mg, 0.25 mmol), N,N-dimethylethylenediamine (69 µL, 0.63 mmol) and THF (1 mL) were reacted according to the described general procedure. Purification on silica gel (1:1 DCM:MeOH) gave the target compound as a yellow solid (50 mg, 0.14 mmol, 54%). Rf 0.23 (1:1 DCM:MeOH); M.p. 270-273° C.; IR (cm$^{-1}$) 1540, 1624, 1673, 2038, 2127, 2773, 2799, 2856, 2937, 2969, 3038, 3109, 3169, 3279; $^1$H NMR (400 MHz, DMSO-d$_6$) 2.19 (6H, s, N(CH$_3$)$_2$), 2.39 (2H, t, J=6.7 Hz, NFCH$_2$CH$_2$NMe$_2$), 2.41 (3H, s, pyrrole-CH$_3$), 2.43 (3H, s, pyrrole-CH$_3$), 3.27-3.35 m, NHCH$_2$CH$_2$NMe$_2$), 6.84 (1H, dd, J=8.4, 4.6 Hz, H-7), 6.93 (1H, ddd, J=9.5, 8.4, 2.5 Hz, H-6), 7.48 (1H, t, J=5.5 Hz, NHCH$_2$CH$_2$NMe$_2$), 7.71 (1H, s, alkene-CH), 7.75 (1H, dd, J=9.4, 2.5 Hz, H-4), 10.88 (1H, s, oxindole-NH), 13.67 (1H, s, pyrrole-NH); $^{13}$C NMR (100 MHz, DMSO-d$_6$) 11.0 (pyrrole-CH$_{13}$), 13.7 (pyrrole-CH$_3$), 37.4 (NHCH$_2$CH$_2$NMe$_2$), 45.7 (N(CH$_3$)$_2$), 58.8 (NHCH$_2$CH$_2$NMe$_2$), 106.4 (d, $J_{CF}$=25.8 Hz, Ar—C), 110.5 (d, $J_{CF}$=8.6 Hz, Ar—C), 112.8 (d, $J_{CF}$=24.2 Hz, Ar—C), 115.0 (Ar—C), 121.3 (Ar—C), 125.4 (Ar—C), 126.3 (Ar—C), 127.6 (d, $J_{CF}$=9.5 Hz, Ar—C), 130.7 (Ar—C), 136.9 (Ar—C), 158.7 (d, $J_{CF}$=234.0 Hz, Ar—C), 165.0 (Ar—C), 170.0 (Ar—C); HRMS calcd. for C$_{20}$H$_{24}$FN$_4$O$_2$ (ES+) m/z 371.188329 [M+H]+, found 371.181945.

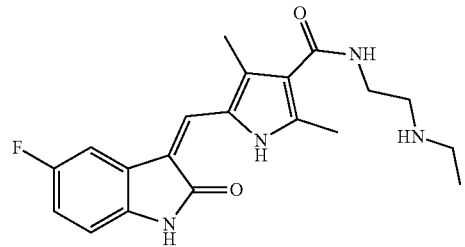 [SMILES: CCNCCNC(=O)c1c(C)[nH]c(/C=C2\C(=O)Nc3ccc(F)cc32)c1C]

(Z)—N-(2-(Ethylamino)ethyl)-5-((5-fluoro-2-oxoindolin-3-ylidene methyl)-2,4-dimethyl-1H-pyrrole-3-carboxamide (Compound No. 6). (Z)-5-((5-Fluoro-2-oxoindolin-3-ylidene)methyl)-2,4-dimethyl-1H-pyrrole-3-carbonyl chloride (80 mg, 0.25 mmol), N-ethylethylenediamine (105 µL, 1.00 mmol) and THF (1 mL) were reacted according to the described general procedure. Purification by reverse phase chromatography (7:3 MeOH:H$_2$O+0.1% Formic acid) gave the target compound as a yellow solid (47 mg, 0.13 mmol, 50%). Rf 0.29 (7:3 MeOH:H$_2$O+0.1% Formic acid); M.p. 233-236° C.; IR (cm$^{-1}$) 1514, 1629, 1664, 2822, 2922, 2959, 3265, 3417; $^1$H NMR (400 MHz, DMSO-d$_6$) 1.02 (3H, t, J=7.2 Hz, NHCH$_2$CH$_3$), 2.41 (3H, s, pyrrole-CH$_3$), 2.43 (3H, s, pyrrole-CH$_3$), 2.57 (2H, q, J=7.1 Hz, NHCH$_2$CH$_3$), 2.67 (2H, t, J=6.6 Hz, NHCH$_2$CH$_2$NHEt), 3.27-3.34 (3H, m, NHCH$_2$CH$_2$NHEt), 6.84 (1H, dd, J=8.4, 4.6 Hz, H-7), 6.93 (1H, ddd, J=9.6, 8.4, 2.5 Hz, H-6), 7.55 (1H, t, J=5.6 Hz, NHCH$_2$CH$_2$NHEt), 7.71 (1H, s, alkene-CH), 7.76 (1H, dd, J=9.4, 2.5 Hz, H-4), 10.88 (1H, s, oxindole-NH), 13.68 (1H, s, pyrrole-NH); $^{13}$C NMR (100 MHz, DMSO-d$_6$) 11.0 (pyrrole-CH$_3$), 13.8 (pyrrole-CH$_3$), 15.7 (NHCH$_2$CH$_3$), 43.7 (NHCH$_2$CH$_3$), 49.1 (NHCH$_2$CH$_2$NHEt), 106.4 (d, $J_{CF}$=25.4 Hz, Ar—C), 110.5 (d, $J_{CF}$=8.8 Hz, Ar—C), 112.8 (d, $J_{CF}$=24.8 Hz. Ar—C), 115.0 (Ar—C), 121.4 (Ar—C), 125.4 (Ar—C), 126.2 (Ar—C), 127.6 (d, $J_{CF}$=9.5 Hz, Ar—C), 130.7 (Ar—C), 135.0 (Ar—C), 136.9 (Ar—C), 158.7 (d, $J_{CF}$=234.8 Hz, Ar—C), 165.1 (C=O), 170.0 (C=O); HRMS calcd. for C$_{20}$H$_{24}$FN$_4$O$_2$ (ES+) m/z, 371.188329 [M+H]+, found 371.181896.

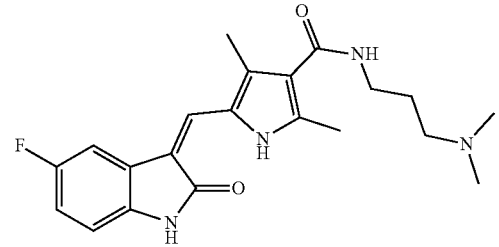 [SMILES: Cc1[nH]c(/C=C2\C(=O)Nc3ccc(F)cc32)c(C)c1C(=O)NCCCN(C)C]

(Z)—N-(3-(Dimethylamino)propyl)-5-((5-fluoro-2-oxoindolin-3-ylidene)methyl)-2,4-dimethyl-1H-pyrrole-3-carboxamide (Compound No. 7). (Z)-5-((5-Fluoro-2-oxoindolin-3-ylidene)methyl)-2,4-dimethyl-1H-pyrrole-3-carbonyl chloride (80 mg, 0.25 mmol), N,N-dimethyl-1,3-propanediamine (78 µL, 0.63 mmol) and THF (1 mL) were reacted according to the described general procedure. Purification on amine silica gel (KP—NH; 19:1 DCM:MeOH) afforded the target compound as an orange solid (76 mg, 0.20 mmol, 79%). Rf 0.48 (KP—NH; 19:1 DCM:MeOH); M.p. 243-246° C.; IR (cm$^{-1}$) 1528, 1621, 1669, 1996, 2754, 2850, 2918, 3045, 3169; $^1$NMR (400 MHz, DMSO-d$_6$) 1.65

(2H, tt, J=7.0, 6.9 Hz, NHCH₂CH₂CH₂NMe₂), 2.17 (6H, s, N(CH₃)₂), 2.31 (2H, t, J=7.0 Hz, NHCH₂CH₂CH₂NMe₂), 2.41 (3H, s, pyrrole-CH₃), 2.42 (3H, s, pyrrole-CH₃), 3.25 (2H, dt, J=6.9, 5.6 Hz, NHCH₂CH₂CH₂NMe₂), 6.85 (1H, dd, J=8.5, 4.6 Hz, H-7), 6.93 (1H, ddd, J=9.6, 8.6, 2.5 Hz, H-6), 7.68 (1H, t, J=5.6 Hz, NHCH₂CH₂CH₂NMe₂), 7.72 (1H, s, alkene-CH), 7.76 (1H, dd, J=8.6, 2.4 Hz, H-4), 10.89 (1H, s, oxindole-NH), 13.68 (pyrrole-NH); $^{13}$C NMR (100 MHz, DMSO-d₆) 11.0 (pyrrole-CH₃), 13.8 (pyrrole-CH₃), 27.6 (NHCH₂CH₂CH₂NMe₂), 37.8 (NHCH₂CH₂CH₂NMe₂), 45.6 (N(CH₃)₂), 57.5 (NHCH₂CH₂CH₂NMe₂), 106.4 (d, J$_{CF}$=25.6 Hz, Ar—C), 110.5 (d, J$_{CF}$=8.4 Hz, Ar—C), 112.8 (d, J$_{CF}$=24.6 Hz, Ar—C), 115.0 (d, J$_{CF}$=2.9 Hz, Ar—C), 121.4 (Ar—C), 125.3 (Ar—C), 126.3 (Ar—C), 127.6 (d, J$_{CF}$=9.4 Hz, Ar—C), 130.6 (Ar—C), 135.0 (Ar—C), 136.8 (Ar—C), 158.7 (d, J$_{CF}$=234.1 Hz, Ar—C), 165.1 (C=O), 170.0 (C=O); HRMS calcd. for C₂₁H₂₆FN₄O₂ (ES+) m/z 385.203979 [M+H]+, found 385.199786.

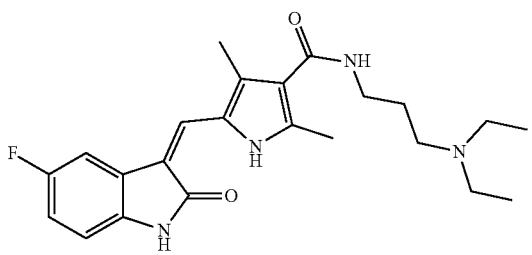 [SMILES: CCN(CC)CCCNC(=O)c1c(C)[nH]c(/C=C2\C(=O)Nc3ccc(F)cc32)c1C]

(Z)—N-(3-(Diethylamino)propyl)-5-((5-fluoro-2-oxoindolin-3-ylidene)methyl)-2,4-dimethyl-1H-pyrrole-3-carboxamide (Compound No. 8). (Z)-5-((5-Fluoro-2-oxoindolin-3-ylidene)methyl)-2,4-dimethyl-1H-pyrrole-3-carbonyl chloride (80 mg, 0.25 mmol), N,N-diethyl-1,3-propanediamine (100 μL, 0.63 mmol) and THF (1 mL) were reacted according to the described general procedure. Purification by chromatography on silica (1:1 DCM:MeOH) gave the target compound as a yellow solid (77 mg, 0.19 mmol, 75%). Rf 0.17 (1:1 DCM:MeOH); M.p. 242-245° C.; IR (cm⁻¹) 1538, 1575, 1620, 1673, 2826, 2871, 2964, 3038, 3110, 3159, 3305; $^1$H NMR (400 MHz, DMSO-d₆) 0.94 (6H, t, J=7.2 Hz, N(CH₂CH₃)₂), 1.62 (2H, tt, J=7.0, 6.9 Hz, NHCH₂CH₂CH₂NEt₂), 2.41 (3H, s, pyrrole-CH₃), 2.43 (3H, s, pyrrole-CH₃), 2.42-2.48 (6H, m, NHCH₂CH₂CH₂NEt₂ and N(CH₂CH₃)₂), 3.24 (2H, dt, J=6.9, 5.4 Hz, NHCH₂CH₂CH₂NEt₂), 6.84 (1H, dd, J=8.4, 4.5 Hz, H-7), 6.92 (1H, ddd, J=9.5, 8.4, 2.5 Hz, H-6), 7.65 (1H, t, J=5.4 Hz, NHCH₂CH₂CH₂NEt₂), 7.71 (1H, s, alkene-CH), 7.75 (1H, dd, J=9.4, 2.5 Hz, H-4), 10.90 (1H, br, oxindole-NH), 13.71 (1H, s, pyrrole-NH); $^{13}$C NMR (100 MHz, DMSO-d₆) 11.0 (pyrrole-CH₃), 12.2 (N(CH₂CH₃)₂), 13.7 (pyrrole-CH₃), 27.4 (NHCH₂CH₂CH₂NEt₂), 37.9 (NHCH₂CH₂CH₂NEt₂), 46.8 (N(CH₂CH₃)₂), 50.7 (NHCH₂CH₂CH₂NEt₂), 106.4 (d, J$_{CF}$=25.7 Hz, Ar—C), 110.5 (d, j$_{CF}$=8.9 Hz, Ar—C), 112.8 (d, J$_{CF}$=23.8 Hz, Ar—C), 115.1 (d, J$_{CF}$=3.0 Hz, Ar—C), 121.6 (Ar—C), 125.3 (Ar—C), 126.2 (Ar—C), 127.7 (d, J$_{CF}$=9.5 Hz, Ar—C), 130.5 (Ar—C), 135.2 (Ar—C), 136.7 (Ar—C), 158.7 (d, J$_{CF}$=234.3 Hz, Ar—C), 165.1 (C=O), 170.1 (C=O); HRMS calcd. for C₂₃H₃₀FN₄O₂ (ES+) m/z 413.235279 [M+H]+, found 413.229777.

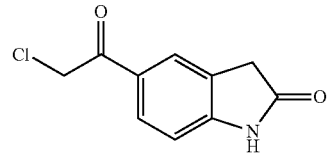 [SMILES: O=C1Cc2cc(C(=O)CCl)ccc2N1]

5-(2-Chloroncetyl)indolin-2-one. Oxindole (0.200 g, 1.50 mmol) in dry DCM (5 mL) was added dropwise to an ice cold suspension of anhydrous AlCl₃ (0.700 g, 5.25 mmol) in dry DCM (10 mL), followed by dropwise addition of chloroacetyl chloride (240 μL, 3.00 mmol). The reaction mixture was allowed to warm to RT and then was heated at 45° C. for 16 h. The mixture was poured onto ice water (50 mL) and the precipitate was collected by filtration, washed with water and dried under vacuum. The target compound was obtained as a beige solid (0.295 g, 1.41 mmol, 94%). Rf 0.22 (1:1 Hexanes:EtOAc); M.p. 228-231° C.; IR (cm⁻¹) 1613, 1681, 1713, 2953, 3234; $^1$H NMR (400 MHz, DMSO-d₆) 3.57 (2H, s, oxindole-CH₂), 5.08 (2H, s, CH₂Cl), 6.93 (1H, d. J=8.2 Hz, H7), 7.83 (1H, d, J=1.6 Hz, H-4), 7.88 (1H, dd, J=8.2, 1.6 Hz, H-6), 10.82 (1H, s, oxindole-NH); $^{13}$C NMR (100 MHz, DMSO-d₆) 35.9 (oxindole-CH₂), 47.6 (CH₂Cl), 109.4 (Ar—C), 125.0 (Ar—C), 126.8 (Ar—C), 128.2 (Ar—C), 130.2 (Ar—C), 149.5 (Ar—C), 177.2 (C=O), 190.6 (C=O); HRMS calcd. for C₁₀H₉ClNO₂ (ES+) m/z 210.032182 [M+H]+, found 210.034340.

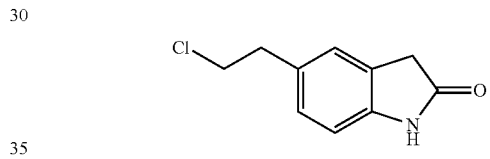

5-(2-Chloroethyl)indolin-2-one. Triethylsilane (375 μL, 2.34 mmol) was added dropwise to an ice cooled solution of 5-(2-Chloroacetyl)indolin-2-one (0.234 g, 1.12 mmol) in TFA (4 mL) under N₂. The mixture was allowed to warm to RT and stirred overnight before being poured onto ice water (10 mL) and the resultant precipitate removed by filtration. Washing with cold water and hexanes followed by air drying afforded the target compound as a beige solid (0.171 g, 0.87 mmol, 78%). Rf 0.28 (1:1 Hexartes:EtOAc); M.p. 159-162° C.; IR (cm⁻¹) 1625, 1692, 2882, 2925, 3039, 3152; $^1$H NMR (400 MHz, DMSO-d₆) 2.95 (2H, t, J=7.11 Hz, CH₂CH₂Cl), 3.44 (2H, s, oxindole-CH₂), 3.78 (2H, t, J=7.1 Hz, CH₂CH₂Cl), 6.74 (1H, d, J=7.9 Hz, H-7), 7.06 (1H, dd, J=7.9, 1.3 Hz, H-6), 7.13 (1H, d, J=1.3 Hz, H-4), 10.31 (1H, s, oxindole-NH); $^{13}$C NMR (100 MHz, DMSO-d₆) 36.2 (oxindole-CH₂), 38.4 (CH₂CH₂Cl), 46.2 (CH₂CH₂Cl), 109.3 (Ar—C), 125.4 (Ar—C), 126.4 (Ar—C), 128.4 (Ar—C), 131.4 (Ar—C), 142.8 (Ar—C), 176.8 (C=O); HRMS calcd. for C₁₀H₁₁ClNO (ES+) m/z 196.052916 [M+H]+, found 196.053544.

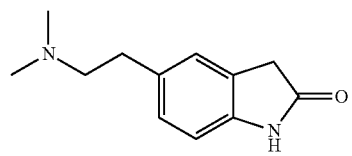

5-(2-(Dimethylamino)ethyl)indolin-2-one. 5-(2-Chloroethyl)indolin-2-one (100 mg, 0.51 mmol) was heated in 2.0M dimethylamine in THF (2.6 mL, 5.11 mmol) under microwave irradiation at 140° C. for 3 h. The solvent was removed in vacuo and the residue was purified by chromatography on KP—NH silica (KP—NH; 19:1 DCM:MeOH) to give the target compound as a pale pink solid (54 mg, 0.26 mmol, 52%). Rf 0.50 (KP—NH, 19:1 DCM:MeOH); M.p. 76-78° C.; IR (cm$^{-1}$) 1620, 1704, 2664, 2726, 2800, 2857, 2937; $^1$H NMR (400 MHz, CDCl$_3$) 2.31 (6H, s, N(CH$_3$)$_2$), 2.53 (2H, t, J=7.1 Hz, CH$_2$CH$_2$NMe$_2$), 2.76 (2H, t, J=7.1 Hz, CH$_2$CH$_2$NMe$_2$), 3.51 (2H, s, oxindole-CH$_2$), 6.78 (1H, d, J=79 Hz, H-7), 7.04-7.08 (1H, m, H-6), 7.09-7.11 (1H, m, H-4), 8.55 (1H, s, oxindole-NH); $^{13}$C NMR (100 MHz, DMSO-d$_6$) 33.4 (CH$_2$CH$_2$NMe$_2$), 36.2 (oxindole-CH$_2$), 45.6 (N(CH$_3$)$_2$), 61.8 (CH$_2$CH$_2$NMe$_2$), 109.2 (Ar—C), 125.2 (Ar—C), 126.2, 127.9 (Ar—C), 133.7 (Ar—C), 142.1 (Ar—C), 176.8 (C=O); HRMS calcd. for C$_{12}$H$_{17}$N$_2$O (ES+) m/z 205.134088 [M+H]+, found 205.129734.

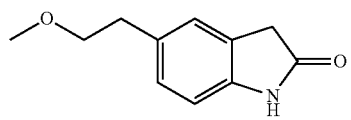

5-(2-Methoxyethyl)indolin-2-one. Sodium methoxide (69 mg, 1.28 mmol) was added to a solution of 5-(2-Chloroethyl)indolin-2-one (100 mg, 0.51 mmol) in dry MeOH (2 mL). The resultant mixture was heated under microwave irradiation at 120° C. for 3 h, before being concentrated in vacuo and dissolved in EtOAc/THF (3:1, 30 mL) and washed with sat. NH$_4$Cl (20 mL). The organic phase was washed with water (10 mL) and brine (10 mL), before being dried (MgSO$_4$) and evaporated to dryness. The residue was purified on silica gel (1:1 Hexanes:EtOAc) to give the desired product as a beige solid (37 mg, 0.19 mmol, 38%). Rf 0.26 (1:1 Hexanes:EtOAc); M.p. 88-90° C.; IR (cm$^{-1}$) 1623, 1695, 2868, 2923, 3029, 3078, 3164; $^1$H NMR (400 MHz, DMSO-d$_6$) 2.73 (2H, t, J=6.9 Hz, CH$_2$CH$_2$OMe), 3.23 (3H, s, OCH$_3$), 3.43 (2H, s, oxindole-CH$_2$), 3.48 (2H, t, J=6.9 Hz, CH$_2$CH$_2$OMe), 6.71 (1H, d, J=7.8 Hz, H-7), 6.99-7.03 (1H, m, H-6), 7.06-7.09 (1H, m, H-4), 10.27 (1H, s, oxindole-NH); $^{13}$C NMR (100 MHz, DMSO-d$_6$) 35.5 (CH$_2$CH$_2$OMe), 36.2 (oxindole-CH$_2$), 58.2 (OCH$_3$), 73.6 (CH$_2$CH$_2$OMe), 109.2 (Ar—C), 125.4 (Ar—C), 126.2 (Ar—C), 128.2 (Ar—C), 132.2 (Ar—C), 142.3 (Ar—C), 176.8 (C=O); HRMS calcd. for C$_{11}$H$_{14}$NO$_2$ (ES+) m/z 192.102454 [M+H]+, found 192.103923.

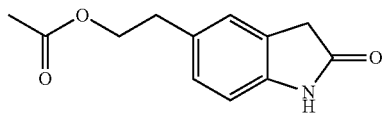 [SMILES: CC(=O)OCCc1ccc2c(c1)CC(=O)N2]

2-(2-Oxoindolin-5-yl)ethyl acetate. 5-(2-Chloroethyl)indolin-2-one (0.200 g, 1.02 mmol) and potassium acetate (0.200 g, 2.04 mmol) were heated in dry DMSO (5 mL) to 100° C. for 1 h. The reaction mixture was poured into water (30 mL) and extracted with EtOAc (3×30 mL). The combined organic extracts were washed with water (2×30 mL) and brine (20 mL), before being dried (MgSO$_4$) and evaporated to dryness. The crude residue was purified on silica gel (1:1 Hexanes:EtOAc) to give the final compound as a pale pink solid (168 mg, 0.77 mmol, 75%). Rf 0.19 (1:1 Hexanes:EtOAc); M.p. 104-106° C.; IR (cm$^{-1}$) 1619, 1697, 2865, 2933, 3025, 3074, 3124, 3159; $^1$H NMR (400 MHz, DMSO-d$_6$) 1.99 (3H, s, COCH$_3$), 2.81 (2H, t, J=7.0 Hz, CH$_2$CH$_2$O), 3.44 (2H, s, oxindole-CH$_2$), 4.15 (2H, t, J=7.0 Hz, CH$_2$CH$_2$O), 6.74 (1H, d, J=7.9 Hz, H-7), 7.02-7.05 (1H, m, 7.08-7.11 (1H, m, H-4), 10.30 (1H, s, oxindole-NH); $^{13}$C NMR (100 MHz, DMSO-d$_6$) 21.2 (acetyl-CH$_3$), 34.5 (CH$_2$CH$_2$OAc), 36.2 (oxindole-CH$_2$), 65.1 (CH$_2$CH$_2$OAc), 109.4 (Ar—C), 125.4 (Ar—C), 126.4 (Ar—C), 128.2 (Ar—C), 131.0 (Ar—C), 142.6 (Ar—C), 170.8 (C=O), 176.8 (C=O); HRMS calcd. for C$_{12}$H$_{14}$NO$_3$ (ES+) m/z 220.097369 [M+H]+, found 220.098553.

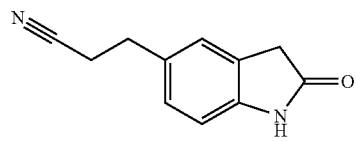 [SMILES: N#CCCc1ccc2c(c1)CC(=O)N2]

3-(2-Oxoindolin-5-yl)propanenitrile. 5-(2-Chloroethyl)indolin-2-one (100 mg, 0.51 mmol) was added to a suspension of potassium cyanide (67 mg, 1.02 mmol) in dry DMSO (1 mL) at 90° C., and the reaction mixture was subsequently heated to 150° C. for 2 h. The reaction was cooled to RT and poured onto ice water (20 mL) before being extracted with EtOAc (2×20 mL). The organic extracts were washed with water (2×20 mL) and brine (20 mL) before being dried (MgSO$_4$) and evaporated to dryness. The crude residue was purified by silica gel chromatography (1:1 Hexanes:EtOAc) to afford the desired compound as a beige solid (77 mg, 0.42 mmol, 81%). Rf 0.19 (1:1 Hexanes:EtOAc); M.p. 154-156° C.; IR (cm$^{-1}$) 1623, 1686, 2242, 2853, 2880, 2926, 2954, 3037, 3068, 3115, 3149; $^1$H NMR (400 MHz, DMSO-d$_6$) 2.72-2.84 (4H, m, CH$_2$CH$_2$), 3.45 (2H, s, oxindole-CH$_2$), 6.75 (1H, d, J=7.9 Hz, H-7), 7.06-7.09 (1H, m, H-6), 7.13-7.15 (1H, m, H-4), 10.32 (1H, s, oxindole-NH); $^{13}$C NMR (100 MHz, DMSO-d$_6$) 19.1 (CH$_2$CH$_2$CN), 30.8 (CH$_2$CH$_2$CN), 36.2 (oxindole-CH$_2$), 109.4, 120.8, 125.0, 126.5, 128.0, 132.1, 142.9, 176.8 (C=O); HRMS calcd. for C$_{11}$H$_{11}$N$_2$O (ES+) m/z 187.087138 [M+H]+, found 187.087821.

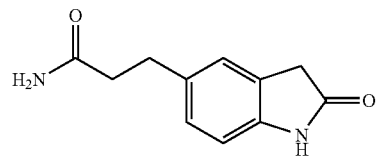 [SMILES: NC(=O)CCc1ccc2c(c1)CC(=O)N2]

3-(2-Oxoindolin-5-yl)propanamide. Sodium hydroxide (0.208 g, 5.21 mmol) was added to a solution of urea-hydrogen peroxide complex (0.840 g. 8.93 mmol) in water (3 mL). 3-(2-Oxoindolin-5-yl)propanenitrile (0.277 g, 1.49 mmol) in EtOH (2 mL) was added dropwise and the resultant mixture was stirred at RT for 2 h. The reaction mixture was diluted with water (10 mL) and EtOAc (10 mL), stirred at RT for 5 min and the aqueous phase adjusted to pH 4 (1M HCl). EtOAc (20 mL) was added and separated, and the aqueous layer extracted with EtOAc (30 mL). The combined organic extracts were washed with brine (20 mL), dried (MgSO$_4$) and evaporated to dryness to afford the target compound as a beige solid (0.281 g, 1.38 mmol, 92%). Rf0.34 (1:1 Hexanes:EtOAc); M.p. 198-202° C.; IR (cm$^{-1}$) 1626, 1688, 2923, 3181, 3346; $^1$H NMR (400 MHz, DMSO-d$_6$) 2.31 (2H, t, J=7.41 Hz, CH$_2$CH$_2$CO), 2.73 (2H, t, J=7.4

Hz, CH₂CH₂CO), 3.42 (2H, s, oxindole-CH₂), 6.71 (1H, d, J=7.9 Hz, H-7), 6.74 (1H, br, CONH'H), 6.97-7.01 (1H, m, H-6), 7.04-7.06 (1H, m, H-4), 7.26 (1H, br, CONH'H), 10.26 (1H, s, oxindole-NH); $^{13}$C NMR (100 MHz, DMSO-d₆) 31.1 (CH₂CH₂CONH₂), 36.2 (oxindole-CH₂), 37.6 (CH₂CH₂CONH₂), 109.2 (Ar—C), 124.9 (Ar—C), 126.2 (Ar—C), 127.5 (Ar—C), 134.7 (Ar—C), 142.1 (Ar—C), 173.9 (C=O), 176.8 (C=O); HRMS calcd. for C₁₁H₁₃N₂O₂ (ES+) m/z 205.097703 [M+H]+, found 205.099340.

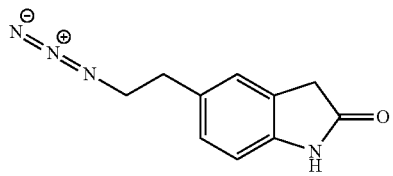 [SMILES: [N-]=[N+]=NCCc1ccc2c(c1)CC(=O)N2]

5-(2-Azidoethyl)indolin-2-one. Sodium azide (96 mg, 1.47 mmol) was added to a solution of 5-(2-Chloroethyl)indolin-2-one (0.240 g, 1.23 mmol) in dry DMF (7 mL) and the reaction mixture was heated at 90° C. for 4 h. The solvent was removed in vacuo and the residue was purified via silica gel chromatography (3:2 Hexanes:EtOAc) to give the target compound as a pale pink solid (152 mg, 0.75 mmol 61%). Rf 0.29 (3:2 Hexanes:EtOAc); M.p. 109-111° C.; IR (cm⁻¹) 1619, 1685, 2083, 2853, 2925, 3034, 3114, 3151; $^1$H NMR (400 MHz, DMSO-d₆) 2.78 (2H, t, J=7.1 Hz, CH₂CH₂N₃), 3.44 (2H, s, oxindole-CH₂), 3.51 (2H, t, J=7.1 Hz, CH₂CH₂N₃), 6.75 (1H, d, J=7.8 Hz, H-7), 7.04-7.09 (1H, m, H-6), 7.11-7.14 (1H, m, H-4), 10.31 (1H, s, oxindole-NH); $^{13}$C NMR (100 MHz, DMSO-d₆) 34.6 (CH₂CH₂N₃), 36.2 (oxindole-CH₂), 52.3 (CH₂CH₂N₃), 109.4 (Ar—C), 125.4 (Ar—C), 126.4 (Ar—C), 128.3 (Ar—C), 131.5 (Ar—C), 142.7 (Ar—C), 176.8 (C=O); HRMS calcd. for C₁₀H₁₁N₄O (ES+) m/z 203.093285 [M+H]+, found 203.094614.

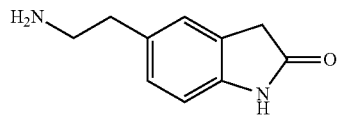 [SMILES: NCCc1ccc2c(c1)CC(=O)N2]

5-(2-Aminoethyl)indolin-2-one. Triphenylphosphine (0.890 g, 339 mmol) and water (20 uL) were added to a solution of 5-(2-Azidoethyl)indolin-2-one (0.343 g, 1.70 mmol) in THF (15 mL). The reaction mixture was heated at 60° C. for 1 h, before being evaporated to dryness and the residue purified by amine chromatography (KP—NH; 19:1 DCM:MeOH) to give the material as a pale yellow oil. Trituration with EtOAc afforded an off white solid (0.210 g, 1.19 mmol, 70%). Rf 0.36 (KP—NH; 19:1 DCM:MeOH); M.p. 136-139° C.; IR (cm⁻¹) 1562, 1623, 1694, 2851, 2919, 3024, 3080, 3155, 3326; $^1$H NMR (400 MHz, CDCl₃) 1.21 (2H, br, NH₂). 2.73 (2H, t, J=6.9 Hz, CH₂CH₂NH₂), 2.97 (2H, t, J=6.9 Hz, CH₂CH₂NH₂), 3.53 (2H, s, oxindole-CH₂), 6.82 (1H, d, J=7.9 Hz, H-7), 7.04-7.10 (2H, m, H-4/6), 9.02 (1H, br, oxindole-NH); $^{13}$C NMR (100 MHz, DMSO-d₆) 36.2 (oxindole-CH₂), 39.2 (CH₂CH₂NH₂), 44.0 (CH₂CH₂NH₂), 109.3 (Ar—C), 125.2 (Ar—C), 126.3 (Ar—C), 128.0 (Ar—C), 133.2 (Ar—C), 142.2 (Ar—C), 176.8 (C=O); HRMS calcd. for C₁₀H₁₃N₂O (ES+) m/z 177.102788 [M+H]+, found 177.099730.

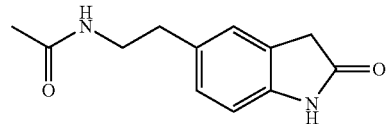 [SMILES: CC(=O)NCCc1ccc2c(c1)CC(=O)N2]

N-(2-(2-Oxoindolin-5-yl)ethyl)acetamide. Acetic anhydride (100 µL, 1.06 mmol) was added to an ice cold solution of 5-(2-Aminoethyl)indolin-2-one (0.170 g, 0.96 mmol) and triethylamine (200 uL, 1.44 mmol) in dry DCM (10 mL). The reaction was allowed to warm to RT and stirred for an additional 2 h before being diluted with DCM (20 mL) and washed with water (20 mL). The organic extract was dried (MgSO₄) and evaporated to dryness, and the crude residue was purified by silica gel chromatography (19:1 DCM:MeOH) to give the target compound as an off white solid (151 mg, 0.69 mmol, 72%). Rf 0.21 (19:1 DCM:MeOH); M.p. 189-192° C.; IR (cm⁻¹) 1562, 1623, 1693, 2851, 2919, 3024, 3080, 3155; $^1$H NMR (400 MHz, DMSO-d₆) 1.78 (3H, s, COCH3), 2.62 (2H, t, J=7.4 Hz, CH₂CH₂NH), 3.20 (2H, dt, J=7.4, 5.0 Hz, CH₂CH₂NH), 3.43 (2H, s, oxindole-CH₂), 6.73 (1H, d, J=7.8 Hz, H-7), 6.97-7.01 (1H, m, H-6), 7.04-7.06 (1H, m, H-4), 7.88 (1H, t, 5.0 Hz, CH₂CH₂NH), 10.28 (1H, s, oxindole-NH); $^{13}$C NMR (100 MHz, DMSO-d₆) 23.1 (acetyl-CH₃), 35.4 (CH₂CH₂NHAc), 36.2 (oxindole-CH₂), 41.0 (CH₂CH₂NHAc), 109.3 (Ar—C), 125.2 (Ar—C), 126.3 (Ar—C), 128.0 (Ar—C), 132.7 (Ar—C), 142.3 (Ar—C), 169.5 (C=O), 176.8 (C=O); HRMS calcd. for C₁₂H₁₅N₂O₂ (ES+) m/z 219.113353 [M+H]+, found 219.110391.

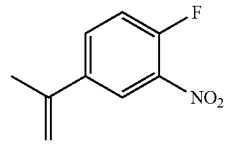

1-Fluoro-2-nitro-4-(prop-1-en-2-yl)benzene. 4-Bromo-1-fluoro-2-nitrobenzene (250 uL, 2.03 mmol), isopropeneboronic acid MIDA ester (0.600 g, 3.04 mmol), palladium acetate (25 mg, 0.10 mmol), SPhos (85 mg, 0.20 mmol) and K₃PO₄ (3.24 g, 15.2 mmol) were combined in dioxane/water (5:1, 20 mL). The reaction mixture was degassed with N₂ for 15 min before being heated in a sealed vial at 100° C. for 16 h. The mixture was filtered over celite and concentrated in vacuo, and the material was subjected to silica gel chromatography (9:1 Hexanes:EtOAc) to afford the target compound as a brown oil (0.232 g, 1.28 mmol, 63%). Rf 0.46 (9:1 Hexanes:EtOAc); IR (cm⁻¹) 1533, 1616, 2860, 2926, 3090; $^1$H NMR (400 MHz, CDCl₃) 2.17 (3H, br, C(CH'H)CH₃), 5.23 (1H, br, C(CH'H)CH₃), 5.43 (1H, br, C(CH'H)CH₃), 7.25 (1H, dd, J=10.6, 8.5 Hz, H-6), 7.71 (1H, ddd, J=8.5, 4.4, 2.5 Hz, H-5), 8.11 (1H, dd, J=7.0, 2.5 Hz, H-3); $^{13}$C NMR (100 MHz, CDCl₃) 21.6 (CH₃), 115.0 (d, $J_{CF}$=1.5 Hz, Ar—C), 118.1 (d, $J_{CF}$=20.8 Hz, Ar—C), 122.8 (d, $J_{CF}$=3.1 Hz, Ar—C), 132.3 (d, $J_{CF}$=8.8 Hz, Ar—C), 138.3 (d, $J_{CF}$=4.3 Hz, Ar—C), 154.7 (d, $J_{CF}$=265.6 Hz, Ar—C).

General procedure for the reaction of o-fluoronitrobenzenes with diethyl malonate: The relevant o-fluoronitrobenzene (1.0 equiv.), diethyl malonate (1.1-2.0 equiv.) and K₂CO₃ (1.8-2.5 equiv.) were combined in dry DMF (2.5 mL/mmol) and heated at 60° C. for 16 h. The solvent was removed in vacuo and the residue was suspended in water (10 mL/mmol) and the pH adjusted to pH 5. The product was extracted with Et$_2$O (2×20 mL/mmol) and the combined organic extracts washed with water (2×10 mL/mmol) and brine (10 mL/mmol), before being dried (MgSO$_4$) and evaporated to dryness. Additional purification was performed if required.

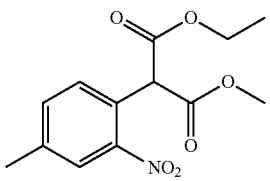

Diethyl 2-(4-methyl-2-nitrophenyl)malonate. 2-Methyl-5-fluoronitrobenzene (0.415 g, 2.67 mmol), diethyl malonate (450 μL, 2.94 mmol), K$_2$CO$_3$ (0.665 g, 4.82 mmol) and DMF (7 mL) were reacted according to the described general procedure. The target compound was isolated as a yellow oil (0.741 g, 2.50 mmol, 94%). Rf 0.31 (9:1 Hexanes:EtOAc); IR (cm$^{-1}$) 1531, 1732, 2984; $^1$H NMR (400 MHz, CDCl$_3$) 1.30 (6H, t, J=7.2 Hz, (OCH$_2$CH$_3$)$_2$), 2.46 (3H, s, ArCH$_3$), 4.28 (4H, q, J=7.2 Hz, (OCH$_2$CH$_3$)$_2$), 5.26 (1H, s, COCHCO), 7.40-7.48 (2H, m, H-5/6), 7.88-7.90 (1H, m, H-3); $^{13}$C NMR (100 MHz, CDCl$_3$) 14.0 (OCH$_2$CH$_3$), 21.9 (Ar—CH$_3$), 54.2 (CH(CO$_2$Et)$_2$), 62.2 (OCH$_2$CH$_3$), 125.3 (Ar—C), 125.5 (Ar—C), 131.0 (Ar—C), 134.2 (Ar—C), 139.8 (Ar—C), 148.6 (Ar—C), 167.4 (C=O); HRMS calcd. for C$_{14}$H$_{18}$NO$_6$ (ES+) m/z 296.113414 [M+H]+, found 296.112971.

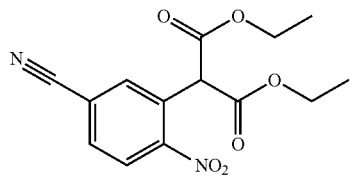 [SMILES: CCOC(=O)C(C(=O)OCC)c1cc(C#N)ccc1[N+](=O)[O-]]

Diethyl 2-(5-cyano-2-nitrophenyl)malonate. 3-Fluoro-4-nitrobenzonitrile (0.500 g, 3.01 mmol), diethyl malonate (505 μL, 3.31 mmol), K$_2$CO$_3$ (0.750 g, 5.41 mmol) and DMF (7 mL) were reacted according to the described general procedure. The desired product was isolated as a yellow oil (0.820 g, 2.68 mmol, 89%). Rf 0.25 (9:1 Hexanes:EtOAc); IR (cm$^{-1}$) 1532, 1731, 2238, 1939, 2985, 3087, 3116; $^1$H NMR (400 MHz, CDCl$_3$) 1.32 (6H, t, J=7.1 Hz, (OCH$_2$CH$_3$)$_2$), 4.27-4.33 (4H, m, (OCH$_2$CH$_3$)$_2$), 5.26 (1H, s, COCHCO), 7.84 (1H, dd, J=8.4, 1.8 Hz, H-4), 7.93 (1H, d, J=1.8 Hz, H-6), 8.13 (1H, d, J=8.4 Hz, H-3); $^{13}$C NMR (100 MHz, CDCl$_3$) 13.9 (OCH$_2$CH$_3$), 53.7 (CH(CO$_2$Et)$_2$), 62.9 (OCH$_2$CH$_3$), 116.5, 117.3, 125.7, 129.5, 132.9, 135.6, 151.0, 166.2 (C=O); HRMS calcd. for C$_{14}$H$_{15}$N$_2$O$_6$ (ES+) m/z 307.093013 [M+H]+, found 307.092986.

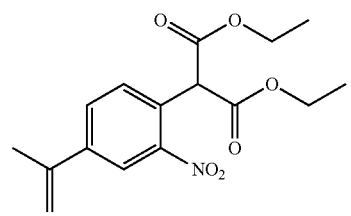 [SMILES: C=C(C)c1ccc(C(C(=O)OCC)C(=O)OCC)c([N+](=O)[O-])c1]

Diethyl 2-(2-nitro-4-(prop-1-en-2-yl)phenyl)malonate. 1-Fluoro-2-nitro-4-(prop-1-en-2-yl)benzene (115 mg, 0.63 mmol), diethyl malonate (194 μL, 1.27 mmol), K$_2$CO$_3$ (0.220 g, 1.59 mmol) and DMF (1.5 mL) were reacted according to the described general procedure. Following purification by silica gel chromatography (9:1 Hexanes:EtOAc) the target compound was obtained as a red oil (162 mg, 0.50 mmol, 80%). Rf 0.38 (9:1 Hexanes:EtOAc); IR (cm$^{-1}$) 1531, 1628, 1733, 2982; $^1$H NMR (400 MHz, CDCl$_3$) 1.25-1.32 (6H, m, (OCH$_2$CH$_3$)$_2$), 2.18 (3H, s, C(CH$^t$H)CH$_3$), 4.19-4.30 (4H, m, (OCH$_2$CH$_3$)$_2$), 5.26 (1H, s, C(CH$^t$H)CH$_3$), 5.27 (1H, s, COCHCO), 5.50 (1H, s, C(CH$^t$H)CH$_3$), 7.48 (1H, d, J=8.3 Hz, H-6), 7.72 (1H, dd, J=8.3, 1.8 Hz, H-5), 8.12 (1H, d, J=1.8 Hz, H-3); $^{13}$C NMR (100 MHz, CDCl$_3$) 14.0 (OCH$_2$CH$_3$), 21.4 (C(CH$_2$)CH$_3$), 54.3 (CH(CO$_2$Et)$_2$), 62.3 (OCH$_2$CH$_3$), 115.4, 122.0, 126.7, 130.2, 131.1, 140.6, 142.6, 148.8, 167.3 (C=O); HRMS calcd. for C$_{16}$H$_{20}$NO$_6$ (ES+) m/z 322.129063 [M+H]+, found 322.132865.

General procedure for the cyclization of nitrophenyl malonates to oxindoles: LiCl (2.0 equiv.) and water (1.0 equiv.) were added to a solution of the relevant nitrophenyl malonate (1.0 equiv.) DMSO (5 mL/mmol) and the mixture was heated at 100° C. for 3 h, before being poured onto ice water. The aqueous was extracted with EtOAc (2×20 mL/mmol) and the combined organic extracts were washed with water (4×10 mL/mmol) before being concentrated in vacuo. The residue was dissolved in AcOH (10 mL/mmol) to which iron powder (5.0 equiv.) was added, and the mixture was stirred at 100° C. for 2 h. The mixture was cooled and filtered, before being evaporated to dryness and the residue dissolved in sat. NaHCO$_3$ (20 mL/mmol), before being extracted with EtOAc (2×20 mL/mmol). The combined organic extracts were washed with brine (10 mL/mmol), evaporated to dryness and purified under necessary conditions.

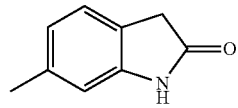

6-Methylindolin-2-one. Diethyl 2-(4-methyl-2-nitrophenyl)malonate (0.424 g, 1.44 mmol), LiCl (122 mg, 2.88 mmol), water (26 μL, 1.44 mmol), DMSO (7 mL), iron powder (0.403 g, 7.20 mmol) and AcOH (14 mL) were reacted according to the described general procedure. Purification on silica gel (1:1 Hexanes:EtOAc) gave the desired compound as a beige solid (161 mg, 1.09 mmol. 76%), Rf 0.38 (1:1 Hexanes:EtOAc); M.p. 162-165° C.; IR (cm$^{-1}$) 1623, 1662, 2651, 2758, 2834, 2918, 2952, 3049; $^1$H NMR (400 MHz, DMSO-d$_6$) 2.27 (3H, s, ArCH$_3$), 3.40 (2H, s, oxindole-CH$_2$), 6.62-6.65 (1H, m, H-7), 6.71-6.76 (1H, m, H-5), 7.07 (1H, d, J=7.3 Hz, H-4), 10.30 (1H, s, oxindole-NH); $^{13}$C NMR (100 MHz, DMSO-d$_6$) 21.7 (Ar—CH$_3$), 35.9 (oxindole-CH$_2$), 110.3 (Ar—C), 122.1 (Ar—C), 123.1 (Ar—C), 124.5 (Ar—C), 137.2 (Ar—C), 144.2 (Ar—C), 177.1 (C=O); HRMS calcd. for C$_9$H$_{10}$NO (ES+) m/z 148.076239 [M+H]+, found 148.074567.

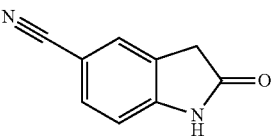 [SMILES: N#Cc1ccc2c(c1)CC(=O)N2]

2-Oxoindoline-5-carbonitrile. Diethyl 2-(5-cyano-2-nitrophenyl)malonte (0.510 g, 1.67 mmol), LiCl (141 mg, 3.33 mmol), water (30 μL, 1.67 mmol), DMSO (8 mL), iron powder (0.466 g, 8.35 mmol) and AcOH (16 mL) were reacted according to the described general procedure. Chromatography on silica gel (1:1 Hexanes:EtOAc) afforded the target compound as an off-white solid (186 mg, 1.18 mmol, 70%). Rf 0.30 (1:1 Hexanes:EtOAc); M.p. 232-235° C.; IR (cm$^{-1}$) 1620, 1711, 2217, 2675, 2705, 2841, 3002, 3099; $^1$H NMR (400 MHz, DMSO-d$_6$) 3.56 (2H, s, oxindole-CH$_2$), 6.95 (1H, d, J=7.9 Hz, H-7), 7.62-7.67 (2H, m, H-4/6), 10.84 (1H, s, oxindole-NH); $^{13}$C NMR (100 MHz, DMSO-d$_6$) 35.8 (oxindole-CH$_2$), 103.5, 110.2, 120.0, 127.6, 128.2, 133.4, 148.6, 176.7 (C=O); HRMS calcd. for C$_9$H$_7$N$_2$O (ES+) m/z 159.055838 [M+H]+, found 159.053840.

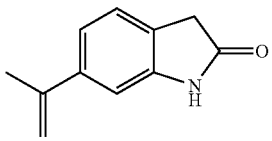

6-(Prop-1-en-2-yl)indolin-2-one. Diethyl 2-(2-nitro-4-(prop-1-en-2-yl)phenyl)malonate (112 mg, 0.35 mmol), LiCl (30 mg 0.70 mmol), water (6 μL, 0.35 mmol), DMSO (2 mL), iron powder (98 mg, 1.75 mmol) and AcOH (3.5 mL) were reacted according to the described general procedure. Purification by chromatography on silica (1:1 Hexanes:EtOAc) gave the desired product as a beige solid (51 mg, 0.29 mmol, 83%). Rf 0.38 (1:1 Hexanes:EtOAc); M.p. 127-129° C.; IR (cm$^{-1}$) 1623, 1696, 2847, 2927, 2967, 3089, 3150; $^1$H NMR (400 MHz, CDCl$_3$) 2.14 (3H, s, C(CH'H)CH$_3$), 3.54 (2H, s, oxindole-CH$_2$), 5.09 (1H, s, C(CH'H)CH$_3$), 5.34 (1H, s, C(CH'H)CH$_3$), 6.99 (1H, d, J=1.3 Hz, H-7), 7.12 (1H, dd, J=7.9, 1.3 Hz, H-5), 7.18 (1H, d, J=7.9 Hz, H-4), 8.39 (1H, br, oxindole-NH); $^{13}$C NMR (100 MHz, CDCl$_3$) 21.9 (C(CH$_2$)CH$_3$), 36.0 (oxindole-CH$_2$), 106.9, 112.9, 119.8, 124.3, 124.4, 141.6, 142.5, 143.0, 177.6 (C=O); HRMS calcd. for C$_{11}$H$_{12}$NO (ES+) m/z 174.091889 [M+H]+, found 174.091443.

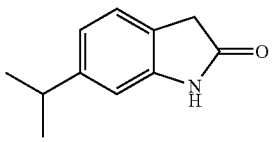

6-Isopropylindolin-2-one. Palladium on carbon (4 mg, 10% w/w) was added to a solution of oxindole 6-(Prop-1-en-2-yl)indolin-2-one (40 mg, 0.23 mmol) in methanol (2.5 mL). The reaction vessel was evacuated under vacuum and backflushed with hydrogen 3 times, before being stirred under a hydrogen atmosphere at RT for 16 h. The catalyst was removed via filtration over celite and the solvent was removed in vacua to afford the desired compound as an off white solid (40 mg, 0.23 mmol, quant.). Rf 0.41 (1:1 Hexanes:EtOAc); M.p. 111-114° C.; IR (cm$^{-1}$) 1623, 1678, 1708, 2869, 2921, 2961, 3274; $^1$H NMR (400 MHz, CDCl$_3$) 1.24 (6H, d, J=7.0 Hz, CH(CH$_3$)$_2$), 2.88 (1H, sept., J=7.0 Hz, CH(CH$_3$)$_2$), 3.51 (2H, s, oxindole-CH$_2$), 6.78 (1H, d, J=1.2 Hz, H-7), 6.88 (1H, dd, J=7.6, 1.2 Hz, H-5), 7.13 (1H, d, J=7.6 Hz, H-4), 8.57 (1H, br, oxindole-NH); $^{13}$C NMR (100 MHz, CDCl$_3$) 24.1 (CH(CH$_3$)$_2$), 34.3 (CH(CH$_3$)$_2$), 36.0 (oxindole-CH$_2$), 107.9 (Ar—C), 120.5 (Ar—C), 122.6 (Ar—C), 124.4 (Ar—C), 142.6 (Ar—C), 149.4 (Ar—C), 178.0 (C=O); HRMS calcd. for C$_{11}$H$_{14}$NO (ES+) m/z 176.107539 [M+H]+, found 176.108112.

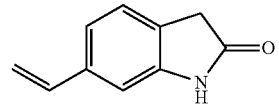

6-Vinylndolin-2-one. 6-Bromooxindole (50 mg, 0.24 mmol), tributyl(vinyl)tin (83 uL, 0.28 mmol), Pd(PPh$_3$)$_2$Cl$_2$ (8 mg, 0.012 mmol), LiCl (30 mg, 0.71 mmol) and BHT (1 mg, 0.005 mmol) were combined in MeCN (2.5 mL) and the reaction mixture was degassed with nitrogen for 15 min, before being heated at 80° C. for 16 h. The reaction mixture was cooled, filtered through celite and evaporated to dryness. The crude residue was purified on silica gel (1:1 Hexanes:EtOAc) to afford the target compound as a pale orange solid (35 mg, 0.22 mmol, 91%). Rf 0.34 (1:1 Hexanes:EtOAc); M.p. 147-149° C.; IR (cm$^{-1}$) 1622, 1663, 1712, 2041, 2095, 2120, 2172, 2747, 2875, 3000, 3076, 3155; $^1$H NMR (400 MHz, DMSO-d$_6$) 3.46 (2H, s, oxindole-CH$_2$), 5.22 (1H, dd, J=11.4, 0.8 Hz, ArCHCH$_{cis}$H$_{trans}$), 5.74 (1H, dd, J=17.2, 0.8 Hz, ArCHCH$_{cis}$H$_{trans}$), 6.71 (1H, dd, J=17.2, 11.4 Hz, ArCHCH$_2$), 6.90 (1H, d, J=1.4 Hz, H-7), 7.02 (1H, dd, J=7.6, 1.4 Hz, H-5), 7.18 (1H, d, J=7.6 Hz, H-4), 10.40 (1H, s, oxindole-NH); $^{13}$C NMR (100 MHz, DMSO-d$_6$) 36.1 (oxindole-CH$_2$), 106.5, 114.1, 120.2, 124.9, 126.2, 137.1, 137.3, 144.6, 176.9 (C=O); HRMS calcd. for C$_{10}$H$_{10}$NO (ES+) m/z 160.076239 [M+H]+, found 160.076417.

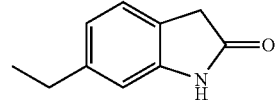

6-Ethylindolin-2-one. Palladium on carbon (7 mg, 10% w/w) was added to a solution of oxindole 6-Vinylindolin-2-one (68 mg, 0.43 mmol) in methanol (4 mL). The reaction flask was evacuated under vacuum and back filled with hydrogen 3 times, before being stirred under a hydrogen atmosphere at RT for 16 h. The catalyst was removed by filtration over celite and the solvent was removed in vacuo to give the desired compound as a pale brown solid (65 mg, 0.40 mmol, 93%). Rf0.37 (1:1 Hexanes:EtOAc); M.p. 100-103° C.; IR (cm$^{-1}$) 1624, 1687, 2773, 2863, 2926, 2957, 3013, 3062, 3113; $^1$H NMR (400 MHz, DMSO-d$_6$) 1.15 (3H, t, J=7.4 Hz, CH$_2$CH$_3$), 2.56 (2H, q, J=7.4 Hz, CH$_2$CH$_3$), 3.40 (2H, s, oxindole-CH$_2$), 6.64-6.66 (1H, m, H-7), 6.75-6.78 (1H, m, H-5), 7.09 (1H, d, J=7.5 Hz, H-4), 10.31 (1H, s, oxindole-NH); $^{13}$C NMR (100 MHz, DMSO-d$_6$) 16.3 (CH$_2$CH$_3$), 28.8 (CH$_2$CH$_3$), 36.0 (oxindole-CH$_2$), 109.1 (Ar—C), 121.0 (Ar—C), 123.4 (Ar—C), 124.6 (Ar—C), 143.8 (Ar—C), 144.3 (Ar—C), 177.1 (C=O); HRMS calcd. for C$_{10}$H$_{12}$NO (ES+) m/z 162.091889 [M+H]+, found 162.090878.

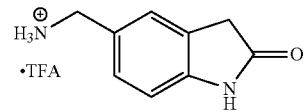 [SMILES: [NH3+]Cc1ccc2c(c1)CC(=O)N2]

(2-Oxoindolin-5-yl)methanaminium trifluoroacetate. Palladium on carbon (13 mg, 10% w/w) was added to a solution of 2-Oxoindoline-5-carbonitrile (130 mg, 0.82 mmol) in methanol (9.5 mL) and TFA (0.5 mL). The reaction vessel was evacuated under vacuum and backflushed with hydrogen 3 times, before being stirred under a hydrogen atmosphere at RT for 16 h. The catalyst was removed over celite and the solvent was evaporated in vacuo to afford the desired compound as a brown solid (0.221 g, 0.80 mmol, 97%). Rf 0.33 (KP—NH; 19:1 DCM:MeOH); M.p. 212-215° C.; IR (cm$^{-1}$) 1574, 1626, 1682, 2600, 2970, 3142, 3203; $^1$H NMR (400 MHz, DMSO-d$_6$) 3.50 (2H, s, oxindole-CH$_2$), 3.91-4.03 (2H, m, CH$_2$NH$_3^+$), 6.85 (1H, d, J=7.9 Hz, H-7), 7.24-7.30 (2H, m, H-4/6), 8.17 (3H, br, CH$_2$NH$_3^+$), 10.51 (1H, s, oxindole-NH); $^{13}$C NMR (100 MHz, DMSO-d$_6$) 36.1 (oxindole-CH$_2$), 42.8 (CH$_2$NH$_3^+$), 109.5 (Ar—C), 117.8 (q, J$_{CF}$=295.8 Hz, CF$_3$), 125.7 (Ar—C), 126.6 (Ar—C), 127.1 (Ar—C), 129.1 (Ar—C), 144.5 (Ar—C), 158.7 (q, J$_{CF}$=30.4 Hz, TFA-C=O), 176.8 (oxindole-C=O); HRMS calcd. for C$_9$H$_{11}$N$_2$O (ES+) m/z 163.087138 [M+H]+, found 163.085660.

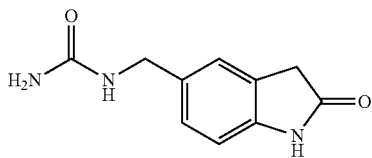 [SMILES: NC(=O)NCc1ccc2c(c1)CC(=O)N2]

1-((2-Oxoindolin-5-yl)methyl)urea. Potassium cyanate (139 mg, 1.71 mmol) in water (2 mL) was added to (2-Oxoindolin-5-yl)methanaminium trifluoroacetate (0.315 g, 1.14 mmol) in water (3 mL). The resultant mixture was stirred at RT for 16 h, before the precipitate was removed by filtration, washed with cold water and dried under vacuum. The desired product was obtained as a beige solid (0.189 g, 0.92 mmol, 81%). Rf 0.39 (19:1 DCM:MeOH); M.p. 240-250° C. (decomposed); IR (cm$^{-1}$) 1558, 1590, 1650, 1696, 2869, 2918, 3072, 3201, 3292, 3413; $^1$H NMR (400 MHz, DMSO-d$_6$) 3.45 (2H, s, oxindole-CH$_2$), 4.10 (2H, d, J=5.9 Hz, CH$_2$NH) 5.47 (2H, s, CONH$_2$), 6.32 (1H, t, J=5.9 Hz, CH$_2$NH), 6.74 (1H, d, J=7.8 Hz, H-7), 7.03-7.07 (1H, m, H-6), 7.09-7.12 (1H, m, H-4), 10.32 (1H, s, oxindole-NH); $^{13}$C NMR (100 MHz, DMSO-d$_6$) 36.2 (oxindole-CH$_2$), 43.2 (CH$_2$NH), 109.1 (Ar—C), 124.0 (Ar—C), 126.3 (Ar—C), 126.8 (Ar—C), 134.2 (Ar—C), 142.7 (Ar—C), 159.1 (C=O), 176.9 (C=O); HRMS calcd. for C$_{10}$H$_{12}$N$_3$O$_2$ (ES+) m/z 206.092952 [M+H]+, found 206.094217.

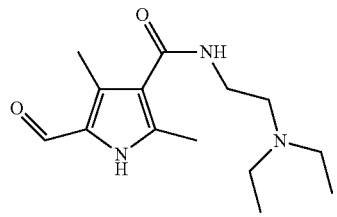 [SMILES: CCN(CC)CCNC(=O)c1c(C)[nH]c(C=O)c1C]

N-(2-(Diethylamino)ethyl)-5-formyl-2,4-dimethyl-1H-pyrrole-3-carboxamide. 5-Formyl-2,4-dimethyl-1H-pyrrole-3-carboxylic acid (0.500 g, 2.99 mmol) was dissolved in dry DMF (10 mL), to which 1-ethyl-3-(3-dimethylaminopropyl)carbodiimide (EDC) (635 µL, 3.59 mmol), 1-hydroxybenzotriazole (HOBt) (0.485 g, 3.59 mmol) and N,N-diethylethylenediamine (505 µL, 3.59 mmol) were added. The reaction mixture was stirred at RT for 16 h, before the solvent was removed in vacuo and the residue was partitioned between sat. NaHCO$_3$ solution (50 mL) and EtOAc (50 mL), and the aqueous phase was extracted with further EtOAc (50 mL). The combined organic extracts were washed with brine (50 mL) before being concentrated in vacuo and the residue triturated with 3:1 hexaries:Et$_2$O (30 mL) and the suspension stirred for 30 min. The mixture was filtered and the filtrand was dried under air to give the desired product as a beige solid (0.627 g, 2.36 mmol, 79%). M.p. 135-138° C.; IR (cm$^{-1}$) 1533, 1621, 2138, 2187, 2807, 2925, 2965, 3251; $^1$H NMR (400 MHz, DMSO-d$_6$) 0.97 (6H, t, J=7.0 Hz, N(CH$_2$CH$_3$)$_2$), 2.32 (3H, s, pyrrole-CH$_3$), 2.37 (3H, s, pyrrole-CH$_3$), 2.47-2.54 (6H, to N(CH$_2$CH$_3$)$_2$ and NHCH$_2$CH$_2$NEt$_2$), 3.26 (2H, dt, J=6.6, 6.2 Hz, NHCH$_2$CH$_2$NEt$_2$), 7.33 (1H, t, J=6.2 Hz, NHCH$_2$CH$_2$NEt$_2$), 9.54 (1H, s, CHO), 11.83 (1H, s, pyrrole-NH); $^{13}$C NMR (100 MHz, DMSO-d$_6$) 10.1 (pyrrole-CH$_3$), 12.3 (N(CH$_2$CH$_3$)$_2$), 12.9 (pyrrole-CH$_3$), 37.4 (NHCH$_2$CH$_2$NEt$_2$), 47.0 (N(CH$_2$CH$_3$)$_2$), 52.1 (NHCH$_2$CH$_2$NEt$_2$), 119.9 (Ar—C), 128.2 (Ar—C), 138.3 (Ar—C), 164.8 (C=O), 177.7 (C=O); HRMS calcd. for C$_{14}$H$_{24}$N$_3$O$_2$ (ES+) m/z 266.186852 [M+H]+, found 266.183829.

General procedure for the coupling of oxindoles to N-(2-(Diethylamino)ethyl)-5-formyl-2,4-dimethyl-1H-pyrrole-3-carboxamide: The relevant oxindole (1.0 equiv.), N-(2-(Diethylamino)ethyl)-5-formyl-2,4-dimethyl-1H-pyrrole-3-carboxamide (1.05 equiv.) and pyrrolidine (2.0 equiv.) were combined in EtOH (10 mL/mmol) and heated to reflux for 3 h. The reaction was cooled to RT and the resultant precipitate collected by filtration and washed with cold EtOH. Additional purification was performed on the filtrand if necessary. If no precipitate formed the solvent was removed in vacuo and further purification performed.

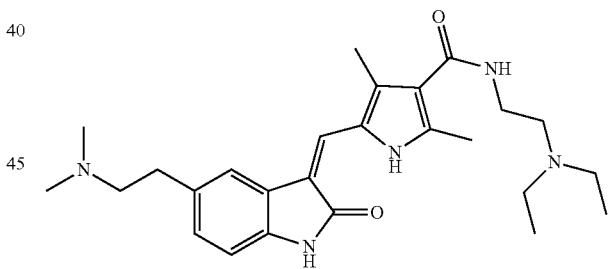

(Z)—N-(2-(Diethylamino)ethyl)-5-((5-(2-(dimethylamino)ethyl)-2-oxoindolin-3-ylidene)methyl)-2,4-dimethyl-1H-pyrrole-3-carboxamide (Compound No. 12). 5-(2-(Dimethylamino)ethyl)indolin-2-one (78 mg, 0.37 mmol), N-(2-(Diethylamino)ethyl)-5-formyl-2,4-dimethyl-1H-pyrrole-3-carboxamide (106 mg, 0.40 mmol), pyrrolidine (63 µL, 0.76 mmol) and EtOH (4 mL) were reacted according to the described general procedure. Purification on amine silica gel (KP—NH; 19:1 DCM:MeOH) afforded the target compound as a yellow solid (63 mg, 0.14 mmol, 38%). Rf 0.51 (KP—NH; 19:1 DCM:MeOH); M.p. 221-223° C.; IR (cm$^{-1}$) 1535, 1624, 1672, 2760, 2808, 2861, 2927, 2966, 3021, 3152, 3272; $^1$H NMR (400 MHz, DMSO-d$_6$) 0.98 (6H, t, J=7.0 Hz, N(CH$_2$CH$_3$)$_2$), 2.20 (6H, s, N(CH$_3$)$_2$), 2.43 (3H, s, pyrrole-CH$_3$), 2.44 (3H, s, pyrrole-CH$_3$), 2.46-2.57 (8H, m, N(CH$_2$CH$_3$)$_2$, CH$_2$CH$_2$NMe$_2$ and NHCH$_2$CH$_2$NEt$_2$), 2.69 (2H, t, J=7.2 Hz, CH$_2$CH$_2$NMe$_2$), 3.29 (2H, dt, J=6.6, 5.6 Hz, NHCH$_2$CH$_2$NEt$_2$), 6.77 (1H, d, J=7.8 Hz, H-7), 6.97 (1H, dd, J=1.3 Hz, H-6), 7.38 (1H, t, J=5.6 Hz, NHCH$_2$CH$_2$NEt$_2$), 7.61 (1H, s, alkene-CH), 7.65 (1H, d, J=1.3 Hz, H-4), 10.79 (1H, s, oxindole-NH), 13.66 (1H, s, pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 33.9 (CH$_2$CH$_2$NMe$_2$), 37.5 (NHCH$_2$CH$_2$NEt$_2$), 45.6 (N(CH$_3$)$_2$), 47.0 (N(CH$_2$CH$_3$)$_2$), 52.2 (NHCH$_2$CH$_2$NEt$_2$), 61.9 (CH$_2$CH$_2$NMe$_2$), 109.6 (Ar—C), 115.9 (Ar—C), 119.3 (Ar—C), 120.8 (Ar—C), 123.6 (Ar—C), 126.0 (Ar—C), 126.2 (Ar—C), 127.2 (Ar—C), 129.2 (Ar—C), 133.7 (Ar—C), 136.0 (Ar—C), 137.1 (Ar—C), 165.1 (C=O), 170.0 (C=O); HRMS calcd. for C$_{26}$H$_{38}$N$_5$O$_2$ (ES+) m/z 452.302550 [M+H]+, found 452.297258.

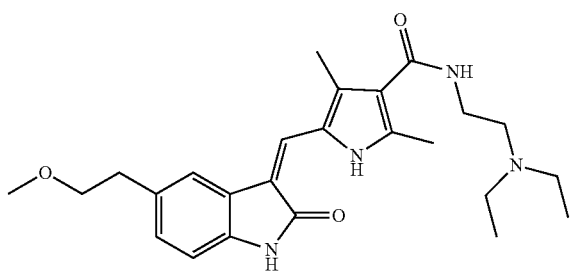 [SMILES: CCN(CC)CCNC(=O)c1c(C)[nH]c(/C=C2\C(=O)Nc3ccc(CCOC)cc32)c1C]

(Z)—N-(2-(Diethylamino)ethyl)-5-((5-(2-methoxyethyl)-2-oxoindolin-3-ylidene)methyl)-2,4-dimethyl-1H-pyrrole-3-carboxamide (Compound No. 9). Oxindole CM-244 (40 mg, 0.21 mmol), N-(2-(Diethylamino)ethyl)-5-formyl-2,4-dimethyl-1H-pyrrole-3-carboxamide (58 mg, 0.22 mmol), pyrrolidine (34 μL, 0.42 mmol) and EtOH (2 mL) were reacted according to the described general procedure. Purification on silica gel (1:1 DCM:MeOH) afforded the target compound as a yellow solid (38 mg, 0.09 mmol, 41%). Rf 0.26 (1:1 DCM:MeOH); M.p. 185-188° C.; IR (cm$^{-1}$) 1552, 1620, 2804, 2856, 2920, 3026, 3155; $^1$H NMR (400 MHz, DMSO-d$_6$) 0.98 (6H, t, J=7.1 Hz, N(CH$_2$CH$_3$)$_2$), 2.42 (3H, s, pyrrole-CH$_3$), 2.44 (3H, s, pyrrole-CH$_3$), 2.47-2.58 (6H, m, N(CH$_2$CH$_3$)$_2$ and NHCH$_2$CH$_2$NEt$_2$), 2.80 (2H, t, J=7.1 Hz, CH$_2$CH$_2$OMe), 2.36 (3H, s, OCH$_3$), 3.27-3.36 (2H, m, NHCH$_2$CH$_2$NEt$_2$), 3.55 (2H, t, J=7.1 Hz, CH$_2$CH$_2$OMe), 6.78 (1H, d, 7.8 Hz, H-7), 6.98 (1H, dd, J=7.8, 1.4 Hz, H-6), 7.61 (1H, s, alkene-CH), 7.66 (1H, d, J=1.4 Hz, H-4), 10.80 (1H, s, oxindole-NH), 13.64 (1H, s, pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 35.9 (CH$_2$CH$_2$OMe), 37.5 (NHCH$_2$CH$_2$NEt$_2$), 47.0 (N(CH$_2$CH$_3$)$_2$), 52.2 (NHCH$_2$CH$_2$NEt$_2$), 58.3 (OCH$_3$), 73.8 (CH$_2$CH$_2$OMe), 109.6 (Ar—C), 115.8 (Ar—C), 119.5 (Ar—C), 120.8 (Ar—C), 123.6 (Ar—C), 126.0 (Ar—C), 126.2 (Ar—C), 127.4 (Ar—C), 129.3 (Ar—C), 132.1 (Ar—C), 136.0 (Ar—C), 137.3 (Ar—C), 165.1 (C=O), 170.0 (C=O); HRMS calcd. for C$_{25}$H$_{35}$N$_4$O$_3$ (ES+) m/z 439.270916 [M+H]+, found 439.262776.

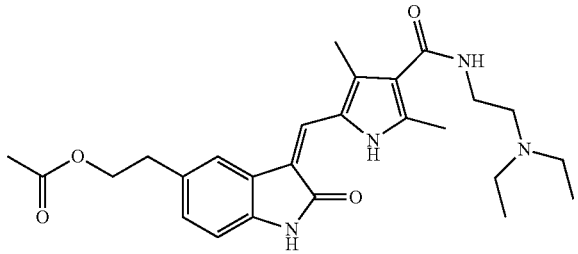 [SMILES: CCN(CC)CCNC(=O)c1c(C)[nH]c(/C=C2\C(=O)Nc3ccc(CCOC(C)=O)cc32)c1C]

(Z)-2-(3-((4-((2-(Diethylamino)ethyl)carbamoyl)-3,5-dimethyl-1H-pyrrol-2-yl)methylene)-2-oxoindolin-5-yl)ethyl acetate (Compound No. 11). 2-(2-Oxoindolin-5-yl)ethyl acetate (100 mg, 0.46 mmol), N-(2-(Diethylamino)ethyl)-5-formyl-2,4-dimethyl-1H-pyrrole-3-carboxamide (127 mg, 0.48 mmol), pyrrolidine (75 μL, 0.91 mmol) and EtOH (4.5 mL) were reacted according to the described general procedure. The desired product was obtained as a yellow solid (111 mg, 0.24 mmol, 52%). Rf 0.25 (1:1 DCM:MeOH); M.p. 209-212° C.; IR (cm$^{-1}$) 1538, 1570, 1625, 1673, 1730, 2809, 2927, 2968, 3026, 3160, 3275; $^1$H NMR (400 MHz, DMSO-d$_6$) 0.98 (6H, t, J=7.1 Hz, N(CH$_2$CH$_3$)$_2$), 2.00 (3H, s, acetyl-CH$_3$), 2.42 (3H, s, pyrrole-CH$_3$), 2.44 (3H, s, pyrrole-CH$_3$), 2.48-2.58 (6H, m, N(CH$_2$CH$_3$)$_2$ and NHCH$_2$CH$_2$NEt$_2$), 2.87 (2H, t, J=7.0 Hz, CH$_2$CH$_2$OAc), 3.28 (2H, dt, J=6.5, 5.5 Hz, NHCH$_2$CH$_2$NEt$_2$), 4.23 (2H, t, J=7.0 Hz, CH$_2$CH$_2$OAc), 6.81 (1H, d, J=7.9 Hz, H-7), 7.00 (1H, dd, J=7.9, 1.4 Hz, H-6), 7.39 (1H, t, J=5.5 Hz, NHCH$_2$CH$_2$NEt$_2$), 7.63 (1H, s, alkene-CH), 7.70 (1H, d, J=1.4 Hz, H-4), 10.83 (oxindole-NH), 13.63 (pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 21.2 (acetyl-CH$_3$), 34.8 (CH$_2$CH$_2$OAc), 37.5 (NHCH$_2$CH$_2$NEt$_2$), 47.0 (N(CH$_2$CH$_3$)$_2$), 52.2 (NHCH$_2$CH$_2$NEt$_2$), 65.2 (CH$_2$CH$_2$OAc), 109.7 (Ar—C), 115.7 (Ar—C), 119.5 (Ar—C), 120.9 (Ar—C), 123.8 (Ar—C), 126.2 (Ar—C), 126.2 (Ar—C), 127.4 (Ar—C), 129.4 (Ar—C), 131.0 (Ar—C), 136.1 (Ar—C), 137.5 (Ar—C), 165.1 (C=O), 170.0 (C=O), 170.8 (C=O); HRMS calcd. for C$_{26}$H$_{35}$N$_4$O$_4$ (ES+) m/z 467.265831 [M+H]+, found 467.258930.

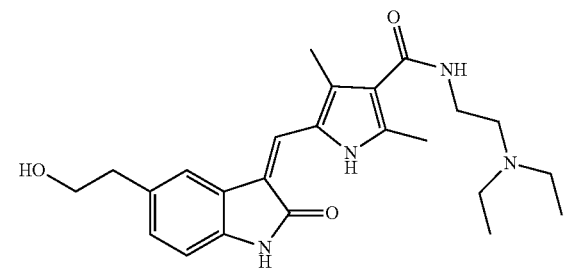 [SMILES: CCN(CC)CCNC(=O)c1c(C)[nH]c(/C=C2\C(=O)Nc3ccc(CCO)cc32)c1C]

(Z)—N-(2-(Diethylamino)ethyl)-5-((5-(2-hydroxyethyl)-2-oxoindolin-3-ylidene)methyl)-2,4-dimethyl-1H-pyrrole-3-carboxamide (Compound No. 10). To a solution of Compound No. 11 (36 mg, 0.08 mmol) in MeOH/Dioxane (1:1, 1 mL) was added 2M NaOH (310 μL, 0.62 mmol) and the resultant mixture was stirred at RT for 6 h. The solvent was removed in vacuo and the resultant residue was suspended in water (2 mL) and the pH was adjusted to pH 7. The aqueous sample was extracted with chloroform (3×5 mL) and the combined organic extracts were washed with brine (5 mL) and dried (MgSO$_4$) before being evaporated to dryness. The resultant residue was purified on silica gel (1:1 DCM:MeOH) to afford the target compound as an orange solid (28 mg, 0.07 mmol, 84%). Rf 0.20 (1:1 DCM:MeOH); M.p. 194-196° C.; IR (cm$^{-1}$) 1533, 1566, 1619, 1665, 2808, 2869, 2926, 2965, 3021, 3157, 3322; $^1$H NMR (400 MHz, DMSO-d$_6$) 0.98 (6H, t, J=7.1 Hz, N(CH$_2$CH$_3$)$_2$), 2.42 (3H, s, pyrrole-CH$_3$), 2.44 (3H, s, pyrrole-CH$_3$), 2.47-2.56 (6H, m, N(CH$_2$CH$_3$)$_2$ and NHCH$_2$CH$_2$NEt$_2$), 2.72 (2H, t, J=7.2 Hz, CH$_2$CH$_2$OH), 3.28 (2H, dt, J=6.4, 5.5 Hz, NHCH$_2$CH$_2$NEt$_2$), 3.62 (2H, dt, J=7.2, 5.2 Hz, CH$_2$CH$_2$OH), 4.61 (1H, t, J=5.2 Hz, OH), 6.78 (1H, d, J=7.8 Hz, H-7), 6.95-6.98 (1H, m, H-6), 7.39 (1H, t, J=5.5 Hz, NHCH$_2$CH$_2$NEt$_2$), 7.61 (1H, s, alkene-CH), 7.64 (1H, br, H-4), 10.78 (oxindole-NH), 13.64 (pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 37.5 (NHCH$_2$CH$_2$NEt$_2$), 47.0 (N(CH$_2$CH$_3$)$_2$), 52.2 (NHCH$_2$CH$_2$NEt$_2$), 63.1 (CH$_2$CH$_2$OH), 109.6 (Ar—C), 115.9 (Ar—C), 119.6 (Ar—C), 120.8 (Ar—C), 123.6 (Ar—C), 125.9 (Ar—C), 126.2 (Ar—C), 127.5 (Ar—C), 129.2 (Ar—C). 132.7 (Ar—C), 136.0 (Ar—C), 137.1 (Ar—C), 165.1 (C=O), 170.0 (C=O); HRMS calcd. for C$_{24}$H$_{33}$N$_4$O$_3$ (ES+) m/z 425.255266 [M+H]+, found 425.250845.

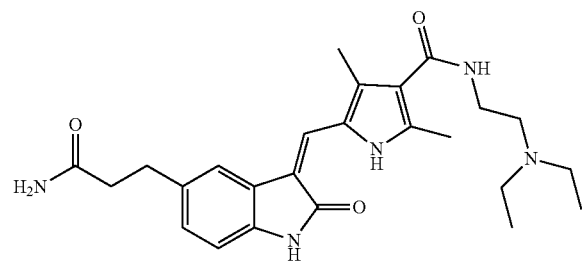 [SMILES: CCN(CC)CCNC(=O)c1c(C)[nH]c(/C=C2\C(=O)Nc3ccc(CCC(N)=O)cc32)c1C]

(Z)-5-((5-(3-Amino-3-oxopropyl)-2-oxoindolin-3-ylidene)methyl)-N-(2-(diethylamino)ethyl)-2,4-dimethyl-1H-pyrrole-3-carboxamide (Compound No. 16). 3-(2-Oxoindolin-5-yl)propanamide (30 mg, 0.15 mmol), N-(2-(Diethylamino)ethyl)-5-formyl-2,4-dimethyl-1H-pyrrole-3-carboxamide (41 mg, 0.15 mmol), pyrrolidine (24 μL, 0.29 mmol) and EtOH (1.5 mL) were reacted according to the described general procedure. The target compound was obtained as a yellow solid (39 mg, 0.09 mmol, 57%). Rf 0.17 (1:1 DCM:MeOH); M.p. 250-253° C.; IR (cm$^{-1}$) 1537, 1623, 1658, 2814, 2924, 2966, 3021, 3194, 3280, 3436; $^1$H NMR (400 MHz, DMSO-d$_6$) 0.98 (6H, t, J=7.0 Hz, N(CH$_2$CH$_3$)$_2$), 2.40 (2H, t, J=7.6 Hz, CH$_2$CH$_2$CONH$_2$), 2.42 (3H, s, pyrrole-CH$_3$), 2.44 (3H, s, pyrrole-CH$_3$), 2.48-2.59 (6H, m, N(CH$_2$CH$_3$)$_2$ and NHCH$_2$CH$_2$NEt$_2$), 2.80 (2H, t, J=7.6 Hz, CH$_2$CH$_2$CONH$_2$), 3.29 (2H, dt, J=6.3, 5.3 Hz, NHCH$_2$CH$_2$NEt$_2$), 6.73-6.80 (2H, m, H-7 and CONN'H). 6.94-6.99 (1H, m, H-6), 7.27 (1H, br, CONH'H), 7.39 (1H, t, J=5.3 Hz, NHCH$_2$CH$_2$NEt$_2$), 7.60 (1H, s, alkene-CH), 7.75 (1H, br, H-4), 10.79 (oxindole-NH), 13.64 (pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 31.5 (CH$_2$CH$_2$CONH$_2$), 37.4, 37.8, 47.0 (N(CH$_2$CH$_3$)$_2$), 52.2 (NHCH$_2$CH$_2$NEt$_2$), 109.6 (Ar—C), 115.9 (Ar—C), 118.9 (Ar—C), 120.8 (Ar—C), 123.5 (Ar—C), 126.0 (Ar—C), 126.2 (Ar—C), 126.8 (Ar—C), 129.2 (Ar—C), 134.8 (Ar—C), 136.0 (Ar—C), 137.1 (Ar—C), 165.1 (C=O), 170.0 (C=O), 174.0 (C=O); HRMS calcd. for C$_{25}$H$_{34}$N$_5$O$_3$ (ES+) m/z 452166165 [M+H]+, found 452.256003.

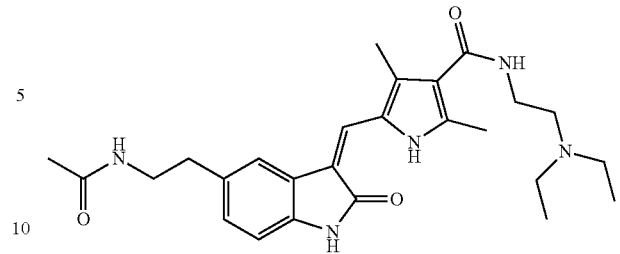

(Z)-5-((5-(2-Acetamidoethyl)-2-oxoindolin-3-ylidene)methyl)-N-(2-(diethylamino)ethyl)-2,4-dimethyl-1H-pyrrole-3-carboxamide (Compound No. 14), N-(2-(2-Oxoindolin-5-yl)ethyl)acetamide (184 mg, 0.84 mmol), N-(2-(Diethylamino)ethyl)-5-formyl-2,4-dimethyl-1H-pyrrole-3-carboxamide (0.235 g, 0.89 mmol), pyrrolidine (138 μL, 1.69 mmol) and EtOH (8.5 mL) were reacted according to the described general procedure. The target compound was isolated as a yellow solid (0.242 g, 0.52 mmol, 62%). Rf 0.21 (1:1 DCM:MeOH); M.p. 245-248° C.; IR (cm$^{-1}$) 1540, 1629, 1673, 2816, 2921, 2966, 3024, 3153, 3265, 3321; $^1$H NMR (400 MHz, DMSO-d$_6$) 0.98 (6H, t, J=7.0 Hz, N(CH$_2$CH$_3$)$_2$), 1.80 (3H, s, acetyl-CH$_3$), 2.42 (3H, s, pyrrole-CH$_3$), 2.44 (3H, s, pyrrole-CH$_3$), 2.48-2.58 (6H, m, N(CH$_2$CH$_3$)$_2$ and NHCH$_2$CH$_2$NEt$_2$), 2.69 (2H, t, J=7.6 Hz, CH$_2$CH$_2$NHAc), 3.24-3.32 (4H, m, NHCH$_2$CH$_2$NEt$_2$ and CH$_2$CH$_2$NHAc), 6.80 (1H, d, J=7.9 Hz, H-7), 6.95 (1H, dd, J=7.9, 1.2 Hz, H-6), 7.39 (1H, t, J=5.6 Hz, NHCH$_2$CH$_2$NEt$_2$), 7.62 (1H, s, alkene-CH), 7.65 (1H, d, J=1.2 Hz, H-4), 7.90 (1H, t, J=5.4 Hz, CH$_2$CH$_2$NHAc), 10.81 (oxindole-NH), 13.65 (pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 23.1 (acetyl-CH$_3$), 35.7 (CH$_2$CH$_2$NHAc), 37.5 (NHCH$_2$CH$_2$NEt$_2$), 41.1 (CH$_2$CH$_2$NHAc), 47.0 (N(CH$_2$CH$_3$)$_2$), 52.2 (NHCH$_2$CH$_2$NEt$_2$), 109.7 (Ar—C), 115.8 (Ar—C), 119.3 (Ar—C), 120.8 (Ar—C), 123.7 (Ar—C), 126.1 (Ar—C), 126.2 (Ar—C), 127.2 (Ar—C), 129.3 (Ar—C), 132.8 (Ar—C), 136.0 (Ar—C), 137.3 (Ar—C), 165.1 (C=O), 169.5 (C=O), 170.0 (C=O); HRMS calcd. for C$_{26}$H$_{36}$N$_5$O$_3$ (ES+) m/z 466.281815 [M+H]+, found 466.274541.

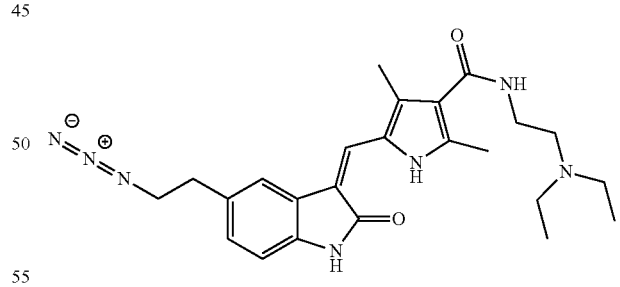

(Z)-5-((5-(2-Azidoethyl)-2-oxoindolin-3-ylidene)methyl)-N-(2-(diethylamino)ethyl)-2,4-dimethyl-1H-pyrrole-3-carboxamide (Compound No. 13). 5-(2-Azidoethyl)indolin-2-one (153 mg, 0.76 mmol), N-(2-(Diethylamino)ethyl)-5-formyl-2,4-dimethyl-1H-pyrrole-3-carboxamide (0.211 g, 0.79 mmol), pyrrolidine (124 μL, 1.51 mmol) and EtOH (7.5 mL) were reacted according to the described general procedure. Purification of KP—NH silica gel (KP—NH; 3:2 Hexanes:Acetone) gave the desired compound as a yellow solid (0.232 g, 0.52 mmol, 68%). Rf 0.32 (KP—NH; 3:2 Hexanes:Acetone); M.p. 172-174° C.; (cm$^{-1}$) 1536, 1621, 1669, 2097, 2807, 2868, 2922, 2965, 3023, 3159, 3235; $^1$H NMR (400 MHz, DMSO-d$_6$) 0.98 (6H, t, J=7.1 Hz, N(CH$_2$CH$_3$)$_2$), 2.43 (3H, s, pyrrole-CH$_3$), 2.44 (3H, s, pyrrole-CH$_3$), 2.48-2.58 (6H, m, N(CH$_2$CH$_3$)$_2$ and NHCH$_2$CH$_2$NEt$_2$), 2.85 (2H, t, J=7.1 Hz, CH$_2$CH$_2$N$_3$), 3.29 (2H, dt, J=6.3, 5.3 Hz, NHCH$_2$CH$_2$NEt$_2$), 3.59 (2H, t, J=7.1 Hz, CH$_2$CH$_2$N$_3$), 6.82 (1H, d, J=7.8 Hz, H-7), 7.02-7.05 (1H, m, H-6), 7.41 (1H, t, J=5.3 Hz, NHCH$_2$CH$_2$NEt$_2$), 7.62 (1H, s, alkene-CH), 7.72 (1H, br, H-4), 10.84 (oxindole-NH), 13.63 (1H, s, pyrrole-NH); $^{13}$C NMR (100 MHz, DMSO-d$_6$) 11.1 (pyrrole-CH$_3$), 12.3 (N(CH$_2$CH$_3$)$_2$), 13.8 (pyrrole-CH$_3$), 35.0 (CH$_2$CH$_2$N$_3$), 37.4 (NHCH$_2$CH$_2$NEt$_2$), 47.0 (N(CH$_2$CH$_3$)$_2$), 52.1, 52.3, 109.7 (Ar—C), 115.7 (Ar—C), 119.4 (Ar—C), 120.9 (Ar—C), 123.7 (Ar—C), 126.2 (Ar—C), 126.3 (Ar—C), 127.4 (Ar—C), 129.4 (Ar—C), 131.4 (Ar—C), 136.2 (Ar—C), 137.6 (Ar—C), 165.1 (C=O), 170.0 (C=O); HRMS calcd. for C$_{24}$H$_{32}$N$_7$O$_2$ (ES+) m/z 450.261748 [M+H]+, found 450.266209.

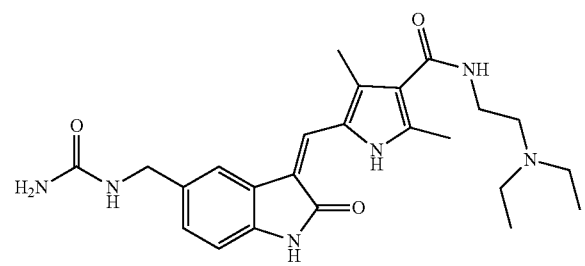 [SMILES: CCN(CC)CCNC(=O)c1c(C)[nH]c(/C=C2\C(=O)Nc3ccc(CNC(N)=O)cc32)c1C]

(Z)—N-(2-(Diethylamino)ethyl)-2,4-dimethyl-5-((2-oxo-5-(ureidomethyl)indolin-3-ylidene)methyl)-1H-pyrrole-3-carboxamide (Compound No. 18). 1-((2-Oxoindolin-5-yl)methyl)urea (82 mg, 0.40 mmol), N-(2-(Diethylamino)ethyl)-5-formyl-2,4-dimethyl-1H-pyrrole-3-carboxamide (111 mg, 0.42 mmol), pyrrolidine (66 µL, 0.80 mmol.) and EtOH (4 mL) were reacted according to the described general procedure. The target compound was obtained as a yellow solid (98 mg, 0.22 mmol, 55%). Rf 0.21 (KP—NH; 19:1 DCM:MeOH); M.p. >350° C.; IR (cm$^{-1}$) 1562, 1611, 1650, 2869, 2926, 2967, 3027, 3276, 3452; $^1$H NMR (400 MHz, DMSO-d$_6$) 0.98 (6H, t, J=7.0 Hz, N(CH$_2$CH$_3$)$_2$), 2.41 (3H, s, pyrrole-CH$_3$), 2.44 (3H, s, pyrrole-CH$_3$), 2.48-2.58 (6H, m, N(CH$_2$CH$_3$)$_2$ and NHCH$_2$CH$_2$NEt$_2$), 3.25-3.32 (2H, m, NHCH$_2$CH$_2$NEt$_2$), 4.16 (2H, d, J=4.8 Hz, CH$_2$NHCONH$_2$), 5.49 (2H, s, CH$_2$NHCONH$_2$), 6.31 (1H, t, J=4.8 Hz, CH$_2$NHCONH$_2$), 6.83 (1H, d, J=7.8 Hz, H-7), 7.03-7.06 (1H, m, H-6), 7.40 (1H, t, J=5.5 Hz, NHCH$_2$CH$_2$NEt$_2$), 7.58 (1H, s, alkene-CH), 7.66 (1H, br, H-4), 10.85 (1H, s, oxindole-NH) 13.63 (1H, s, pyrrole-NH); $^{13}$C NMR (100 MHz, DMSO-d$_6$) 11.0 (pyrrole-CH$_3$), 12.4 (N(CH$_2$CH$_3$)$_2$), 13.8 (pyrrole-CH$_3$), 37.5 (NHCH$_2$CH$_2$NEt$_2$), 43.7 (CH$_2$NHCONH$_2$), 47.0 (N(CH$_2$CH$_3$)$_2$), 52.2 (NHCH$_2$CH$_2$NEt$_2$), 109.7 (Ar—C), 115.7 (Ar—C), 118.3 (Ar—C), 120.9 (Ar—C), 123.6 (Ar—C), 125.9 (Ar—C), 126.1 (Ar—C), 129.4 (Ar—C), 134.0 (Ar—C), 136.1 (Ar—C), 137.7 (Ar—C), 159.0 (C=O), 165.1 (C=O), 170.1 (C=O); HRMS calcd. for C$_{24}$H$_{33}$N$_6$O$_3$ (ES+) m/z 453.261414 [M+H]+, found 453.253061.

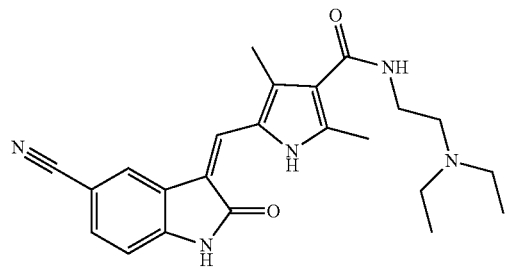 [SMILES: CCN(CC)CCNC(=O)c1c(C)[nH]c(/C=C2\C(=O)Nc3ccc(C#N)cc32)c1C]

(Z)-5-((5-Cyano-2-oxoindolin-3-ylidene)methyl)-N-(2-(diethylamino)ethyl)-2,4-dimethyl-1H-pyrrole-3-carboxamide (Compound No. 17), 2-Oxoindoline-5-carbonitrile (60 mg, 0.38 mmol), N-(2-(Diethylamino)ethyl)-5-formyl-2,4-dimethyl-1H-pyrrole-3-carboxamide (106 mg, 0.40 mmol), pyrrolidine (62 µL, 0.76 mmol) and EtOH (4 mL) were reacted according to the described general procedure. The desired product was obtained as a yellow solid (85 mg, 0.21 mmol, 55%). Rf 0.23 (1:1 DCM:MeOH); M.p. 244-247° C.; IR (cm$^{-1}$) 1563, 1610, 1671, 2216, 2717, 2820, 2961, 3059, 3441; $^1$H NMR (400 MHz, DMSO-d$_6$) 0.98 (6H, t, J=7.2 Hz, N(CH$_2$CH$_3$)$_2$), 24.4 (3H, s, pyrrole-CH$_3$), 2.45 (3H, s, pyrrole-CH$_3$), 2.48-2.57 (6H, m, N(CH$_2$CH$_3$)$_2$ and NHCH$_2$CH$_2$NEt$_2$), 3.29 (2H, dt, J=6.7, 5.6 Hz, NHCH$_2$CH$_2$NEt$_2$), 7.01 (1H, d, J=8.1 Hz, H-7), 7.46 (1H, t, J=5.6 Hz, NHCH$_2$CH$_2$NEt$_2$), 7.53 (1H, dd, J=8.1, 1.6 Hz, H-6), 7.85 (1H, s, alkene-CH), 8.36 (1H, d, J=1.6 Hz, H-4), 11.29 (1H, s, oxindole-NH), 13.51 (1H, s, pyrrole-NH); $^{13}$C NMR (100 MHz, DMSO-d$_6$) 11.0 (pyrrole-CH$_3$), 12.4 (N(CH$_2$CH$_3$)$_2$), 13.8 (pyrrole-CH$_3$), 37.5 (NHCH$_2$CH$_2$NEt$_2$), 47.0 (N(CH$_2$CH$_3$)$_2$), 52.1 (NHCH$_2$CH$_2$NEt$_2$), 103.5, 110.5, 112.8, 120.4, 121.6, 122.7, 126.3, 126.5, 127.1 (Ar—C), 130.6 (Ar—C), 131.8 (Ar—C), 138.0 (Ar—C), 141.9 (Ar—C), 164.8 (C=O), 169.9 (C=O); HRMS calcd. for C$_{23}$H$_{28}$N$_5$O$_2$ (ES+) m/z 406.224299 [M+H]+, found 406.218506.

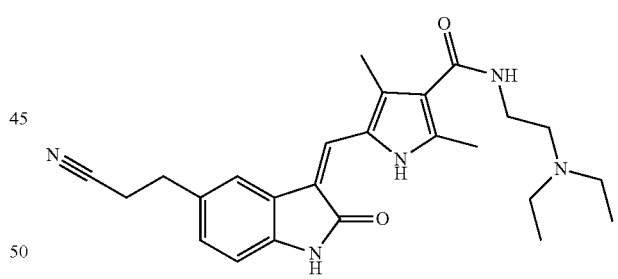

(Z)-5-((5-(2-cyanoethyl)-2-oxoindolin-3-ylidene)methyl)-N-(2-(diethylamino)ethyl)-2,4-dimethyl-1H-pyrrole-3-carboxamide (Compound No. 15). 3-(2-Oxoindolin-5-yl)propanenitrile (91 mg, 0.49 mmol), N-(2-(Diethylamino)ethyl)-5-formyl-2,4-dimethyl-1H-pyrrole-3-carboxamide (136 mg, 0.51 mmol), pyrrolidine (80 µL, 0.98 mmol) and EtOH (5 mL) were reacted according to the described general procedure. Purification on KP—NH silica gel (KP—NH; 9:9:1 Hexanes:DCM:MeOH) afforded the target compound as a yellow solid (105 mg, 0.24 minol, 49%). Rf 0.34 (PH-NE; 9:9:1 Hexanes:DCM:MeOH); M.p. 216-219° C.; IR (cm$^{-1}$) 1529, 1623, 1670, 2102, 2247, 2809, 2924, 2964, 3024, 3144, 3292; $^1$H NMR (400 MHz, DMSO-d$_6$) 0.98 (6H, t, J=7.2 Hz, N(CH$_2$CH$_3$)$_2$), 2.42 (3H, s, pyrrole-CH$_3$), 2.44 (3H, s, pyrrole-CH$_3$), 2.48-2.57 (6H, m, N(CH$_2$CH$_3$)$_2$ and NHCH$_2$CH$_2$NEt$_2$), 2.83-2.89 (4H, m, CH$_2$CH$_2$CN), 3.29 (2H, dt, J=6.6, 5.6 Hz, NHCH$_2$CH$_2$NEt$_2$), 6.83 (1H, d, J=7.9 Hz, H-7), 7.05 (1H, dd, J=7.9, 1.5 Hz, H-6), 7.40 (1H, t, J=5.6 Hz, NHCH$_2$CH$_2$NEt$_2$), 7.61 (1H, s, alkene-CH), 7.72 (1H, d, J=1.5 Hz, H-4), 10.86 (oxindole-NH), 13.61 (pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 19.0 (CH$_2$CH$_2$CN), 31.1 (CH$_2$CH$_2$CN), 37.5 (NHCH$_2$CH$_2$NEt$_2$), 47.0 (N(CH$_2$CH$_3$)$_2$), 52.2 (NHCH$_2$CH$_2$NEt$_2$), 109.8 (Ar—C), 115.6 (Ar—C), 119.0, 120.8, 120.9, 123.7 (Ar—C), 126.2 (Ar—C), 126.2 (Ar—C), 127.0 (Ar—C), 129.5 (Ar—C), 132.1 (Ar—C), 136.3 (Ar—C), 137.7 (Ar—C), 165.1 (C=O), 170.0 (C=O); HRMS calcd. for C$_{25}$H$_{32}$N$_5$O$_2$ (ES+) m/z 434.255600 [M+H]+, found 434.247547.

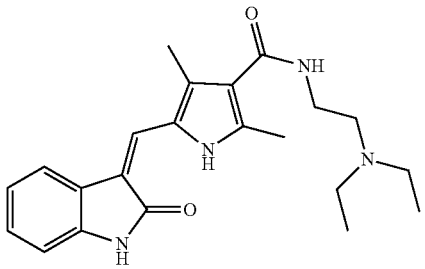 [SMILES: CCN(CC)CCNC(=O)c1c(C)[nH]c(/C=C2\C(=O)Nc3ccccc32)c1C]

(Z)—N-(2-(Diethylamino)ethyl)-2,4-dimethyl-5-((2-oxoindolin-3-ylidene)methyl)-1H-pyrrole-3-carboxamide (Compound No. 19). Oxindole (100 mg, 0.75 mmol), N-(2-(Diethylamino)ethyl)-5-formyl-2,4-dimethyl-1H-pyrrole-3-carboxamide (0.209 g, 0.79 mmol), pyrrolidine (123 µL, 1.50 mmol) and EtOH (7.5 mL) were reacted according to the described general procedure. The target compound was isolated as a yellow solid (174 mg, 0.46 mmol, 61%). Rf 0.25 (1:1 DCM:MeOH); M.p. 233-236° C.; IR (cm$^{-1}$) 1533, 1568, 1620, 1670, 2816, 2924, 2968, 3022, 3159, 3301; $^1$H NMR (400 MHz, DMSO-d$_6$) 0.98 (6H, t, J=7.1 Hz, N(CH$_2$CH$_3$)$_2$), 2.41 (3H, s, pyrrole-CH$_3$), 2.44 (3H, s, pyrrole-CH$_3$), 2.48-2.57 (6H, m, N(CH$_2$CH$_3$)$_2$ and NHCH$_2$CH$_2$NEt$_2$), 3.28 (2H, dt, J=6.4, 5.3 Hz, NHCH$_2$CH$_2$NEt$_2$), 6.87-6.91 (1H, m, H-4), 6.99 (1H, ddd, J=7.5, 7.4, 1.4 Hz, H-6), 7.13 (1H, ddd, J=7.6, 7.5, 1.4 Hz, H-5), 7.39 (1H, t, J=5.3 Hz, NHCH$_2$CH$_2$NEt$_2$), 7.63 (1H, s, alkene-CH), 7.75-7.79 (1H, m, H-7), 10.88 (1H, s, oxindole-NH), 13.64 (1H, s, pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 37.5 (NHCH$_2$CH$_2$NEt$_2$), 47.0 (N(CH$_2$CH$_3$)$_2$), 52.1 (NHCH$_2$CH$_2$NEt$_2$), 109.9 (Ar—C), 115.6 (Ar—C), 119.1 (Ar—C), 120.9 (Ar—C), 121.5 (Ar—C), 123.8 (Ar—C), 126.0 (Ar—C), 126.2 (Ar—C), 126.9 (Ar—C), 129.5 (Ar—C), 135.2 (Ar—C), 138.9 (Ar—C), 165.1 (C=O), 169.9 (C=O); HRMS calcd. for C$_{22}$H$_{29}$N$_4$O$_2$ (ES+) m/z 381.229051 [M+H]+, found 381.225764.

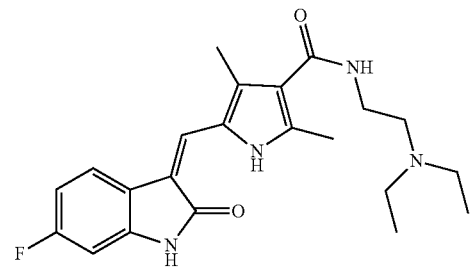 [SMILES: CCN(CC)CCNC(=O)c1c(C)[nH]c(/C=C2\C(=O)Nc3cc(F)ccc32)c1C]

(Z)—N-(2-(Diethylamino)ethyl)-5-((6-fluoro-2-oxoindolin-3-ylidene)methyl)-2,4-dimethyl-1H-pyrrole-3-carboxamide (Compound No. 20). 6-Fluorooxindolin-2-one (78 mg, 0.52 mmol), N-(2-(Diethylamino)ethyl)-5-formyl-2,4-dimethyl-1H-pyrrole-3-carboxamide (144 mg, 0.54 mmol), pyrrolidine (85 µL, 1.03 mmol) and EtOH (5 mL) were reacted according to the described general procedure. The desired product was isolated as a yellow solid (118 mg, 0.30 mmol, 57%). Rf 0.24 (1:1 DCM:MeOH); M.p. 256-258° C.; IR (cm$^{-1}$) 1531, 1566, 1620, 1670, 2774, 2934, 2969, 3030, 3109, 3303; $^1$H NMR (400 MHz, DMSO-d$_6$) 0.98 (6H, t, J=7.0 Hz, N(CH$_2$CH$_3$)$_2$), 2.41 (3H, s, pyrrole-CH$_3$), 2.44 (3H, s, pyrrole-CH$_3$), 2.48-2.58 (6H, m, N(CH$_2$CH$_3$)$_2$ and NHCH$_2$CH$_2$NEt$_2$), 3.29 (2H, dt, J=6.4, 5.4 Hz, NHCH$_2$CH$_2$NEt$_2$), 6.70 (1H, dd, J=9.2, 2.2 Hz, H-7), 6.81 (1H, ddd, J=9.5, 8.2, 2.2 Hz, H-5), 7.39 (1H, t, J=5.4 Hz, NHCH$_2$CH$_2$NEt$_2$), 7.62 (1H, s, alkene-CH), 7.80 (1H, dd, J=8.2, 5.6 Hz, H-4), 10.99 (oxindole-NH), 13.48 (1H, s, pyrrole-NH); $^{13}$C NMR (100 MHz, DMSO-d$_6$) 11.0 (pyrrole-CH$_3$), 12.4 (N(CH$_2$CH$_3$)$_2$), 13.8 (pyrrole-CH$_3$), 37.5 (NHCH$_2$CH$_2$NEt$_2$), 47.0 (N(CH$_2$CH$_3$)$_2$), 52.1 (NHCH$_2$CH$_2$NEt$_2$), 97.8 (d, J$_{CF}$=27.3 Hz, Ar—C), 108.0 (d, J$_{CF}$=22.2 Hz, Ar—C), 114.6 (Ar—C), 120.4 (d, J$_{CF}$=9.5 Hz, Ar—C), 120.9 (Ar—C), 122.3 (d, J$_{CF}$=2.8 Hz, Ar—C), 123.9 (Ar—C), 126.2 (Ar—C), 129.7 (Ar—C), 136.3 (Ar—C), 139.9 (d, J$_{CF}$=12.4 Hz, Ar—C), 161.9 (d, J$_{CF}$=240.8 Hz, Ar—C), 165.0 (C=O), 170.3 (C=O); HRMS calcd. for C$_{22}$H$_{28}$FN$_4$O$_2$ (ES+) m/z 399.219629 [M+H]+, found 399.213657.

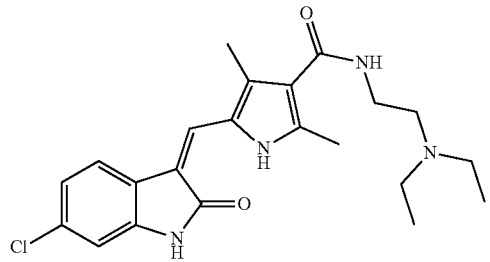 [SMILES: CCN(CC)CCNC(=O)c1c(C)[nH]c(/C=C2\C(=O)Nc3cc(Cl)ccc32)c1C]

(Z)-5-((6-Chloro-2-oxoindolin-3-ylidene)methyl)-N-(2-(diethylamino)ethyl)-2,4-dimethyl-1H-pyrrole-3-carboxamide (Compound No. 21). 6-Chlorooxindolin-2-one (0.200 g, 1.19 mmol), N-(2-(Diethylamino)ethyl)-5-formyl-2,4-dimethyl-1H-pyrrole-3-carboxamide (0.334 g, 1.25 mmol), pyrrolidine (195 µL, 2.39 mmol) and EtOH (12 mL) were reacted according to the described general procedure. The target compound was isolated as a yellow solid (0.365 g, 0.88 mmol, 74%). Rf 0.30 (1:1 DCM:MeOH); M.p. 257-259° C.; IR (cm$^{-1}$) 1550, 1621, 1665, 2789, 2929, 2967, 3075, 3291; $^1$H NMR (400 MHz. DMSO-d$_6$) 0.97 (6H, t, J=7.1 Hz, N(CH$_2$CH$_3$)$_2$), 2.41 (3H, s, pyrrole-CH$_3$), 2.44

(3H, s, pyrrole-CH$_3$), 2.47-2.57 (6H, m, N(CH$_2$CH$_3$)$_2$ and NHCH$_2$CH$_2$NEt$_2$), 3.28 (2H, dt, J=6.5, 5.6 Hz, NHCH$_2$CH$_2$NEt$_2$), 6.88 (1H, d, J=1.8 Hz, H-7), 7.03 (1H, dd, J=8.2, 1.8 Hz, H-5), 7.42 (1H, t, J=5.6 Hz, NHCH$_2$CH$_2$NEt$_2$), 7.67 (1H, s, alkene-CH), 7.81 (1H, d, J=8.2 Hz, H-4), 11.00 (1H, s, oxindole-NH), 13.53 (1H, s, pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 37.5 (NHCH$_2$CH$_2$NEt$_2$), 47.0 (N(CH$_2$CH$_3$)$_2$), 52.1 (NHCH$_2$CH$_2$NEt$_2$), 109.8 (Ar—C), 114.2 (Ar—C), 120.4 (Ar—C), 121.2 (Ar—C), 121.2 (Ar—C), 124.7 (Ar—C), 125.0 (Ar—C), 126.3 (Ar—C), 130.4 (Ar—C), 130.7 (Ar—C), 136.9 (Ar—C), 139.8 (Ar—C), 164.9 (C=O), 169.9 (C=O); HRMS calcd. for C$_{22}$H$_{28}$ClN$_4$O$_2$ (ES+) m/z 415.190078 [M+H]+, found 415.181371.

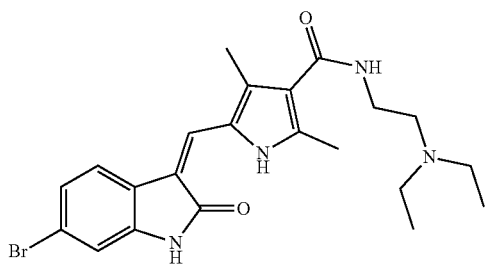

(Z)-5-((6-Bromo-2-oxoindolin-3-ylidene)methyl)-N-(2-(diethylamino)ethyl)-2,4-dimethyl-1H-pyrrole-3-carboxamide (Compound No. 22). 6-Bromooxindolin-2-one (0.200 g, 0.94 mmol), N-(2-(Diethylamino)ethyl)-5-formyl-2,4-dimethyl-1H-pyrrole-3-carboxamide (0.263 g, 0.99 mmol), pyrrolidine (155 µL, 1.89 mmol) and EtOH (9 mL) were reacted according to the described general procedure. The desired compound was isolated as a yellow solid (0.211 g, 0.46 mmol, 49%). Rf 0.23 (1:1 DCM:MeOH); M.p. 255-257° C.; IR (cm$^{-1}$) 1578, 1621, 1670, 2797, 2869, 2907, 2965, 3103, 3402; $^1$H NMR (400 MHz, DMSO-d$_6$) 0.98 (6H, t, J=7.1 Hz, N(CH$_2$CH$_3$)$_2$), 2.41 (3H, s, pyrrole-CH$_3$), 2.44 (3H, s, pyrrole-CH$_3$), 2.47-2.58 (6H, m, N(CH$_2$CH$_3$)$_2$ and NHCH$_2$CH$_2$NEt$_2$), 3.29 (2H, dt, J=6.6, 5.5 Hz, NHCH$_2$CH$_2$NEt$_2$), 7.01 (1H, d, J=1.7 Hz, H-7), 7.15 (1H, dd, J=8.2, 1.7 Hz, H-5), 7.42 (1H, t, J=5.5 Hz, NHCH$_2$CH$_2$NEt$_2$), 7.67 (1H, s, alkene-CH), 7.74 (1H, d, J=8.2 Hz, H-4), 10.98 (1H, s, oxindole-NH), 13.54 (1H, s pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 37.5 (NHCH$_2$CH$_2$NEt$_2$), 47.0 (N(CH$_2$CH$_3$)$_2$), 52.1 (NHCH$_2$CH$_2$NEt$_2$), 112.5 (Ar—C), 114.2 (Ar—C), 118.9 (Ar—C), 120.7 (Ar—C), 121.2 (Ar—C), 124.0 (Ar—C), 124.7 (Ar—C), 125.4 (Ar—C), 126.3 (Ar—C), 130.5 (Ar—C), 137.0 (Ar—C), 140.0 (Ar—C), 164.9 (C=O), 169.8 (C=O); HRMS calcd. for C$_{22}$H$_{28}$BrN$_4$O$_2$ (ES+) m/z 459.139561 [M+H]+, found 459.132760.

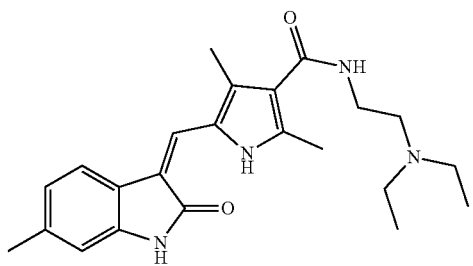 [SMILES: CCN(CC)CCNC(=O)c1c(C)[nH]c(/C=C2\C(=O)Nc3cc(C)ccc32)c1C]

(Z)—N-(2-(Diethylamino)ethyl)-2,4-dimethyl-5-((6-methyl-2-oxoindolin-3-ylidene)methyl)-1H-pyrrole-3-carboxamide (Compound No. 23), 6-Methylindolin-2-one (55 mg, 0.37 mmol), N-(2-(Diethylamino)ethyl)-5-formyl-2,4-dimethyl-1H-pyrrole-3-carboxamide (104 mg, 0.37 mmol), pyrrolidine (61 µL, 0.75 mmol) and EtOH (4 mL) were reacted according to the described general procedure. The target compound was isolated as a yellow solid (88 mg, 0.22 mmol, 60%). Rf 0.22 (1:1 DCM:MeOH), M.p. 243-246° C.; IR (cm$^{-1}$) 1553, 1621, 1665, 2788, 2920, 2964, 3079, 3287; $^1$H NMR (400 MHz, DMSO-d$_6$) 097 (6H, t, J=7.0 Hz, N(CH$_2$CH$_3$)$_2$), 2.31 (3H, s, Ar—CH$_3$), 2.40 (3H, s, pyrrole-CH$_3$), 2.44 (3H, s, pyrrole-CH$_3$), 2.47-2.57 (6H, m, N(CH$_2$CH$_3$)$_2$ and NHCH$_2$CH$_2$NEt$_2$), 3.28 (2H, dt, J=6.3, 5.4 Hz, NHCH$_2$CH$_2$NEt$_2$), 6.70 (1H, br, H-7), 6.78-6.84 (1H, m, H-5), 7.36 (1H, t, J=5.4 Hz, NHCH$_2$CH$_2$NEt$_2$), 7.54 (1H, alkene-CH), 7.64 (1H, d, J=7.7 Hz, H-4), 10.82 (1H, s, oxindole-NH), 13.56 (1H, s, pyrrole-NH); $^{13}$C NMR (100 MHz, DMSO-d$_6$) 11.0 (pyrrole-CH$_3$), 12.4 (N(CH$_2$CH$_3$)$_2$), 13.8 (pyrrole-CH$_3$), 21.9 (Ar—CH$_3$), 37.4 (NHCH$_2$CH$_2$NEt$_2$), 47.0 (N(CH$_2$CH$_3$)$_2$), 52.2 (NHCH$_2$CH$_2$NEt$_2$), 110.5 (Ar—C), 116.0 (Ar—C), 119.0 (Ar—C), 120.7 (Ar—C), 122.3 (Ar—C), 122.9 (Ar—C), 123.4 (Ar—C), 126.1 (Ar—C), 128.8 (Ar—C), 135.7 (Ar—C), 136.6 (Ar—C), 139.2 (Ar—C), 165.1 (C=O), 170.2 (C=O); HRMS calcd. for C$_{23}$H$_{31}$N$_4$O$_2$ (ES+) m/z 395.244701 [M+H]+, found 395.240082.

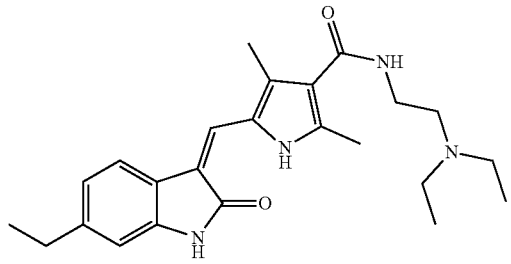 [SMILES: CCc1ccc2c(c1)NC(=O)/C2=C\c1[nH]c(C)c(C(=O)NCCN(CC)CC)c1C]

(Z)—N-(2-(Diethylamino)ethyl)-5-((6-ethyl-2-oxoindolin-3-ylidene)methyl)-2,4-dimethyl-1H-pyrrole-3-carboxamide (Compound No. 24). 6-Ethylindolin-2-one (60 mg, 0.37 mmol), N-(2-(Diethylamino)ethyl)-5-formyl-2,4-dimethyl-1H-pyrrole-3-carboxamide (104 mg, 0.39 mmol), pyrrolidine (61 µL, 0.74 mmol) and EtOH (4 mL) were reacted according to the described general procedure. The target compound was isolated as a yellow solid (73 mg, 0.18 mmol, 49%). Rf 0.28 (1:1 DCM:MeOH); M.p. 228-230° C., IR (cm$^{-1}$) 1550, 1623, 1663, 2802, 2968, 3084, 3146, 3292; $^1$H NMR (400 MHz, DMSO-d$_6$) 0.97 (6H, t, J=7.0 Hz, N(CH$_2$CH$_3$)$_2$), 1.18 (3H, t, J=7.6 Hz, Ar—CH$_2$CH$_3$), 2.40 (3H, s, pyrrole-CH$_3$), 2.44 (3H, s, pyrrole-CH$_3$), 2.47-2.56 (6H, m, N(CH$_2$CH$_3$)$_2$ and NHCH$_2$CH$_2$NEt$_2$), 2.60 (2H, q, J=7.6 Hz, Ar—CH$_2$CH$_3$), 3.28 (2H, dt, J=6.2, 5.2 Hz, NHCH$_2$CH$_2$NEt$_2$), 6.72 (1H, br, H-7), 6.81-6.87 (1H, m, H-5), 7.36 (1H, t, J=5.2 Hz, NHCH$_2$CH$_2$NEt$_2$), 7.55 (1H, alkene-CH), 7.66 (1H, d, J=7.6 Hz, H-4), 10.82 (1H, s, oxindole-NH), 13.57 (1H, s, pyrrole-NH); $^{13}$C NMR (100 MHz, DMSO-d$_6$) 11.0 (pyrrole-CH$_3$), 12.4 (N(CH$_2$CH$_3$)$_2$), 13.8 (pyrrole-CH$_3$), 16.3 (Ar—CH$_2$CH$_3$), 29.0 (Ar—CH$_2$CH$_3$), 37.5 (NHCH$_2$CH$_2$NEt$_2$), 47.0 (N(CH$_2$CH$_3$)$_2$), 52.2 (NHCH$_2$CH$_2$NEt$_2$), 109.3 (Ar—C), 116.0 (Ar—C), 119.0 (Ar—C), 120.7 (Ar—C), 121.2 (Ar—C), 123.0 (Ar—C), 123.6 (Ar—C), 126.1 (Ar—C), 128.8 (Ar—C), 135.7 (Ar—C), 139.2 (Ar—C), 143.1 (Ar—C), 165.1 (C=O), 170.2 (C=O); HRMS calcd. for $C_{24}H_{33}N_4O_2$ (ES+) m/z 409.260351 [M+H]+, found 409.250439.

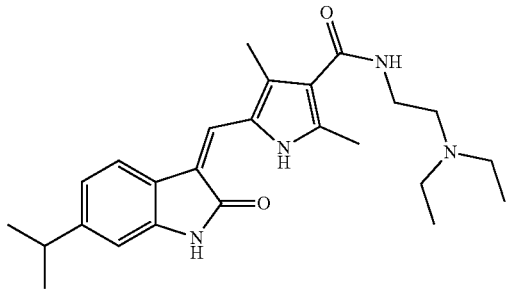 [SMILES: CCN(CC)CCNC(=O)c1c(C)[nH]c(/C=C2\C(=O)Nc3cc(C(C)C)ccc32)c1C]

N-(2-(Diethylamino)ethyl)-5-((6-isopropyl-2-oxoindolin-3-ylidene)methyl)-2,4-dimethyl-1H-pyrrole-3-carboxamide (Compound No. 25). 6-Isopropylindolin-2-one (35 mg, 0.20 mmol), N-(2-(Diethylamino)ethyl)-5-formyl-2,4-dimethyl-1H-pyrrole-3-carboxamide (56 mg, 0.21 mmol), pyrrolidine (33 µL, 0.40 mmol) and EtOH (2 mL) were reacted according to the described general procedure. Purification on silica gel (9:1 DCM:MeOH) afforded the desired compound as a yellow solid (41 mg, 0.10 mmol, 49%). Rf 0.29 (1:1 DCM:MeOH); M.p. 229-231° C.; IR (cm$^{-1}$) 1552, 1620, 1666, 2807, 2968, 3088, 3157, 3282; $^1$H NMR (400 MHz, DMSO-d$_6$) 0.98 (6H, t, J=7.1 Hz, N(CH$_2$CH$_3$)$_2$), 1.20 (6H, d, J=6.9 Hz, Ar—CH(CH$_3$)$_2$), 2.40 (3H, s, pyrrole-CH$_3$), 2.44 (3H, s, pyrrole-CH$_3$), 2.48-2.57 (6H, m, N(CH$_2$CH$_3$)$_2$ and NHCH$_2$CH$_2$NEt$_2$), 2.88 (1H, sept., J=6.9 Hz, Ar—Ar—CH(CH$_3$)$_2$), 3.28 (2H, dt, J=6.3, 5.3 Hz, NHCH$_2$CH$_2$NEt$_2$), 6.74 (1H, br, H-7), 6.85-6.90 (1H, m, H-5), 7.37 (1H, t, J=5.3 Hz, NHCH$_2$CH$_2$NEt$_2$), 7.55 (1H, alkene-CH), 7.66 (1H, d, J=7.8 Hz, H-4), 10.82 (1H, s, oxindole-NH), 13.58 (1H, s, pyrrole-NH); $^{13}$C NMR (100 MHz, DMSO-d$_6$) 11.1 (pyrrole-CH$_3$), 12.4 (N(CH$_2$CH$_3$)$_2$), 13.8 (pyrrole-CH$_3$), 24.5 (Ar—CH(CH$_3$)$_2$), 34.2 (Ar—CH(CH$_3$)$_2$), 37.4 (NHCH$_2$CH$_2$NEt$_2$), 47.0 (N(CH$_2$CH$_3$)$_2$), 52.1 (NHCH$_2$CH$_2$NEt$_2$), 107.8 (Ar—C), 116.0 (Ar—C), 119.0 (Ar—C), 119.8 (Ar—C), 120.7 (Ar—C), 123.0 (Ar—C), 123.8 (Ar—C), 126.1 (Ar—C), 128.8 (Ar—C), 135.7 (Ar—C), 139.1 (Ar—C), 147.9 (Ar—C), 165.1 (C=O), 170.2 (C=O); HRMS calcd. for $C_{25}H_{35}N_4O_2$ (ES+) m/z 423.276001 [M+H]+, found 423.267685.

Example 3. Kinase Inhibition Activity of the Exemplary Compounds

The synthesized compounds described in Example 2 were tested in recombinant kinase TR-FRET inhibition assays against AMPKα1 and AMPKα2 kinases, and their half-maximal inhibitory potency values (IC$_{50}$) were calculated as set forth in Table 1 (values are the mean±S.D. (n=3)).

TABLE 1

| Compound No. | AMPK(α1) | IC$_{50}$ (nM) AMPK(α2) | KDR |
|---|---|---|---|
| Sunitinib | 158 ± 11 | 61.7 ± 9.5 | 461 ± 98 |
| 1 | 40% at 20 µM | 17% at 10 µM | — |
| 2 | 78% at 20 µM | 85% at 10 µM | — |
| 3 | 30% at 20 µM | 48% at 10 µM | — |
| 4 | 393 ± 27 | 141 ± 33 | — |
| 5 | 136 ± 16 | 50.4 ± 17.9 | 493 ± 24 |
| 6 | 180 ± 24 | 61.4 ± 12.7 | 505 ± 18 |
| 7 | 221 ± 31 | 74.8 ± 3.1 | — |

TABLE 1-continued

| Compound No. | AMPK(α1) | IC$_{50}$ (nM) AMPK(α2) | KDR |
|---|---|---|---|
| 8 | 152 ± 22 | 38.6 ± 10.6 | 480 ± 52 |
| 9 | 296 ± 16 | 96.6 ± 4.3 | — |
| 10 | 173 ± 15 | 20.5 ± 2.7 | 848 ± 41 |
| 11 | 418 ± 45 | 111 ± 21 | — |
| 12 | 2100 ± 440 | 154 ± 53 | — |
| 13 | 139 ± 13 | 101 ± 20 | 2260 ± 110 |
| 14 | 184 ± 11 | 108 ± 17 | 2164 ± 101 |
| 15 | 164 ± 10 | 32.4 ± 7.8 | 1328 ± 140 |
| 16 | 107 ± 17 | 60.7 ± 16.5 | 3820 ± 530 |
| 17 | 93 ± 8 | 16.2 ± 7.4 | 391 ± 22 |
| 18 | 205 ± 52 | 83.6 ± 7.0 | — |
| 19 | 246 ± 11 | 88.5 ± 7.1 | — |
| 20 | 240 ± 37 | 49.4 ± 22.1 | 189 ± 7 |
| 21 | 217 ± 37 | 65.1 ± 12.3 | 206 ± 7 |
| 22 | 208 ± 30 | 82.5 ± 27.9 | — |
| 23 | 89% at 20 µM | 88% at 10 µM | — |
| 24 | 348 ± 71 | 90% at 10 µM | — |
| 25 | 70% at 20 µM | 69% at 10 µM | — |

As expected, the oxindole N-methyl analog of sunitinib (Compound No. 1; AMPKα1=40% inhibition at 20 µM; AMPkα2=17% inhibition at 10 µM) was devoid of activity against both isoforms of AMPK, confirming it as a suitable negative control due to loss of the predicted H-bonding motif with the kinase hinge region. For the series of compounds modifying the pyrrole carboxamide alkylamino side chain, it was apparent that the presence of a terminal amine was critical, as complete loss of activity was observed for the carboxylic acid intermediate Compound No. 2 (AMPKα1=78% inhibition at 20 µM; AMPKα2=85% inhibition at 10 µM) as well as the propylamide Compound No. 3 (AMPKα1=30% inhibition at 20 µM; AMPKα2=48% inhibition at 10 µM). However, there was significant tolerance to both the positioning and the degree of alkylation of the amine group, as was evidenced by retention of potency for the dimethylamine (Compound No. 5; IC$_{50}$; AMPKα1=136±16 nM; AMPKα2=50.4±17.9 nM) and monoethylamine (Compound No. 6; IC$_{50}$; AMPKα1=180±24 nM; AMPKα2=61.4±12.7 nM) compounds, as well as the homologated diethylaminopropyl Compound No. 8 (IC$_{50}$; AMPKα1=152±22 nM; AMPKα2=38.6±10.6 nM), with an improvement in inhibitory potency observed for AMPKα2. But alkylation was required at the terminal amine group, as was evidenced by loss of activity for the primary amine Compound No. 4 (IC$_{50}$; AMPKα1=393±27 nM; AMPKα2=141±33 nM), potentially as a result of effects on the pKa and thus protonation state of the amine. Unfortunately, attempts to improve AMPK inhibitory potency by extension at the oxindole 6-position into the hydrophobic pocket were unsuccessful, although the results varied between the AMPK isoforms. The 6-fluoro analog of Compound No. 20 exhibited a modest improvement in activity over the parent compound against AMPKα2 (IC$_{50}$; AMPKα1=240±37 nM; AMPKα2=49.4±22.1 nM), although any additional expansion at this position, particularly with alkyl substituents, was poorly tolerated. Without wishing to be bound by theory, the marginal retention of activity with the 6-bromo analog Compound No. 22 (IC$_{50}$; AMPKα1=208±33 nM; AMPKα2=82.5±27.9 nM) when compared to the complete loss of activity for the 6-methyl analog Compound No. 23 (AMPKα1=89% inhibition at 20 µM; AMPKα2=88% inhibition at 10 µM) suggests that electronic effects play a role due to the approximate similarity in Van der Waals radius between a bromo atom and methyl group unlikely to account for this difference. Overall, modification at the oxindole 5-position was well-tolerated, e.g., expanding 2-3 atoms from the oxindole group with a H-bond donor.

This was observed for Compound No. 10, with a retention in AMPKα1 potency ($IC_{50}$=173±15 nM) and increase in potency against AMPKα2 ($IC_{50}$=20.5±2.7 nM). It was apparent that either an H-bond donor was necessary or that the space within this pocket was limited, as Compound No. 9 (AMPKα1 $IC_{50}$=296±16 nM; AMPKα2 $IC_{50}$=96.6±4.3 nM), Compound No. 11 (AMPKα1 $IC_{50}$=418±45 nM; AMPKα2 $IC_{50}$=111±21 nM), and Compound No. 12 (AMPKα1 $IC_{50}$=2.10±0.44 µM; AMPKα2 $IC_{50}$=154±53 nM) all lost activity to varying degrees. Despite the high degree of homology between the α1 and α2 subunit isoforms the tolerance for inhibitor modification was fairly distinct between subunits. In addition to Compound No. 10, Compound No. 16 showed a modest increase in AMPKα1 activity ($IC_{50}$=107±17 nM) with equipotency against the AMPKα2 subunit ($IC_{50}$=60.7±16.5 nM). Only Compound No. 17 (AMPKα1 $IC_{50}$=93±8 nM; AMPKα2 $IC_{50}$=16.2±7.4 nM) gave an increase in potency against both isoforms, but again this was to a greater degree for AMPKα2. Any of the compounds that retained or improved potency over sunitinib against either of the AMPK α-subunit isoforms were tested for their activity in a KDR competitive binding assay. KDR, also known as VEGFR-2, is a major target of sunitinib and allows an initial assessment of selectivity over the receptor tyrosine kinase (RTK) family. The majority of the compounds retained KDR binding potency similar to that of sunitinib, particularly those bearing modifications to the pyrrole carboxamide alkylamino side chain. However, substitution at the oxindole 5-position reduced KDR binding in a size-dependent manner. The 5-cyano analog Compound No. 17 (KDR $IC_{50}$=391±22 nM) retained potency, but increasing the size of the 5-substituent decreased KDR binding affinity for Compound No. 10 (KDR $IC_{50}$=848±41 nM), Compound No. 15 (KDR $IC_{50}$=1.33±0.14 µM), Compound No. 13 (KDR $IC_{50}$=2.26±0.11 µM), and Compound No. 16 (KDR $IC_{50}$=3.82±0.53 µM). Without wishing to be bound by theory, these results suggest that modifications to this region of the molecule may enhance selectivity for AMPK over the RTK family.

Figure 2B:
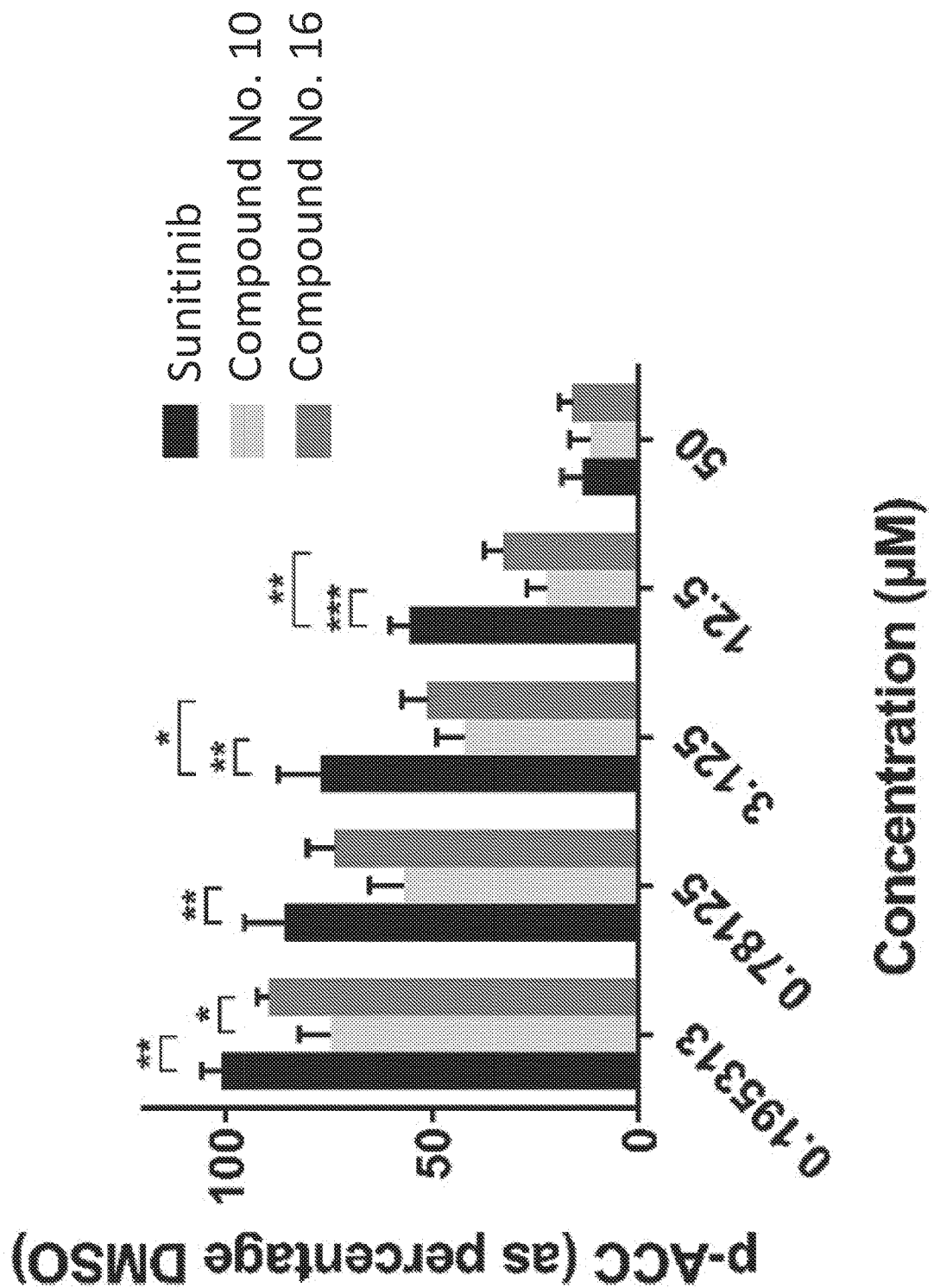

Example 4. Inhibition of Cellular AMPK Kinase Activity by the Exemplary Compounds Compounds of the present disclosure that were active against either AMPKα1 or AMPKα2 in Example 3 were evaluated for their ability to inhibit cellular AMPK. The AMPK substrate ACC is used as a biomarker for the relative activity of AMPK, and the levels of p-ACC(Ser79) were measured by ELISA in the absence or presence of the compounds to determine the compounds' effects on cellular AMPK activity. The presence of total AMPK, p-AMPK, total ACC, and p-ACC was measured by Western blot in a panel of leukemic cell lines grown in glucoe competent or glucose-free media. This analysis showed that both Molm-13 cells and K562 cells expressed robust quantities of all of the proteins in both media conditions. Molm-13 cells showed a high sensitivity to treatment with sunitinib and related analogs, with an $EC_{50}$ for sunitinib in an MTS assay of 14.3±1 nM. Therefore, K562 cells, which were more resistant to sunitinib treatment, were used in an ELISA assay. Altough satisfactory quantities of p-ACC were present in K562 cells grown in both normal and glucose-free media alone, the addition of the glycolysis inhibitor and indirect AMPK activator 2-deoxy-D-glucose (2-DG) to glucose-free media resulted in a more reproducible signal in the ELISA. The cell lysates from K562 cells grown in glucose-free media in the presence 2-DG and treated with compounds of the present disclosure were analyzed by the p-ACC(Ser79) ELISA to determine the effect of the compounds on cellular AMPK activity. The results of this analysis are shown in FIG. 2A An $EC_{50}$ of 4.89 µM for sunitinib was measured using the ELISA assay. Consequently, the cells were treated with the compounds of the present disclosure 5 µM as a single dose, whilst the inactive Compound No. 1 was included as a negative control. When compared to DMSO control, the majority of the compounds reduced the level of cellular p-ACC to the range observed for sunitinib (51.8% of control). Compound No. 1 exhibited no effect on cellular AMPK activity when compared to DMSO (97.1% of control). Some compounds showed an improved ability to reduce p-ACC levels when compared to sunitinib, with Compound No. 16 (29.2% of control) and Compound No. 10 (23.7% of control) showing statistically significant decreases (p=0.022 and p=0.003, respectively, when compared to sunitinib). Although Compound No. 15 (34.1% of control) appeared to show an increase in potency in this assay, the observed result was not of statistical significance. Sunitinib, Compound No. 16, and Compound No. 10 were taken forward for more extensive testing across a concentration range. The results of this analysis are shown in FIG. 2B. Both Compound No. 16 and Compound No. 10 showed significant reductions in pACC levels when compared to sunitinib across the concentration range, confirming improved potency in inhibiting cellular AMPK. Compound No. 10 exhibited a significant reduction of p-ACC levels compared to sunitinib at all concentrations tested except for 50 µM, and Compound No. 16 showed significant reductions at both 3.125 µM and 12.5 µM.

Taken together these results indicate that the compounds of the present disclosure exhibit improved potency at inhibiting cellular AMPK as compared to sunitinib.

Figure 3A:
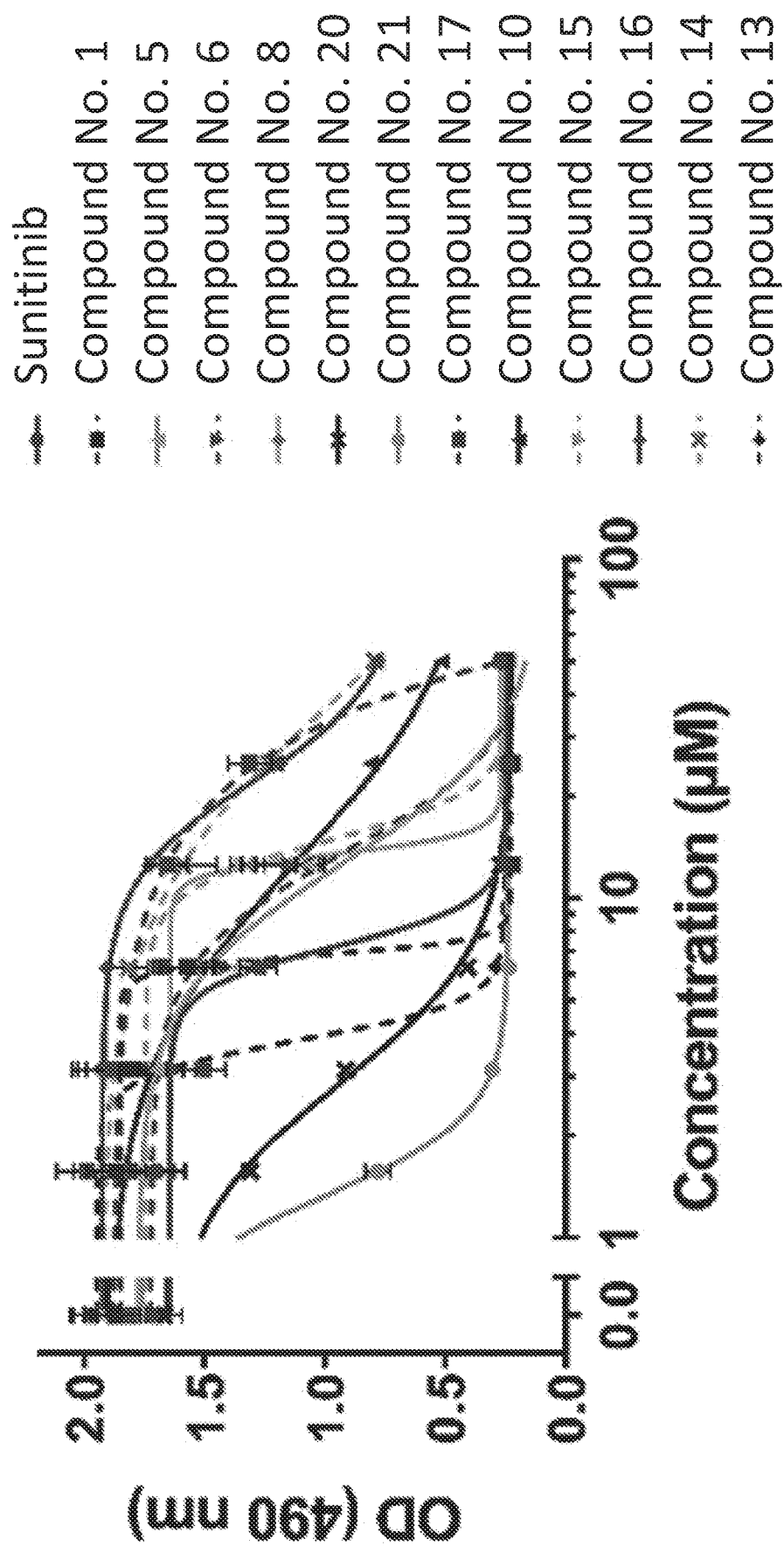
FIGS. 3A-3D are a series of graphs showing the cellular effects of compounds of the present disclosure on cellular viability and toxicity in K562 cells.

Example 5. Effects of Exemplary Compounds on Cell Viability and Cellular Toxicity All of the active compounds from Example 3, and Compound No. 1 as a negative control, were evaluated for their effects on cellular viability and toxicity. An MTS assay was utilized to assess the effect of inhibitors on K562 viability. Cell viability studies were performed in glucose-free media in order to promote AMPK activation; however, under these conditions the untreated cells were unable to convert the MTS tetrazolium salt to the colored formazan product in sufficient quantities for an assay window to be established. Thus, the MTS assays were performed in standard RPMI-1640 media. The results of this analysis are shown in FIG. 3A. Compound No. 1 exhibited equipotency when compared to sunitinib ($EC_{50}$=6.79±0.15 µM and 7.23±0.14 µM, respectively) despite showing very little effect in either the recombinant kinase assay (AMPKα1=40% inhibition at 20 µM; AMPKα2=17% inhibition at 10 µM) or the cellular p-ACC ELISA (97.1% of control). Furthermore, both Compound No. 16 (MTS=65% inhibition at 50 µM) and Compound No. 10 (MTS=82% inhibition at 50 µM) showed little effect in the MTS assay, despite showing potency in the recombinant kinase assay (Table 1, supra) and being the most potent compounds in the p-ACC ELISA assay. Without wishing to be bound by theory, these results suggest that potent inhibition of cellular AMPK activity under these conditions does not affect cell viability.

Figure 3B:
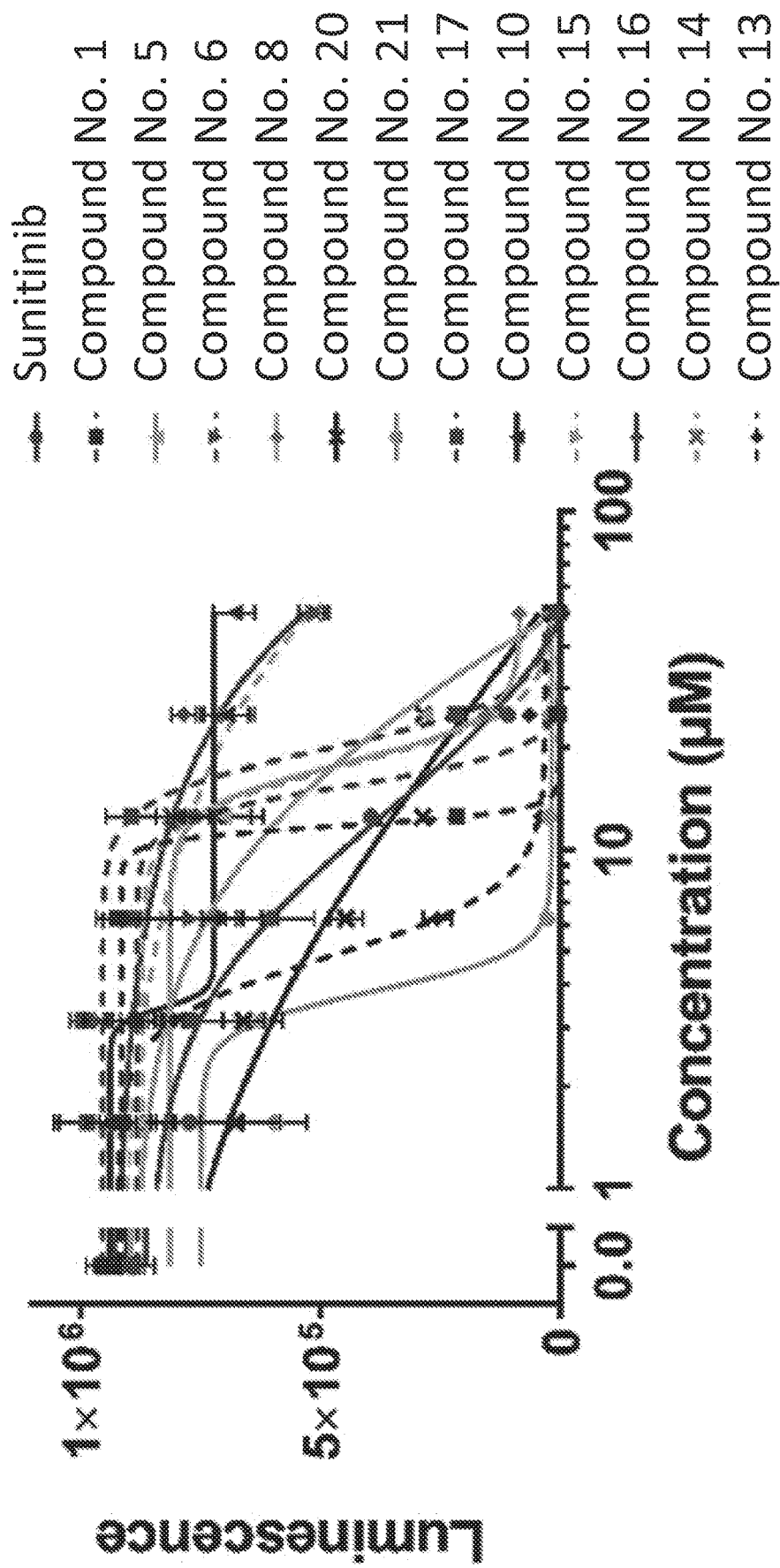
Figure 3C:
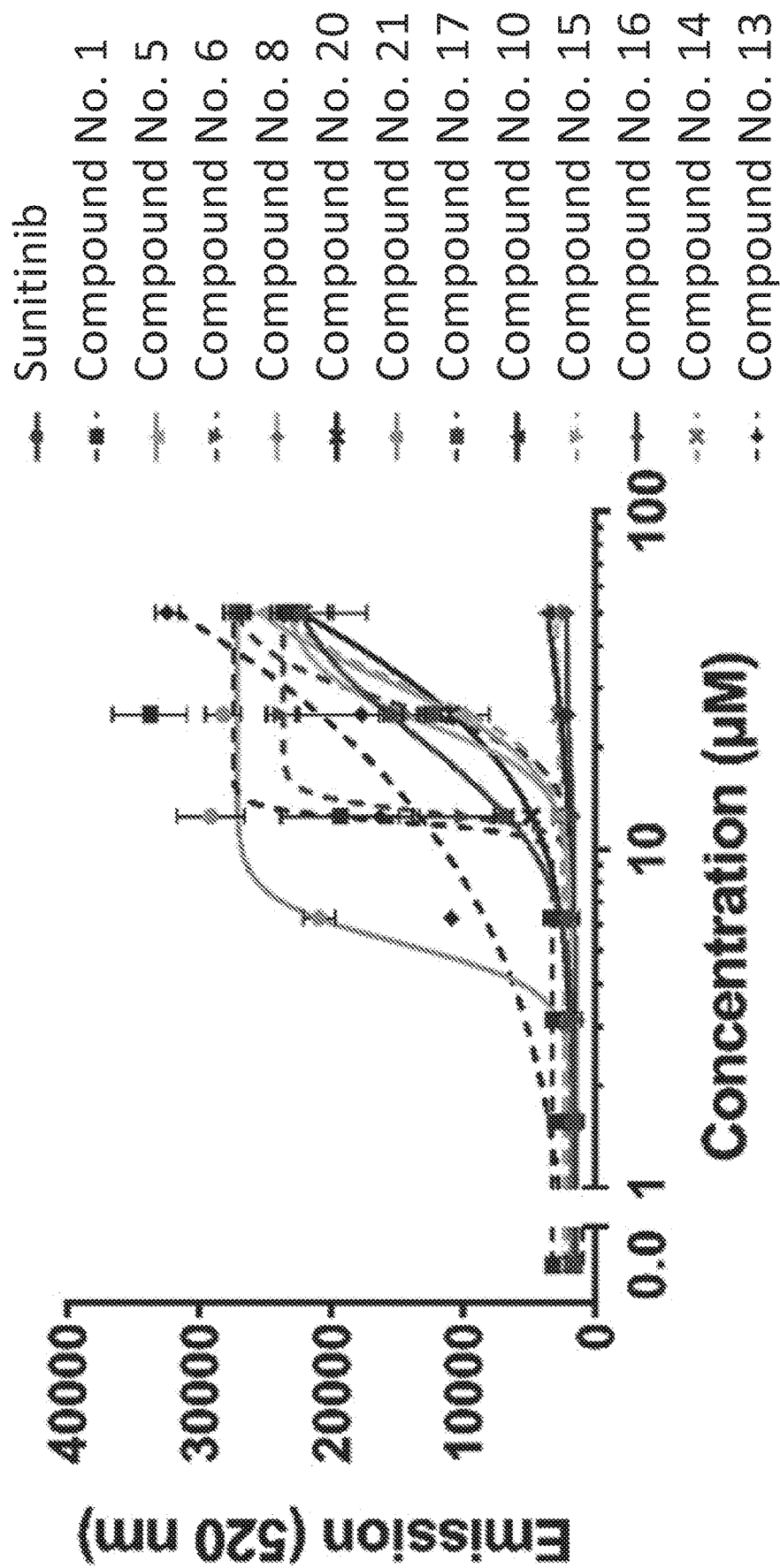
Figure 3D:
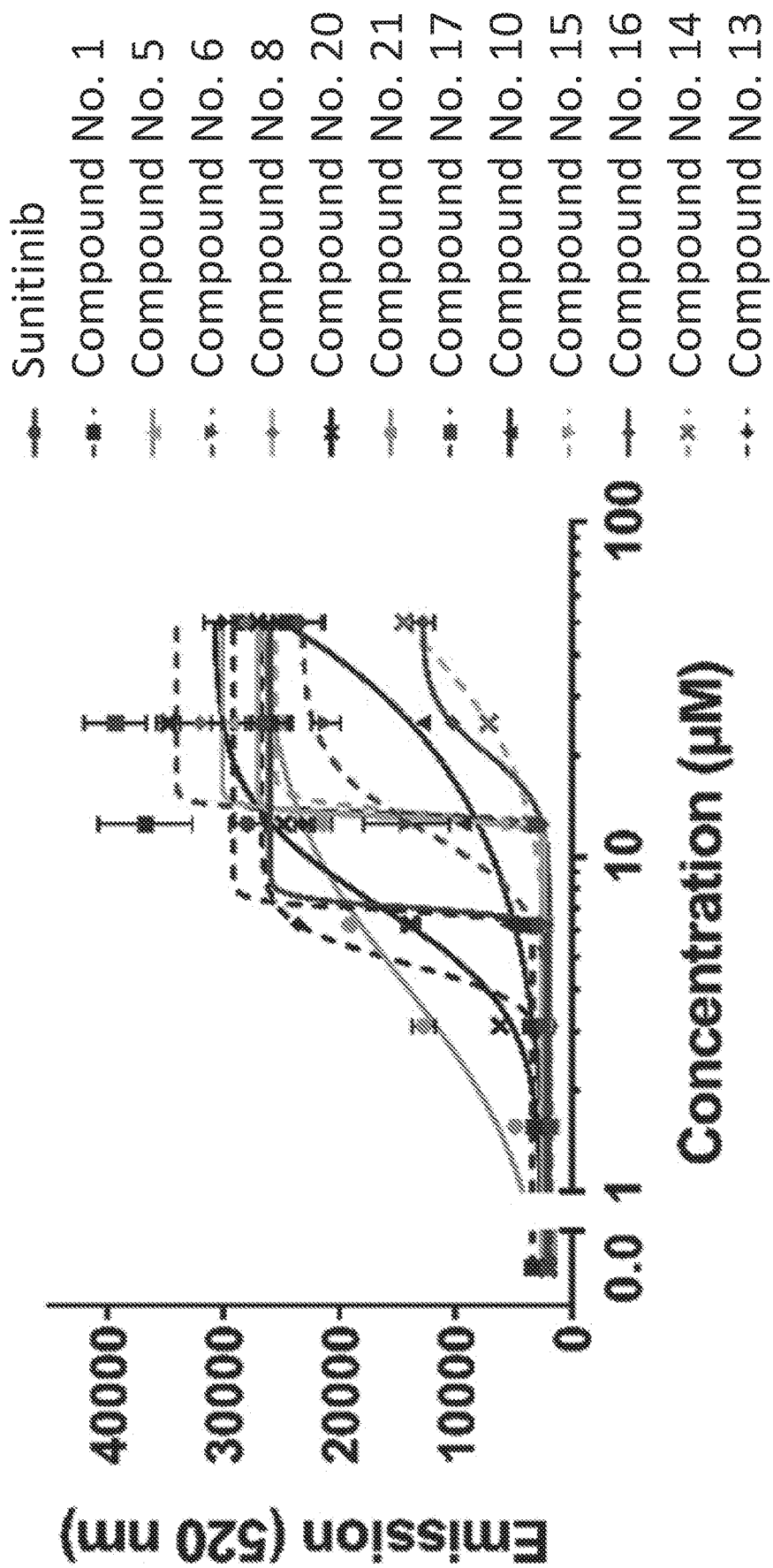

In order to increase the reliance of the cells on AMPK function, assays were needed that could be performed under glucose-free conditions. Therefore in order to elucidate the mechanism of action of the AMPK inhibitors, a CellTiter-Glo cell viability assay (FIG. 3B), which provide a readout proportional to ATP concentration, and thus, cellular viability, as well as a CellTox green cellular toxicity assay (FIG. 3C and FIG. 3D), which contain a dye that fluoresces upon DNA-binding in cells with impraied membrane integrity due to cytotoxicity were performed in K562 cells grown in glucose-free media. The results are summarized in Table 2 (values are the mean±S.D. (n=3)).

TABLE 2

| | ECs ($\mu$M) | | | |
|---|---|---|---|---|
| Compound No. | MTS 24 h | CellTiter Glo 24 h | CellTox Green 24 h | CellTox Green 48 h |
| Sunitinib | 7.23 ± 0.14 | 12.50 ± 4.60 | 61% at 50 $\mu$M | 7.03 ± 0.23 |
| 1 | 6.79 ± 0.15 | 11.76 ± 0.78 | 12.11 ± 0.91 | 6.91 ± 0.06 |
| 5 | 12.55 ± 0.93 | 98% at 50 $\mu$M | 70 % at 50 $\mu$M | 13.03 ± 0.04 |
| 6 | 13.59 ± 1.69 | 15.48 ± 0.48 | 12.89 ± 0.11 | 11.88 ± 1.58 |
| 8 | 13.48 ± 0.59 | 17.98 ± 0.32 | 63% at 50 $\mu$M | 13.27 ± 0.08 |
| 10 | 82% at 50 $\mu$M | 26% at 50 $\mu$M | 7% at 50 $\mu$M | 78% at 50 $\mu$M |
| 13 | 3.83 ± 0.05 | 4.86 ± 0.16 | 90% at 50 $\mu$M | 4.81 ± 0.08 |
| 14 | 64% at 50 M | 98% at 50 $\mu$M | 5% at 50 $\mu$M | 42% at 50 $\mu$M |
| 15 | 14.78 ± 0.22 | 17.77 ± 0.78 | 64% at 50 $\mu$M | 13.60 ± 1.07 |
| 16 | 65% at 50 $\mu$M | 43% at 50 $\mu$M | 2% at 50 $\mu$M | 20.45 ± 0.34 |
| 17 | 98% at 50 $\mu$M | 19.87 ± 1.21 | 75% at 50 $\mu$M | 13.58 ± 0.35 |
| 20 | 2.85 ± 0.22 | 98% at 50 $\mu$M | 61% at 50 $\mu$M | 7.15 ± 0.35 |
| 21 | 65% at 1.56 $\mu$M | 3.83 ± 0.46 | 5.24 ± 0.22 | 4.18 ± 0.41 |

The results for sunitinib indicated, that at 24 hours, the compound is either working in a more cytostatic manner or acting to reduce cellular ATP, as may be expected from an AMPK inhibitor. This is evidenced from the increased potency in the CellTiter-Glo assay (FIG. 3B, $EC_{50}$=12.50±4.60 $\mu$M), when compared to the CellTox green assay (FIGS. 3C and 3D, 61% inhibition at 50 $\mu$M), and after 48 hours more appreciable sunitinib cell toxicity was apparent in the CellTox green assay ($EC_{50}$=7.03±0.23 $\mu$M). The negative control Compound No. 1 showed potency similar to sunitinib with cellular viability (CellTiter-Glo $EC_{50}$=11.76±0.78 $\mu$M), whilst exhibiting improved cellular toxicity at early time points (CellTox green 24 hour $EC_{50}$=12.11±0.91 $\mu$M; 48 hour $EC_{50}$=6.91±0.06 $\mu$M) and Compound No. 21, Compound No. 20, and Compound No. 13 were more potent than sunitinib in the cell viability and toxicity assays without significant improvement in cellular AMPK activity inhibition.

Figure 4:
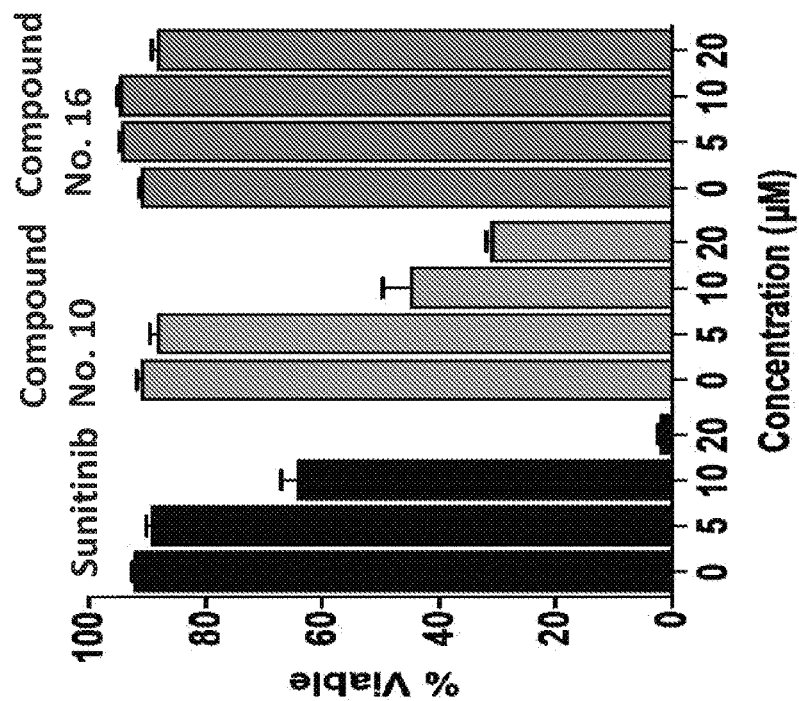
FIG. 4 are a series of graphs showing the cell viability of K562 cells grown under hypoxic culture conditions and treated with compounds of the present disclosure. K562 cells were cultured in RPMI-1640 (Gibco) supplemented with 10% FBS and 1% penicillin/streptomycin, seeded at final concentration of 1×10$^6$ cells/ml in a 96-well plate, pre-incubated for 1 hour at 5% $CO_2$ and 5% $O_2$ (hypoxic environment), at 37° C. After pre-incubation cells were treated with the compounds of the present disclosure for 24 hours (left panel) and 72 hours (right panel) in a hypoxic environment. After treatment cells, were stained with Annexin-V-APC and DAPI in annexin buffer, incubated for 15 minutes at 4° C. and analyzed immediately by flow cytometry (Celesta, BD Bioscience). Viable cells were scored as Annexin V-negative and DAPI-negative population. A high-throughput sampler (BD Bioscience) was used to allow automated sampling processes. (n=3, error bars: ±S.D.).
Figure 4:
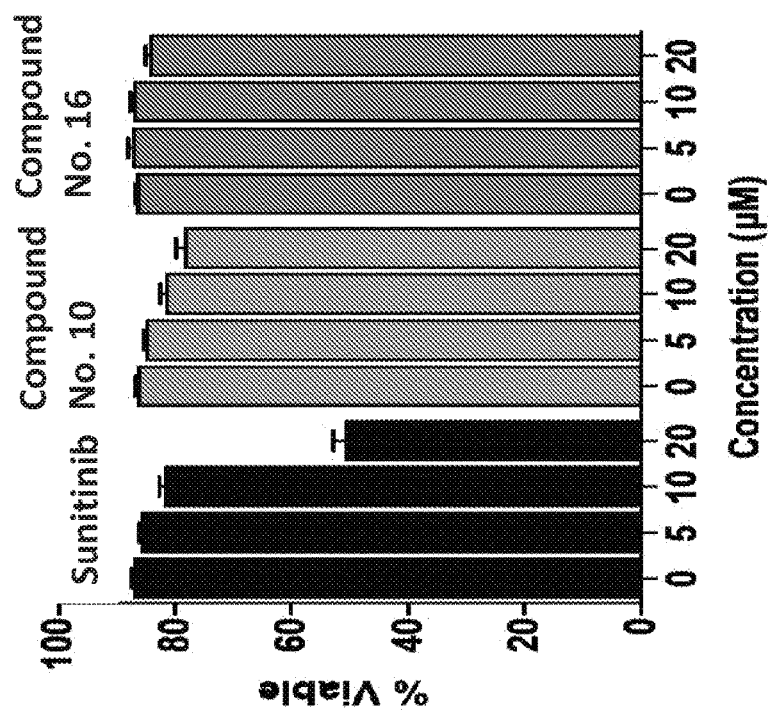

The lead compounds from the p-ACC ELISA assay, Compound No. 16 and Compound No. 10, exhibited minimal effects on both cellular viability and toxicity, with Compound No. 16 (CellTiter-Glo=43% inhibition at 50 $\mu$M; CellTox green 24 hour=2% inhibition at 50 $\mu$M; 48 hour $EC_{50}$=20.4.5±0.34 $\mu$M) and Compound No. 10 (CellTiter-Glo=26% inhibition at 50 $\mu$M; CellTox green 24 hour=7% inhibition at 50 $\mu$M; 48 hour=78% inhibition at 50 $\mu$M) showing little effect, particularly at 24 hours. The effect of sunitinib, Compound No. 10, and Compound No. 16 on K562 cell viability was measured using Annexin-V when cultured under hypoxic conditions. The results were similar to the results with normal culture conditions after 24 hours. The results of these analysis are shown in FIG. 4. After 72 hours, marked decrease in cell viability were observed upon treatment with Compound No. 10. There was no measurable impact on cell viability with Compound No. 16 in K562 cells cultured under hypoxic conditions. Without wishing to be bound by theory, this may be due to difference in the interaction profiles of the compounds. However, the cells were grown in RPMI-1640 media and an AMPK-related effect on cell viability may not be observed until glucose reserves are exhausted. Taken together, these results indicate that the potent effects against cell viability and increased cytotoxicity observed with sunitinib and many of the synthesized compounds are due to AMPK-independent effects and are the result of interactions with other molecular targets.

Without wishing to be bound by theory, these results are consistent with the fact that these compounds were designed using the sunitinib structure, which is known to have multiple kinase targets, and it is unlikely that it is attributable to interaction with VEGFR2 as some compounds exhibited poor potency in the recombinant KDR assay. Interestingly, Compound No. 1 was designed to improve MST2 inhibitory activity compared with sunitinib, while retaining activity for VEGFR2, KIT, PDGFR, FLT1, and FLT3, and eliminating activity with AMPK and RSK. These data also show that Compound No. 16 and Compound No. 10 have reduced activity against the molecular targets responsible for the potent effects in the cell viability and toxicity assays. Therefore, it was desirable to determine the kinase selectivity profiles for both sunitinib, Compound No. 16 and Compound No. 10.

Example 6. Identification of AMPK as a Molecular Target in AML

Gene set enrichment analysis (GSEA) of RNA sequencing comparing ROS-low with ROS-high cells from multiple primary specimens indicated that AMPK activation may be a characteristic of ROS-low cells. Increased activation of AMPK by phosphorylation of Thr172 in ROS-low compared with ROS-high cells was consistently observed in Western blots of primary human AML specimens. These data suggested that AMPK is preferentially activated in the ROS-low population and may be involved in regulating the metabolic state of these cells. AMPK is a serine/threonine kinase and functions as a central homeostatic regulator of metabolic pathways that has well-established roles in the control of glycolysis, fatty acid oxidation (FAO), and NADPH production, acting as a key metabolic sensor that activates cellular mechanisms associated with survival, in cancer cells, the depletion of cellular energy, particularly in regions of hypoxia, activates AMPK that in-turn phosphorylates multiple downstream targets to favor energy-producing catabolic processes. Our data support that AMPK activity is a key component controlling the metabolic status of leukemic stem cells (LSC), and that AMPK inhibition may be an effective therapeutic strategy. Small molecules that promote AMPK activity (e.g. metformin) have received significant attention in recent years as potential anticancer agents for a number of cancer types, including AML. But these observations may reflect inherently different roles for AMPK depending upon the biological context. In actively growing cancer cells, AMPK activation may be inhibitory to cell growth; however, in LSCs it is believed that AMPK inhibition impairs "stemness", resulting in cells that are more sensitive to apoptosis, either via cellular mechanisms or challenge with conventional drugs. In addition, the genetic loss of AMPK, has been reported to have only a minor effect on the activity of normal HSCs, supporting that targeting AMPK activity will be inherently LSC-selective.

Example 7. AMPK is Required to Maintain LSCs

Following the finding that ROS-low cells preferentially activate AMPK, suggesting that more primitive AML cells reside in a metabolically distinct state, studies were performed to determine the importance of AMPK in the ROS-low population. A lentiviral vector was introduced that co-expresses GFP and shAMPK into primary AML specimens and the GFP-positive cells were isolated. This strategy achieves 80-90% reduction in expression AMPK and was evaluated for the functional consequence of AMPK knockdown by transplanting lentiviral-transduced cells into immune deficient NSG mice. The successful engraftment in the bone marrow of primary AML cells is considered the best available surrogate model of LSC activity, and this is commonly used as a functional readout for malignant stem cells. In this in vivo model, a marked reduction was observed in the engraftment of shAMPK transduced primary AML cells compared with vector control, and serial transplantation into secondary recipients demonstrated an even more profound loss of LSC potential (FIG. 4B). Without wishing to be bound by theory, these results suggest that AMPK is required for in vivo maintenance of the LSC population.

To further understand the contribution of AMPK to metabolic programs in AML, two key metabolic properties associated with AMPK were examined: 1) regulation of FAO, and 2) regulation of NADPH production. There was an approximately 50% reduction in FAO activity upon knockdown of AMPK in primary AML cells. The relative levels of NADPH/NADP+ in control compared with AMPK knockdown in the Molm13 AML cell line, revealed reduced NADPH levels and increased NADP+ levels, indicating that overall reducing equivalents are suppressed upon loss of AMPK. Finally, the overall ROS levels were increased upon AMPK knockdown, consistent with the change in metabolic status and increased oxidative state expected from the loss of NADPH. Without wishing to be hound by theory, these results indicate that AMPK is a molecular target in LSCs and that inhibition of AMPK by small molecules can induce apoptosis and/or chemosensitize LSCs to conventional therapy.

Example 8. Kinome Selectivity of the Exemplary Compounds

Sunitinib, Compound No. 10 and Compound No. 16 were tested for binding affinity analysis against 468 kinases at a concentration of 100 nM. The results are shown in Table 3. Unsurprisingly, as a known multi-kinase inhibitor, sunitinib strongly interacts with a large number of kinases at this concentration, with 32 kinases inhibited >90%. This multi-kinase targeting is not absent from our novel inhibitors, with Compound No. 10 and Compound No. 16 inhibiting 28 and 33 kinases >90% at this concentration, respectively. However, differences do exist between the targets of interaction of sunitinib and compounds Compound No. 10 and Compound No. 16 (Table 4). The concentration used for the analysis allowed for the capture of the interaction with AMPK($\alpha$1) and AMPK($\alpha$2) between 30-60% inhibition for all compounds, as would be expected from their kinase $IC_{50}$ values. The data also support the results described supra that should that Compound No. 10 and Compound No. 16 exhibit reduced binding affinity against VEGFR2, when compared to sunitinib. Interestingly, there were several kinases that were strongly inhibited by sunitinib with greatly reduced binding by both Compound No. 10 and Compound No. 16. The autoinhibited forms of both colony stimulating factor 1 receptor (CSFIR) and KIT, as well as the JAK1-JH2 domain pseudokinase are not catalytically active, although the inhibition of autoinhibited CSFIR and KIT may prevent their activation and regulatory function. Bruton's tyrosine kinase (BTK) is strongly inhibited by sunitinib with no observable effect by both Compound No. 10 and Compound No. 16, and inhibition of BTK has been implicated in the induction of apoptosis in leukemia. Both WT-CSFIR and FLT1, also known as VEGFR1, are RTKs, inhibition of which has been shown to induce apoptosis in leukemia. Taken together these results show that the reduced activity of Compound No. 10 and Compound. No. 16 for these targets with respect to sunitinib reveal that small modifications to the oxindole structure can improve activity against AMPK whilst reducing activity with the RTK family.

TABLE 3

| | % Inhibition @ 100 nM | | |
| --- | --- | --- | --- |
| DiscoverX Kinase Name | Sunitinib | Compound No. 10 | Compound No. 16 |
| AAK1 | 44 | 88 | 89 |
| ABL1 (E255K)-phosphorylated | 34 | 35 | 43 |
| ABL1 (F317I)-nonphosphorylated | 0 | 8 | 2 |
| ABL1 (F317I)-phosphorylated | 21 | 0 | 31 |
| ABL1 (F317L)-nonphosphorylated | 14 | 6 | 2 |
| ABL1 (F317L)-phosphorylated | 17 | 22 | 20 |
| ABL1 (H396P)-nonphosphorylated | 64 | 57 | 66 |
| ABL1 (H396P)-phosphorylated | 36 | 6 | 43 |
| ABL1 (M351T)-phosphorylated | 24 | 24 | 22 |
| ABL1 (Q252H)-nonphosphorylated | 31 | 33 | 55 |
| ABL1 (Q252H)-phosphorylated | 30 | 19 | 54 |
| ABL1 (T315I)-nonphosphorylated | 36 | 56 | 61 |
| ABL1 (T315I)-phosphorylated | 54 | 91.8 | 86 |
| ABL1 (Y253F)-phosphorylated | 41 | 5 | 44 |
| ABL1 -nonphosphorylated | 27 | 54 | 36 |
| ABL1 -phosphorylated | 37 | 44 | 44 |
| ABL2 | 0 | 0 | 3 |
| ACVR1 | 2 | 0 | 18 |
| ACVR1B | 0 | 0 | 0 |
| ACVR2A | 0 | 10 | 18 |
| ACVR2B | 0 | 1 | 12 |
| ACVRL1 | 0 | 0 | 0 |
| ADCK3 | 0 | 8 | 8 |
| ADCK4 | 0 | 0 | 0 |
| AKT1 | 0 | o | 0 |
| AKT2 | 0 | 4 | 0 |
| AKT3 | 19 | 47 | 17 |
| ALK | 60 | 29 | 54 |
| ALK(C1156Y) | 88 | 90 | 86 |
| ALK(L1196M) | 35 | 52 | 31 |

TABLE 3-continued

| DiscoverX Kinase Name | % Inhibition @ 100 nM | | |
|---|---|---|---|
| | Sunitinib | Compound No. 10 | Compound No. 16 |
| AMPK-alpha1 | 50 | 49 | 29 |
| AMPK-alpha2 | 46 | 64 | 35 |
| ANKK1 | 69 | 53 | 66 |
| ARK5 | 58 | 84 | 71 |
| ASK1 | 0 | 0 | 20 |
| ASK2 | 18 | 0 | 47 |
| AURKA | 29 | 0 | 41 |
| AURKB | 43 | 20 | 34 |
| AURKC | 77 | 40 | 98.4 |
| AXL | 76 | 88 | 92.5 |
| BIKE | 65 | 97.4 | 93.6 |
| BLK | 12 | 40 | 29 |
| BMPR1A | 0 | 0 | 0 |
| BMPR1B | 14 | 0 | 28 |
| BMPR2 | 44 | 0 | 50 |
| BMX | 0 | 11 | 8 |
| BRAF | 4 | 2 | 11 |
| BRAF(V600E) | 1 | 3 | 0 |
| BRK | 2 | 7 | 1 |
| BRSK1 | 20 | 29 | 27 |
| BRSK2 | 18 | 32 | 25 |
| BTK | 91.3 | 0 | 0 |
| BUB1 | 3 | 0 | 21 |
| CAMK1 | 0 | 0 | 0 |
| CAMK1B | 8 | 26 | 30 |
| CAMK1D | 0 | 0 | 6 |
| CAMK1G | 43 | 0 | 37 |
| CAMK2A | 33 | 6 | 45 |
| CAMK2B | 1 | 0 | 10 |
| CAMK2D | 3 | 20 | 4 |
| CAMK2G | 36 | 8 | 18 |
| CAMK4 | 0 | 0 | 0 |
| CAMKK1 | 38 | 15 | 28 |
| CAMKK2 | 43 | 29 | 49 |
| CASK | 18 | 19 | 34 |
| CDC2L1 | 0 | 0 | 7 |
| CDC2L2 | 7 | 1 | 13 |
| CDC2L5 | 49 | 27 | 50 |
| CDK11 | 0 | 12 | 3 |
| CDK2 | 0 | 0 | 7 |
| CDK3 | 4 | 0 | 19 |
| CDK4 | 17 | 0 | 9 |
| CDK4-cyclinD1 | 23 | 5 | 29 |
| CDK4-cyclinD3 | 17 | 0 | 16 |
| CDK5 | 0 | 0 | 0 |
| CDK7 | 70 | 86 | 80 |
| CDK8 | 26 | 23 | 15 |
| CDK9 | 0 | 0 | 6 |
| CDKL1 | 17 | 31 | 26 |
| CDKL2 | 0 | 10 | 5 |
| CDKL3 | 4 | 22 | 0 |
| CDKL5 | 5 | 0 | 5 |
| CHEK1 | 28 | 42 | 66 |
| CHEK2 | 85 | 83 | 93.2 |
| CIT | 0 | 4 | 0 |
| CLK1 | 36 | 90.2 | 90.7 |
| CLK2 | 90.7 | 93.8 | 100 |
| CLK3 | 0 | 5 | 10 |
| CLK4 | 46 | 95.5 | 96.2 |
| CSF1R | 99.2 | 24 | 18 |
| CSF1R-autoinhibited | 99.75 | 0 | 14 |
| CSK | 0 | 0 | 1 |
| CSNK1A1 | 46 | 14 | 27 |
| CSNK1A1L | 11 | 7 | 6 |
| CSNK1D | 34 | 29 | 9 |
| CSNK1E | 23 | 37 | 4 |
| CSNK1G1 | 3 | 0 | 16 |
| CSNK1G2 | 14 | 0 | 3 |
| CSNK1G3 | 15 | 6 | 5 |
| CSNK2A1 | 71 | 0 | 78 |
| CSNK2A2 | 18 | 0 | 43 |
| CTK | 9 | 22 | 16 |
| DAPK1 | 20 | 4 | 20 |
| DAPK2 | 7 | 0 | 7 |
| DAPK3 | 16 | 5 | 21 |
| DCAMKL1 | 28 | 32 | 32 |
| DCAMKL2 | 8 | 0 | 3 |
| DCAMKL3 | 20 | 73 | 88 |
| DDR1 | 51 | 0 | 43 |
| DDR2 | 21 | 12 | 27 |
| DLK | 94.3 | 86 | 100 |
| DMPK | 0 | 0 | 11 |
| DMPK2 | 0 | 0 | 20 |
| DRAK1 | 89 | 71 | 78 |
| DRAK2 | 1 | 1 | 0 |
| DYRK1A | 30 | 74 | 93.3 |
| DYRK1B | 9 | 75 | 0 |
| DYRK2 | 24 | 18 | 34 |
| EGFR | 58 | 0 | 64 |
| EGFR(E746-A750del) | 0 | 32 | 7 |
| EGFR(G719C) | 2 | 32 | 9 |
| EGFR(G719S) | 3 | 9 | 21 |
| EGFR(L747-E749del, A750P) | 15 | 0 | 27 |
| EGFR(L747-S752del, P753S) | 24 | 23 | 5 |
| EGFR(L747-T751del,Sins) | 3 | 37 | 11 |
| EGFR(L858R) | 24 | 0 | 32 |
| EGFR(L858R,T790M) | 8 | 0 | 18 |
| EGFR(L861Q) | 0 | 39 | 4 |
| EGFR(S752-1759del) | 5 | 14 | 19 |
| EGFR(T790M) | 25 | 0 | 30 |
| EIF2AK1 | 38 | 0 | 42 |
| EPHA1 | 0 | 0 | 0 |
| EPHA2 | 0 | 2 | 0 |
| EPHA3 | 8 | 0 | 14 |
| EPHA4 | 0 | 0 | 0 |
| EPHA5 | 0 | 0 | 9 |
| EPHA6 | 5 | 0 | 0 |
| EPHA7 | 0 | 0 | 1 |
| EPHA8 | 0 | 0 | 0 |
| EPHB1 | 0 | 0 | 8 |
| EPHB2 | 2 | 3 | 10 |
| EPHB3 | 0 | 0 | 0 |
| EPHB4 | 0 | 3 | 0 |
| EPHB6 | 16 | 0 | 34 |
| ERBB2 | 0 | 0 | 0 |
| ERBB3 | 8 | 14 | 11 |
| ERBB4 | 0 | 15 | 6 |
| ERK1 | 0 | 0 | 13 |
| ERK2 | 0 | 8 | 6 |
| ERK3 | 0 | 0 | 9 |
| ERK4 | 1 | 0 | 4 |
| ERK5 | 83 | 6 | 100 |
| ERK8 | 4 | 15 | 25 |
| ERN1 | 27 | 0 | 10 |
| FAK | 93.2 | 8 | 100 |
| FER | 3 | 12 | 0 |
| FES | 0 | 20 | 0 |
| FGFR1 | 2.7 | 44 | 14 |
| FGFR2 | 0 | 37 | 1 |
| FGFR3 | 0 | 52 | 11 |
| FGFR3(G697C) | 8 | 52 | 12 |
| FGFR4 | 0 | 0 | 1 |
| FGR | 21 | 16 | 32 |
| FLT1 | 96.1 | 42 | 43 |
| FLT3 | 100 | 96.7 | 62 |
| FLT3(D835H) | 95.1 | 91.7 | 92.9 |
| FLT3(D835V) | 100 | 100 | 100 |
| FLT3(D835Y) | 95.9 | 100 | 100 |
| FLT3(ITD) | 99.6 | 99.3 | 97.2 |
| FLT3(ITD,D835V) | 100 | 99.15 | 100 |
| FLT3(ITD,F691L) | 100 | 100 | 100 |
| FLT3(K663Q) | 100 | 96.4 | 92.9 |
| FLT3(N841I) | 98.6 | 95.5 | 85 |
| FLT3(R834Q) | 83 | 56 | 55 |
| FLT3 -autoinhibited | 99.8 | 81 | 61 |
| FLT4 | 71 | 27 | 56 |
| FRK | 17 | 0 | 38 |
| FYN | 59 | 0 | 95 |
| GAK | 65 | 36 | 35 |
| GCN2(Kin.Dom.2,S808G) | 15 | 28 | 0 |

TABLE 3-continued

| DiscoverX Kinase Name | % Inhibition @ 100 nM | | |
|---|---|---|---|
| | Sunitinib | Compound No. 10 | Compound No. 16 |
| GRK1 | 4 | 39 | 37 |
| GRK2 | 37 | 0 | 48 |
| GRK3 | 51 | 0 | 61 |
| GRK4 | 49 | 79 | 72 |
| GRK7 | 17 | 40 | 76 |
| GSK3A | 10 | 3 | 10 |
| GSK3B | 24 | 0 | 36 |
| HASPIN | 75 | 59 | 68 |
| HCK | 4 | 2 | 0 |
| HIPK1 | 45 | 56 | 92.6 |
| HIPK2 | 41 | 58 | 99.45 |
| HIPK3 | 56 | 21 | 95.3 |
| HIPK4 | 11 | 28 | 57 |
| HPK1 | 90.3 | 96.6 | 95.2 |
| HUNK | 16 | 13 | 0 |
| ICK | 46 | 0 | 88 |
| IGFIR | 0 | 0 | 6 |
| IKK-alpha | 9 | 0 | 20 |
| IKK-beta | 9 | 8 | 19 |
| IKK-epsilon | 15 | 68 | 44 |
| INSR | 29 | 0 | 25 |
| INSRR | 11 | 1 | 10 |
| IRAK1 | 74 | 99.35 | 96.9 |
| IRAK3 | 66 | 0 | 100 |
| TRAK4 | 37 | 68 | 68 |
| ITK | 12 | 12 | 12 |
| JAK1(JH1domain-catalytic) | 0 | 0 | 10 |
| JAK1(JH2domain-pseudokinase) | 98.1 | 54 | 41 |
| JAK2( JH1domain-catalytic) | 41 | 72 | 76 |
| JAK3 (JH1domain-catalytic) | 0 | 17 | 48 |
| JNK1 | 4 | 9 | 7 |
| JNK2 | 25 | 0 | 32 |
| JNK3 | 47 | 0 | 55 |
| KIT | 100 | 80 | 8 |
| KIT(A829P) | 70 | 0 | 35 |
| KIT(D816H) | 44 | 6 | 33 |
| KIT(D816V) | 14 | 12 | 24 |
| KIT(L576P) | 99.9 | 88 | 12 |
| KIT(V559D) | 99.85 | 88 | 0 |
| KIT(V559D,T6701) | 99.6 | 72 | 23 |
| KIT(V559D,V654A) | 93.5 | 79 | 0 |
| KIT-autoinhibited | 98.3 | 28 | 0 |
| LATS1 | 30 | 43 | 17 |
| LATS2 | 27 | 4 | 13 |
| LCK | 11 | 37 | 16 |
| LIMK1 | 5 | 0 | 17 |
| LIMK2 | 4 | 0 | 17 |
| LKB1 | 27 | 31 | 16 |
| LOK | 5 | 3 | 0 |
| LRRK2 | 78 | 96.5 | 94 |
| LRRK2(G2019S) | 0 | 89 | 88 |
| LTK | 3 | 8 | 0 |
| LYN | 0 | 6 | 9 |
| LZK | 31 | 0 | 61 |
| MAK | 0 | 0 | 4 |
| MAP3K1 | 30 | 0 | 36 |
| MAP3K15 | 58 | 0 | 71 |
| MAP3K2 | 65 | 77 | 29 |
| MAP3K3 | 59 | 59 | 48 |
| MAP3K4 | 17 | 7 | 8 |
| MAP4K2 | 59 | 88 | 89 |
| MAP4K3 | 59 | 74 | 65 |
| MAP4K4 | 15 | 47 | 46 |
| MAP4K5 | 41 | 52 | 53 |
| MAPKAPK2 | 0 | 0 | 0 |
| MAPKAPK5 | 8 | 0 | 28 |
| MARK1 | 25 | 39 | 13 |
| MARK2 | 6 | 6 | 40 |
| MARK3 | 4 | 0 | 0 |
| MARK4 | 33 | 41 | 12 |
| MAST1 | 14 | 40 | 30 |
| MEK1 | 48 | 64 | 56 |
| MEK2 | 74 | 90.4 | 83 |
| MEK3 | 25 | 9 | 35 |
| MEK4 | 68 | 0 | 97.7 |
| MEK5 | 71 | 82 | 80 |
| MEK6 | 0 | 11 | 25 |
| MELK | 22 | 4 | 16 |
| MERTK | 53 | 71 | 68 |
| MET | 0 | 13 | |
| MET(M1250T) | 0 | 0 | 6 |
| MET(Y1235D) | 0 | 4 | 0 |
| MINK | 65 | 91.8 | 81 |
| MKK7 | 3 | 0 | 17 |
| MKNK1 | 15 | 3 | 31 |
| MKNK2 | 33 | 0 | 52 |
| MLCK | 40 | 0 | 0 |
| MLK1 | 4 | 1 | 5 |
| MLK2 | 14 | 18 | 7 |
| MLK3 | 2 | 20 | 0 |
| MRCKA | 0 | 3 | 9 |
| MRCKB | 16 | 0 | 15 |
| MST1 | 29 | 28 | 0 |
| MST1R | 0 | 5 | 0 |
| MST2 | 7 | 82 | 41 |
| MST3 | 41 | 20 | 19 |
| MST4 | 9 | 0 | 37 |
| MTOR | 11 | 0 | 6 |
| MUSK | 20 | 28 | 15 |
| MYLK | 42 | 49 | 34 |
| MYLK2 | / | 26 | 4 |
| MYLK4 | 55 | 32 | 24 |
| MYO3A | 0 | 0 | 1 |
| MYO3B | 0 | 0 | 0 |
| NDR1 | 16 | 34 | 20 |
| NDR2 | 3 | 0 | 11 |
| NEK1 | 4 | 9 | 77 |
| NEK10 | 8 | 10 | 20 |
| NEK11 | 33 | 0 | 36 |
| NEK2 | 6 | 0 | 5 |
| NEK3 | 1 | 50 | 45 |
| NEK4 | 0 | 0 | 9 |
| NEK5 | 7 | 0 | 19 |
| NEK6 | 0 | 19 | 0 |
| NEK7 | 0 | 7 | 5 |
| NEK9 | 0 | 0 | 0 |
| NIK | 12 | 17 | 16 |
| NIMI | 59 | 26 | 67 |
| NLK | 10 | 5 | 8 |
| OSR1 | 46 | 0 | 47 |
| p38-alpha | 0 | 0 | 0 |
| p38-beta | 4 | 80 | 0 |
| p38-delta | 0 | 0 | 0 |
| p38-gamma | 3 | 14 | 15 |
| PAK1 | 0 | 0 | 0 |
| PAK2 | 0 | 0 | 0 |
| PAK3 | 32 | 36 | 13 |
| PAK4 | 0 | 0 | 0 |
| PAK6 | 0 | 0 | 0 |
| PAK7 | 2 | 0 | 11 |
| PCTK1 | 7 | 0 | 19 |
| PCTK2 | 56 | 0 | 17 |
| PCTK3 | 4 | 12 | 9 |
| PDGFRA | 99.4 | 84 | 55 |
| PDGFRB | 99.85 | 99.35 | 61 |
| PDPK1 | 0 | 11 | 3 |
| PFCDPK1 (P.falciparum) | 8 | 0 | 14 |
| PFPK5 (P.falciparum) | 43 | 0 | 40 |
| PFTAIRE2 | 0 | 0 | 0 |
| PFTK1 | 5 | 7 | 13 |
| PHKG1 | 63 | 86 | 88 |
| PHKG2 | 76 | 94.4 | 97.2 |
| PIK3C2B | 0 | 0 | 24 |
| PIK3C2G | 7 | 19 | 4 |
| PIK3CA | 0 | 0 | 14 |
| PIK3CA(C420R) | 13 | 0 | 31 |
| PIK3CA(E542K) | 13 | 10 | 26 |
| PIK3CA(E545A) | 0 | 3 | 10 |
| PIK3CA(E545K) | 24 | 56 | 41 |
| PIK3CA(H1047L) | 0 | 16 | 15 |

TABLE 3-continued

| DiscoverX Kinase Name | % Inhibition @ 100 nM | | |
|---|---|---|---|
| | Sunitinib | Compound No. 10 | Compound No. 16 |
| PIK3CA(H1047Y) | 19 | 4 | 28 |
| PIK3CA(I800L) | 10 | 41 | 20 |
| PIK3CA(M10431) | 10 | 0 | 12 |
| PIK3CA(Q546K) | 2 | 0 | 3 |
| PIK3CB | 0 | 0 | 3 |
| PIK3CD | 14 | 0 | 24 |
| PIK3CG | 6 | 0 | 22 |
| PIK4CB | o | 0 | 10 |
| PIKFYVE | 21 | 6 | 27 |
| PIM1 | 0 | 0 | 0 |
| PIM2 | 0 | 8 | 0 |
| PIM3 | 0 | 8 | 0 |
| PIP5K1A | 83 | 98 | 91.1 |
| PIP5K1C | 8 | 32 | 15 |
| PIP5K2B | 35 | 91.7 | 86 |
| PIP5K2C | 12 | 0 | 1 |
| PKAC-alpha | 0 | 0 | 0 |
| PKAC-beta | 0 | 0 | 13 |
| PKMYT1 | 14 | 19 | 18 |
| PKN1 | 8 | 7 | 24 |
| PKN2 | 8 | 24 | 18 |
| PKNB(M.tuberculosis) | 36 | 0 | 16 |
| PLK1 | 10 | 0 | 28 |
| PLK2 | 14 | 0 | 19 |
| PLK3 | 11 | 4 | 16 |
| PLK4 | 23 | 0 | 57 |
| PRKCD | 9 | 16 | 9 |
| PRKCE | 4 | 0 | 5 |
| PRKCH | 7 | 1 | 0 |
| PRKCI | 35 | 12 | 37 |
| PRKCQ | 4 | 0 | 0 |
| PRKD1 | 0 | 0 | 0 |
| PRKD2 | 18 | 0 | 16 |
| PRKD3 | 45 | 0 | 53 |
| PRKG1 | 2 | 0 | 14 |
| PRKG2 | 27 | 0 | 36 |
| PRKR | 12 | 2 | 29 |
| PRKX | 13 | 0 | 9 |
| PRP4 | 47 | 87 | 76 |
| PYK2 | 3 | 31 | 7 |
| QSK | 0 | 0 | 0 |
| RAF1 | 0 | 9 | 0 |
| RET | 81 | 55 | 60 |
| RET(M918T) | 78 | 65 | 68 |
| RET(V804L) | 88 | 91.1 | 86 |
| RET(V804M) | 97.3 | 86 | 99.35 |
| RIOK1 | 84 | 88 | 87 |
| RIOK2 | 30 | 0 | 38 |
| RIOK3 | 100 | 93.9 | 100 |
| RIPK1 | 8 | 1 | 19 |
| RIPK2 | 17 | 0 | 18 |
| RIPK4 | 8 | 12 | 14 |
| RIPK5 | 24 | 0 | 3 |
| ROCK1 | 37 | 4 | 53 |
| ROCK2 | 25 | 29 | 44 |
| ROS1 | 1 | 15 | 0 |
| RPS6KA4(Kin.Dom.1-N-terminal) | 49 | 8 | 34 |
| RPS6KA4(Kin.Dom.2-C-terminal) | 33 | 0 | 35 |
| RPS6KA5(Kin.Dom.1-N-terminal) | 2 | 11 | 0 |
| RPS6KA5(Kin.Dom.2-C-terminal) | 12 | 0 | 17 |
| RSK1(Kin.Dom.1-N-terminal) | 6 | 4 | 20 |
| RSK1(Kin.Dom.2-C-terminal) | 3 | 0 | 30 |
| RSK2(Kin.Dom.1-N-terminal) | 61 | 39 | 59 |
| RSK2(Kin.Dom.2-C-terminal) | 61 | 54 | 65 |
| RSK3(Kin.Dom.1-N-terminal) | 18 | 13 | 7 |
| RSK3(Kin.Dom.2-C-terminal) | 9 | 0 | 19 |
| RSK4(Kin.Dom.1-N-terminal) | 66 | 0 | 70 |
| RSK4(Kin.Dom.2-C-terminal) | 10 | 4 | 22 |
| S6K1 | 56 | 37 | 33 |
| SBK1 | 34 | 40 | 58 |
| SGK | 65 | 2 | 47 |
| SgK110 | 0 | 58 | 0 |
| SGK2 | 12 | 0 | 14 |
| SGK3 | 33 | 0 | 26 |
| SIK | 0 | 0 | 9 |
| SIK2 | 9 | 0 | 15 |
| SLK | 25 | 59 | 37 |
| SNARK | 63 | 80 | 81 |
| SNRK | 9 | 12 | 10 |
| SRC | 0 | 15 | 6 |
| SRMS | 14 | 13 | 27 |
| SRPK1 | 85 | 60 | 78 |
| SRPK2 | 13 | 66 | 51 |
| SRPK3 | 38 | 88 | 77 |
| STK16 | 4 | 0 | 6 |
| STK33 | 52 | 70 | 78 |
| STK35 | 8 | 21 | 15 |
| STK36 | 0 | 0 | 0 |
| STK39 | 31 | 7 | 12 |
| SYK | 6 | 16 | 0 |
| TAK1 | 65 | 59 | 61 |
| TAOK1 | 12 | 22 | 53 |
| TAOK2 | 6 | 18 | 21 |
| TAOK3 | 28 | 31 | 56 |
| TBK1 | 28 | 57 | 58 |
| TEC | 0 | 0 | 0 |
| TESK1 | 8 | 10 | 5 |
| TGFBR1 | 0 | 11 | 1 |
| TGFBR2 | 0 | 0 | 0 |
| TIE1 | 0 | 2 | 14 |
| TIE2 | 0 | 0 | 0 |
| TLK1 | 2 | 2 | 0 |
| TLK2 | 23 | 0 | 23 |
| TNIK | 45 | 86 | 55 |
| TNK1 | 27 | 9 | 43 |
| TNK2 | 14 | 0 | 20 |
| TNNI3K | 0 | 0 | 5 |
| TRKA | 94.9 | 95.5 | 97.4 |
| TRKB | 76 | 61 | 83 |
| TRKC | 60 | 60 | 63 |
| TRPM6 | 27 | 0 | 29 |
| TSSK1B | 1 | 0 | 4 |
| TSSK3 | 12 | 4 | 5 |
| TTK | 28 | 0 | 8 |
| TXK | 10 | 10 | 16 |
| TYK2(JH1domain-catalytic) | 29 | 1 | 33 |
| TYK2(JH2domain-pseudokinase) | 49 | 0 | 39 |
| TYRO3 | 18 | 0 | 2.1 |
| ULK1 | 69 | 58 | 56 |
| ULK2 | 77 | 71 | 82 |
| ULK3 | 15 | 87 | 25 |
| VEGFR2 | 99.95 | 55 | 19 |
| VPS34 | 22 | 25 | 46 |
| VRK2 | 28 | 0 | 39 |
| WEE1 | 16 | 15 | 24 |
| WEE2 | 5 | 7 | 2 |
| WNK1 | 1 | 0 | 2 |
| WNK2 | 6 | 0 | 13 |
| WNK3 | 1 | 9 | 7 |
| WNK4 | 40 | 0 | 55 |
| YANK1 | 11 | 0 | 23 |
| YANK2 | 0 | 1 | 0 |
| YANK3 | 0 | 22 | 0 |
| YES | 11 | 13 | 24 |
| YSK1 | 17 | 21 | 22 |
| YSK4 | 84 | 90.4 | 98.2 |
| ZAK | 23 | 10 | 10 |
| ZAP70 | 50 | 6 | 60 |

TABLE 4

| | Percentage inhibition at 100 nM | | |
|---|---|---|---|
| Kinase | sunitinib | Compound No. 10 | Compound No. 16 |
| AMPK(α1) | 50% | 49% | 29% |
| AMPK(α2) | 46% | 35% | 64% |

TABLE 4-continued

Percentage inhibition at 100 nM

| Kinase | sunitinib | Compound No. 10 | Compound No. 16 |
|---|---|---|---|
| VEGFR2 | 100% | 55% | 19% |
| BTK | 91.3% | 0% | 0% |
| CSF1R | 99.2% | 24% | 18% |
| CSF1R-autoinhibited | 99.8% | 0% | 14% |
| FLT1 | 96.1% | 42% | 43% |
| JAK1 JH2-pseudokinase | 98.1% | 54% | 41% |
| KIT-autoinbibited | 98.3% | 28% | 0% |

Example 9. AMPK Inhibitors in Combination with an Additional Therapeutic Agent for the Treatment of AML The following is a non-limiting example showing that AMPK inhibitors, such as the compounds of the present disclosure, can be used in combination with an additional therapeutic agent for the treatment of AML.

Figure 5:
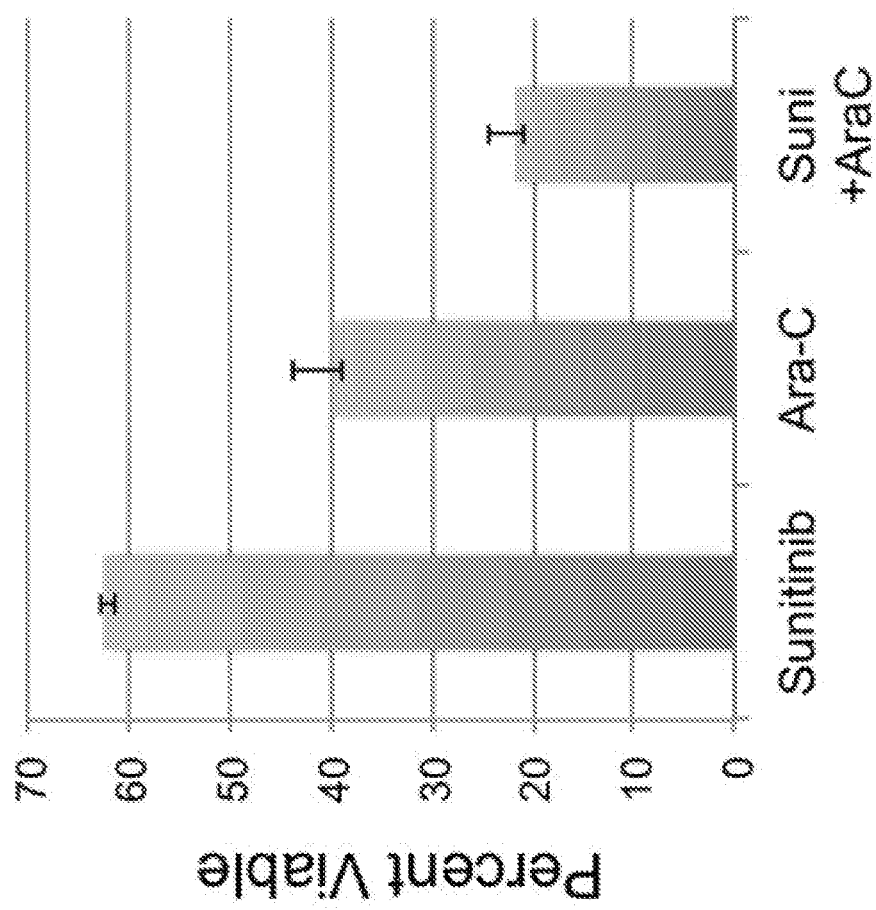
FIG. 5 is a graph showing the viability of primary AML cells cultured with either 2.5 μM sunitinib alone, 2.5 μM cytarabine alone, or a combination of sunitinib and cytarabine for 24 hours.

In a first experiment, primary AML cells were cultured and treated for 24 hours with 2.5 µM sunitinib alone, 2.5 µM cytarabine alone, or a combination of sunitinib and cytarabine. The cell viability was then assessed. The result of this analysis are shown in FIG. 5. Whereas all treatments decreased cell viability, co-treatment of sunitinib and cytarabine result in cell viability. These results indicate that AMPK inhibitors, such as the compounds of the present disclosure, can be used in combination with cytarabine for the treatment of AML.

Figure 6:
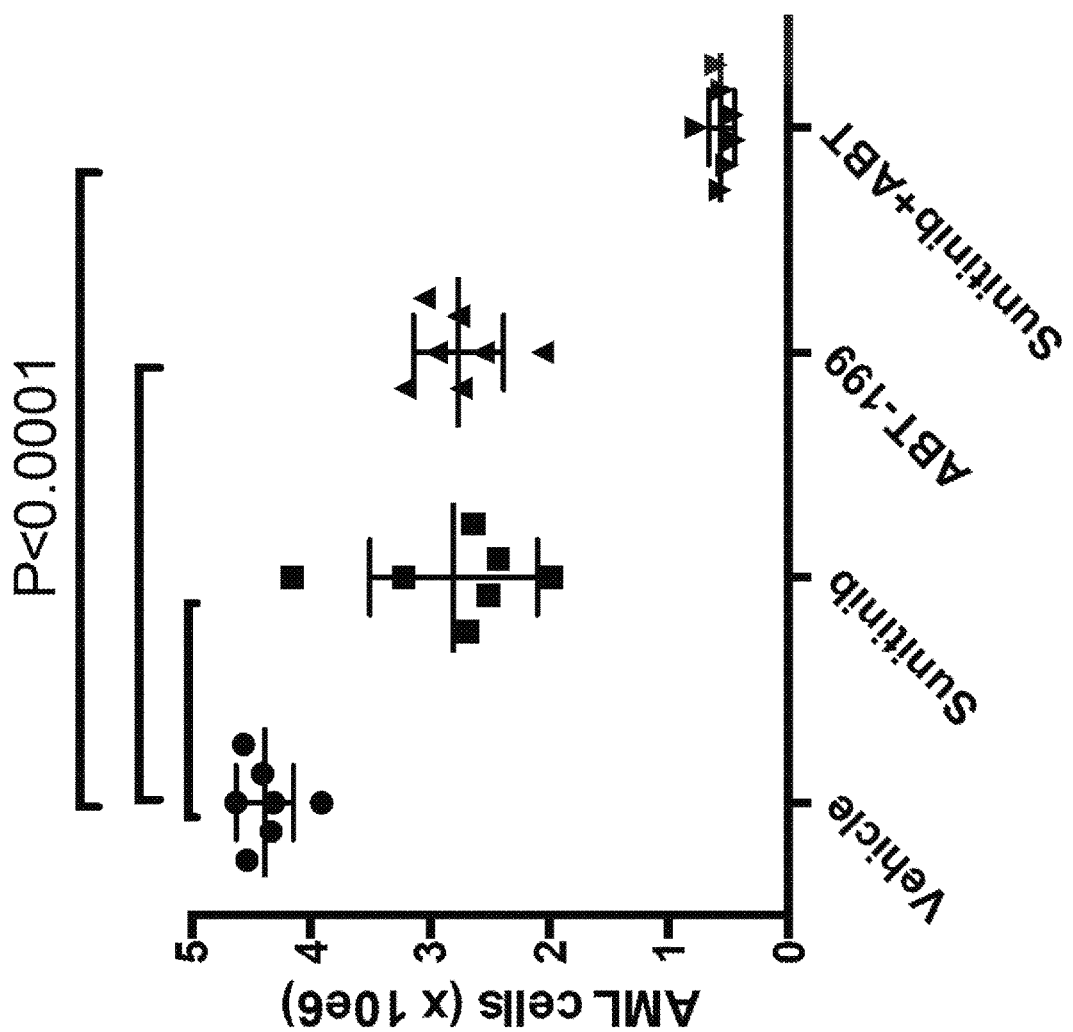
FIG. 6 is a graph showing the analysis of AML cell burden in xenograft mice treated with either vehicle control, sunitinib alone, venetoclax alone or a combination of sunitinib and venetoclax.

In a second experiment, primary AML cells were transplanted into NSG-S mice and allowed to engraft for 4 weeks. Mice were then treated with either vehicle control, sunitinib alone (20 mg/kg), venetoclax alone (100 mg/kg) or a combination of sunitinib and venetoclax. Treatments were administered daily for 10 days. After the 10 days, animals were sacrificed to evaluate AML cell burden in marrow. The results of this analysis are shown in FIG. 6. As shown in FIG. 6, treatment with the combination of sunitinib and venetoclax results in the largest decreased in AML cell burden in the mice. These results indicate that AMPK inhibitors, such as the compounds of the present disclosure, can be used in combination with venetoclax for the treatment of AML.

EQUIVALENTS

The foregoing examples of the present invention have been presented for purposes of illustration and description. Furthermore, these examples are not intended to limit the invention to the form disclosed herein. Consequently, variations and modifications commensurate with the teachings of the description of the invention, and the skill or knowledge of the relevant art, are within the scope of the present invention. The specific embodiments described in the examples provided herein are intended to further explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

What is claimed is:

1. A compound of Formula (I):

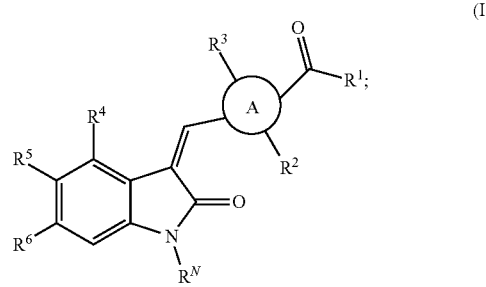

a stereoisomer thereof, or a pharmaceutically acceptable salt thereof, wherein:
A is pyrrole;
$R^N$ is H;
$R^1$ is N-(2-(diethylamino)ethyl);
$R^2$ is $CH_3$;
$R^3$ is $CH_3$;
$R^4$ is H;
$R^5$ is 5-(2-cyanoethyl).

2. A compound of Formula (I):

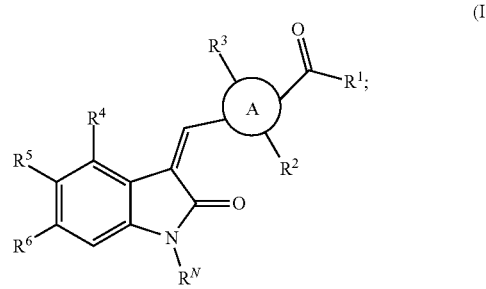

a stereoisomer thereof, or a pharmaceutically acceptable salt thereof, wherein:
A is pyrrole;
$R^N$ is H;
$R^1$ is N-(2-(diethylamino)ethyl), N-(2-(dimethylamino)ethyl)amino, N-(2-(dimethylamino)propyl)amino, N-(2-(diethylamino)propyl)amino, or N-(2-(pyrrolidin-1-ylamino)propyl)amino;
$R^2$ is $CH_3$;
$R^3$ is $CH_3$;
$R^4$ is H;
$R^5$ is 5-(2-cyanoethyl), 5-(2-dimethylaminoethyl) or 5-(2-amidoethyl); and
$R^6$ is H.

3. A compound of Formula (I):

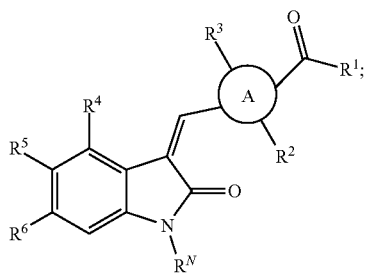

a stereoisomer thereof, or a pharmaceutically acceptable salt thereof, wherein:
A is pyrrole;
$R^N$ is H;
$R^1$ is N-(2-(diethylamino)ethyl);
$R^2$ is $CH_3$;
$R^3$ is $CH_3$;
$R^4$ is H;
$R^5$ is 5-(2-dimethylaminoethyl); and
$R^6$ is H.

4. A compound of Formula (I):

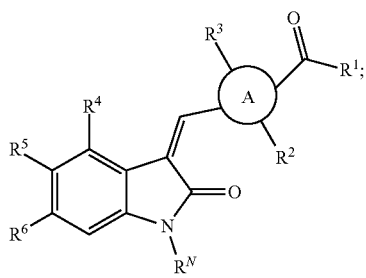

a stereoisomer thereof, or a pharmaceutically acceptable salt thereof, wherein:
A is pyrrole;
$R^N$ is H;
$R^1$ is N-(2-(diethylamino)ethyl);
$R^2$ is $CH_3$;
$R^3$ is $CH_3$;
$R^4$ is H;
$R^5$ is 5-(2-amidoethyl); and
$R^6$ is H.

5. A compound of Formula (I):

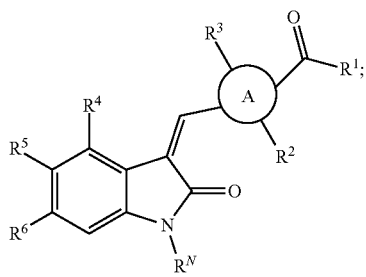

a stereoisomer thereof, or a pharmaceutically acceptable salt thereof, wherein:
A is pyrrole;
$R^N$ is H;
$R^1$ is N-(2-(dimethylamino)ethyl)amino;
$R^2$ is $CH_3$;
$R^3$ is $CH_3$;
$R^4$ is H;
$R^5$ is 5-(2-cyanoethyl); and
$R^6$ is H.

6. A compound of Formula (I):

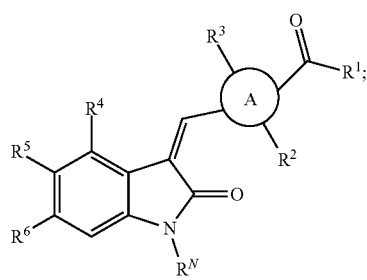

a stereoisomer thereof, or a pharmaceutically acceptable salt thereof, wherein:
A is pyrrole;
$R^N$ is H;
$R^1$ is N-(2-(dimethylamino)ethyl)amino;
$R^2$ is $CH_3$;
$R^3$ is $CH_3$;
$R^4$ is H;
$R^5$ is 5-(2-dimethylaminoethyl); and
$R^6$ is H.

7. A compound of Formula (I):

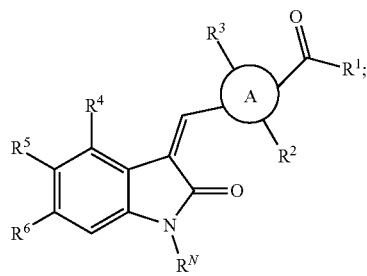

a stereoisomer thereof, or a pharmaceutically acceptable salt thereof, wherein:
A is pyrrole;
$R^N$ is H;
$R^1$ is N-(2-(dimethylamino)ethyl)amino;
$R^2$ is $CH_3$;
$R^3$ is $CH_3$;
$R^4$ is H;
$R^5$ is 5-(2-amidoethyl); and
$R^6$ is H.

8. A compound of Formula (I):

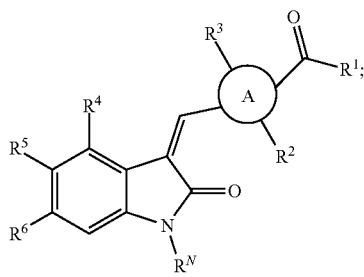

a stereoisomer thereof, or a pharmaceutically acceptable salt thereof, wherein:
A is pyrrole;
$R^N$ is H;
$R^1$ is N-(2-(dimethylamino)propyl)amino;
$R^2$ is $CH_3$;
$R^3$ is $CH_3$;
$R^4$ is H;
$R^5$ is 5-(2-cyanoethyl); and
$R^6$ is H.

9. A compound of Formula (I):

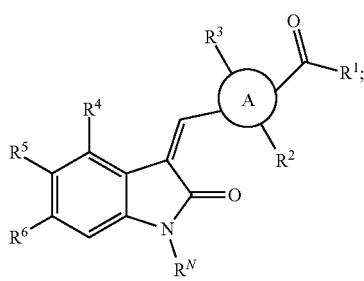

a stereoisomer thereof, or a pharmaceutically acceptable salt thereof, wherein:
A is pyrrole;
$R^N$ is H;
$R^1$ is N-(2-(dimethylamino)propyl)amino;
$R^2$ is $CH_3$;
$R^3$ is $CH_3$;
$R^4$ is H;
$R^5$ is 5-(2-dimethylaminoethyl); and
$R^6$ is H.

10. A compound of Formula (I):

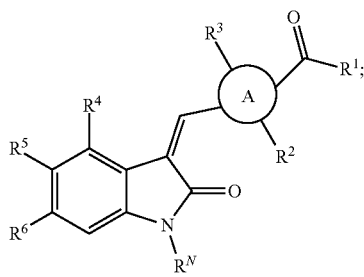

a stereoisomer thereof, or a pharmaceutically acceptable salt thereof, wherein:
A is pyrrole;
$R^N$ is H;
$R^1$ is N-(2-(dimethylamino)propyl)amino;
$R^2$ is $CH_3$;
$R^3$ is $CH_3$;
$R^4$ is H;
$R^5$ is 5-(2-amidoethyl); and
$R^6$ is H.

11. A compound of Formula (I):

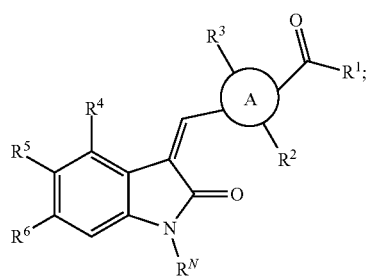

a stereoisomer thereof, or a pharmaceutically acceptable salt thereof, wherein:
A is pyrrole;
$R^N$ is H;
$R^1$ is N-(2-(diethylamino)propyl)amino;
$R^2$ is $CH_3$;
$R^3$ is $CH_3$;
$R^4$ is H;
$R^5$ is 5-(2-cyanoethyl); and
$R^6$ is H.

12. A compound of Formula (I):

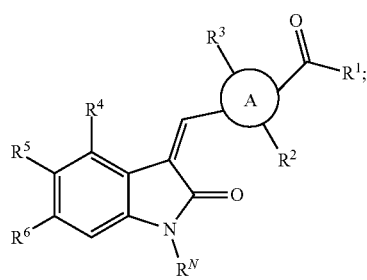

a stereoisomer thereof, or a pharmaceutically acceptable salt thereof, wherein:
A is pyrrole;
$R^N$ is H;
$R^1$ is N-(2-(diethylamino)propyl)amino;
$R^2$ is $CH_3$;
$R^3$ is $CH_3$;
$R^4$ is H;
$R^5$ is 5-(2-dimethylaminoethyl); and
$R^6$ is H.

13. A compound of Formula (I):

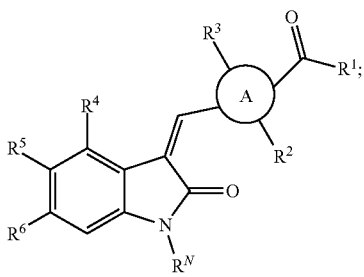

a stereoisomer thereof, or a pharmaceutically acceptable salt thereof, wherein:
A is pyrrole;
$R^N$ is H;
$R^1$ is N-(2-(diethylamino)propyl)amino;
$R^2$ is $CH_3$;
$R^3$ is $CH_3$;
$R^4$ is H;
$R^5$ is 5-(2-amidoethyl); and
$R^6$ is H.

14. A pharmaceutical composition comprising the compound of claim 1, and at least one pharmaceutically acceptable additive.

15. A pharmaceutical kit containing the pharmaceutical composition of claim 14, prescribing information for the composition, and a container.

16. A method for modulating AMPK activity in a subject, comprising administering to the subject a therapeutically effective amount of the compound of claim 1.

17. The method of claim 16, wherein modulating AMPK activity comprises inhibiting AMPK activity.

18. A method of treating, or ameliorating cancer, or preventing metastasis of a cancer in a subject, wherein the cancer is mediated by AMP-activated protein kinase, comprising administering to the subject a therapeutically effective amount of the compound of claim 1.

19. A method of treating, or ameliorating cancer, or preventing metastasis of a cancer in a subject, wherein the cancer is mediated by AMP-activated protein kinase, comprising administering to the subject a therapeutically effective amount of the pharmaceutical composition of claim 14.

* * * * *